United States Patent [19]

Tidd et al.

[11] 4,446,491

[45] May 1, 1984

[54] ULTRAHIGH RESOLUTION PHOTOCOMPOSITION SYSTEM EMPLOYING ELECTRONIC CHARACTER GENERATION FROM MAGNETICALLY STORED DATA

[75] Inventors: James A. Tidd, Northbrook; Miles H. Tidd, Deerfield, both of Ill.

[73] Assignee: Alphatype Corporation, Niles, Ill.

[21] Appl. No.: 192,846

[22] Filed: Oct. 1, 1980

Related U.S. Application Data

[62] Division of Ser. No. 942,893, Sep. 15, 1978.

[51] Int. Cl.³ .............................................. G11B 5/09

[52] U.S. Cl. .............................................. 360/48

[58] Field of Search .............................. 360/39, 48, 49

[56] References Cited

U.S. PATENT DOCUMENTS

| | | | |
|---|---|---|---|
| 3,546,686 | 12/1970 | McPherson et al. | 360/48 |
| 3,643,067 | 2/1972 | Colditz et al. | 354/7 X |
| 3,936,604 | 2/1976 | Sato | 364/523 |
| 4,029,947 | 6/1977 | Evans et al. | 364/523 X |
| 4,151,571 | 4/1979 | Cardot et al. | 360/48 X |

*Primary Examiner*—Vincent P. Canney

*Attorney, Agent, or Firm*—Sixbey, Friedman & Leedom

[57] ABSTRACT

A photocomposition system for composing typeface characters on a CRT display using a magnetic font disc formed of plural variable length character sectors wherein each sector includes successive storage cells containing all of the coded signals necessary to describe a single character image which signals may be retrieved and decoded for use by the CRT to create an optical image of the character. An optical scanner system is disclosed for optically determining the coordinate points on the boundary of an original character design for subsequent encoding into successive 3 bit binary codes representing successive end to end translational movements along the boundaries of the character design being encoded. The translational movements are selected from a subset of a total of 24 possible translational paths wherein the paths making up the subset is continually varying dependent on the general direction of the previous translational path. An electronic printer system is disclosed for retrieving single groups of character identifying translational command codes in response to text composing signals produced on a text editor. Each group of translational command codes is temporarily stored for decoding into coordinate signals used to access a high speed output memory having storage cells corresponding to the coordinates of the elemental areas (dots) on the CRT screen conceptually divided into an elemental area (dot) matrix. Following one complete decoding cycle, the data stored in the high speed output memory is used to cause the CRT to create an image of the character.

13 Claims, 48 Drawing Figures

FIG. 2
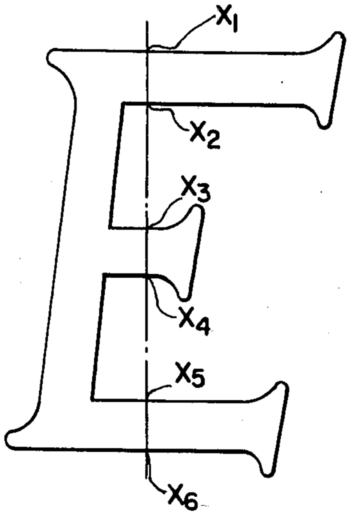
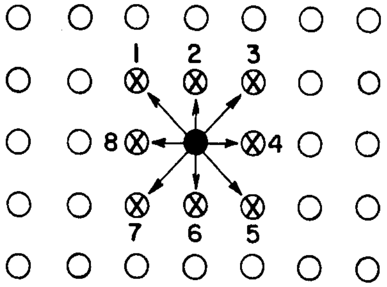
FIG. 4
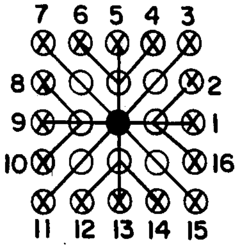
FIG. 5
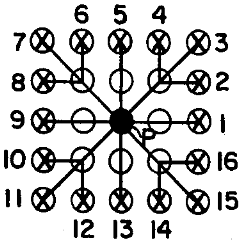
FIG. 8
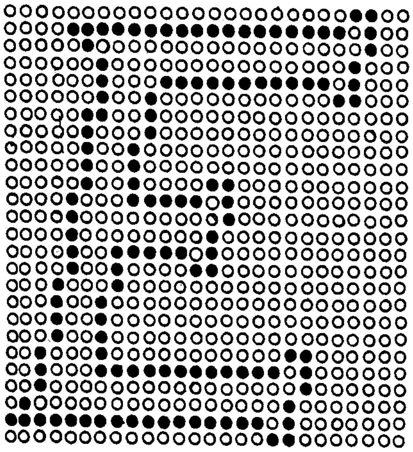
FIG. 3
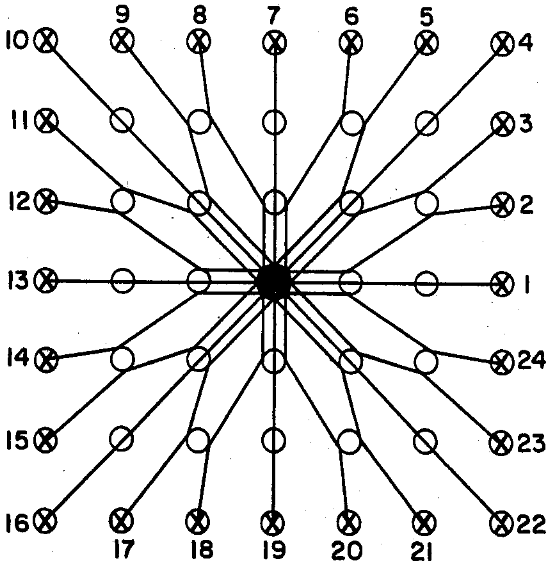
FIG. 6

| NUMBER OF DOTS TRANSVERSED PER TRANSLATIONAL CODE | NO. OF PERIPHERAL TERMINAL POINTS | NO. OF STORAGE BITS REQUIRED PER CODE | RATIO OF BITS/DOTS |
|---|---|---|---|
| 1 | 8 | 3 | 3/1 |
| 2 | 16 | 4 | 4/2 |
| 3 | 24 | 5 | 5/3 |
| 4 | 32 | 5 | 5/4 |
| 5 | 40 | 6 | 6/5 |
| 6 | 48 | 6 | 6/6 |
| 7 | 56 | 6 | 6/7 |
| 8 | 64 | 6 | 6/8 |
| 9 | 72 | 7 | 7/9 |

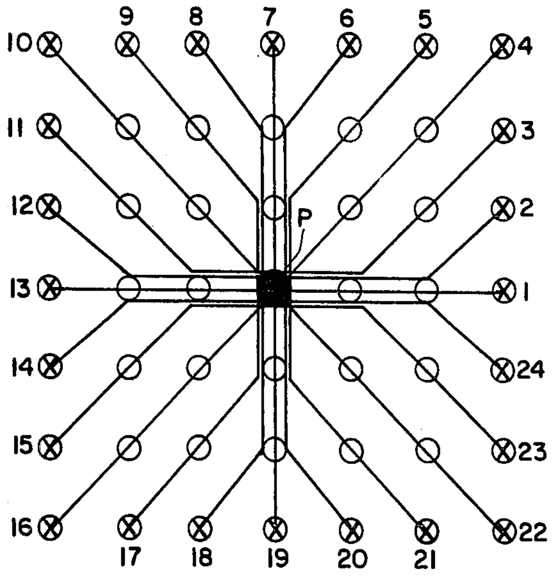
FIG. 9
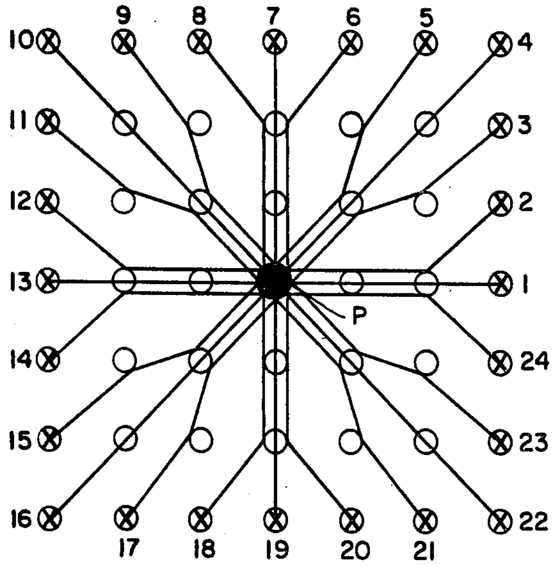
FIG. 10
FIG. 12
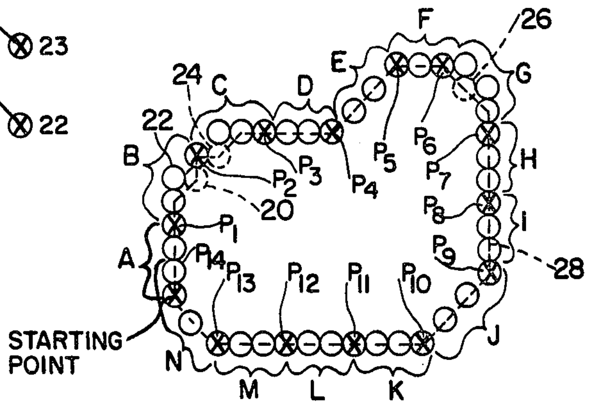

| TRANSLATIONAL MOVEMENT | PATH SET FROM WHICH DESIGNATED PATH IS SELECTED | PATH NO. DESIGNATION DECIMAL | BINARY CODE | RESULTING DIRECTIONAL MOVEMENT | PATH SET USED FOR DESIGNATING NEXT MOVE |
|---|---|---|---|---|---|
| A | $T_5$ | 4 | 100 | $D_5$ | $T_5$ |
| B | $T_5$ | 5 | 101 | $D_6$ | $T_6$ |
| C | $T_6$ | 6 | 110 | $D_7$ | $T_7$ |
| D | $T_7$ | 4 | 100 | $D_7$ | $T_7$ |
| E | $T_7$ | 1 | 001 | $D_6$ | $T_6$ |
| F | $T_6$ | 7 | 111 | $D_7$ | $T_7$ |
| G | $T_7$ | 07 | 000 111 | $D_1$ | $T_1$ |
| H | $T_1$ | 4 | 100 | $D_1$ | $T_1$ |
| I | $T_1$ | 4 | 100 | $D_1$ | $T_1$ |
| J | $T_1$ | 7 | 111 | $D_2$ | $T_2$ |
| K | $T_2$ | 7 | 111 | $D_3$ | $T_3$ |
| L | $T_3$ | 4 | 100 | $D_3$ | $T_3$ |
| M | $T_3$ | 4 | 100 | $D_3$ | $T_3$ |
| N | $T_3$ | 07 | 000 111 | $D_4$ | |

TOTAL DOTS TRAVERSED = 42

TOTAL BINARY BITS NECESSARY TO STORE BOUNDARY = 48

FIG. 13

| COLUMN 1<br>FORMAT OF SUCCESSIVE PAIRS OF 8 BIT BYTES ACTUALLY STORED ON DISC 44 BY MICROPROCESSOR 36 | COLUMN 2<br>FOUR PLACE HEXIDECIMAL NO. REPRESENTED BY SUCCESSIVE PAIRS OF 8 BIT BYTES | COLUMN 3<br>MEANING OF HEXIDECIMAL NO. |
|---|---|---|
| 0000 0000 0000 0000 | 0000 | START OF SCAN OF FIRST VERTICAL LINE |
| 0000 0000 0000 0101 | 0005 | FIRST TRANSITION FROM DARK TO LIGHT OCCURRED AT 5th PHOTODIODE FROM BOTTOM |
| 0000 0000 1011 0101 | 00B5 | FIRST TRANSITION FROM LIGHT BACK TO DARK OCCURRED AT THE 181st PHOTODIODE FROM BOTTOM |
| 0000 0001 1011 0101 | 01B5 | SECOND TRANSITION FROM DARK TO LIGHT OCCURRED AT 437th PHOTODIODE |
| 0000 0010 0000 0101 | 0205 | SECOND TRANSITION FROM LIGHT TO DARK OCCURRED AT 517th PHOTODIODE |
| 0000 0000 0000 0000 | 0000 | START OF SCAN OF SECOND VERTICAL LINE |

FIG. 20

PRIOR ART

- ALPHABET DIRECTORY (SECTOR 131) (MAX. 512 BYTES) 282
  - CUSTOMER CHECK NUMBER (2 BYTES) 228
  - ALPHABET INFORMATION (REPEATED FOR EACH ALPHABET) 230
    - TYPE FACE NUMBER (2 BYTES) 232
    - ENCODER POINT SIZE (1/8 PT. UNITS) (1 BYTE) 234
    - ENCODER SET SIZE (1/8 SET UNITS) (1 BYTE) 236
    - SECTOR 130 TRACK NUMBER (1 BYTE) 238
    - SIZE INFORMATION LENGTH (1 BYTE) 240
    - SIZE INFORMATION 256
      - 258 LOWER LIMIT
        - 262 POINT SIZE (1/8 PT. UNITS) (2 BYTES)
        - 264 SET SIZE (1/8 SET UNITS) (2 BYTES)
      - SIZE BREAK (REPEATED)
        - POINT SIZE (1/8 PT. UNITS) (2 BYTES)
        - SET SIZE (1/8 SET UNITS) (2 BYTES)
      - 260 UPPER LIMIT 266
        - POINT SIZE (1/8 PT. UNITS) (2 BYTES)
        - SET SIZE (1/8 SET UNITS) (2 BYTES) 268
- ALPHABET (REPEATED FOR EACH ALPHABET)
  - CHARACTER (REPEATED FOR EACH CHARACTER) (SECTORS 0-127)
    - SECTION INFORMATION (REPEATED)
      - LEFT LIMIT (BIT 15=1) (2 BYTES) 284
      - SECTION LENGTH (2 BYTES) 286
      - SECTION BYTE EXECUTION TIME (2 BYTES) 288
    - RIGHT LIMIT (2 BYTES) 290
    - SECTION (REPEATED FOR EACH SECTION)
      - 00 (1 BYTE) 292
      - STARTING X COORDINATE (2 BYTES) 294
        - BITS 11, 12 = 1
        - BITS 13, 14, 15 = STARTING DIRECTION
      - STARTING Y COORDINATE (2 BYTES) 296
        - BIT 11 = X ENTRY DIRECTION (0 = FROM RIGHT, 1 = LEFT)
      - 8 BYTES OF OFFH 298
      - BOUNDRY DATA (VARIABLE LENGTH) (LAST BYTE OF DATA = 00) 300
      - ADDITIONAL BOUNDRY (REPEATED IF REQUIRED)
        - 00 (1 BYTE) 302
        - STARTING X COORDINATE (2 BYTES) 304
          - BITS 11, 12 = 0
          - BITS 13, 14, 15 = START DIRECTION
        - STARTING Y COORDINATE (2 BYTES) 306
          - BIT 11 = X ENTRY DIRECTION (0 = FROM RIGHT, 1 = LEFT)
        - BOUNDRY DATA (VARIABLE) (LAST BYTE = 00) 308
    - 2 BYTES OF 00 310
    - 0F8H (1 BYTE) 312
  - WIDTH TABLE 314 (SECTOR 128)
    - CHARACTER WIDTH 316 (REPEATED 128)
      - 144 RELATIVE UNITS PER EM (1 BYTE)
  - SECTOR 318 DIRECTORY (SECTOR 130)
    - SECTOR 320 INFORMATION (REPEATED 130)
      - TRACK NUMBER (1 BYTE) (77 IF SECTOR NOT ON DISC)
      - LENGTH (2 BYTES)
        - BITS 14, 15 = BREAKS BETWEEN TRACKS

FIG. 25

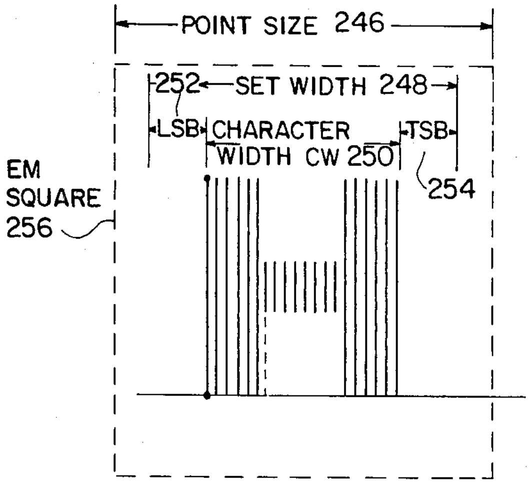
FIG. 26
FIG. 30a
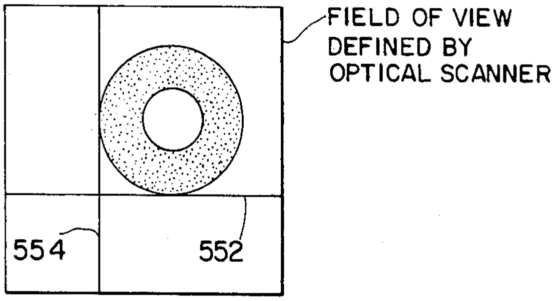
FIG. 30b
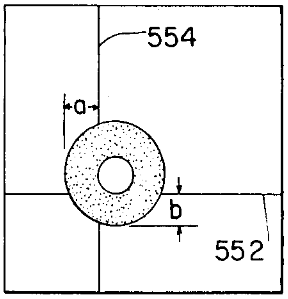
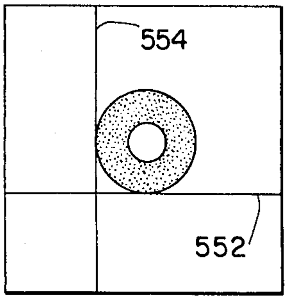
FIG. 30c

FIG. 33
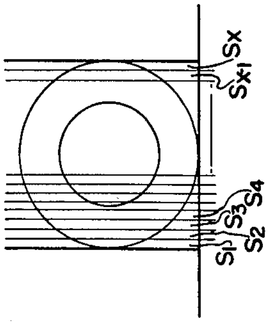
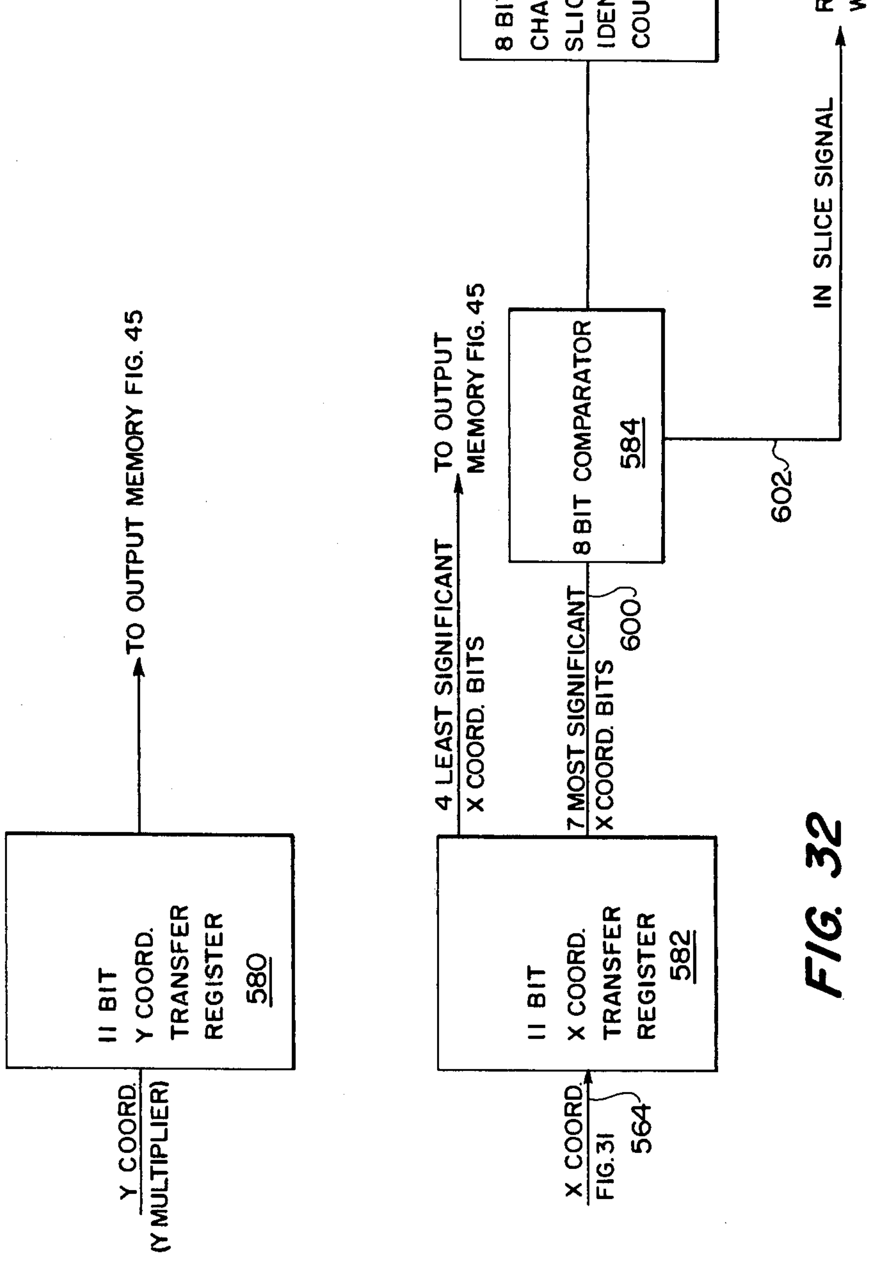
FIG. 32

ULTRAHIGH RESOLUTION PHOTOCOMPOSITION SYSTEM EMPLOYING ELECTRONIC CHARACTER GENERATION FROM MAGNETICALLY STORED DATA

This is a division of application Ser. No. 942,893, filed Sept. 15, 1978.

BACKGROUND OF THE INVENTION (1) Field of the Invention

This invention relates to the field of photocomposition using electronically displayed character images generated from stored binary signals.

(2) Discussion of the Prior Art

Electronic graphic displays controlled by digital computers are presently used in a variety of applications including computer aided design, long distance telecommunications and word processor systems. Due to their extremely high speed and great versatility, computer controlled CRT displays have even found application in the field of photocomposition of typecharacters and other graphic symbols but such applications have generally been attended by low resolution and high cost due to the vast amount of digital data needed to obtain even a minimally acceptable character resolution. As the requirement for greater resolution in character design increases, very significant sacrifices must be made in the speed at which the character designs are displayed in order to keep the capital equipment costs within reasonable limits. For this reason, virtually all photocomposition systems capable of producing high resolution, graphic quality character images have relied upon film grid fonts from which the character designs may be optically reproduced. Film font systems, however, suffer from a number of disadvantages including the high cost and fragile nature of the film grids, the need for a complicated font support mechanism and the need for an expensive optical projection system.

Since an electronic display system virtually eliminates all of these disadvantages of the conventional film font, numerous attempts have been made to develop a practical electronic system capable of producing sufficiently high resolution to compete with film font based photocomposition systems. In U.S. Pat. No. 3,569,951 to Lavenir, a digital computer based graphic symbol display system is disclosed in which line image characters are generated on a CRT display screen by cursively moving the CRT beam in response to a series of 3 bit codes commanding successive translational movements of the CRT beam. Since the CRT screen can be imagined as an orthogonal matrix of dots, each translational movement of the CRT can be described as a movement from one dot in the matrix to an adjacent dot in one of eight possible directions (called Freeman directions). A three bit binary number is required to identify all 8 possible directions assigned to each translational movement command produced by the digital circuitry controlling the CRT display. To obtain a greater degree of flexibility, the Freeman direction codes can be expanded to allow selectively for either one dot or two dot translational movements, as is disclosed in U.S. Pat. No. 3,533,096 to Bouchard and U.S. Pat. No. 3,603,967 Houerbach.

Still further reduction in the storage capacity required for cursive character generation can be realized by using successive two part encoded commands wherein the first part of each command identifies generally a sector direction in which movement of the CRT beam will take place and a second part specifically identifies a path within the sector over which the CRT beam is to be moved. By generating successive two part commands of this type the CRT beam may be commanded to sweep out any arbitrary design. Examples of this technique are disclosed in U.S. Pat. Nos. 3,675,230 to Pitteway; 3,716,705 to Newell and 3,735,389 to Tarczy-Hornach. While significant reduction in storage capacity can be achieved by this approach especially when a large number of display matrix dots are traversed in response to each binary path identification code, this reduction is offset somewhat by the need to include a number of bit positions in each command to identify the direction sector in which path movement is to take place. Moreover, cursive line generation of character images allows no variation in the thickness of the line images generated and is therefore unacceptable in most situations in which graphic quality photocomposition is desired.

Accordingly, it has been suggested to encode additional information such as disclosed in U.S. Pat. No. 4,087,788 to Johannesson in which the Freeman direction codes are supplemented by digital information relating to the "thickness" of the various letter portions. Some loss of resolution occurs in systems of this type and thus for very high resolution work, the system disclosed in U.S. Pat. No. 3,581,302 to Kolb may be employed wherein successive 3 bit Freeman codes are employed to describe in successive translational movements the position of all dots in the dot matrix of a CRT display which must be illuminated in order to recreate a particular character image. The Kolb patent recognizes that one of the Freeman directions may even be eliminated by careful arrangement of the instructions and yet permit all of the dot positions to be described. In this way the eliminated Freeman direction code can be used for further machine code instructions without requiring more than three bits per translational command code.

A system using successive 3 bit Freeman codes to define each dot location of a character design will maximize the resolving capability of a CRT display, but massive storage capacity will be required to approach the maximum resolving capability of the human eye. For example, assuming the minimum resolving capacity of the unaided human eye at a normal reading distance to be about 0.0002 inch, a character reproduced at copy size in 12 point type would require almost 1 million dots of 0.0001 inch to define a dot matrix covering a 12 point EM square which is the imaginary square in which all letters of a 12 point alphabet are formed. Even if the letter form uses only one tenth of the dots in the EM matrix, 300,000 bits of storage capacity would be required for each symbol in the alphabet in order to achieve the maximum visibly perceptible resolution in the output image.

One technique for reducing this mammoth storage requirement is illustrated in U.S. Pat. No. 3,594,759 to Smura wherein successive 24 bit computer commands are sent to a decoder circuit for deflecting a CRT beam in a pattern to sweep through the dots defining one portion of a character. Basically the system of the type illustrated in the Smura patent works well for "block style" lettering, but tends to break down when the letter boundary is of a curvilinear nature. Note for example the chart in column 8 wherein 30 24 bit commands are required to describe a curved letter portion as compared with rectangular portions requiring only 2 or 3 24 bit commands.

An alternative approach to encoding commands identifying all dots making up a character is to encode only the boundary point of the character design and to use these encoded boundary point positions to control a raster scanned display to recreate the character image. A system of this type is disclosed in U.S. Pat. No. 3,783,331 to Darnall wherein original artwork is scanned in raster fashion to produce signals indicating the position at which each scan line crosses the boundary of the character. This stored information is subsequently read out to control the blanking and unblanking of a CRT beam which is raster scanned over a display screen to recreate an image of the character. In a system employing many hundreds of scans per character, the amount of storage capacity required can still be impractical with this sytem even though significant advantages are achieved over systems identifying the location of each and every point in a character image. Moreover, a system of scanning original artwork such as illustrated in U.S. Pat. No. 3,783,331 requires simultaneous scanning of the artwork and a reference character in order to obtain a spatial reference for the encoding data. This requirement prevents the selection of the conventional base and left hand reference lines normally used by typeface designers as the scan reference since the character design will often touch the conventional base or left hand reference lines thereby creating the absence of a reference character in the area of overlap. Other techniques for creating character images by raster type scanning of a display screen are illustrated in U.S. Pat. Nos. 3,422,737 to Bailey, Jr.; 3,643,067 to Coldita et al. and 3,713,098 to Muenchhousen et al.

Some attempts have been made to combine the benefits of cursive type character data storage with the efficiency and simplicity of a raster scanned image display. For example U.S. Pat. No. 3,936,664 to Sato discloses a technique whereby a character pattern is encoded by end to end vectors defining plural dot positions whereby the stored vector signals are used, upon decoding, to store data bits in a random access memory in which the storage cells correspond to dot positions in an electronic display matrix. When all of the vectors making up a character have been stored, the memory is read out to control a conventionally scanned CRT display.

Another way to combine cursive type character encoding with raster scanned output display is illustrated in U.S. Pat. No. 3,870,922 to Schutoh which discloses a pattern generating structure wherein the coordinates of boundary points of a pattern intersected by a scan line are generated in real time using encoded data relating to successive translational movements from one boundary point to another. The CRT beam is unblanked when the position of the CRT beam coincides with a coordinate being generated from the encoded data indicating that the beam is entering the pattern image and is blanked when the CRT beam position coincides with a coordinate being generated from the encoded data indicating that the beam is leaving the pattern image.

Attempts have also been made to achieve greater data compaction by modifying the organization of the storage media itself. For example, numerous techniques have been developed, such as illustrated in U.S. Pat. No. 4,001,883, for high density data storage on magnetic discs using uniform length data sectors. Similar techniques such as disclosed in U.S. Pat. No. 3,514,616 to Kolb have been disclosed as being particularly advantageous for the storage of encoded data CRT image generation wherein the data for each character is subdivided into subsections assigned to plural sectors containing both character and non-character data. Disc storage media organized with uniform length data sectors inevitably result in unused storage capacity since the amount of encoded data necessary to describe completely any one character will be variable and will often require only a fraction of the last data sector assigned to record the encoded character data.

SUMMARY OF THE INVENTION

It is the primary object of this invention to overcome the deficiencies of the prior art and to provide a photocomposition system for composing typeface characters with the highest practical degree of resolution using electronically displayed character images generated from stored binary signals.

A more specific object of this invention is to provide a system capable of producing the same high resolution and graphic character quality obtainable from film grid font based photocompositions systems by means of a system wherein the film grid font has been replaced by a magnetic font disc on which character images are stored in the form of magnetically recorded encoded binary signals.

A still more specific purpose of this invention is to provide a magnetic font disc organized to allow the maximum possible compaction of encoded character design signals and to allow extremely rapid retrieval of the encoded signals. More particularly the signals are organized into groups of successive multi-bit translational commands sufficient to describe the entire boundary contour of a single alphabet character. Each such group is stored in a single continuous character sector including a character data field formed of a plurality of magnetic storage cells equal in number to the total number of data bits in the associated group of multi-bit translational commands and a non-character data field formed of a predetermined fixed number of storage cells preceding the associated character data field. The storage cells of the non-character data field are magnetically altered to store binary signals identifying the position of the associated character data field. A plurality of additional characters corresponding to the number of remaining character contours recorded on the disc are arranged sequentially end to end within a plurality of concentric tracks made up of the ordered storage cells on the magnetic font disc.

Still another object of the subject invention is the provision of a single master magnetic font disc capable of producing signals suitable for electronic alteration to generate all sizes of normally used alphabet characters of a particular typestyle. This advantage is achieved by recording two or more complete sets of alphabet letters of the same type style encoded from separate original art work wherein corresponding letters are proportioned slightly differently in order to better adapt one complete set of alphabet characters for image generation in larger point sizes and the other set of characters for image generation in smaller point sizes. This master magnetic font disc further includes instructions in the form of binary numbers stored thereon to indicate what point sizes each set of alphabet characters is properly adapted to generate.

It is still another object of this invention to provide a master magnetic disc font for use with a photocomposition system capable of independently altering the set size and the point size in which character images are generated on the electronic output display wherein the master magnetic font disc includes instructions recorded in binary form for causing the photocomposition system to vary, automatically, the ratio of point size to set size as the point size of the characters are modified.

A primary feature of the subject invention is the method for recording the boundary contour of a character image by means of a series of translational codes designed to identify one path out of a set of translational paths which may be followed in moving incrementally around the boundary of a character image. The number of binary bits required for each translational code is reduced by limiting the number of paths which may be followed dependent upon the path previously followed. In other words the meaning which is attached to a particular translational code is dependent upon the preceding translational code in the series of codes used to define the character boundary.

A more specific feature of this invention is the provision of a method for encoding a character boundary whereby a series of three bit translational codes is used to identify one translational path out of a path set composed of 24 distinct translational paths wherein the general direction of a preceding translational path is used to define a subset of translational paths from which the succeeding translational path must be selected. In this way the number of bits required to identify successive translational codes may be significantly less than the number of bits which would be required in order to uniquely identify each of the total number of translational paths in the overall path set. This advantage of the invention derives from the fact that a character boundary generated in a very high density dot matrix will very rarely require a translational movement which represents a sharp turn away from the direction of the previous translational path.

A further feature of the subject invention is the provision of special code which is substituted for a normal translational code to indicate that the next translational move will be identified from a set of translational paths which are infrequently required in order to define a character boundary. In particular, the path set includes translational paths which represent generally sharper turns from the direction previously followed.

Still another object of the subject invention is the provision of an optical scanner system for deriving the coordinate position of the intersection of a scan line with the boundary of a character image whereby the coordinates identify the position of such intersection points relative to a reference the position of which does not appear on the optical image carrier. Rather, the reference position on which the character boundary point coordinates are based are recorded on a separate image carrier adapted to be scanned separately from the character image carrier.

A more specific object of the invention is to provide a photocomposition printer system including decoding means for retrieving the successive translational codes stored on the magnetic font disc and converting these codes into coordinate numbers capable of defining the contour of a character boundary combined with collector circuit means for responding only to those coordinates located within a predetermined linear slice of the character image to cause signals to be stored in an output memory from which the CRT beam control signals may be derived.

A more particular object of the subject invention is to provide a photocomposition printer system including a character decoder memory in which is stored the successive multi-bit translational codes defining the entire boundary contour of at least one character image combined with cyclically operating accessing circuitry for reading out in series the multi-bit translational codes for use by the collector circuit means in determining whether any of the multi-bit translational codes identify coordinates existing within a particular slice of the character image. By this technique, all of the translational codes are successively transformed to boundary coordinates one time for each character slice idntified by the collector circuit means.

Still another object of this invention is to provide a photocomposition printer system including a multiplier circuit means between the output of the decoder circuit means and the collector means for the purpose of altering the magnitude of the coordinates received from the decoder circuit in such a way as to adjust the point size and the set size of the character images to be generated on the CRT display. In particular the multiplier circuit means includes an X multiplier circuit for adjusting the X coordinate of each boundary point received from the decoder circuit to thereby adjust the set size of the character image and a Y multiplier circuit for adjusting the Y coordinate of each boundary coordinate to thereby adjust the point size of the character image independently of the set size.

Still another object of the subject invention is to provide four separate output memory circuits controlled in such a way that two memory circuits are simultaneously accessed to provide CRT beam control signals while the CRT is displaying one slice of a character image while the remaining two output memories are successively operated to receive data from the collector circuit means with one output memory circuit receiving data regarding the boundary of one character and the second output memory receiving data regarding the boundary of an adjacent character image such that upon simultaneous read out of the data from these two output memory circuits, the CRT beam can be properly controlled even though two character images are designed to be photocomposed in overlapping relationship.

Still another object of the subject invention is to provide four separate random access output memory circuits having a storage cell corresponding to each dot position within the output dot matrix conceptually representing the elemental areas of the CRT display screen being used. The coordinate signal produced by the collector circuit means are accordingly used to access particular locations within the random access output memory circuits to permit a binary representation to be stored in the memory storage cell corresponding in position to the coordinate signal provided by the collector circuit. When the decoder circuit means has cyclically read out all of the translational command codes completely describing a single character's boundary the output memory circuit then being accessed will contain stored signals at each of the storage cells corresponding to the boundary coordinates of the character image falling within the character slice then identified by the collector circuit means.

Other and more specific objects of the subject invention may be understood by a consideration of the drawings and the following description of the preferred embodiments.

BRIEF SUMMARY OF THE DRAWINGS

FIG. 2 is a schematic illustration of the manner by which the boundary coordinates of a letter form are generated, FIG. 3 is a schematic illustration of an electronic optical generator screen on which the letter form of FIG. 2 has been generated in response to encoded signals derived from the scanning operation illustrated in FIG. 2, FIG. 4 is a schematic illustration of the 8 possible 1-dot translational movements from any point in a dot matrix to an adjacent point, FIG. 5 is a schematic illustration of a path set of posible 2-dot translational movements from one dot matrix position to the 16 peripheral termination points surrounding the one dot matrix position, FIG. 6 is a schematic illustration of a path set of possible 3-dot translational movements from one dot matrix position to the 24 peripheral three dot translation termination points surrounding the one dot matrix position, FIG. 8 is a schematic illustration of another path set of possible 2-dot translational movements from one dot matrix position to the 16 peripheral two dot translation termination points surrounding the one dot matrix position, FIG. 9 is a schematic illustration of another path set of possible 3-dot translational movements from one dot matrix position to the 24 peripheral three dot translational termination points surrounding the one dot matrix position, FIG. 10 is a schematic illustration of yet another path set of possible 3-dot translational movements from one dot matrix position to the 24 peripheral three dot translational termination points surrounding the dot matrix position, FIG. 12 is a schematic illustration of an arbitrary boundary contour defined by a succession of dots, FIG. 13 is a chart detailing the successive three bit binary codes necessary to describe the boundary contour illustrated in FIG. 2 in accordance with the method illustrated in FIG. 11, FIG. 20 is a chart illustrating the format of 8 bit bytes actually stored on a magnetic disc by the microprocessor of the optical scanner of FIG. 14, FIG. 25 is a chart illustrating in greater detail the manner by which blocks of data are stored on the magnetic font disc of the subject invention, FIG. 26 is an illustraton of the E.M. square employed by typeface designers and photocomposers to measure the size of a character image, FIG. 32 is a simplified schematic illustration of the collector circuit employed in the printer illustrated in FIG. 27, FIG. 33 is a schematic illustration of the character slice identifying function of the slice identifying counter employed in the collector circuit of FIG. 32, FIGS. 34 through 36 are illustrations of the function of the collector circuit permitting boundary "turn around" configurations occuring within a character slice to be appropriately handled by the collector circuit.

DETAILED DESCRIPTION OF THE PREFERRED EMBODIMENTS

The ultimate purpose of the subject invention is to provide a photocomposition system for composing typeface characters with the highest practical degree of resolution of the character designs and of control over the arrangement and spacing of the characters forming the textual material composed by the system. By use of the subject invention, it is now practical for the first time to photocompose by electronically recreating images from highly compact data stored in memory with optical resolution equal to or greater than that possible by use of a film-font based photocomposition system. In particular, the subject system has the unique ability to sense and encode original design data for storage in an ultra compact format and to recreate electronically the original designs from this data in an optical form suitable for photographic recordation at a sufficiently high speed to permit commercial application without sacrificing in any significant way the visually perceptible resolution of the original letter design.

Figure 1:
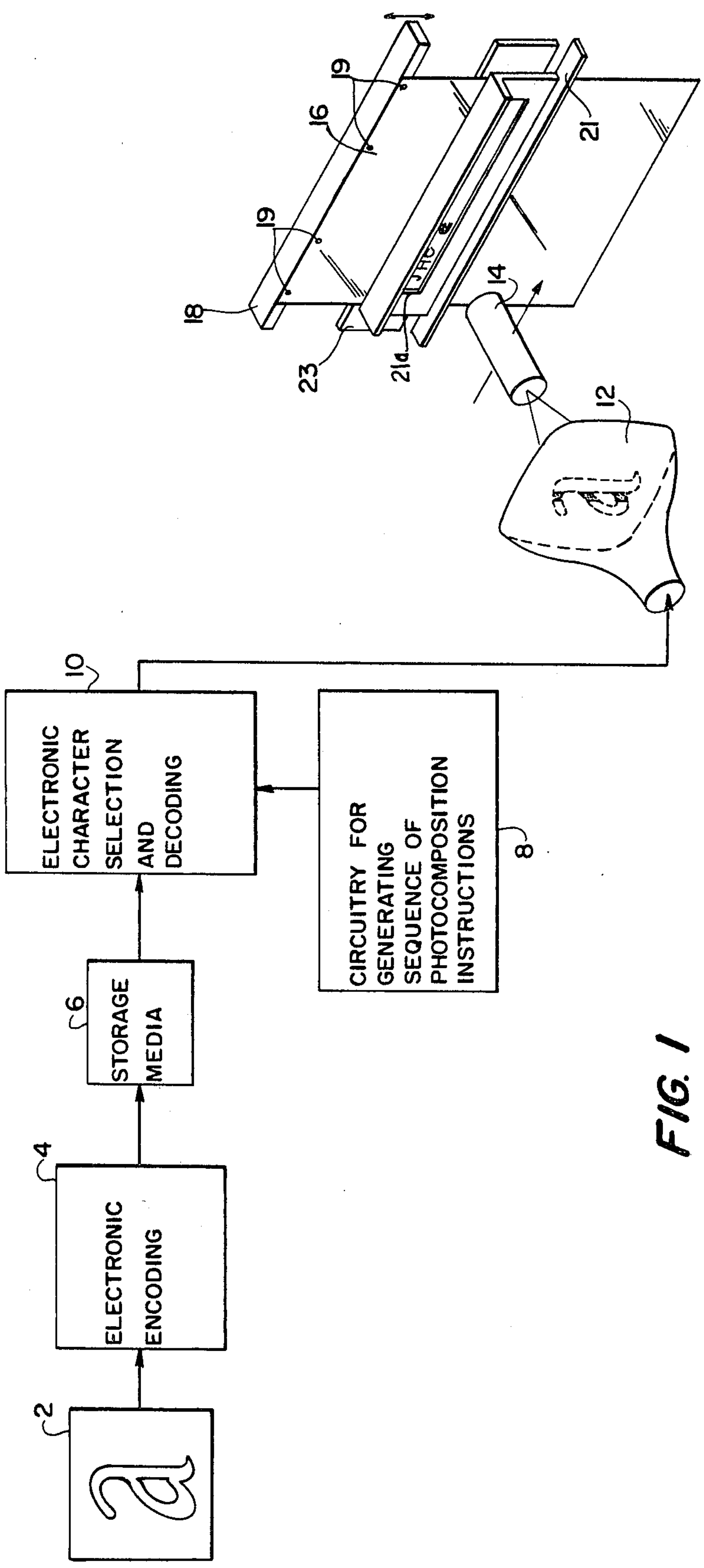
FIG. 1 is a conceptual schematic diagram of a photocomposition system formed in accordance with the subject invention.

FIG. 1 is a diagrammatic representation of the conceptual basis of the subject system. Block 2 represents the original character artwork normally drawn by an artist using pen and ink in accordance with the artist's esthetic sense. If the system is to be used for photocomposing the Roman alphabet, all upper and lower case letters plus numerals 0–9 and miscellaneous punctuation symbols will be drawn by the artist using a systematically applied design scheme so that each character can be visually identified as belonging to a particular alphabet style (typeface design) such as HELVETICA (a trademark of Eltra Corporation) or ALPHAVANTI (a trademark of Alphatype Corporation, Skokie, Ill.). Block 4 represents that portion of the subject system used to electronically digitize the character designs and encode the information in a highly compact format thereby allowing storage of a massive amount of character design information in storage media 6 such as a magnetic (floppy) disc. Encoded data including all upper and lower case letters plus all numerals and miscellaneous punctuation for each typeface in which it is directed to photocompose must be encoded and stored. While it is possible to electronically or photographically adjust proportionally from one point size to the next size or even the next two sizes without significant loss of resolution and artistic effect, it is not possible to electronically or optically enlarge or diminish a single letter design proportionally to all of the commonly used commercial point sizes. Thus, it is necessary to draw, encode and store a complete set of letters, numbers and symbols of each typeface style at least three or four times in order to provide optimum esthetic effect in textual matter photocomposed in letter sizes covering the commonly used point sizes 6 pt through 18 pt. A massive amount of storage capacity is thus required which further necessitates the highest possible data compaction consistent with achieving the ultimate purpose of this invention, i.e., maximizing resolution of the final output character design. By use of the disclosed apparatus and method it has been possible to record a complete set of characters in a single typeface style in each of 4 different commercial weights (e.g., 8 pt, 10 pt, 14 pt, 18 pt) in both Roman and italicized form, or Roman and bold, for a total of over 800 separate characters on a single magnetic floppy disc. This degree of compaction allows a photocomposer to maintain a complete library of most commercially available type styles in all point sizes and weights having the highest possible degree of resolution and clarity on a few hundred easily stored discs.

After a disc has been properly encoded with the desired typeface design information, it may be used in the system to produce the signals necessary to control a display such as a CRT or other type character image generator to recreate letter designs sequentially in accordance with a series of text composing instructions in the form of electrical signals formulated in circuit 8 by prior recordation or by "on-line" manual input at a keyboard. More particularly, the blocks of coded signals representative of each letter or symbol identified by successive instructions from circuit 8 are encoded into a form suitable for transmission to an electronic display device 12, such as a CRT, where the signals are used to generate a highly accurate optical image of the original artwork. A lens system 14 projects this image onto a photosensitive film master 16 which is adapted to photographically record the character images in the sequence in which they are formed on the CRT corresponding to the sequence of instructions formulated by instruction circuit 8. The photosensitive film master 16 is mounted for vertical translation on a horizontal bar 18 by pins 19 to permit the master 16 to be positioned to record successive lines of characters while the lens system 14 is horizontally translatable to permit successive characters in each line of print to be recorded. In order to hold film master 16 in a fixed perfectly flat position, the film master is pressed against a focus frame 21 containing an exposure window 21*a* through which the optical image formed on CRT 12 is projected by lens system 14 onto the photosensitive film master 16. The back side of the film is gently pressed against focus frame 21 by a film clamp bar 23 on which a plurality of spaced flat fingers (not illustrated) are separately mounted to contact and gently urge the back side of film master 16 against the focus frame.

While each and every portion of the system illustrated in FIG. 1 includes advantageous novel features over systems known heretofore, the method and apparatus employed in coding and decoding the extremely compact design data is crucial to the dramatic improvements brought about by the subject system. The specific procedure for achieving this data compaction depends upon the recognition of several unique characteristics of letter and symbol designs which permit the use of novel method steps and novel apparatus for implementing the subject invention as will be more fully understood by considering the following general description.

When generating images of readable symbols such as letters, numbers, and miscellaneous punctuation using digitally stored information, it is possible to obtain virtually any degree of optical resolution desired simply by increasing the amount of stored data per unit area of display up to the resolving limit of the display. If each elemental area on the display is assigned a coordinate position, the coordinate positions of all areas which must be illuminated to form any arbitrary design could be stored in the digital memory and read out in order to generate the control signals necessary to permit the electronic image generator to optically recreate the stored design. Since hundreds of thousands of elemental areas would be required for achieving even low optical resolution with such a system, an extremely large number of coordinate positions would have to be stored in memory. If the cost of memory and the speed at which it operates were unimportant there would be no need to encode the raw design data into a more compact form. However, the immensity of data required to store high resolution design information makes effective data compaction the primary requirement for design of a practical system. It is possible, in part, to achieve significant data compaction because substantially all character designs used in commercial photocomposition consist of spatially arranged, solid sections having substantial width and length. In other words, letter and number designs, to be recognized as such, even when artistically formed in a pleasing typeface design, will almost always employ contoured solid line sections of substantial width compared to the overall character size. Thus, if a letter character is recreated on a display such as a CRT by scanning the CRT in raster fashion made up of a plurality of parallel sweeps, the scanning mechanism, i.e., the electronic beam may be merely turned "on" once upon entering a character boundary with no further control information being required until the beam moves out of a character boundary at which time the beam is turned "off". For example, there are only a maximum of six transitions between light and dark areas in a vertical scan of the letter "E" as illustrated in FIG. 2 wherein the transitions are labeled $X_1, X_2 \ldots X_6$. The letter E design, thus, could be recreated on a raster scanned CRT by storing the coordinate positions of only the transition points for each sweep and by generating the necessary signals from this stored data for controlling the electron beam during its scan of the CRT screen. In a very high resolution system scanning many hundreds of elemental areas per beam sweep, a substantial reduction in the memory area required for storing character design data could be achieved by storing only the coordinates of the CRT elemental areas or points defining the boundaries of the letter or symbol as it would appear on the CRT screen. If the elemental areas are visualized as a matrix of dots the letter design could be recorded in memory by recording the coordinate position of each of the boundary dots such as illustrated in FIG. 3.

In accordance with the subject invention, coordinate locations of the boundary dots of a stored image is further condensed by storing the coordinates of only a single starting point for each boundary line relative to a given reference followed by a series of binary codes representative of a series of translational movements which, conceptually, will trace out the boundary of the character image defined by the boundary data referred to above. Actual generation of the necessary CRT control signals to recreate the desired image could take place subsequently by reprocessing the stored binary codes to reproduce the coordinate information describing the positions of each and every dot defining the boundary of a letter.

To understand more clearly how the coordinate data can be transformed into translational movement codes and how this process will result in data compaction, consider the matrix of dots such as illustrated in FIG. 4, wherein movement from one dot position to an adjacent dot position can occur in only one of eight distinct directions labeled 1 through 8. It would thus be possible conceptually to trace out the boundary of a character on a matrix of dots, such as illustrated in FIG. 3, by simply encoding a succession of one dot translational movement codes with each successive movement being identified by a stored code representative of one of the eight possible directions illustrated in FIG. 4. In binary code, the number n of storage bits required to identify X different unique codes is determined by the formula: $2^n-X$. Accordingly, at least three bits are required to identify uniquely each of the eight possible directions schematically illustrated in FIG. 4, i.e., direction 1=000, direction, 2=001, direction 3=010, direction 4=011, direction 5=100, direction 6=101, direction 7=110 and direction 8=111. An encoding scheme of this type could significantly reduce the total amount of storage area required since only three bits would be required for each boundary dot as compared with the storage of coordinate locations for each boundary dot wherein many more than three bits would be required to uniquely identify each coordinate position in a dot matrix of very high density.

Still further reduction in the required storage area can be achieved by increasing the number of dot positions actually traversed per translational movement code. For example, FIG. 5 discloses a 2 dot translational scheme wherein 16 unique 2 dot translational movements are represented by the lines interconnecting the central dot P with each of the 16 peripheral termination points at which a two dot translational movement could terminate in a display system made up of a matrix of dots. FIG. 6 discloses a 3 dot translational scheme using 24 different translational paths to reach each of the 24 possible peripheral termination points in a dot matrix.

Figures 7, 21:
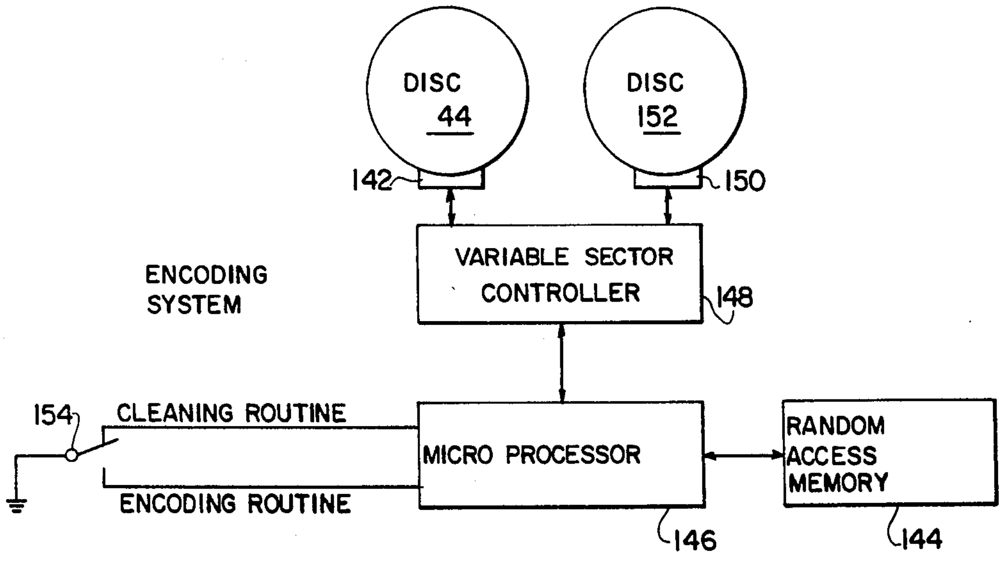
FIG. 7 is a chart indicating the ratio of storage bits required to identify a translational movement within a dot matrix to the number of dots actually traversed within the matrix for each translational movement.
FIG. 21 is a schematic illustration of the encoding system by which the 16 bit coordinate numbers resulting from the scanning operation of the optical scanner of FIG. 14 are converted to 3 bit translational codes as illustrated in FIG. 11.

FIG. 7 (sheet 11) demonstrates how increasing the number of dots actually traversed per stored translational code results in a reduction in the total number of bits which must be stored in order to encode a character boundary line using each such scheme. As is evident from FIG. 7, each one dot increase in the number of dots traversed per stored code increases the number of termination end points by eight. Accordingly, the number of binary bits which must be assigned to each code to permit unique identification of all possible termination points is determined by the formula $2^n-8L$ wherein n equals the number of bits per code and L equals the number of dots traversed per stored code. FIG. 7 demonstrates that increased data compaction can result from continual increases in the number of dots actually traversed for each stored code. However, the logic of this approach breaks down when it is no longer possible to assign only a single traversing path between the beginning position and each terminal point without sacrificing visibly perceptible character design resolution. To explain this more fully, attention is again directed to FIG. 4 wherein it is obvious that, in a 1 dot translational system there can be no loss of resolution by coding the boundary in the form of one dot translational movement codes since any arbitrary translational path from one dot to the next may be followed. When two dot positions are transversed for each stored code, more than one path may be followed in arriving at each of the 16 possible termination points. Compare, for example, the pattern in FIG. 5 with the pattern of paths illustrated in FIG. 8. For an even more dramatic illustration compare the 3 dot schemes illustrated in FIGS. 9 and 10 with the scheme of FIG. 6 wherein it is apparent that there exists more than a single desirable path between the central staring point P and each of the 24 termination points in a 3 dot system. In each of the above examples illustrated in FIGS. 4–6 and 8–10, the termination points for each code translation was assumed to be at the periphery of a square matrix of dots having 2n+1 rows and 2n+1 columns wherein n is the number of dots traversed by each translation path. As the number of dots traversed for each stored code increases, the resolving capacity of the system increasingly degenerates. This results in a system where the termination points are constrained to the periphery of the (2n+1) by (2n+1) matrix because the total number of possibly necessary paths between the starting point and each of the termination points increases as the matrix size increases. Elimination of some of the possible paths may not be particularly detrimental in a system wherein the character generation has a very high dot density in the output display and wherein the character images stored do not have boundary lines with exceptionally sharp radii of curvature. In systems of this type, no exceptionally abrupt changes in direction would occur within a relatively small section of the total display area. With stored characters of the type normally employed in photocomposition, it has been found that a 3 dot translational scheme such as illustrated in FIGS. 6, 9 and 10 is well suited for producing standard photocomposition characters. The FIG. 6 sheme, in fact, has been found imperically to be superior in producing the best possible resolution, as compared with the schemes of FIGS. 9 and 10. Four or five dot translational systems may also be employed although some sacrifice of image resolution must be accepted in such systems in order to achieve the data compaction disclosed in FIG. 7. The use of codes indicating a translational movement greater than 5 would not generally yield an acceptable level of image resolution since too many possible paths would be eliminated thereby causing significant degeneration in the optical resolution of the character image.

An extremely important and crucial refinement of the subject invention derives from the additional conceptual recognition that multi-dot translational movements along the boundary of virtually all standard photocomposition characters need not involve a turn greater than ninety degrees relative to the direction of the previous move when the dot density per letter is very high, e.g., greater than 1000 dots per linear inch at copy size, and the number of dots traversed per stored code is relatively low, e.g., less than 5. Under such circumstances, the translational code system illustrated in FIG. 11 may be employed. In this notational system the translational path identified by each successive code will depend upon the path defined by the previous code. Arrows $D_0$ through $D_7$ represent the eight possible directions in which a one dot translational movement may take place. When a previous translational movement (whether a single dot or multi-dot) has occurred in approximately one of the directions represented by arrows $D_0$ through $D_7$, the probability is quite high that the next translational movement necessary to remain on the character boundary will take place generally in the same direction. As the density of the dots on the display screen increases, the number of dots defining the boundary also increases thereby increasing the probability that each successive move necessary to define the boundary of a character will take place in the same general direction as the previous move. If a 3 dot translational system is used such as described in FIG. 6 in which 24 different and unique paths are possible for each move, it can be safely assumed for example, that a translation path defined in FIG. 6 by numbers 4, 5 or 6 would never be followed by a translation along the paths numbered 16, 17 or 18.

Figure 11:
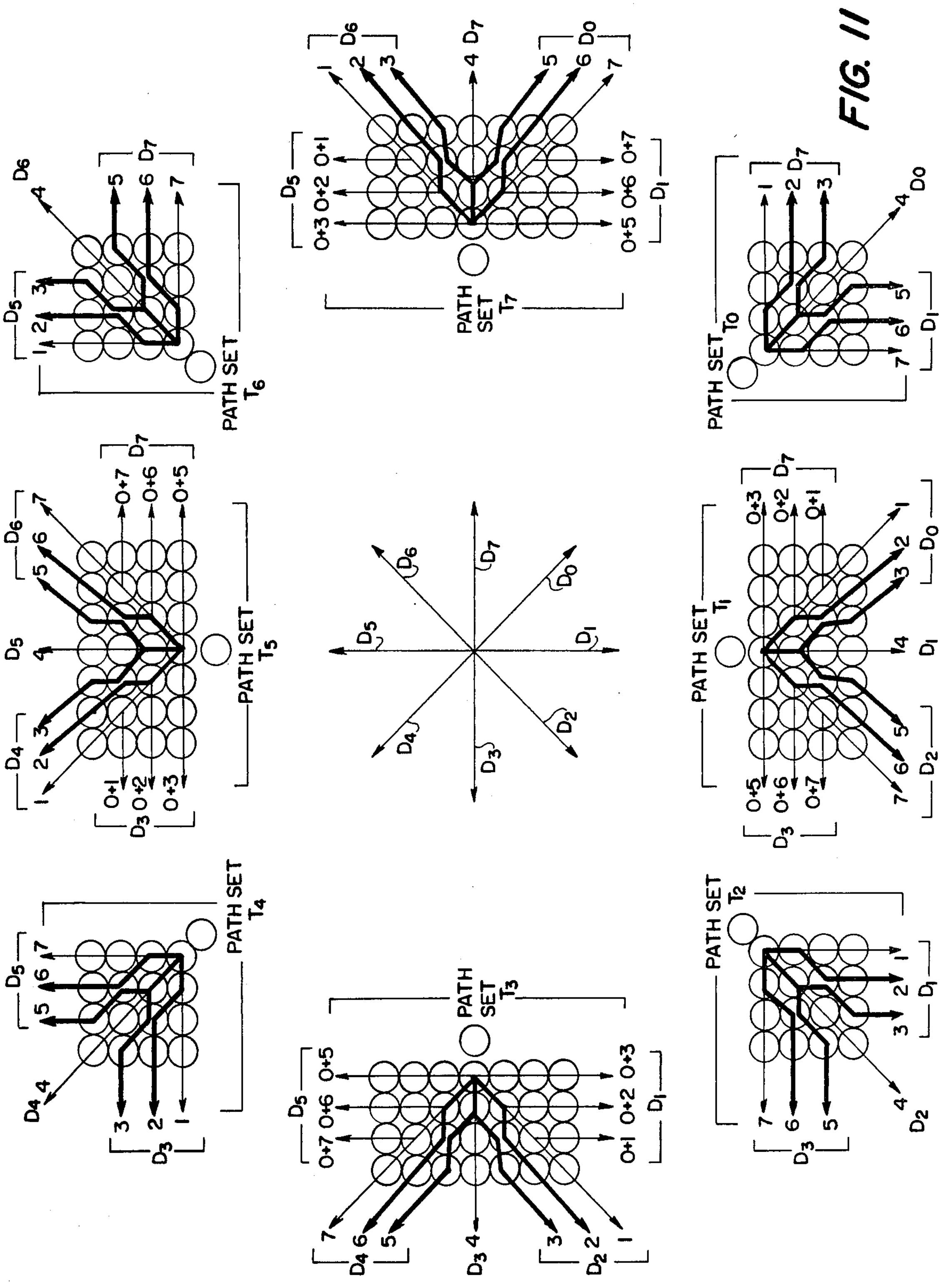
FIG. 11 is a schematic illustration of the method of this invention for encoding successively the translation paths of FIG. 6 using 3 bit binary codes in order to describe the boundary contour of a alphabet character.

The FIG. 11 system adopts the same set of translational paths as described in FIG. 6 but only a limited number (subset) of the total of 24 paths may be identified by each successively stored translational code. The composition of the subset will vary dependent upon the direction generally indicated by the previously stored code. For example, if a series of translational codes describing a character boundary were stored in memory and the first such code identified a direction of movement indicated by arrow $D_5$, the subset of translational paths from which the next translational path could be chosen would be one of the translational paths illustrated in FIG. 11 within the section marked "Path Set $T_5$." If the second translational code in the series were the number one, the translational path identified would be the path terminating at the number 1 in path set $T_5$. This path corresponds to path 10 in FIG. 6. Alternatively, the second translational code following the first code could be identified by an encoded 4 or an encoded 7 representative of paths 4 and 7, respectively, in path set $T_5$ (corresponding to paths 7 and 4, respectively, in FIG. 6). Each translational movement along paths 1, 2 or 3 in path set $T_5$ will generally result in movement in the direction of arrow $D_4$, and would cause the next translational path to be selected from path set $T_4$. As an example, the third code could identify path 1 in path set $T_4$ which would correspond to translational path 13 in FIG. 6 and simultaneously constrain the next possible translational movement to one of the paths identified in path set $T_3$ since path 1 in this set is directed generally in the direction indicated by arrow $D_3$. Similarly, if the second code were a 5, 6 or 7 indicating generally a direction represented by arrow $D_6$, the third stored code would represent a path selected from path set $T_6$ illustrated in FIG. 11.

The purpose of this rather involved system is to reduce the total number of unique codes required to describe accurately the boundary of a symbol or character by identifying successively one out of a rather large number of unique multi-dot translational paths wherein the number of unique codes actually needed is significantly less than the total number of possible paths which may be followed. As indicated in FIG. 7 a scheme of describing character boundaries involving three dot translations, such as illustrated in FIG. 6, would require a 5 bit binary code in order to uniquely identify each successive movement around the boundary if no constraint is placed on the sequence in which these paths may be followed. By employing the system described in FIG. 11, the number of possible paths which can be identified following a previous translational movement is limited to the 7 next most likely moves. Thus, if the last movement was in the direction of arrow $D_7$, the next most likely move will be one of the 7 paths illustrated in path set $T_7$. These paths are identified by numbers 1–7 which are the same numbers used to identify different paths in the remaining path sets. In the binary number system, a three bit binary number will define up to 8 unique numbers and thus a 3 bit binary code would be sufficient to implement an encoding scheme such as illustrated in FIG. 11 as compared with the encoding scheme of FIG. 6 wherein a 5 bit code is required to identify the 24 possible 3 dot translational movements which are permitted. The constraints and limitations imposed by the scheme of FIG.

11 are not detrimental to the specific purpose to which the subject invention is directed (which is to recreate ultra high resolution character images for photocomposition from digitally stored binary dots). Ultra high resolution is maintained because the boundaries of standard characters, when encoded in successive steps on a high density dot matrix do not often require the encoding of a sharp turn. Therefore, the successive directional movements along the character boundary may be limited to variable subsets of the total number of movements necessary to move around the entire boundary.

FIG. 12 is a schematic illustration of how the scheme of FIG. 11 might be employed to encode the boundary line of a character using a successiion of three bit codes defining, respectively, one of the 24 3-dot translational movements illustrated in FIG. 6. The series of circles drawn with solid lines correspond to those dots in a matrix of dots which would most nearly define the boundary line of a character. Obviously in a high resolution system the density of dots per lineal unit would be significantly greater (i.e. over 1000 dots per inch) but the procedure followed would be analogous to that described below. The process begins by recording the coordinate position of the lowest left hand boundary dot. By so selecting the starting point and arbitrarily choosing to proceed in the clockwise direction, it is obvious that the first three dot translation of any character boundary would take place generally upwardly and thus path set $T_5$ of FIG. 11 will be used to identify the first translational movement shown within bracket A in FIG. 12. Since this movement takes place straight upwardly to point $P_1$, the first stored three bit code should be a binary 4 (100) to identify path 4 in path set $T_5$ as was the first translational movement. The second movement, indicated by bracket B, is most nearly followed by path 5 of path set $T_5$ even though the path follows a route through circle 20, shown in dashed lines, instead of circle 22. The third code would thus be a binary 5 (101). Since path 5 of path set $T_5$ follows generally the direction represented by arrow $D_6$, the next three bit code will identify one of the paths defined by path set $T_6$ of FIG. 11. Within path set $T_6$ path 6 corresponds to the movement C followed in moving from point $P_2$ to point $P_3$ of FIG. 12. Thus, the third 3 bit code should be a binary 6 (110).

Reference is now made to FIG. 13 wherein the successive binary codes used to describe each of the successive translational movements A through N necessary to move around the boundary of FIG. 12 are listed. The path set from which each designated path is selected and the resulting directional movement are also listed. With the exception of dashed circles 20, 24 and 26, the composite translational path 28 (consisting of movements A through N) intersects each of the circles defining the boundary line of FIG. 12. In a very high density matrix, slight deviations from the true boundary such as represented by dashed circles 20, 24 and 26 will not be visibly perceptible. It must be noted here that the choice of the pattern of movements illustrated in FIGS. 6 (as opposed to FIGS. 9 and 10) was not arbitrary. For reasons that are not totally understood, the path set of FIG. 6 has been found, empirically to produce better results than other possible path sets. In particular, one of the path sets which was tried caused the encoded boundary to "hunt" back and forth across the true boundary resulting in a jagged edge. As FIG. 12 aptly shows dots 20, 24 and 26 are off the true boundary on the same side rather than on opposite sides.

To give the scheme of FIG. 11 a greater degree of flexibility a special meaning is assigned to the one remaining 3 bit binary (000) code which is not employed to identify the heavy solid line paths illustrated in FIG. 11. When this code appears no translational movement is indicated, rather, the next three bit code is assigned a special meaning indicative, generally, of translational movements which are less frequently required to sweep out a boundary line. These specialized movements are illustrated in path sets $T_1$, $T_3$, $T_5$ and $T_7$ by thin lines identified as 0+1, 0+2, 0+3, 0+5, 0+6 and 0+7. Since these movements represent sharp turns, they are used much less often than are the paths numbered 1 through 7. Use of 6 bits to store each code representing these translational paths does not materially increase the total number of bits used to store a series of codes representing a boundary line since such 6 bit codes are not frequently needed. In the example of FIG. 12, the specialized zero code was only needed twice (for movements G and N). While the 6 bit codes increase slightly the amount of data which must be stored to describe an image boundary, a special straight ahead command of up to 54 dots can be employed to offset the increased storage required by the 6 bit codes. This special straight ahead code includes a three bit binary zero (000) code followed by a three bit binary 4 (100) which is used to indicate a straight ahead movement of 9 dots plus an additional movement of 3 times the number represented by the next 3 bit code. For example, the following sequence of codes (000, 100, 111 equivalent to 9, 4, 7 in base 10) would indicate a straight ahead displacement of $(9+3\times7)$ dots or 30 dots. By yet another refinement, the scheme of FIG. 11 may be designed to respond to a specialized zero command to move still further along a straight line by the following sequence of 3 bit binary codes: (000, 100, 000, 100, 111) equivalent to (0, 4,0,4, 7 in base 10) which would command a displacement of 33 dots plus 3 times the next number, that is $33+3\times7$ for a total of 54 dots. Since only 15 bits are used to indicate a translational movement of 54 dots, it is apparent that a significant reduction in the number of storage bits per straight line translation of boundary dots can be achieved. Since straight line displacements in excess of 9 dots usually occurs more frequently than the thin line sharp turns indicated in FIG. 11, the use of specialized zero commands can result in a further reduction in the total number of bits used to describe the boundary of a character in a dot matrix.

The above described technique for encoding the boundary of a character requires a completely novel method and apparatus for implementing the technique in a practical photocomposition system schematically illustrated in FIG. 1 and described in greater detail hereinbelow.

MASTER DISC ENCODING SYSTEM

Figure 14:
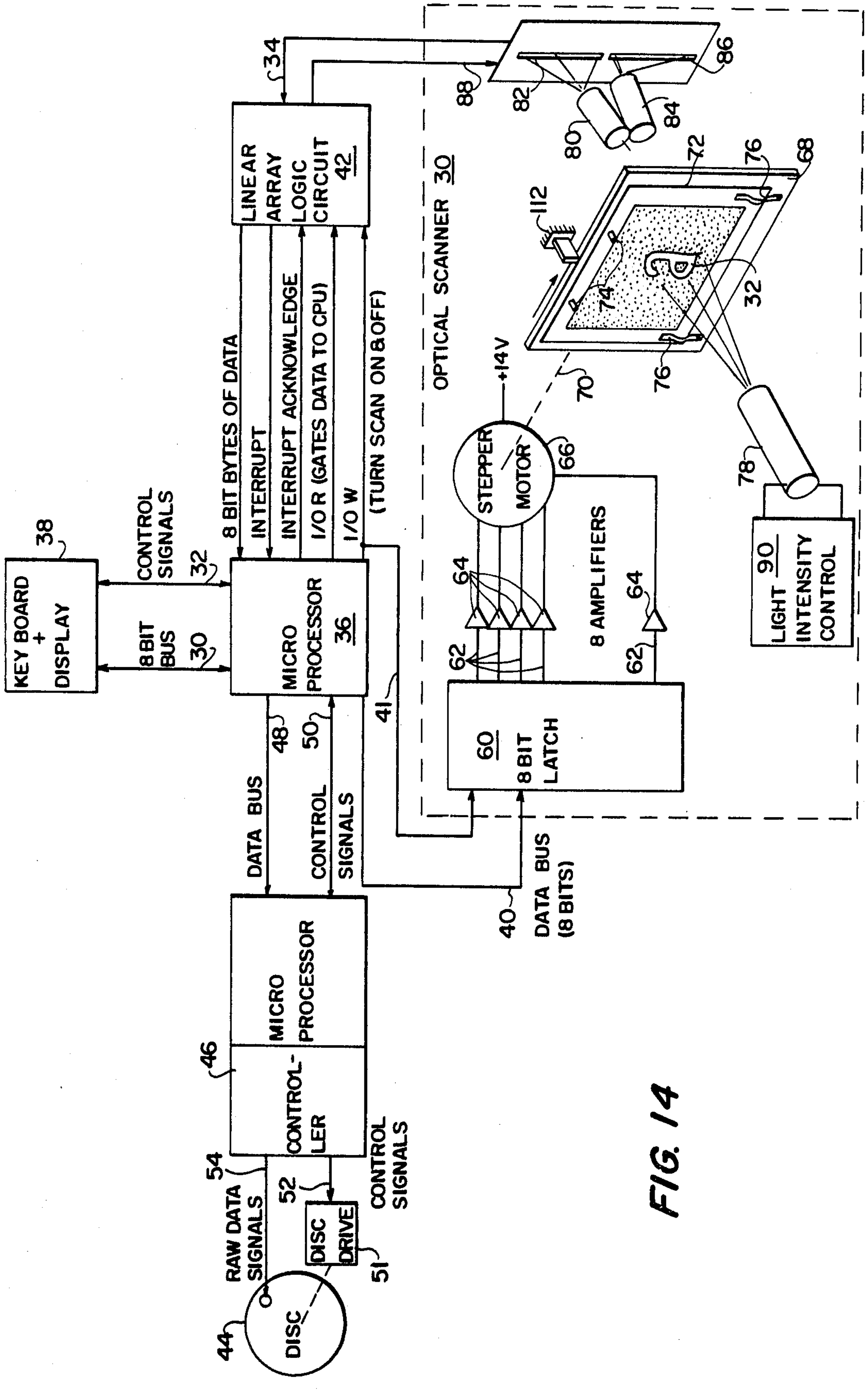
FIG. 14 is a schematic illustraton of the scanner system employed to initially encode the coordinate position of the intersection of scan lines with the boundary contour of a letter form.

As noted above, the subject photocomposition system employs magnetic disc storage media for recording character design data in an extremely compact format and includes virtually all of the visibly perceptible design information contained in the original character design. FIG. 14 schematically illustrates the system employed to initially convert the character design artwork into raw digital data including an optical scanner 30 for scanning the original character artwork 32 (including a transparent character image on an opaque background) and for converting the optical image into a stream of digital pulses supplied to an output line 34.

The operation of the optical scanner will be described in greater detail hereinbelow. Controlling the operation of the optical scanner 30 is a microprocessor 36 adapted to receive operator commands from a keyboard and display 38 and to forward these commands to the optical scanner over lines 40 and 41 to control its operation. A linear array logic circuit 42 is arranged to receive the serial stream of pulses supplied over line 34 and convert this digital information into 8 bit bytes of data which the microprocessor 36 is capable of manipulating and transmitting to a conventional magnetic disc 44. The disc 44 is controlled by a conventional microprocessor based controller 46 such as sold by Intel Corporation identified as 8271 Floppy Disc Controller Chip. The 8 bit bytes of character data information is received from the microprocessor 36 over data bus 48. The main scanner microprocessor 36 communicates with the disc controller 46 over control line 50. The controller 46, in turn, supplies control signals to the disc drive 51 over line 52 while simultaneously supplying the data signals in serial form to the magnetic disc 44 over data signal line 54. Manual operation of the scanner system is accomplished by means of keyboard and display 38 communicating with the microprocessor 36 through lines 56 and 58 for handling 8 bit data bytes and control signals, respectively.

Referring now in more detail to the optical scanner 30, illustrated partially in perspective view in FIG. 14, control signals are received from the microprocessor 36 over line 40 to set the condition of the outputs from an 8 bit latch 60. The output signals are sent via lines 62 and amplifiers 64 to control stepper motor 66 which in turn controls the position of a horizontally translatable frame 68 through a rack and pinion drive 70 schematically illustrated in dashed lines. The original artwork design 32 photographically recorded in negative form on transparency film 72 is mounted by means of pins 74 and spring clips 76. A light source 78 is arranged to project a beam of light through the transparency film 72 to illuminate image 32 contained thereon as the frame 68 is stepped through each of 2048 different horizontal positions in which the frame may be placed. An upper lens 80 is arranged on the opposite side of the film 72 from light source 78 in order to project one portion of the shadow image of design 32 onto an upper linear array of photodetectors 82 and lower lens 84 is arranged to project the lower portion of the shadow image of design 32 onto a lower linear array of photodetectors 86. Each photodetector array may be the monolithic self scanning type such as sold by Reticon Corporation, Sunnyvale, Calif. under the name RETICON G SERIES. The upper array consists of 512 photo diodes while the lower array includes 1024 photo diodes. Upon receipt of the appropriate control signals from linear array logic circuit 42 over control line 88, the condition of each photo diode contained in linear arrays 82 and 86 are serially scanned to produce a stream of output bits on line 34 to indicate whether or not the respective photo diodes are illuminated. The stream of serial bits is therefore in the form of a series of binary pulses having an amplitude indicative of whether the corresponding photo diodes are illuminated or not-illuminated. Microprocessor 36 in the scanner system of FIG. 1 is programmed to cause each of the photo diodes in linear arrays 82 and 86 to be interrogated once in series for each advancement step of frame 68 caused by stepper motor 66.

Figure 15:
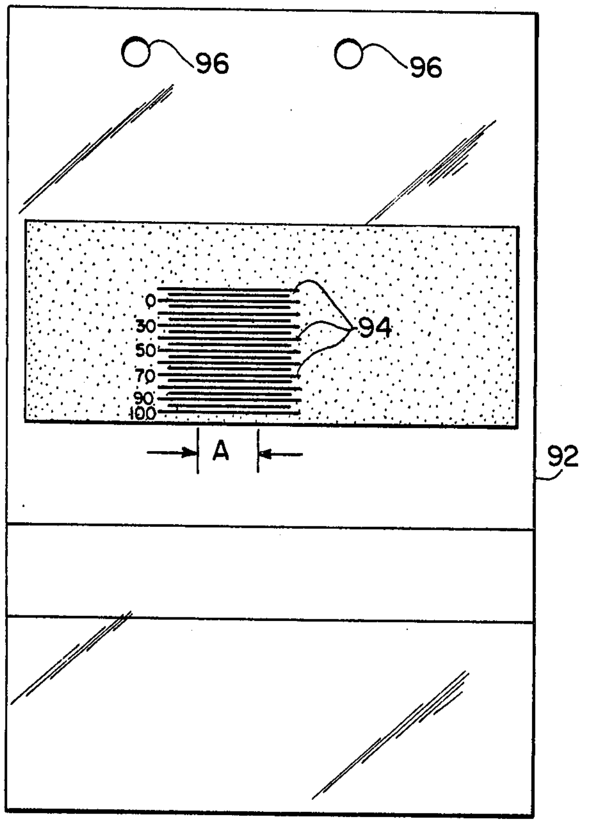
FIG. 15 is an illustration of a standardized grid for use in adjusting the intensity of the light source employed in the scanner system of FIG. 14.

To set up the scanner 30 for scanning artwork, the intensity of light 78 is first adjusted by means of light intensity control 90 by scanning a standardized grid, FIG. 15, over a predetermined number of horizontal positions. If the number of dark areas detected by the photodiodes falls within a predetermined range, no light adjustment is required. However, if too many dark areas are detected, the light intensity control 90 is adjusted to increase the illumination produced by light source 78. If an insufficient number of dark areas are detected, the light intensity control 90 is adjusted to reduce the amount of illumination produced by light source 78. FIG. 15 discloses one form of standardized grid 92 which may be used consisting of a film transparency having horizontally oriented transparent lines 94 when the standardized grid 92 is mounted on the translatable frame 68. Apertures 96 contained in the grid 92 are positioned to receive pins 74 and thereby positioning the grid properly for the light source intensity test. During this test, stepper motor 66 is advanced over only a limited number of horizontal positions A of carriage 68 so that the area of grid 66 actually scanned by linear arrays 82 and 86 can be controlled and predicted. The number of dark areas actually sensed by the photodetectors of arrays 82 and 86 are compared by microprocessor 36 with upper and lower acceptable limits and appropriate instructions are thereafter sent for display to the keyboard and display 38 if either an increase or decrease in the light source intensity is required. The tests can be repeated until the light source intensity has been adjusted in order to cause the number of detected light and dark areas to fall within an acceptable range. Of course, the microprocessor 36 could be programmed to automatically adjust the light intensity control 90 to cause light source 78 to produce an appropriately intense light for scanning images mounted on frame 68. Moreover, the standardized grid 92 may take a variety of shapes or forms although the design disclosed in FIG. 15 consisting of horizontal lines 94 has been found to be quite satisfactory.

As will be described hereinbelow, high quality photocomposition of character designs such as alphabet letters and numerical symbols requires not only extremely accurate resolution and reproduction of character design but also extremely accurate positioning and spacing of such character designs in word and sentence forming sequences so as not only to optimize readability but also to satisfy criteria relating to the artistic effect desired by the photocomposer. Thus, before each letter design may be scanned, a reference position for the design must be established and is normally chosen to coincide with the left reference line and base line normally used by typeface designers. These lines correspond to the left hand boundary of the imaginary square establishing the set width of the letter and the base line defining the lower boundary of an upper case letter, respectively. In the subject system, this reference position is established by scanning a positional reference grid recorded on film transparency 98, illustrated in FIG. 16, upon which has been recorded a base line 100 arranged horizontally when the transparency is mounted on pins 74 of frame 68 by means of apertures 102 contained in the transparency 98. A left hand reference line 104 is also positioned on transparency 98 perpendicular to base line 100. Before any single letter design is scanned, reference grid film transparency 98 is placed on frame 68 to permit the scanner system to record the position of the base line 100 and reference line 104 as recorded on transparency 98 relative to the lower most photodiode position and the left most starting position of the frame 68, respectively. Thereafter, the transparency 98 is removed from the frame so as to permit a letter design or designs to be scanned as desired.

Figure 17:
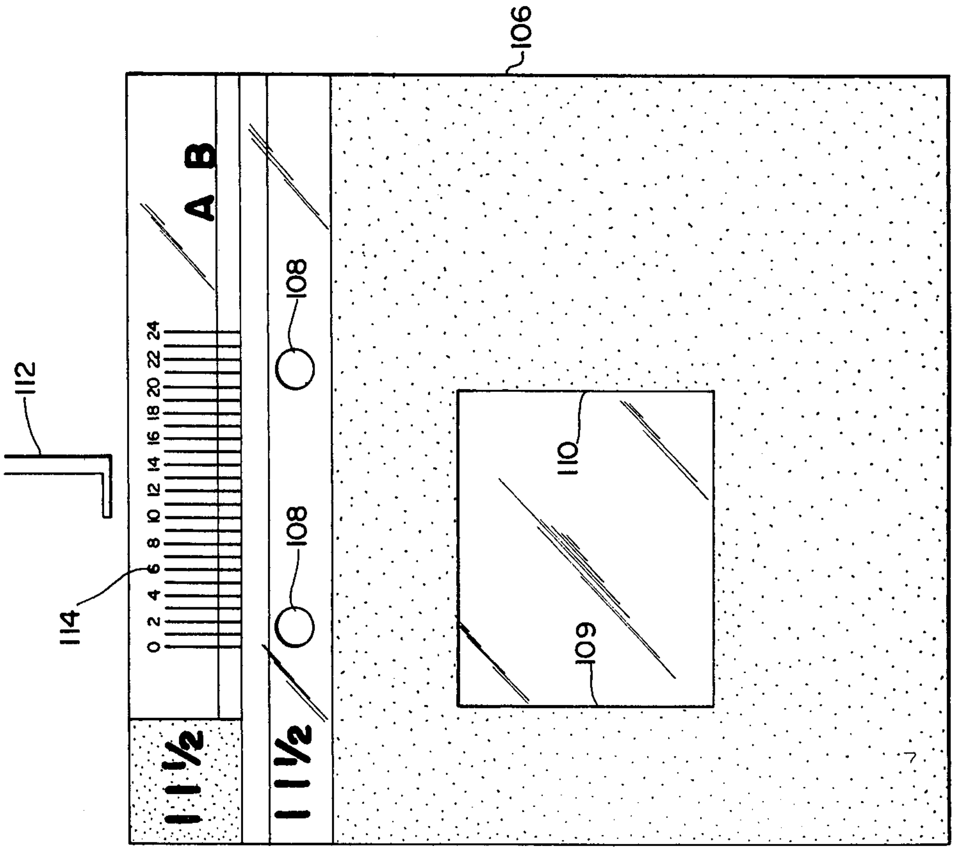
FIG. 17 is an illustration of a blocking mask transparency for use in reducing the scan time of the optical scanner of FIG. 14.

Naturally, the width and height of all letter designs will not be so great as to require use of the entire width and height scanning capability of optical scanner 30. Accordingly, a blocking mask transparency 106, illustrated in FIG. 17, may be mounted on pins 74 of frame 68 by means of apertures 108 to permit digital recording of a left boundary 109 and a right boundary 110 between which scanning will occur; thus, enabling the stepper motor 66 to initially advance frame 68 to the left boundary position defined by left boundary line 109 before commencing the optical scanning of a selected design known to reside between the left and right boundaries 109 and 110, respectively. Obviously, the use of a transparency such as illustrated in FIG. 17 will greatly reduce the time required for digitally recording the design information contained in a series of designs which occupy a field of view significantly less than the total field of view defined by the optical and mechanical portions of the subject optical scanner 30.

The optical scanner 30 may be further provided with a scan position indicator 112 (FIGS. 14 and 17) physically mounted to a fixed position relative to the optical axis defined by lens 80 and 84. The indicator 112 is positioned to cooperate with a position scale 114 recorded at the top of blocking mask transparency 106. Apertures 108 contained in transparency 106 are positioned to receive pins 74 thereby positioning the scale 114 and the boundaries 109, 110, in a predetermined location relative to the frame 68. Thus, a group of character designs known to occupy only a selected field of view relative to a predetermined base line and left hand reference lines may be more quickly scanned by the provision of a masking transparency as illustrated in FIG. 17 by positioning the left and right boundaries 109, 110 so as to define a desired field of scan. Moreover, should the operator determine that any one particular character design need only be scanned over a portion of the field defined by boundaries 109 and 110, the scan position indicator 112 may be employed in cooperation with the scale 114 to permit manual control, through keyboard and display 38, over which stepper motor 66 moves during the scanning procedure.

Figure 16:
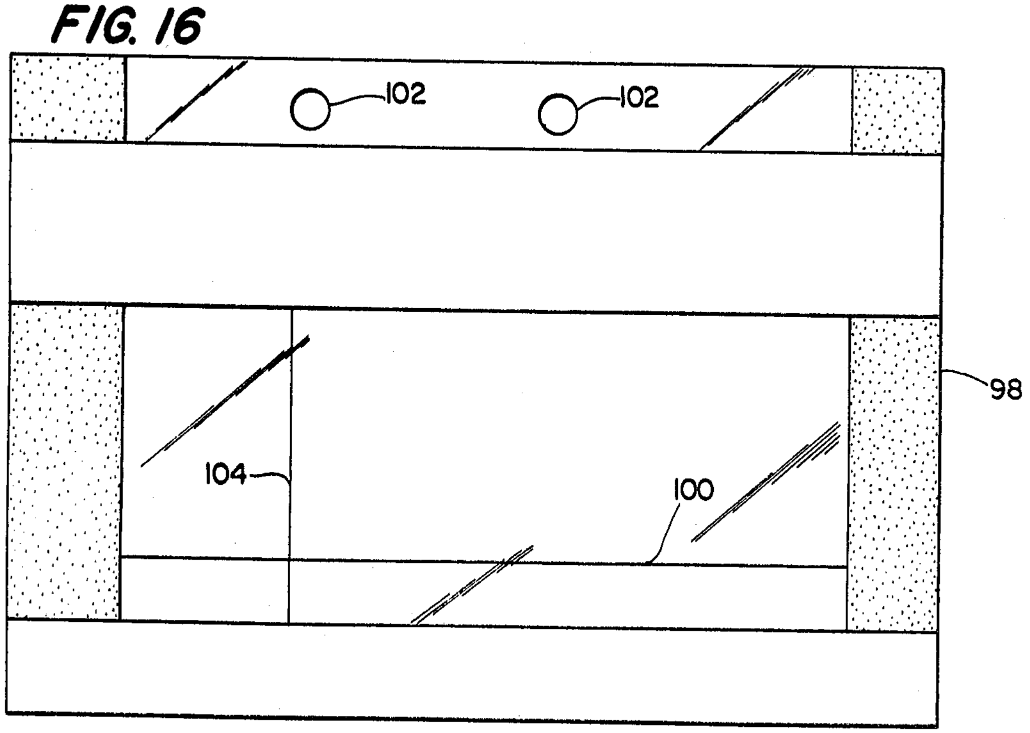
FIG. 16 is an illustration of a reference grid for use in establishing the reference position for a scanning operation of the optical scanner illustrated in FIG. 14.
Figure 18:
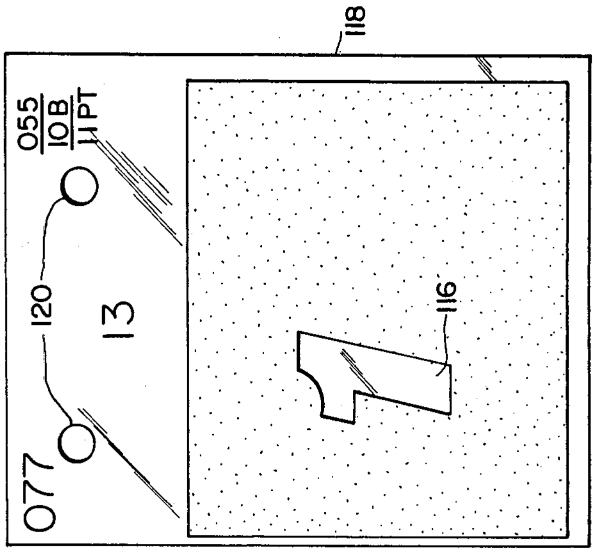
FIG. 18 is an illustration of a typical character image suitable for scanning by the optical scanner system of FIG. 14.

FIG. 18 discloses a typical character image 116 recorded on a transparency 118 in a predetermined location relative to apertures 120 arranged to receive positioning pins 74 of frame 68. By separating the character image 116 from the base and left hand reference lines contained on transparency 98, FIG. 16, the character image itself may extend below the base line or to the left of the left hand reference line as is desirable with certian types of letter designs including what is termed in the printing trade as a "descender" which is that portion of a letter design extending below the base line of a line of printed characters. For example, the lower portion of a lower case "g" or "y" which extends below a line of print is considered a "descender." The recordation of the position of the base and left hand reference lines by scanning a reference line transparency (FIG. 16) separate from the transparency containing the letter or character design (FIG. 18) allows the letter form to fall below the base line or extend to the left of the left hand reference line without thereby requiring the microprocessor 36 to distinguish between that portion of the shadow image representative of the base and left hand reference lines. At the same time, provision of a positional reference grid film transparency such as transparency 98 (FIG. 16) permits the base line and left hand reference lines to coincide with corresponding lines traditionally used by typeface design artists in preparing original artwork. Moreover, a reference grid transparency 98 such as illustrated in FIG. 16 further permits highly accurate positional recordation of character images which are substantially unaffected by changes in temperature and mechanical wear associated with the translation of frame 68 by stepper motor 66. If the reference grid transparency 98 were not employed periodically to redefine the correct position of the left hand and base reference lines, such information would have to either be contained on each transparency containing a character design to be scanned or would have to be permanently stored. Placement of such lines on the character design image transparency would lead to the disadvantages discussed above relating to the confusion caused by the character design actually coming in contact with or crossing over one of the reference lines. On the other hand, if the reference line positions were permanently stored, no provision could be made for variations caused by temperature changes or gradual wear of the mechanical parts connecting the stepper motor 66 to the reference frame 68.

Figure 19:
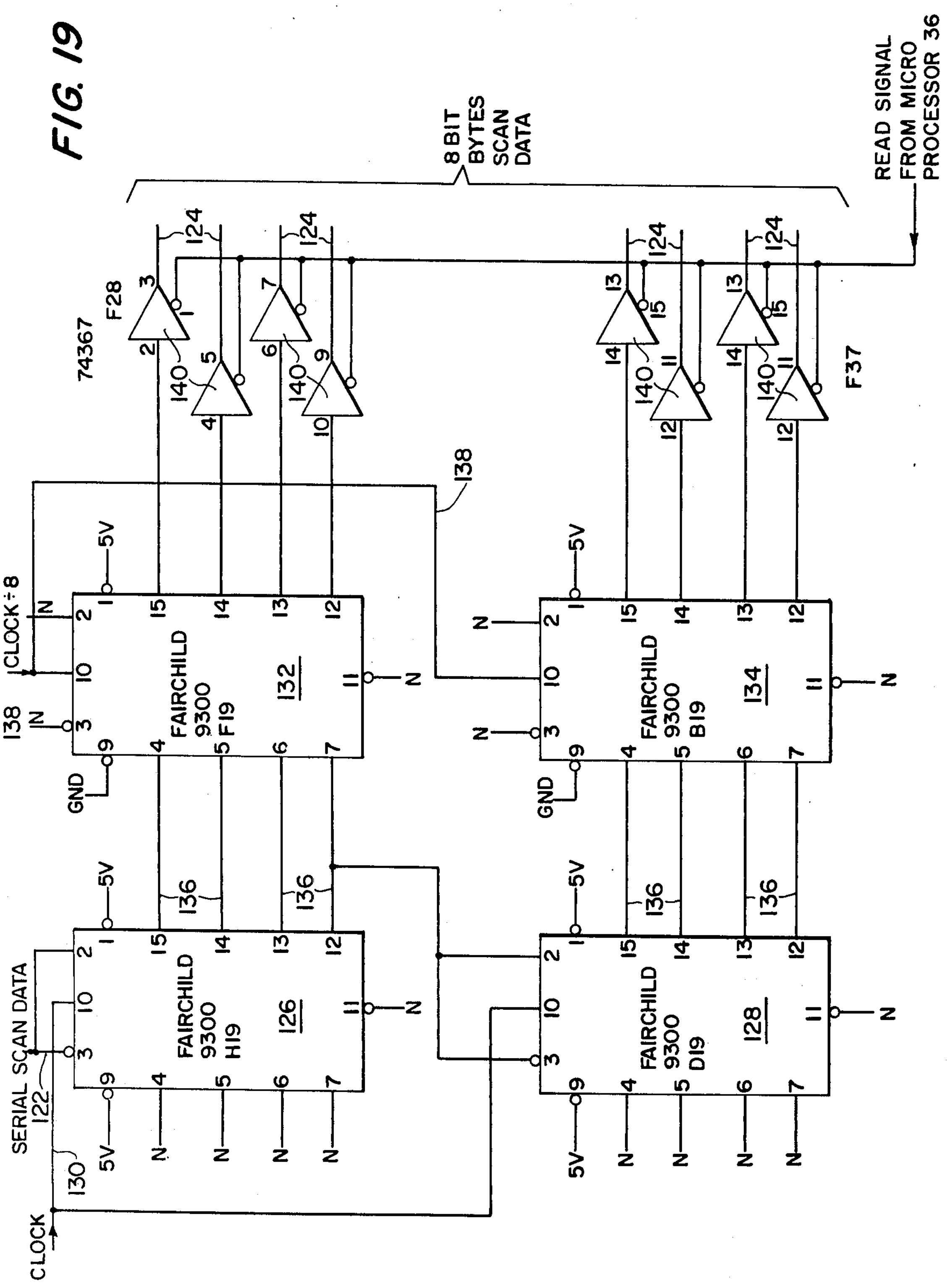
FIG. 19 is a schematic illustration of a series to parallel converter for converting the serial scan pulses into 8 bit bytes suitable for manipulation by the microprocessor of the scanner of FIG. 14.

As noted above, the output from photodetector arrays 82 and 86 is provided to the linear array logic circuit 42 over line 34 in serial pulse form wherein each pulse is amplitude detected to form a series of digital pulses indicating binary ones and zeros corresponding to the illuminated or non-illuminated condition of corresponding photodiodes of arrays 82 and 86. FIG. 19 discloses a series of parallel converters for converting the series form of digital pulses resulting from each scan of the photo arrays into parallel 8 bit bytes suitable for processing by the microprocessor 36. More particularly, the circuit of FIG. 19 which forms part of logic circuit 42 is designed to convert the serial digital pulses received on an input line 122 into 8 bit bytes of scan data provided on output lines 124 connected with microprocessor 36. In particular, FIG. 19 discloses a pair of 4 bit shift registers 126, 128 designed to shift through the data received on line 122 upon receipt of clock signals on clock line 130. Since the same clock signals are provided to the photodetector arrays, the digital data received by registers 126 and 128 are syncronized with the receipt of data pulses on input line 122. FIG. 19 also discloses a pair of shift registers 132 and 134 connected in parallel by lines 136 with registers 126 and 128, respectively, to read out the contents of registers 126 and 128 once for each 8 clock pulses supplied on line 130. Operation of registers 132 and 134 is controlled by a pulsed signal having a frequency equal to the clock rate divided by 8 supplied over line 138. Upon receipt of a pulse over line 138, registers 132 and 134 transfer in parallel the contents in registers 126 and 128 to output lines 124 through amplifiers 140 for transmission to microprocessor 36 of FIG. 14. This microprocessor is programmed to accept the 8 bit bytes of scan data for each vertical scan of a character image received from optical scanner 30, and to determine from this data the coordinate position of each transition from light to dark in each series of 8 bit scan data bytes representative of a vertical image scan. In the preferred embodiment the pulse data received by microprocessor 36 for each vertical scan of an image is reduced to a series of pairs of 8 bit bytes of binary pulses representing hexadecimal numbers describing the the start of each vertical scan followed by hexidecimal representation of the transition between light and dark areas as determined by transitions in the pulse data from ones to zeros and back again. The total number of pulses received from the linear photodiode arrays 82 and 86 for each scan is 1536. To uniquely identify the position of each photodetector, a hexidecimal number having at least three place a significance would be required. In binary format, a 3 place hexidecimal number would require 12 bits per 3 place hexidecimal number but since the commercially available microprocessors operate in 8 bit bytes, a pair of such bytes is required to uniquely identify the position of all photodiodes in arrays 82 and 86. FIG. 20 illustrates a typical example of the format of data prepared by microprocessor 36 in response to the pulse scan data received from optical scanner 30. In column 1, are listed successive pairs of 8 bit data bytes representaive of the beginning of a vertical scan followed by idenfication of those photodiodes in arrays 82 and 86 at which transistors between light and dark takes place. These transistors would, of course, represent the boundary points of a character image which points are actually intersected during each vertical scan of the character image. Referring again to FIG. 14, a character image 32 may be vertically scanned once for each horizontal step of frame 68 across the entire width of the character image 32. In this way, microprocessor 36 would be in a position to determine the coordinate position of each boundary point by obtaining the horizontal position of frame 68 upon detection of the first transition from light to dark followed by determining the vertical position of transitions between light and dark for each successive vertical scan of the image.

The transition coordinate data is fed by microprocessor 36 to the magnetic disc recorder 46 where it is recorded on a magnetic disc 44 as a series of binary bits having the form shown in column 1 of FIG. 20. Microprocessor 36 is also designed to forward signals indicative of the position of frame 68 at which image data is first detected in the scan of the character image. Operator inserted data identifying the character image is also received from keyboard and display 10 by the microprocessor 36 which forwards the information for recording on disc 44. Programs capable of operating the microprocessor 36 and microprocesssor based controller 46 are listed in appendices A and B, respectively.

Since the data supplied to disc 44 is in a fairly raw uncondensed form, only a few letters may be recorded on any one disc. It is the purpose of the encoding system illustrated in FIG. 21 to take the raw data from a series of discs such as disc 44 and to encode this data in accordance with the principles described with reference to the scheme of FIG. 11 by which the binary representation of the coordinate positions in hexadecimal format of all boundary points for a character image is transposed into a series of 3 bit codes represenatative of successive 3 dot translational movements along the boundary of the character image.

More particularly with regard to FIG. 21, the encoding system includes a disc drive 142 for receiving a disc 44 from the scanner system of FIG. 14 whereby data comprising hexadecimal coordinate data for the boundary points of one or more character images may be transferred to a random access memory 144 by means of a microprocessor 146 operating through a variable length sector controller 148, the precise organization and function of which will be described in greater detail hereinbelow with reference to FIG. 29. Also included in the encoding system illustrated in FIG. 21 is a second disc drive 150 for driving a magnetic floppy disc 152 on which the final encoded data representative of the letters and images in one or more alphabets may be recorded to form a master disc adapted to be repeatedly used composing text material as will also be described below. A program capable of operating the system of FIG. 21 in accordance with the encoding scheme of FIG. 11 is reproduced in Appendix C. Before encoding of the data actually takes place, the microprocessor 146 is programmed to perform a cleaning routine wherein data recorded on disc 44 which is obviously representative of spurious signals as opposed to actual boundary point coordinates are removed from the recorded information before encoding takes place. For example, if a coordinate position is recorded indicating transition from light to dark followed immediately by the coordinate position of a transition from dark to light during the vertical stand, it can reasonably be assumed that the scanner system has generated a spurious signal since any visibly perceptable portion of an image character would require more than a single matrix dot corresponding to the elemental area in the CRT display which corresponds to each of the 1500+ photodiodes contained in linear arrays 82 and 86. The clean up routine is designed to apply a selectably variable criteria in deciding whether to accept a particular coordinate. In particular, recordation of a coordinate is allowable according to one criteria only if the raw coordinate data indicates that at least 4 consecutive character dots in the dot matrix are followed by at least 6 consecutive non character dots. If the encoded data is to be reduced by a factor of 3 or more, a courser criteria is applied which prevents the acceptance of any coordinate unless at least 6 consecutive character dots are followed by at least 9 consecutive non-character dots. Once the cleaning routine has been completed on the data recorded on a disc 44, the actual encoding routine may be performed by microprocessor 146 by manually switching the microprocessor using switch 154 between operation in the cleaning routine mode to the encoding routine mode. A cleaning routine program suitable for the encoded of FIG. 21 is recorded in Appendix D.

Figures 22, 23:
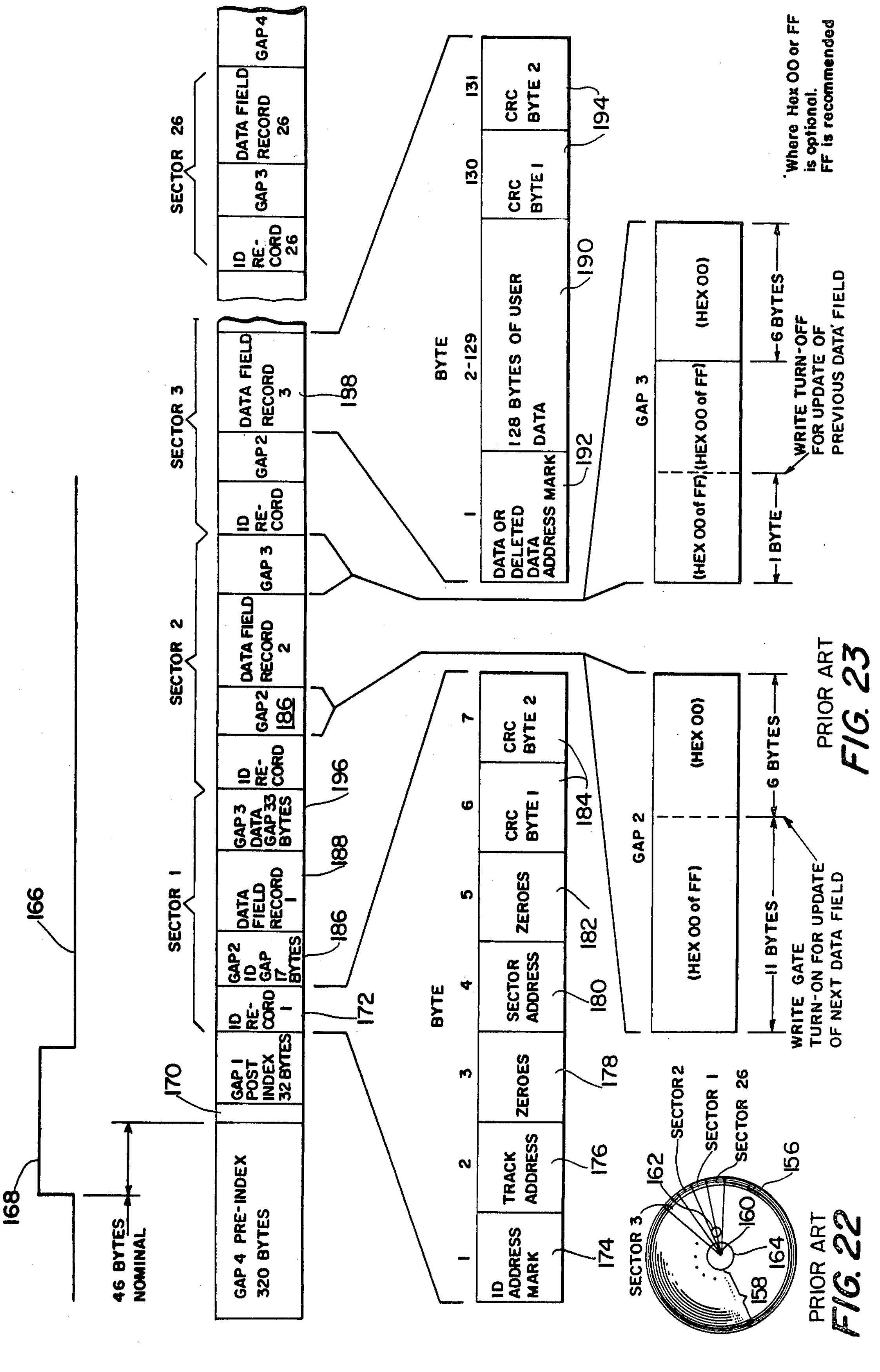
FIG. 22 PRIOR ART
FIG. 22 is a schematic illustration of a conventional magnetic floppy disc provided with equal length data storage sectors.
FIG. 23 is a chart of the manner by which data is organized on the conventional floppy disc of FIG. 22.

To make the vitally important encoding function performed by the encoding system of FIG. 21 more understandable, attention is directed to FIG. 22 wherein a conventional floppy disc 156 is disclosed having 77 concentric recording tracks 158 disposed around the rotational axis 160 of the disc. Each of the recording tracks 158 is, according to the standard format used in the prior art, subdivided into 26 equal angular length sectors with sector 1 beginning at a point coincident with the angular position of physical indexing aperture 162. In operation, disc 156 is placed upon a centering hub to be received in central opening 164. As disc 156 is rotated, an index position sensing device, such as a photosensor, picks up the passage of indexing aperture 162, thus enabling identification of the beginning of sector 1 as it passes the read/write head which is conventional on floppy disc drives.

To understand more clearly the importance of the novel type of magnetic disc which makes possible the subject invention, attention is directed to FIG. 23 in which the prior art arrangement of data within each of the 77 tracks of floppy discs 156 is illustrated. In particular, the output waveform 166 produced by the index aperture sensor, not illustrated, is shown in FIG. 23 wherein pulse 168 denotes the passage of index aperture 162 once for each revolution of the floppy disc 156. Within each of the 77 tracks 158 contained on the disc, there exists room for several thousand bit cells containing a clock bit occurring at the beginning of the bit cell followed by sufficient magnetic storage area to retain magnetic representation of the presence or absence of a data bit. Each successive group of eight bit cells forms a byte within which 8 data pulses may be stored. As indicated in FIG. 23, it is conventional to place an index address mark 170 located nominally 46 bytes subsequent to the commencement of the indexing aperture pulse 168 followed by 32 post index bytes before the commencement of the first of 26 sectors made up of 162 bytes of recorded data. In particular, each sector begins with an identification record 172 made up of 7 bytes including an identification address mark 174, a track address 176, one byte of zeroes 178 followed by sector address 180 again followed by a byte of zeroes 182. The concluding two bytes of the identification record includes CRC codes which are conventional system integrity checks.

Following the identification record in sector 1, is 17 bytes of data forming a gap 186 used to store data indicating a write function for a following data field. After gap 186, the following 131 bytes form gap 188 and are set aside for storing user data 190 which may consist of 128 bytes of such data sandwiched between a data or deleted addressed data mark 192 and a pair of CRC bytes 194. Each sector concludes with a 33 byte data gap 196 for storing data relating to a right turn-off function for update of the previous data field. While useful for many purposes, the subdivision of each track 158 into 26 equal length sectors is not well suited for the subject invention as it does not permit optimum compaction of the stored data. Moreover, merely subdividing each track into a greater or lesser number of individual sectors would not permit the flexibility necessary to implement the subject invention so as to permit the maximum number of image characters such as letters and numbered designs to be recorded on each floppy disc used in the system.

Figure 24:
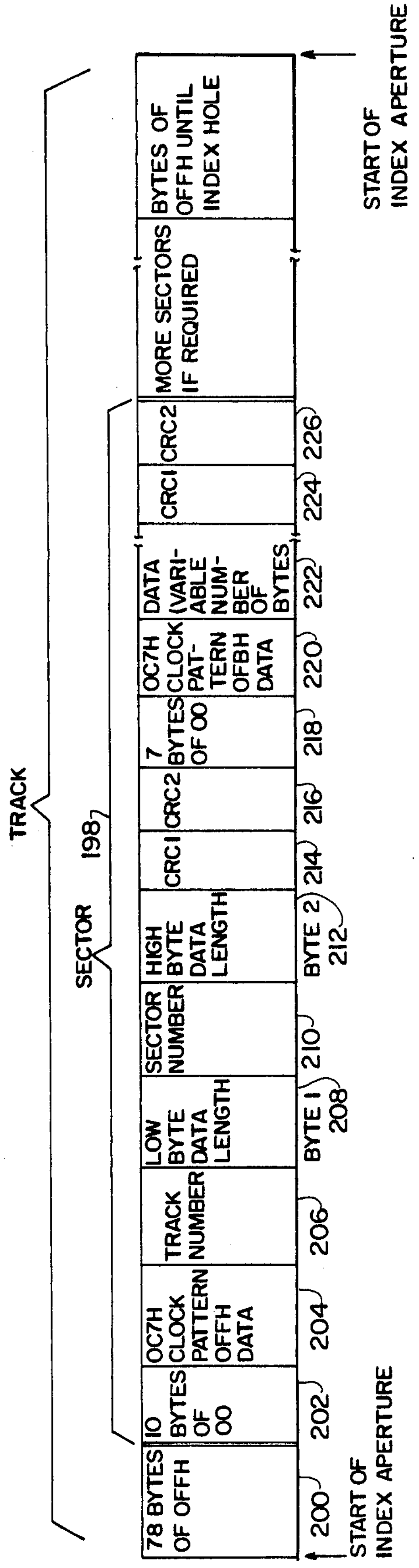
FIG. 24 is a chart illustration of the manner by which data is organized on the novel magnetic font disc formed in accordance with the subject invention.

FIG. 24 discloses the completely novel way in which data is recorded on a magnetic disc within variable length sectors arranged relative to the index aperture of the disc to maximize the amount of character image data which may be stored on a magnetic disc. The compact nature of this data derives primarily from the use of successive three bit translational codes produced in accordance with the encoding scheme of FIG. 11. As illustrated in FIG. 24, the first sector in each track begins at a point 78 bytes following detection of the index aperture indicated at point 200. The first 10 bytes 202 of each sector includes stored zeroes followed by a special "dropped" clock pattern consisting of an eight bit byte of the hexadecimal numbers C7 (i.e., 1100 0111). The exact function of this pattern will be described more fully hereinbelow. Following byte 204 of each sector is a track number byte 206 followed by a byte 208 which indicates the beginning position of data recorded within the particular sector. The fifth byte group 210 includes bit cells set aside for receiving data identifying the sector. The next byte 212 consists of data cells set aside for receiving a number indicative of the position of the high byte of data recorded in the variable length sector. Thus, it is bytes 208 and 212 which define the boundaries of the character image data stored in each variable length sector contained on a magnetic disc organized in accordance with the subject invention. Bytes 214 and 216 contain the conventional CRC codes followed by seven bytes of zeroes 218. Yet another "dropped" clock pattern byte 220 follows byte 218 at which point the character image data commences starting at byte 222 within the sector and continuing for as little as one byte up to 4861 bytes of data. Following conclusion of the bytes of recorded data, a pair of concluding bytes 124 and 126 contain character conventional CRC check codes. As is now apparent from FIG. 24, the number of bytes that can be stored on a track will vary dependent upon the number of sectors into which the track is actually divided since each sector includes 27 bytes of non user data including identification, clock checks and other types of control information, the total number of bytes that can be stored on a track equals 4889 minus 27 times the number of sectors. This amount of storage should be compared with the conventional storage capacity of a floppy disc as organized in the manner illustrated in FIG. 23 wherein a maximum of 26 times 128 bytes of user data may be stored on a single track or 3328 bytes of user data. By varying the length of each sector, in accordance with the length necessary to store all of the three bit translational codes needed to define a particular character image, additional storage capacity may be derived by elminating the need for separate successive sectors of a single character boundary. If a particular series of three bit translational codes describing a single letter cannot be stored before the available bytes in a particular track are exhausted, a special code may be stored which causes the remaining three bit codes to be stored in the first sector of the following track. By this technique, all of the data necessary to define a particular character image need appear in no more than two sectors since as will be discussed further hereinbelow, the degree of resolution required to exceed the resolution of the human eye and the degree of data compaction permitted by the scheme of FIG. 11, will not, as a practical matter, cause the amount of data necessary for any one character image to exceed the storage capacity of any one track in a magnetic disc organized in accordancce with the arrangement illustrated in FIG. 24.

Attention is now directed to FIG. 25 which discloses the organization of data actually placed on a disc 152 by the microprocessor 146 and variable sector controller 148 of FIG. 21 upon execution of the encoding routine contained in the program appearing in appendix C. As illustrated in FIG. 25, each master disc includes one sector such as sector 131 (not necessarily the first sector in the first track) wherein alphabet directory information is stored. This directory begins with a customer check number 228 including two bytes for purposes of identifying a particular customer using the master disc. Following the customer check number 228, certain alphabet information for each alphabet stored on the master disc is recorded. This information includes typeface number 232, encoded point size 234, encoded set size 236, sector 130 track number 238 and size information length 240.

To understand the meaning and necessity for the information recorded in bytes 232–240, it should be noted that each character in a font of characters is defined by a set of parameters that includes an EM square 252 such as shown in dashed lines in FIG. 26. The EM square defines the point size 246 of the character which for exemplary purposes is shown as an H in FIG. 26.

The set size of an alphabet is defined as the horizontal width of the capital letter M of the alphabet measured in point units of length. The body size of the overall set width 248 of a particular character is equal to the sum of the character width 250 and the leading side bearing 252 and trailing side bearing 242 of the character. The leading side bearing 252 is defined as the distance from the leading or left outer periphery of the character to the leading edge of the set width of the character. Similarly, the trailing side bearing 254 is defined as the distance from the right edge of the character to the trailing edge of the set width of the character. One character is spaced from another character by the sum of the trailing and leading side bearings of the respective successive characters. In order to achieve the very high degree of graphic quality desired from the subject photocomposing system, the EM square is subdivided into 144 relative units per EM instead of the normal 18 pts. Thus the subject system has the capability of modifying the size of encoded character design in ⅛ point size variations. During the initial process of hand drawing each letter form, the artist will arbitrarily choose the overall set width of each character including the leading and trailing side bearings in accordance with the artist's visual conception of how the character sould fit when juxtaposed with all other letters in a particular typeface style.

Returning now to FIG. 25, alphabet information 230 which is repeated for each alphabet includes size information 256 specifying the lowest limit 258 to which the encoded alphabet design may be reduced in both point size 262 and set size 264 (by ⅛ point units). Similarly, the upper limit 260 of both point and set sizes to which the encoded alphabet may be adjusted is recorded. If the ratio of point size to set size at the upper and lower limits are not identical, the point at which the ratio changes is indicated as the size break recorded at 267. Thus, if the upper limits were 18 pt 17 set and the lower were 12 pt 12 set, the allowed point/set ratios could be limited as follows 17/16; 16/15; 15/14; 14/14; 13/13; 12/12. In this situation, 14/14 would be the break point. Plural break points may be defined in ⅛ 1 pt units from upper to lower limit sizes.

The alphabet information 230 is repeated for each alphabet contained on the master disc to a maximum of 512 bytes of information in the alphabet directory 282. Following the alphabet directory, the actual alphabet letter image and number image information is recorded by successive three bit translational codes organized in accordance with the scheme of FIG. 11. More particularly, sectors 0–127 of the master disc are assigned for recording character data by first recording the left limit of the series of three bit translational codes for describing a letter boundary. The section length 286 within which the codes are recorded and the section byte execution time 288. The right limit is stored at 290 followed by one byte of zeroes 292 following which the X coordinate for the starting point for the first boundary line of a character are stored in two bytes 294. Also recorded in these two bytes within bits 13, 14 and 15 is a code indicating the starting direction of the first three bit code. As can be easily understood from the scheme of FIG. 11, the path identified by the first three bit code can only be determined when the path set from which the path has been selected is also identified. Thus, the purpose of the information recorded at bits 13, 14 and 15 is to properly identify this path set. Immediately following the starting X coordinate are two bytes 296 in which are recorded the starting Y coordinate followed by 8 bytes 298 of hexadecimal FF or in other words eight bytes of ones. The actual boundary data is next stored in successive bytes having a variable length dependent upon the amount of data required to completely describe one boundary of the character. The same information recorded in a series of bytes 292–300 is recorded for the second boundary of the same character as required in corresponding byte sections 302–312. There then follows separate sectors including a series of bytes containing a width table 314 including set width information for each character in each alphabet encoded on the disc. Since these widths are expressed in 144 relative units or 8 relative units per conventional width unit (point), the size and fit of letters photocomposed with the subject system may be very accurately controlled. The sector directory 318 merely indicates in which sector on the disc a particular alphabet character is found.

All of the information identified in FIG. 25 is placed on the master disc 152 of FIG. 21 by operation of the encoding system which, as described above, was also operative to encode the boundary data received from the scanner system of FIG. 14. Disc 152 now contains all of the information required to permit a printer, designed in accordance with the subject invention and described in detail hereinbelow, to function in response to text composing signals received from a record produced previously on a keyboard editor, not illustrated, or in response to signals from a keyboard connected online to the printer all as schematically illustrated by circuit 8 in FIG. 1.

PHOTOCOMPOSITION PRINTER

Figure 27:
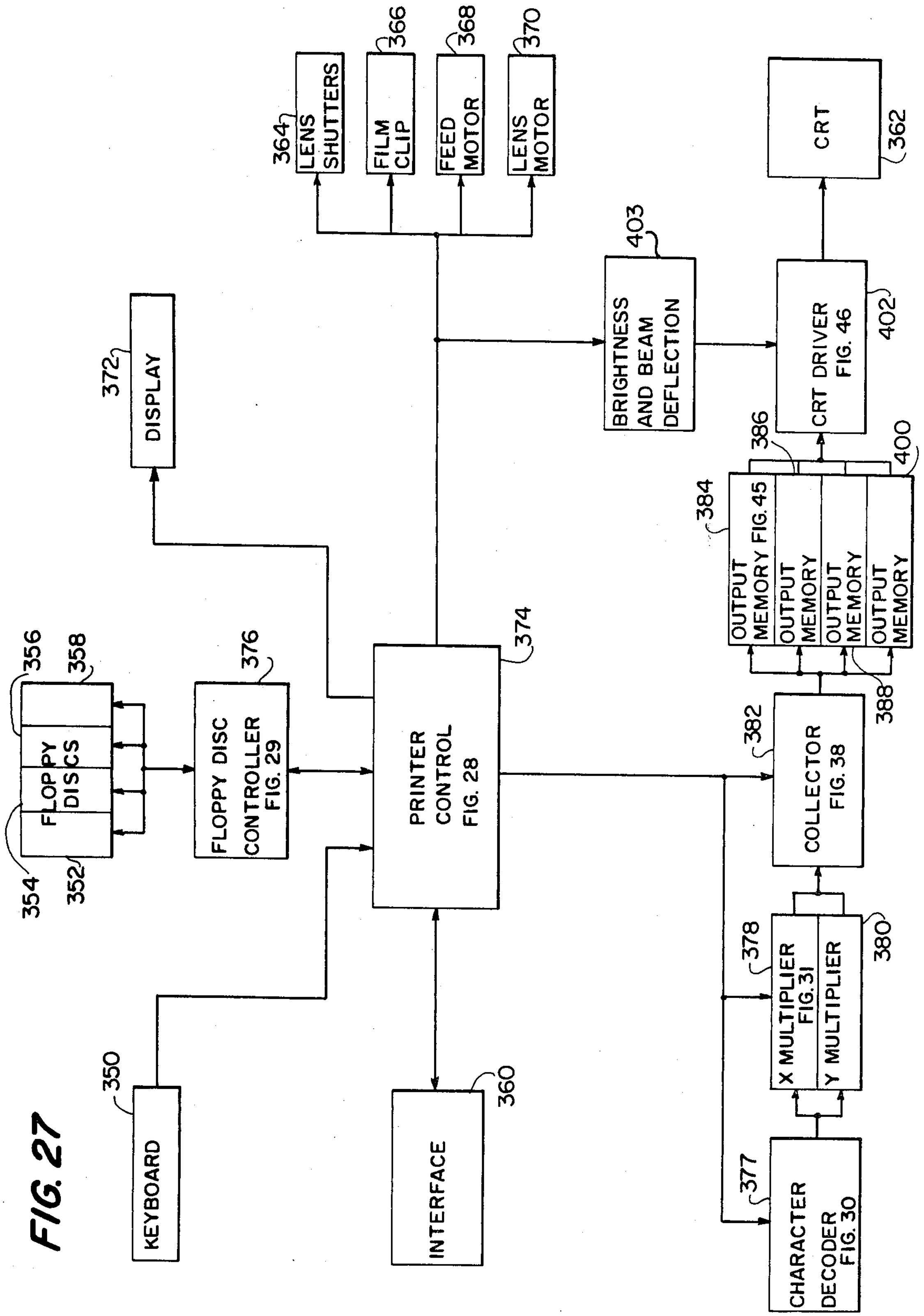
FIG. 27 is a schematic illustration of the major components of the photocomposition printer formed in accordance with the subject invention.

Attention is now directed to FIG. 27 which schematically illustrates the important components of the printer system. Input commands are initially received from keyboard 350 for directing the printer to prepare itself to photocompose a particular text which may involve several different typeface styles in varying weights of Roman, bold and/or italized form. Thus, before the printer may be commanded to execute a particular photocomposition task, it is necessary to select one or more master discs such as disc 152 containing the information outlined in FIG. 25 for each of the alphabets selected within which the text material is to be photocomposed. A bank of floppy disc drives 352–358 are therefore provided to receive the appropriately chosen master disc on which are recorded the various alphabet styles necessary for photocomposing the text as desired. It has generally been found to be desirable to place a blank floppy disc in one of the disc drives such as drive 358 and to dump onto such a disc, commonly referred to as a working disc, only the alphabet identification and character design information required from each of the plurality of master discs containing the various alphabet styles desired for execution of a particular photocomposition job. Thus, the operator of the printer will use keyboard 350 to command the printer to first custom design a working font disc by recording thereon only the information necessary from a plurality of previously recorded master discs. The working disc will include all of the information stored on the master disc pertaining to a particular alphabet including all numbers and punctuation symbols associated therewith, with the exception that the information recorded in bytes 240 and 256 is omitted as it is unnecessary for photocomposition in a selected point size and set size of a single alphabet. Thus, the information recorded in bytes 234 and 236 of the master disc is modified on the working disc to specify the selected set size and selected point size of the alphabet in which photocomposition is to take place.

Once the working disc has been properly formulated, a series of text composing, instructional commands are fed into the printer either from an on-line text composing keyboard, not illustrated, through interface 360 or from a previously prepared floppy disc inserted into one of the disc drives such as drive 358 so as to command operation of the printer to sequentially produce character designs on CRT 362 while appropriately controlling operation of the lens 14 and film transport 18, illustrated in FIG. 1, by appropriate control of the lens shutter 364, film clamp 366, feed motor 368 and lens motor 370. To assist the operator to properly control the printer, a display 372 is provided to permit display of information as it is being fed into the printer and/or to display messages regarding improper commands and/or to display instructions regarding appropriate steps necessary for completion of a particular photocomposition task.

Central control and command of the printer system occurs in a microprocessor based printer control circuit 374 which will be described below. Control of the floppy disc drives during both read and write functions is further implemented by a novel floppy disc controller 376 which has been designed especially to handle the variable sector format of the master and working discs. In order to recreate on the display screen of CRT 362 the successive character images necessary to compose the desired text, the printer control circuit 374 is designed to feed all of the three bit translational codes forming a description of the boundaries of a particular character into a character decoder 377. As will be explained in greater detail, the decoder 377 continuously cycles around the outline of the character until the CRT display has reproduced each portion of the character for recordation on the film master, not illustrated in FIG. 27. Since the character image is not always recorded on the master disc in all point sizes, X and Y multiplier circuits 378 and 380 are provided to multiply the coordinate information received from the character decoder by an appropriate scaling factor determined by the selected set size and point size recorded on the working disc so as to cause the CRT to display the character image in the appropriate point size. Collector circuit 382 receives the output from multipliers 378, 380 but records only a predetermined slice of the character image which, as will be explained, comprises only the information required for 16 successive vertical sweeps of the CRT display 362. Because conventional integrated circuitry does not operate at a sufficiently high rate, special high speed output memory boards 384, 386, 388 and 400 are provided. In this way, one pair of the output boards such as boards 384 and 386 may be supplying control signals to the CRT driver circuit 402 while the other two output boards 388 and 400 are receiving CRT control signals from collector board 382. A CRT beam brightness and deflection circuit 403 is connected to CRT driver circuit 402 in order to provide proper control of the CRT during recreation of each character image.

Figure 28:
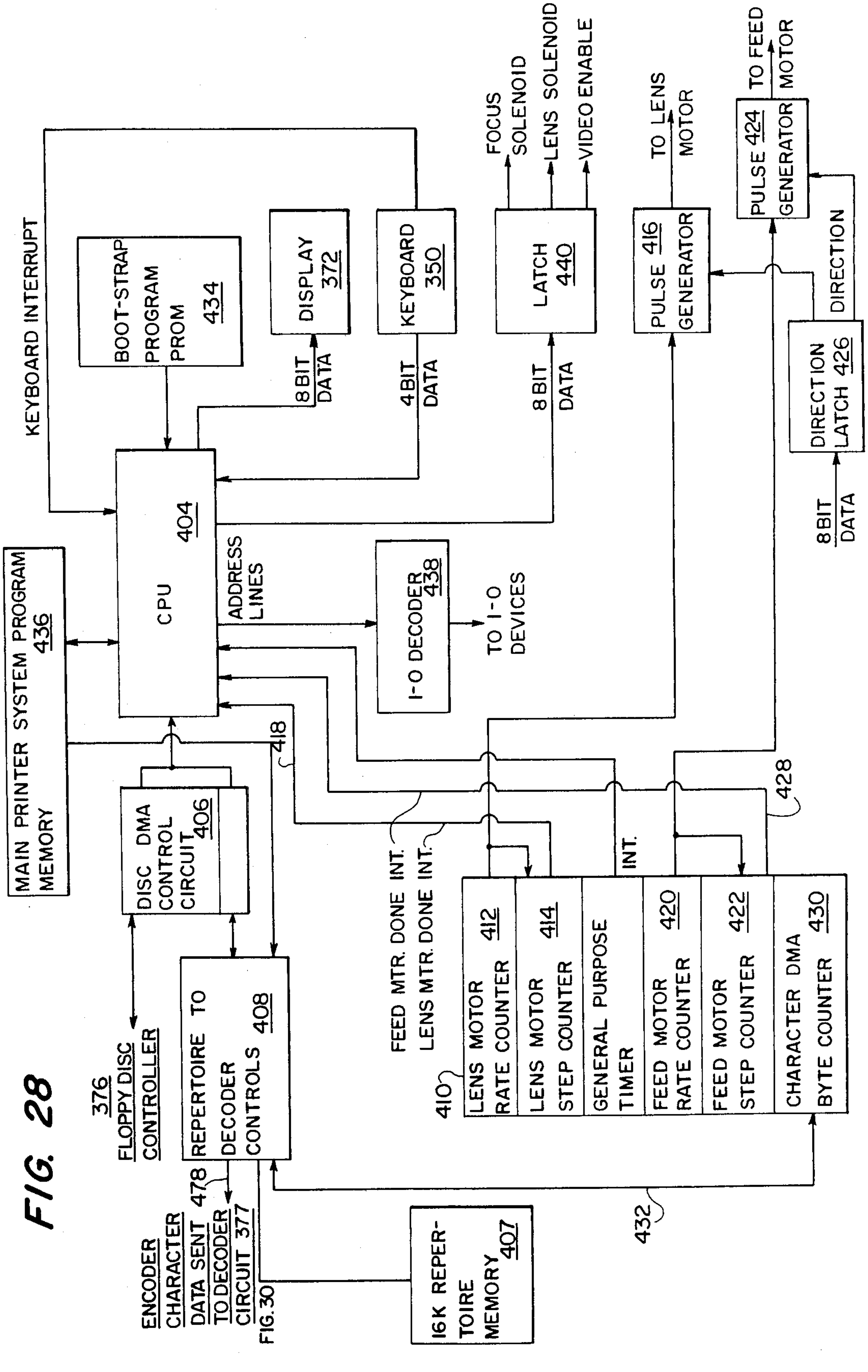
FIG. 28 is a schematic illustration of the printer control circuit illustrated in FIG. 27.

FIG. 28 discloses a more detailed schematic illustration of the printer control circuit 374 wherein a central processor unit 404, such as an Intel 8080 microprocessor based circuit group, is used for providing the central control to the printer system illustrated in FIG. 27. Through a direct memory access control circuit 406, the CPU 404 operates the floppy disc controller 376 to read out selected image data from the floppy disc and to dump this data into a 16K RAM board which may be referred to as a repertoire memory 407 which will be discussed in greater detail in reference to the floppy disc controller circuit 376 hereinbelow. A repertoire to decoder control circuit 408 is operable upon receipt of a command from control circuit 406 to cause encoded data representative of a single character to be dumped from the repertoire memory 407 into the decoder circuit 377 in order to thereby commence the process of generating the signals necessary to cause the CRT 362 to produce a photographable image of the character. The CPU 404 further controls a programmable counter circuit 410 having six separate counters independently programmable to appropriately control the motor which causes the lens 14 illustrated in FIG. 1 to be displaced in a horizontal direction along the line of print and the motor which feeds the film 16 as each print character is recorded on the CRT 12. In particular, the CPU programs a lens motor rate counter 412 and a lens motor step counter 414 so that the lens rate counter 412 may provide an output through a pulse generator 416 to cause the lens to advance in a horizontal direction as illustrated in FIG. 1. The lens motor step counter counts backward from the number stored therein by the CPU and produces a signal indicative of the completion of the translational movement requried in order to photocompose the character image produced by the CRT. This signal is sent back to the CPU on line 418. A feed motor rate counter 420 and a feed motor step counter 422 are similarly programmed by the CPU to cause the film frame 18 of FIG. 1 to be translated in a vertical direction in accordance with the command signals of the CPU. In particular, rate counter 420 generates signals which are forwarded to pulse generator 424 which in turn control the movement of a film frame motor not illustrated. The direction of movement of both the lens and the film frame is controlled by a latch 426 which may be set by the CPU to produce appropriate direction signals for both pulse generators 416 and 424. Upon completion of the necessary film advance, the feed motor step counter 422 will produce a signal sent to the CPU 404 over line 428 to indicate completion of the commanded film advance. Yet another counter 430 is provided to receive a count indicative of the number of bytes in the series of stored three bit translational codes describing the boundary of a character image which is being transferred from the repertoire memory to the character decoder circuit 376. When the requisite number of bytes have been transferred by causing counter 431 to count back to zero, a signal is sent to the repertoire to decoder control 408 to indicate that the required number of bytes has been transmitted to the decoder circuit 376. This end of byte transfer signal is sent to the repertoire to decoder control 408 over line 432.

During initial start-up of the printer, a boot strap program from PROM 434 is transferred to CPU 407 to provide the necessary start up signals for the printer system. These start up signals serve to initiate the system and permit the main system program to be read from a previously encoded program disc. The boot strap program in PROM 434 is designed to cause this system program to be transferred from the program disc to a 16K program memory 436. The input/output decoder circuit 438 provides necessary control signals to the various circuit chips contained within the central processor unit 404. A latch circuit 440 under the control of the CPU 404 is designed to provide output signals to control lens and focus solenoids as well as to enable the CRT video circuitry. Appendix E includes the program permanently recorded in PROM 434 and Appendix F includes the main program for the printer stored on the program disc.

Figure 29:
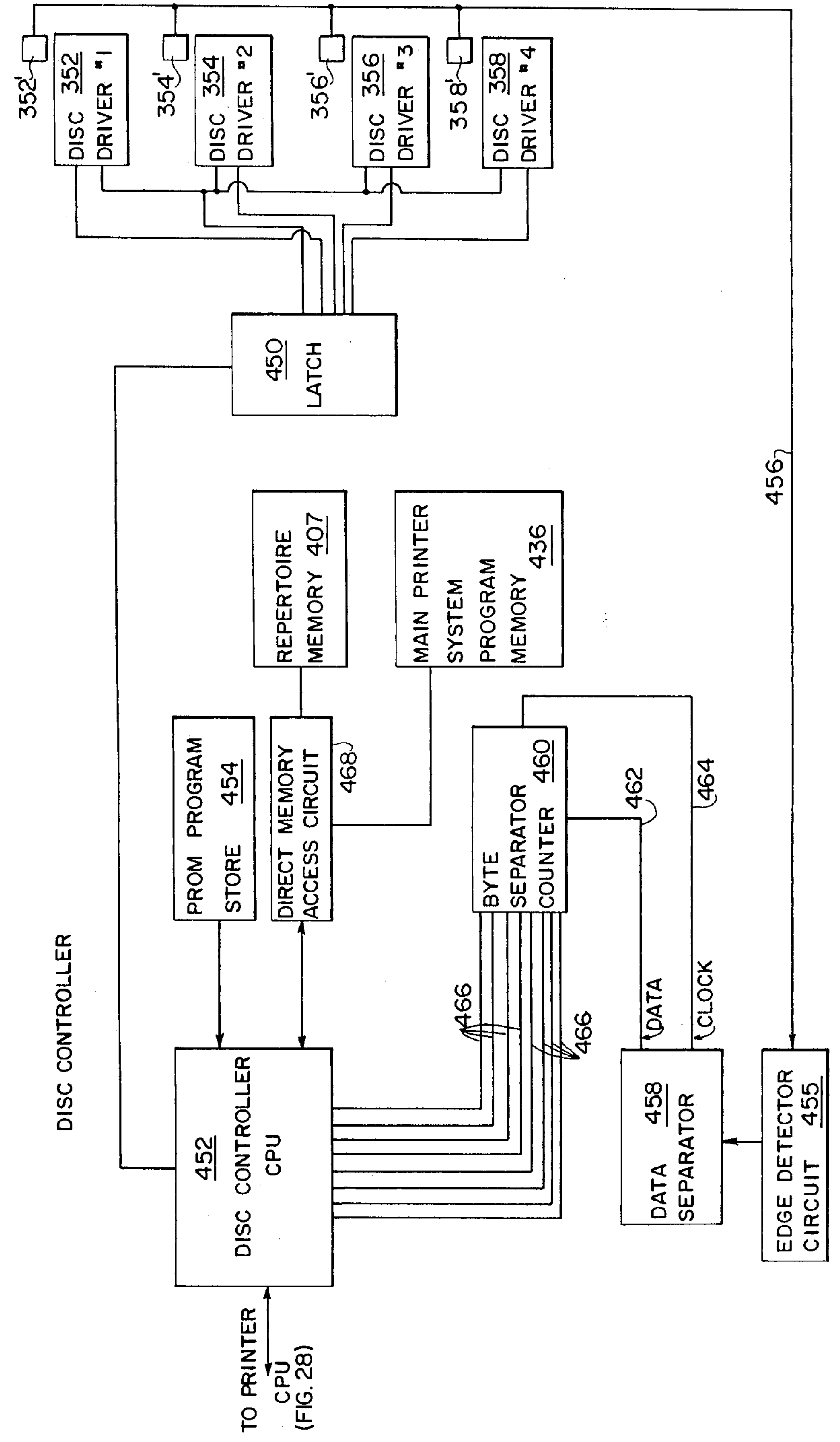
FIG. 29 is a schematic illustration of the disc controller circuit of FIG. 27 used to control the magnetic font disc formed in accordance with the subject invention.

Attention is now directed to FIG. 29 which is a schematic illustration of the disc controller circuit 376. This controller is identical to the variable length sector controller 148 of the encoding circuit illustrated in FIG. 21 and is designed to operate with the novel discs encoded in accordance with the scheme illustrated in FIGS. 24 and 25. Some differences are necessary in order to permit the performance of certain specialized functions but the program listed in Appendix G is basically the same whether used in the circuit of FIG. 21 or FIG. 29. Referring now specifically to FIG. 29, each of the four disc drives 352, 354, 356 and 358 are illustrated as being connected to a latch circuit 450 which in turn is connected to the disc controller CPU 452. Like CPU 404 of FIG. 28, the disc controller includes an Intel 8080 microprocessor based chip group 452. Control signals received from the printer CPU illustrated in FIG. 28 operate in accordance with the program initially stored in PROM 454 to permit the disc controller to operate disc drives 352–358 in a manner to accommodate the novel variable sector length, data recording format disclosed in FIGS. 24 and 25. In particular, selection for drive of one of the disc drives by CPU 452 through latch 450 causes one of the corresponding read/write heads 352′–358′ to respond to the magnetically recorded data stored in the various tracks of the magnetic discs. Signals received from the read heads are sent via line 456 to an edge detector circuit 455 designed to produce a composite series of pulses including both data and clock pulses corresponding to the data recorded on the respective discs inserted in the disc drive selected by latch 452. This series of composite data is sent to a data separator circuit 458 wherein the data pulses are separated from the clock pulses both of which are still in a serial form and are passed over separate lines to a byte separator counter 460. The serial data pulses are provided over line 462 while the clock pulses are supplied over line 464. Byte separator counter 460 operates as a serial to parallel converter by converting the serially received data pulses from 462 into parallel 8 bit bytes sent to disc controller CPU 452 over data lines 466. Under operation of the printer CPU 404, the disc controller CPU 452 transfers the program for operating the entire printer system from the program disc inserted in one of the disc drives into the main printer system program memory 436. Communication between the disc controller CPU 452 and the respective repertoire memory 407 and program memory 436 takes place through a direct memory access circuit 468. Appendix G includes a listing of the variable sector disc controller program stored in PROM Program store 454.

After the main printer system program has been read into memory 436, a master disc, a working disc and a photocomposition instruction disc may be inserted into respective disc drives to permit the process of photocomposition to commence. The various three bit translational code sequences describing character image boundaries are read from the master disc(s) into the working disc as required in accordance with the particular instructions recorded on the instruction disc. Once the working disc is completely formatted, the actual photocomposition function can commence by transfer of the three bit translational codes for the first character to be displayed on the CRT from the working disc to the repertoire memory 407. Moreover, the selected character point size and set size are also read from the disc and transmitted to appropriate positions within the printer system. Other necessary control information is read from the working disc and instruction disc to provide the necessary control information for operation of the system.

The first step in providing appropriate control signals to the CRT display begins by the transfer of boundary data from the repertoire memory 407 to a temporary boundary memory 476 over line 478. The data for two successive characters are transferred to the temporary boundary memory in order to permit simultaneous generation of CRT vertical scan signals in case the text generating instructions require the two successive letters to actually be superimposed to some degree in the final printed text material. When the temporary boundary 476 has been completely loaded, the system produces a decode ready signal at line 480 to cause a mode sequencer circuit 482 to provide an activating signal successively to four output lines 484, 486, 488 and 490. A parameter loading circuit 492 is connected to output line 484 and is thus first initiated upon activation of the mode sequencer circuit 482. This performs the function of causing the first several bits of encoded image data stored in temporary boundary memory 476 to be sent to the appropriate registers in the decoder circuit and multiplier circuits 378 and 380. In particular, parameter loading circuit 492 produces an X starting coordinate load enable signal on line 494 to cause the eleven bit X starting coordinate stored in temporary boundary memory 476 to be supplied over lines 496 to the X multiplier circuit illustrated in FIG. 31. Subsequently, a Y starting coordinate load enable signal is supplied over line 498 to the Y multiplier board 380 in order to cause the Y coordinate to be supplied over lines 496 to the Y multiplier circuit which is a circuit identical to the circuit of FIG. 31.

A point size latch store enable signal is also sent to the Y multiplier circuit on output line 500 to cause a latch in the Y multiplier circuit to store a scaling number designed to cause the CRT to display the selected point size from information stored in the temporary boundary memory 476 which describes the character image in the encoded point size. Similarly, a set size latch store enable signal is sent to the X multiplier circuit 378 over line 502 in order to cause the X multiplier circuit to store the scaling number in a latch so that the multiplier circuit may appropriately scale the X coordinate data of each character image to cause the CRT to display each character image in the selected set size. Starting direction information stored in temporary boundary memory 476 is transferred to the direction determining circuit 504 upon receipt of a starting direction store enable signal received over line 506. The exact function of the direction determining circuit 504 will be described in greater detail hereinbelow. Mode sequencer circuit 482 then advances to provide an activating signal over line 508 in order to cause the first byte of boundary data to be loaded into the parallel to serial converter 518. Mode sequencer circuit 482 then advances to provide an activating signal on line 510 to cause the first three bits to appear at the outputs of parallel to serial converter 518. Finally, a commence decoding activating signal is provided over line 512 to the memory addressing circuit 514. The temporary boundary memory 476 connected with the memory addressing circuit 514 is then caused to read out the sequentially stored three bit translational codes describing the boundary coordinates of two successive characters which are to be photocomposed. The temporary boundary memory 476 operates by providing an output in 8 bit bytes over data lines 516 to an 8 bit parallel to a three bit parallel converter 518. The three bit bytes provided at the output of converter 518 on lines 520 are synchronized to correspond to the originally encoded three bit translational codes representative of the translational movements around the boundary of a character image starting at the point identified by the starting X-Y coordinates discussed above. A high speed decoding PROM 522 is permanently programmed (as indicated in Appendix H) to decode each three bit translational code to cause the addition of one, the subtraction of one, or no change in the previously recorded X coordinate in the X multiplier circuit 378 and similarly to add one, subtract one or make no change in the Y coordinate recorded previously in the Y multiplier circuit 380 during each of the next three successive clock cycles of the high speed decoding PROM 522. This operation has the function of generating the three succeeding X-Y coordinates for each of the dot positions described by the translational paths represented by the three bit translational codes described in FIG. 11 above. As each three bit code is shifted into the high speed decoding PROM 522, the direction determining circuit 504 operates to provide a signal on line 524 which operates to define the path set from which the next three bit code will select a translational path in accordance with the encoding scheme of FIG. 11. If the three bit code sent to the high speed decoding PROM 522 is a three bit binary zero, a signal is provided on line 526 to enable a zero detect circuit 528 to provide an indication as to whether the succeeding three bit code is a zero in which case an activating signal is provided on line 520 to the memory addressing circuit 514 which operates to terminate boundary data decoding since two succeeding three bit zero codes are indicative of the end of the boundary data as illustrated in FIG. 25. Note byte groups 300 and 308 of FIG. 25. If the after zero detect circuit 528 senses a three bit binary number 4(100), an activating signal is sent over line 532 to an extend logic circuit 534. This circuit operates to determine the number represented by the next three bit binary code and operates to recirculate the three bit binary number 4 previously sent to the high speed decoding PROM 522 two additional times plus a number of times equivalent to the three bit binary code number stored in the temporary boundary in a position immediately following the three bit binary four code. Extend logic 534 therefore serves to implement the special zero command dealing with straight line advance as described above with reference to the encoding scheme of FIG. 11. During the recirculating operation of the 8 bit parallel to 3 bit parallel converter, a hold signal is provided on line 538 to cause memory addressing circuit 514 to remain in a fixed state to prevent further 8 bit parallel bytes of data from being transferred out of temporary boundary memory 476. The add and subtract signals from the high speed decoding PROM 522 provided over output lines 540 are first set to a X-Y coordinate adjusting circuit 542 which provide up-down count signals on lines 544 in order to operate the X coordinate latch for the X multiplier circuit illustrated in FIG. 31. Similarly, up-down count signals are provided on lines 546 to operate the Y coordinate latch of the Y multiplier circuit 380.

The parameter loading circuit 492 further serves to load X and Y position adjusting constants in each of the X and Y multiplier boards in order to properly position the size adjusted character image on the line of type being photocomposed by the CRT display. To understand this function more clearly reference is made to FIG. 30*a* which discloses the image of a letter O in the point size in which the letter was initially scanned by the optical scanner 30. As is apparent from FIG. 30*a*, the lower most boundary of the letter O was drawn to touch the base line 552 and the left most boundary of the letter was initially drawn to touch the left reference line 554. Should the text editing program call for the system to photocompose in a point size and a set size different from that in which the character image was originally encoded, appropriate scaling numbers would be stored in the X and Y multiplier circuits, as discussed above, by means of enable signals produced in the parameter loading circuit 492 and sent to the respective multiplier circuits on lines 500 and 502. As further discussed above, the multiplier circuits are designed to scale each X and Y coordinate by multiplying the stored scaling number times each X and Y coordinate, respectively. If no further adjustment were made, the image of the letter O illustrated in FIG. 30*a* would appear in the form illustrated in FIG. 30*b* wherein the set and point size of the letter image would have been properly adjusted but the letter image would no longer appear in the proper position on the CRT display screen relative to the base line 552 and the reference line 554. Accordingly, it is necessary to add a position adjusting constant to each product of the multiplier circuits in order to reposition the letter image as desired relative to the base line and reference line. For example, by adding the constant b to each of the Y coordinates describing the image illustrated in FIG. 30*b* and similarly adding the constant a to each of the X coordinates describing the image, the letter image would be repositioned as illustrated in FIG. 30*c*, thereby achieving the point and set adjustment desired while maintaining the letter image on the line being photocomposed by the printer system.

Figure 30:
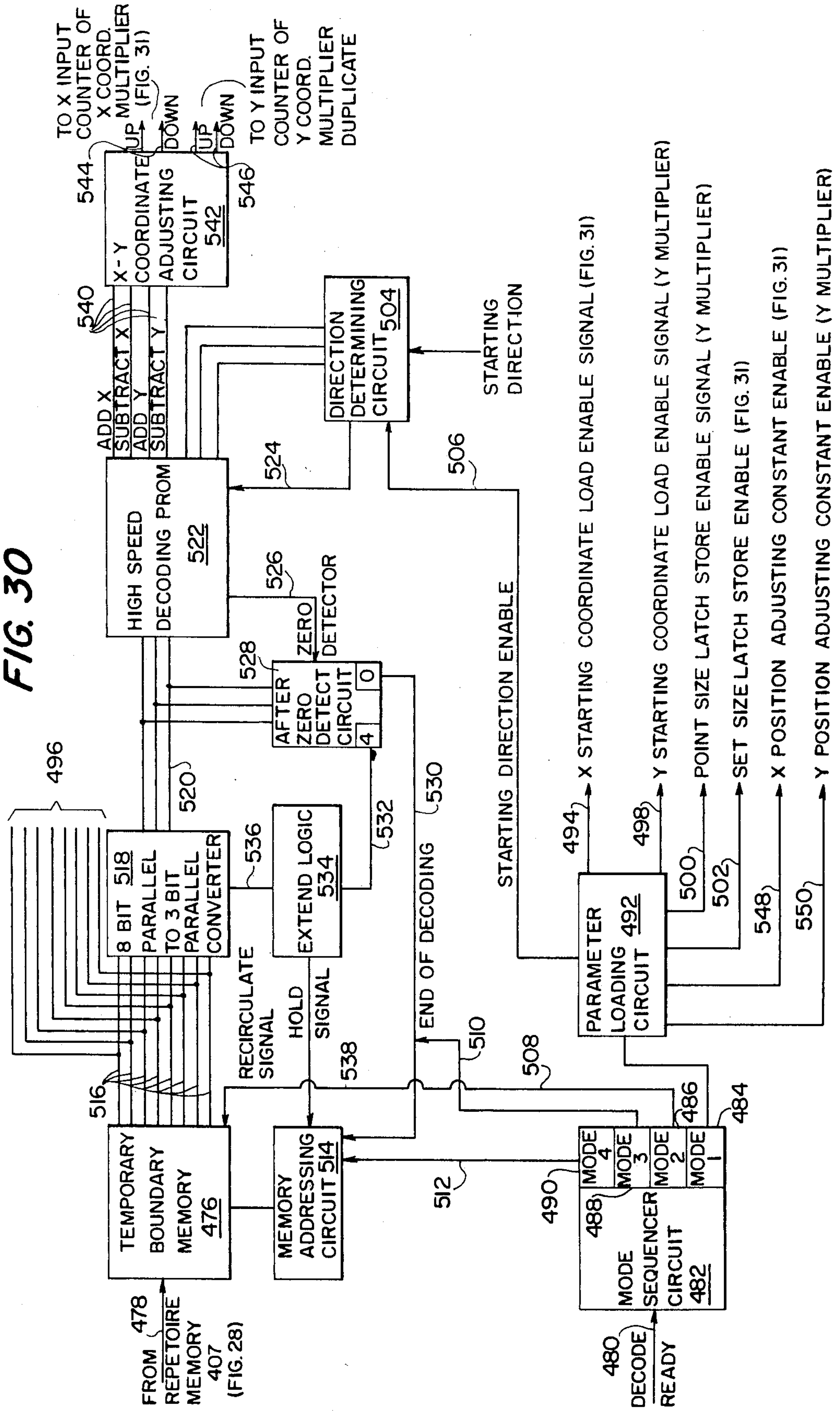
FIG. 30 is a schematic illustration of the character decoder circuit employed in the printer illustrated in FIG. 27, FIG 30A through 30C illustrate schematically the operation of an adder circuit of the multiplier circuit.
Figure 31:
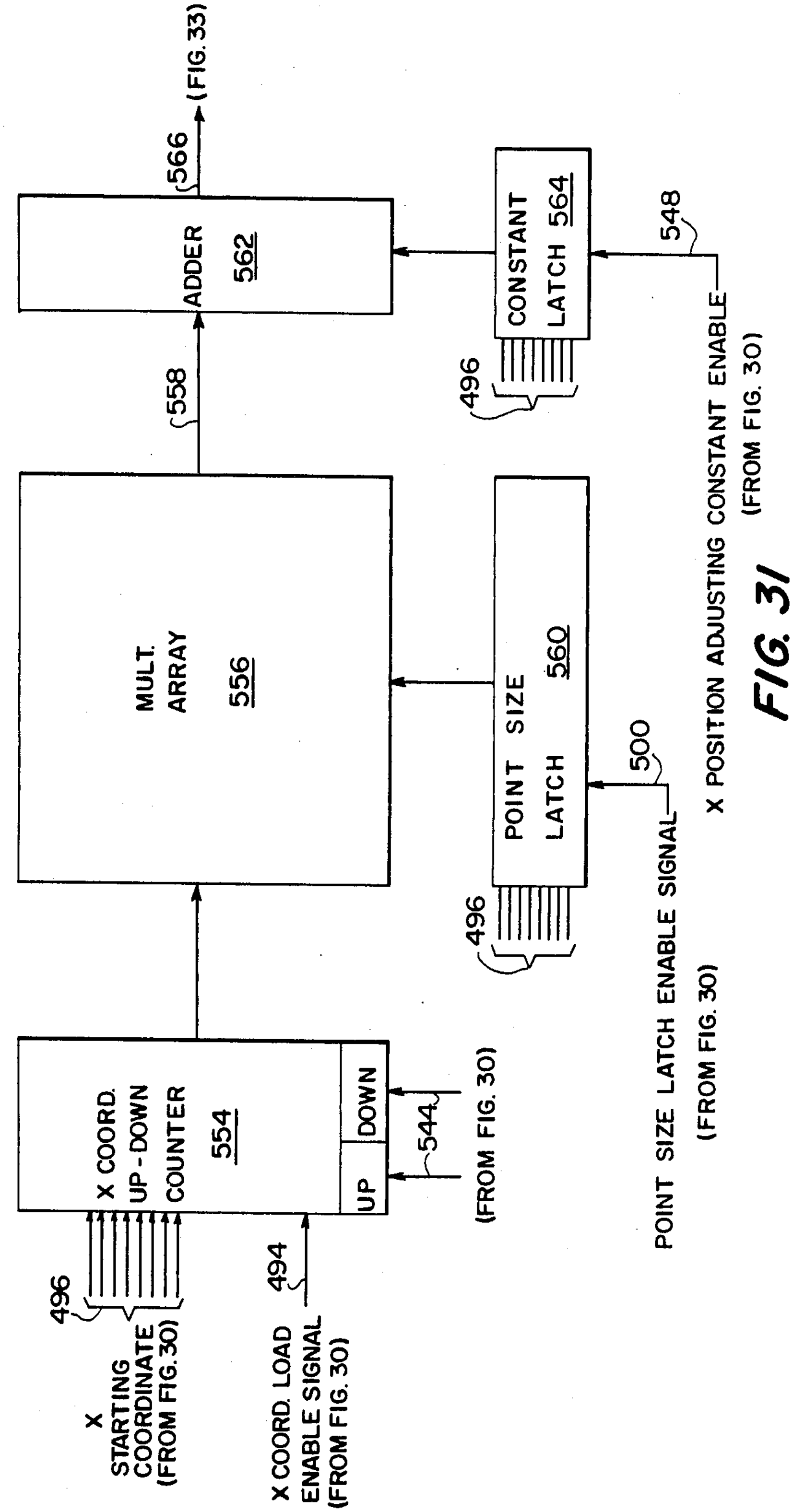
FIG. 31 is a schematic illustration of the multiplier circuit employed in the printer illustrated in FIG. 27.

Referring now in FIG. 31, the organization of the X multiplier circuit 378 is schematically illustrated in greater detail. The Y multiplier circuit 380 is identical to the circuit illustrated in 31 and therefore functions in exactly the same manner. In particular, the X starting coordinate is initially recorded in a X coordinate up-down counter 554 upon receipt of an enable signal on line 494 from FIG. 30. The decoder circuit of FIG. 30 is designed to synchronize the provision of the enable signal on line 494 with the output of the appropriate X starting coordinates on output lines 496 from the temporary boundary memory 476. The X coordinate up-down counter 554 is continually adjusted by the X-Y coordinate adjusting circuit 542 of FIG. 30 as the decoder circuit moves around the boundary of a character image stored in the temporary boundary memory 476 of FIG. 30. More particularly, as the high speed decoding PROM 522 receives a three bit translational code, the X-Y coordinate adjusting circuit 542 is commanded to successively change the X coordinate stored in the X coordinate up-down counter 554 by adding one, subtracting one, or commanding no change in order to define the X coordinate for each of the three dots making up the translational path represented by the three bit translational code then being decoded. A similar function is performed by a Y coordinate up down counter in the Y coordinate multiplier circuit. For example, the high speed decoding PROM 522 may be decoding a three bit binary number 5 while the direction determining circuit 504 indicates that the three bit code 5 identifies a translational path selected from path set $T_5$ see FIG. 11. In this circumstance, the high speed decoding PROM 522 would command the Y coordinate up down counter to add one to the Y coordinate then stored in the counter and would send no signal to the X coordinate up down counter to add one to the Y coordinate then stored in the counter and would send no signal to the X coordinate up down counter thereby indicating that the first dot position in the translational path identified by the three bit binary number 5 being decoded was a dot whose position is spaced 1 dot above the preceding dot on the boundary of the character image being decoded. As is evident from FIG. 11, the decoding PROM 522 would, during its next cycle, command both the X and Y coordinate up down counters to add one to the then existing coordinates to indicate that the second dot in the three dot translational path was positioned at a 45° angle upwardly to the right of the first dot in the three dot translational path. Finally, in decoding the three bit binary 5 number from path set $T_5$, the decoding PROM would command the Y coordinate up down counter of the Y multiplier circuit to add one to the previously recorded Y coordinate while no change would be made in the number stored in the X coordinate up down counter 554 of FIG. 31. This last command would indicate that the third dot in the three dot translational path was spaced immediately above the second dot. It can now be seen that the high speed decoding PROM is arranged to operate the X-Y coordinate up down counters of the multiplier circuits 378 and 380 in a way to cause these counters to store successively the coordinates of the dots making up the translational paths defined by the encoded data originally placed on the master disc. This boundary data has previously been transferred by the system from the master disc, to the working disc, and from the working disc to the repertoire memory of the printer. From the repertoire memory, the boundary data was transferred to the temporary boundary memory 476 along with the boundary data of a second succeeding character from the temporary boundary, each succeeding three bit translational code is read out by converter 518 to allow the high speed decoding PROM to successively define the X-Y coordinates of each of the boundary dots making up the character boundary. It should be noted here that the coordinate numbers stored successively in the X and the Y coordinate counters have now been transformed into 11 bit binary numbers representative of the position of each boundary dot relative to the boundary of the field defined by the original optical scanner 30. For each X coordinate stored in the X coordinate up down counter 554, the multiplier array 556 is caused to cycle one time to produce at output 558 an 11 bit number equivalent to the product of the X coordinate stored in 554 times the point size scaling number stored in point size latch 560. Thus, the multiplier array 556 would be cycled one time during the period that counter 554 is retained at a value representative of the X coordinate of one dot on the boundary of an image character being decoded. Normally the multiplier array would be cycled three times in order to scale the X coordinate of each of the three dots represented by a single three bit translational code supplied to the decoding PROM 522 from the temporary boundary memory 476. However, in those instances where the three bit binary code is a zero code, the high speed decoding PROM 522 would either operate to identify a sharp turn three dot translational movement or a multi-length straight ahead movement involving up to 54 dots arranged in a straight line. The coordinates provided on output line 558 define the X coordinate of all dots on a character boundary adjusted from the encoded set size to the selected set size. Similarly, the output from the multiplier array of the Y multiplier circuit represent the Y coordinates of all dots on the boundary of the image character modified from the encoded point size to the selected point size. Referring again to FIG. 31, the X coordinates successively provided on output line 558 are fed into adder circuit 562 within which the position adjusting constant previously stored in constant latch 564 is added to provide on output line 566 a series of X coordinates to which the constant in latch 564 has been added in order to adjust the position of the image boundary as is necessary to cause the CRT to photocompose the image on the proper print line of the photo sensitive master being used to record the successive characters reproduced on the CRT display screen.

Following each cycle of the multiplier circuits the outputs from the adder circuits of both the X multiplier and the Y multiplier are sent to the collector circuit 382 (FIG. 27). FIG. 32 is a schematic illustration of a simplified version of the collector circuit. Included in the input of the collector circuit are a pair of coordinate transfer registers 580 and 582 for receiving the Y coordinate numbers and the X coordinate numbers, respectively from the output circuits of the Y and X multipliers. The coordinate numbers entering the registers 580 and 582 are in an 11 bit byte format. The seven most significant X coordinate bits from register 582 are sent to an eight bit byte comparator 584 for comparison with a number received from an eight bit character slice identifying counter 586. To understand the purpose of the counter 586, consider the character image illustrated in FIG. 33, in which the letter image has been divided into a plurality of vertical slices $S_1$ through $S_x$. Each slice encompasses, conceptually, an integral number of beam sweeps of the CRT display in a vertical direction. In the preferred embodiment each vertical slice of the character encompasses 16 adjacent vertical beam sweeps of the character image. Accordingly, the output of counter 586 is provided to comparator 584 over line 588 in the form of an eight bit binary number starting with number 1 and advancing one count each time that the CRT beam completes the display of the character image data contained in one slice. Since the CRT in the preferred embodiments actually sweeps each vertical line three times, the CRT beam will scan the screen 48 times for each advance in the count stored in the character slice identifying counter 586. The comparator 584 compares the number stored in the counter 586 with only the seven most significant X coordinate bits stored in register 582 provided to the eight bit comparator over output line 600. Whenever the comparator 584 determines that the number represented by the eight most significant bits in register 582 is equal to the count stored in counter 586, a signal is produced on comparator output line 602 indicative of the fact that the X and Y coordinate then being stored in registers 580 and 582 define a coordinate within the character slice identified by the count stored in counter 568. To understand this function of the collector circuit more clearly, it should be recalled that the three bit translational codes stored in the temporary boundary memory 476 of the decoder illustrated in FIG. 30, are representative of successive translational movements around the boundary of a stored image character. Accordingly, the X and Y coordinate numbers successively stored in registers 580 and 582 will define the coordinate position of each and every dot on the boundary of a character image reproduced in a dot matrix as the high speed decoding PROM 522 proceeds to decode the three bit translational codes in the order in which these codes are stored in the temporary boundary memory 476. As the boundary dots move into the dot matrix slice conceptually identified by the number stored in counter 586, a positive output signal appears on the output of eight bit comparator 602 in order to signal that the numbers stored in registered 580 and 582 are indicative of the X-Y coordinate of a dot actually appearing within the identified slice. A positive signal appearing on output line 602 is sent to one of the output random access memories 384, 386, 388 or 400, FIG. 27, in order to cause an appropriate signal to be stored therein as will be discussed hereinbelow.

Figure 36:
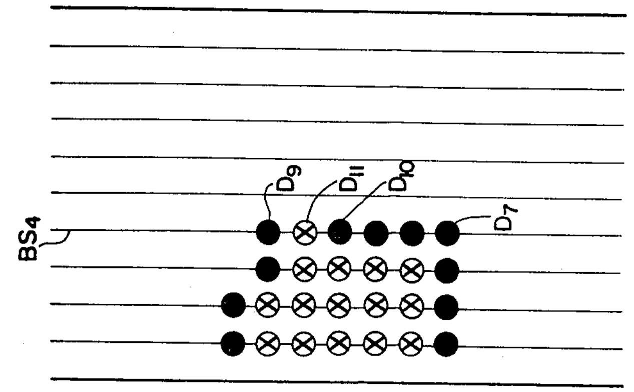
Figure 35:
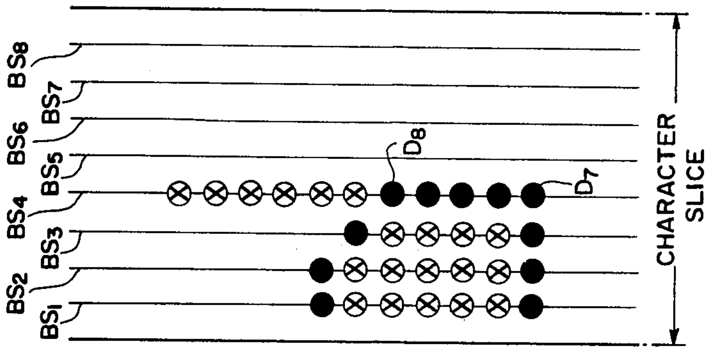
Figure 34:
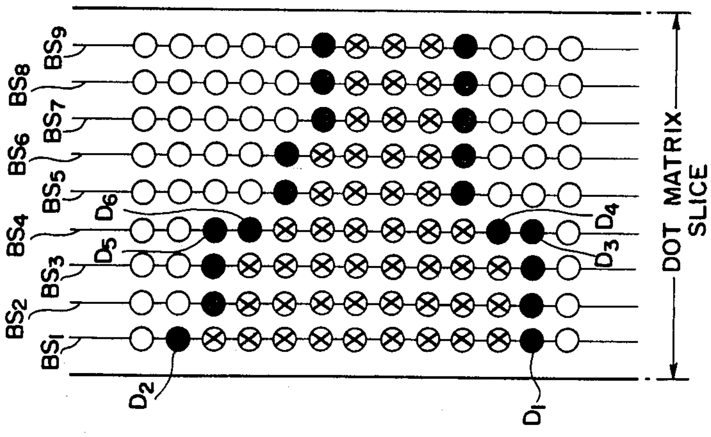

While the basic collector circuit illustrated in FIG. 32 will operate satisfactorily to control the output memories in the manner described above, specialized circuitry is required in order to solve a particular decoding problem which can be better understood by reference to FIGS. 34–36. Referring first to FIG. 34, there is illustrated a graphic representation of the type of information which appears successively in X and Y coordinate registers 580 and 582 as the high speed decoding PROM proceeds to decode successively the X-Y coordinate positions of the boundary dots represented by the boundary data stored in the temporary boundary memory 476. In particular, FIG. 34 represents a slice of a dot matrix corresponding to the elemental areas on the display screen of a CRT. Each vertical column of dots would be touched by a vertical sweep of the CRT beam and thus the storage of coordinate data representative of selected dots in such a dot matrix could be used to turn the CRT beam on and off at selected times in order to recreate a character image on the CRT screen by a process which is basically the reverse of the optical scanning procedure described in detail with reference to FIG. 14 above. In FIG. 34 the solid dots D represent dots whose X-Y coordinates are stored in one of the output memories by the collector circuit of FIG. 32. Thus, as the beam of the CRT moves vertically along the beam sweep paths indicated by letter $BS_1$ through $BS_9$ the output random access memory could be accessed to determine whether coordinates have been stored representative of a boundary dot as each corresponding elemental area of the display screen is swept by the beam. Normally, the CRT conceptually should encounter only two boundary dots as it crosses into and out of the character image being recreated such as would occur in an upward sweep along the path identified by $BS_1$. As the CRT beam encounters dot $D_1$, the beam would be turned on and would remain on until dot $D_2$ is encountered at which point the beam would be turned off. By this technique, all of the intervening dots would be illuminated on the display screen of the CRT as indicated by the circular dots containing an X. In some instances, however, successive boundary dots will be recorded in memory identifying successive boundary dots identifying successive vertical locations along a particular vertical sweep pattern such as indicated by the sweep path identified as $BS_4$ in FIG. 34. Here dots $D_3$ and $D_4$ having the same X coordinate are located on the lower boundary while dots $D_5$ and $D_6$ located on the upper boundary line also have the same X coordinate. The image recreating circuitry can easily take care of this situation by turning the CRT beam on upon the detection during its sweep of a boundary dot after which the beam is left on until the beam has swept through at least one dot position at which no boundary dot has been recorded followed by one or more successive boundary dots at the termination of which the CRT beam is turned off. Thus, if CRT beam is swept upwardly along path $BS_4$, the beam would be turned on upon detection of a boundary dot at $D_3$ and would remain on until the circuitry determines that no boundary dot is recorded at the position above boundary dot $D_5$ at which point the CRT beam would be turned off.

Circuitry of this type would take care of all circumstances except for that illustrated in FIG. 35 wherein the boundary of the image stored in memory follows a turn-around path within the character slice being displayed by the CRT. Without specialized circuit controls, the movement of a CRT beam upwardly along the conceptual beam sweep path $BS_4$ would result in the beam being turned on at dot $D_7$ and left on continuously for the remainder of the beam sweep. Thus, those elemental areas of the CRT screen display represented by the dots above $D_8$ would be improperly illuminated. The problem created by a situation such as illustrated in FIG. 35 where the boundary dots sweep out a turn-around path within a particular character slice can be corrected as illustrated in FIG. 36. In particular, the boundary dot stored at the position identified by dot $D_8$ in FIG. 35 has been moved up by one vertical position to the position identified by $D_9$. Thus, operation of the beam control circuitry described with reference to FIG. 34 would cause the CRT beam to properly turn on while sweeping between dots $D_7$ and $D_9$ as the beam sweeps along path $BS_4$ regardless of whether the beam is sweeping upwardly or downwardly. When the data is initially encoded, as noted above with regard to FIG. 21, boundary dots are normally stored as indicated in FIG. 36 since the microprocessor 146 has been programmed to automatically modify data appearing in the format of FIG. 35 to be transformed to the format illustrated in FIG. 36. Nevertheless, during the process of modifying the size of character boundary data by operation of the multiplier array 556 and adder 562 of FIG. 31, a boundary dot such as boundary dot $D_9$ of FIG. 36 might be moved in juxtaposition to the boundary dot indicated by $D_{10}$. Thus, improper control of the CRT beam could result such as illustrated in FIG. 35.

Figure 37:
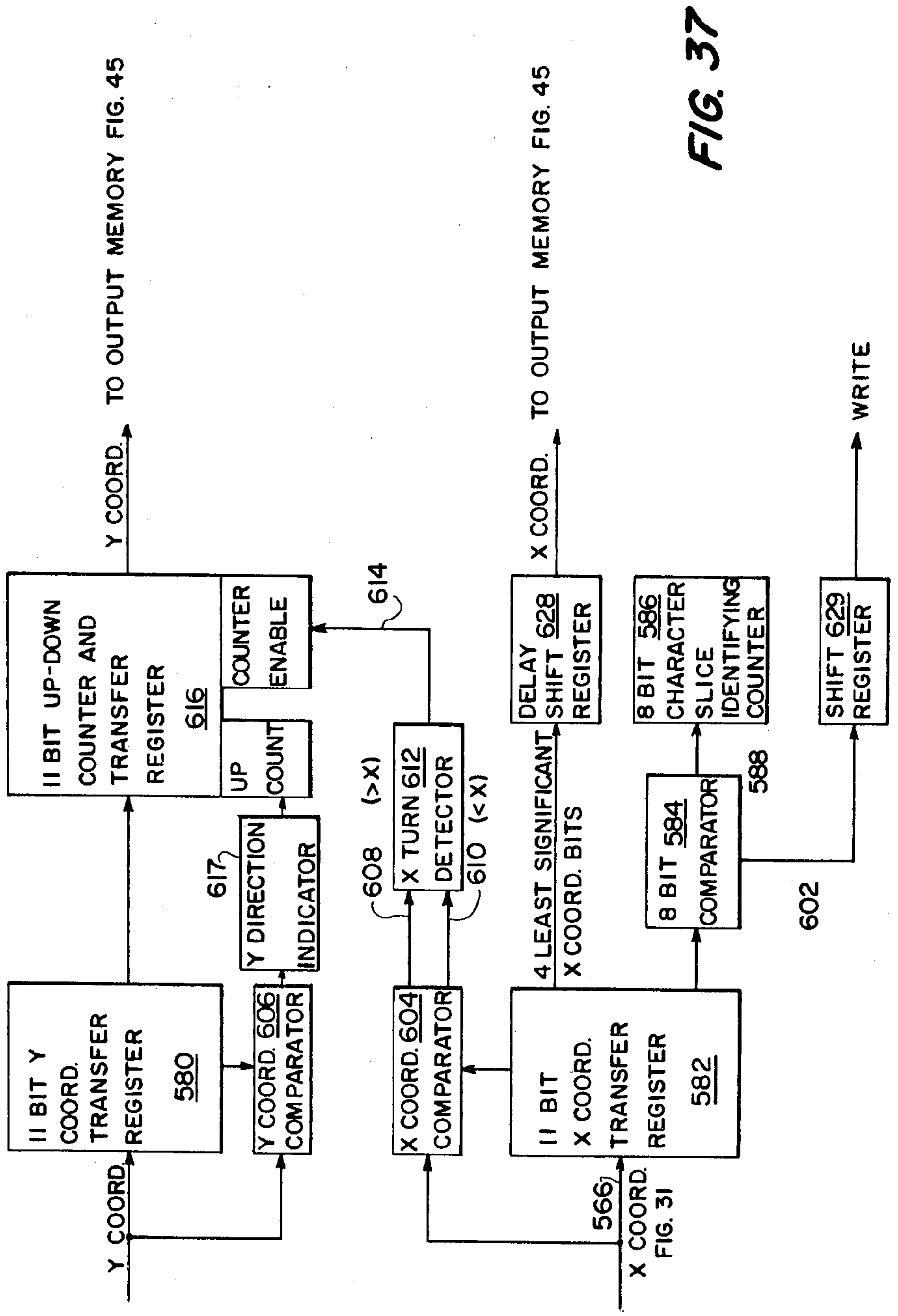
FIG. 37 is a more detailed schematic illustration of the collector circuit employed in the printer illustrated in FIG. 27.

To correct this problem, the circuit of FIG. 32 can be modified as indicated in FIG. 37. In particular, X coordinate comparator 604 is designed to compare the X coordinate stored in X coordinate register 582 with the next X coordinate supplied on line 566 to determine whether the X coordinate is changing positively or negatively. If the X coordinate is increasing, a signal is provided at output 608. If the X coordinate is changing negatively, an output is sent on line 610. A turn detector circuit 612 compares the output supplied by 608 or 610 with the output of the X coordinate comparator which was previously sent to turn detector 612. If a positive change is followed by a negative change or a negative change is followed by a positive change, the X turn detector 612 produces an output signal on line 614 which is designed to enable up/down counter 616 to add or subtract one from the number stored in the Y coordinate register 580. In order to decide whether to add or subtract one from the Y coordinate, a Y direction indicator 617 is connected with the Y coordinate comparator 606 arranged to provide an output if the previous Y coordinates indicate movement upwardly along the vertical sweep of the boundary in which case the Y coordinate stored in the Y coordinate register 580 should be increased by one to move the stored dot one position above the position in which it would have otherwise been stored. On the other hand, if the Y coordinate comparator 606 indicates that the movement in the Y direction is generally downward by comparing previous succeeding Y coordinates, no output signal is provided by comparator 606 thus causing the up/down counter 616 to subtract one from the Y coordinate upon an enable signal provided from the X turn detector 612. If no output is received from the X turn detector 612, the up/down counter operates merely as a transfer register and causes transfer of the number stored in the Y register 580 to the memory board as will be discussed hereinbelow. Since the Y coordinates are delayed by one clock cycle, shift register 628 is required to delay similarly the X coordinate data provided to the output memory. The write command from comparator 584 is also passed through a one cycle delay in shift register 629.

Figure 38:
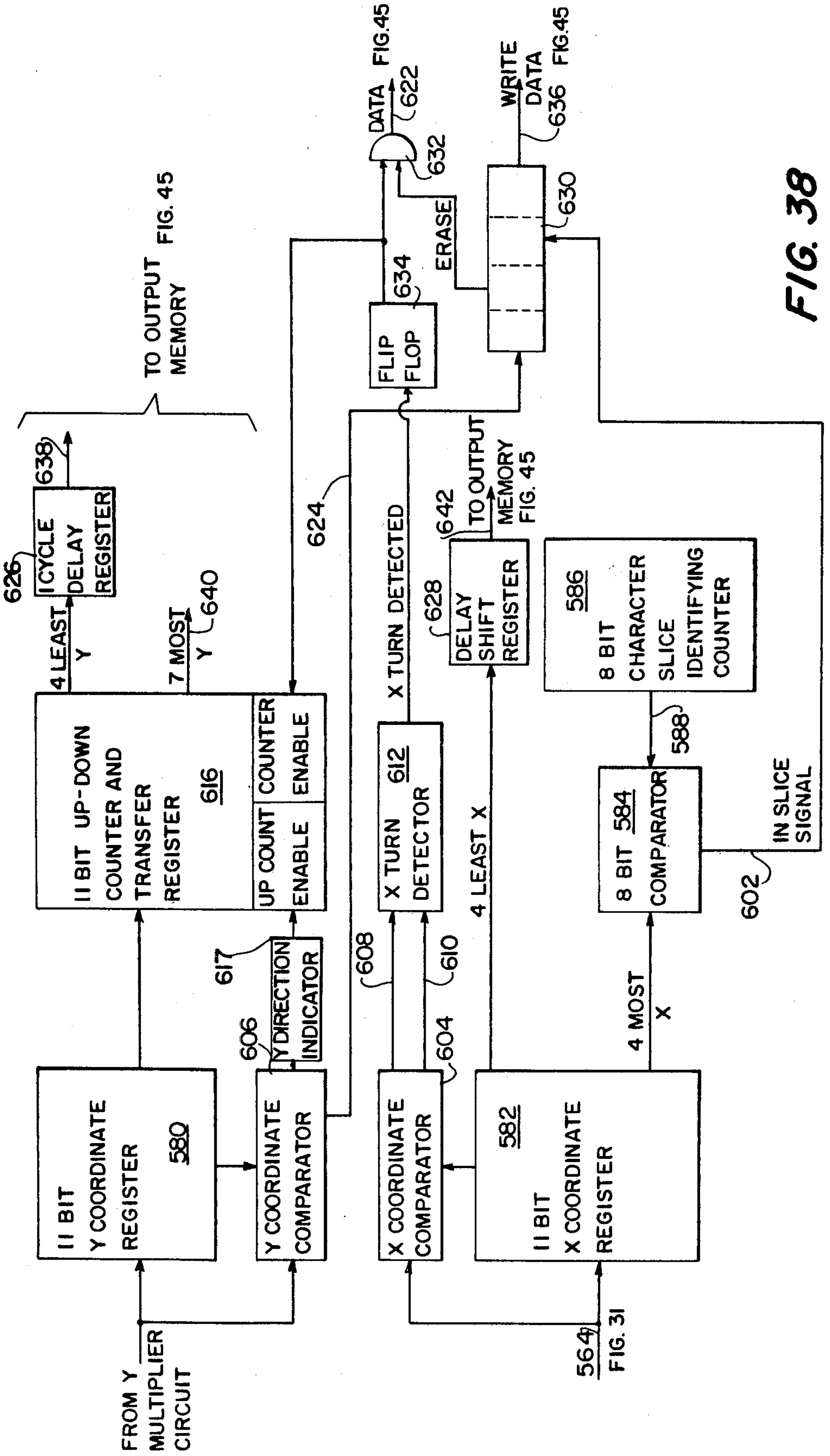
FIG. 38 is a more detailed schematic illustration of the collector circuit employed in the printer illustrated in FIG. 27, FIGS. 39 through 43 are illustrations of the operation of the collector circuit of FIG. 38.

The collector circuit design of FIG. 37 is adequate for handling stored character data indicative of a turn around boundary configuration, such as illustrated in FIGS. 35 and 36 above, except when two successive X-Y coordinates identify the same end position on an X turn around line such as dot $D_8$ on beam sweep line $BS_4$ FIG. 35. In such circumstances, the addition of 1 to the Y coordinate of one of the two identical X-Y coordinates, would not have the effect of creating a dot storage void such as indicated at position $D_{11}$ in FIG. 36 since the remaining X-Y coordinate will identify this position and cause a record of it in the output memory. The problem of succeeding identical coordinates results, as explained above, from the operation of the multiplier circuit of FIG. 31 wherein the X-Y coordinate data may be scaled down by a factor of ½ or more. To overcome this problem, a circuitry of FIG. 37 can be modified as illustrated in FIG. 38 to provide a data output AND gate 632 which normally operates to provide a series of binary 0 signals in synchronization with the clock rate of the circuit with the zeroes being inverted and presented to the random access output memory for storage therein at the locations accessed by the successive coordinate data. The output memory can be visualized as a matrix of storage cells corresponding to the dot matrix on which the character boundary is described by the X-Y coordinates successively provided by the collector circuit. Since the inverted data generator output of 632 normally provides one as input to the memory, and the X-Y coordinates supplied from the collector circuit causes ones to be stored within the output memory at bit storage cell locations corresponding to the boundary dots on a dot matrix describing the character outline which it is desired to reproduce on the CRT display. It should now be apparent that the problem posed by successive X-Y coordinates describing the terminal position on an X turn around line can be solved by simply causing the AND gate data generator 632 to produce an output one instead of a zero which when inverted will cause a zero to be stored in the output memory at the terminal dot location. This function is accomplished by supplying, as input to the AND gate 632, a binary one signal indicative of the existence of a turn around line simultaneously with a binary one signal indicating that two successive X-Y dots are both located at the terminal point on the X turn around line. Of course the necessary timing and sequencing of such signals with regard to the sequence in which the X-Y coordinates are presented to the output memory is somewhat difficult to achieve. The circuitry of FIG. 38 accomplishes this result by modifying the Y coordinate comparator 606 to produce a Y coordinate equal signal on line 624 whenever the Y coordinate stored in register 580 is equal to the succeeding Y coordinate being supplied as input to such register. This Y coordinate equal signal is provided to a shift register 630 which is designed to delay the application of the Y coordinate equal signal to the AND gate data generator 632 for two clock cycles in order for the appropriate terminal point describing coordinate to be shifted to the output memory at which it is held in a register so that on the third cycle following detection of the Y coordinate equality, a binary zero will be stored in the indicated memory storage cell rather than a binary one as would have otherwise been stored. In order to properly synchronize the appearance of an X turn indicating signal at the second input to AND gate data generator 632, the output from X turn detector 612 is pased through a one clock cycle delay to flip flop 634. Because an additional clock cycle delay is required in the write command the output from comparator 584 is passed through a two clock cycle delay register which may be additional stages in shift register 630.

As already mentioned, the output from delay shift register 628 is subjected to an additional one clock cycle delay by means of a register in the output memory which will be described with reference to FIG. 45. The seven most significant Y coordinate bits are similarly delayed by a register in the output memory. However, the least significant bits in each Y coordinate are delayed for one clock cycle by register 626 after which the coordinate bits stored therein are used to immediately access the output memory.

Figure 39:
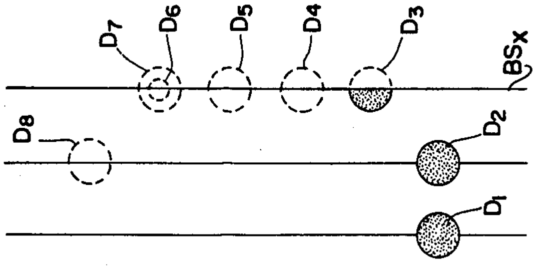
Figure 40:
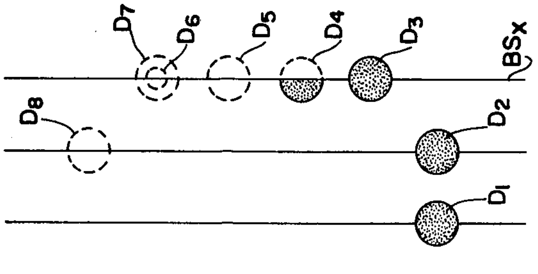
Figure 41:
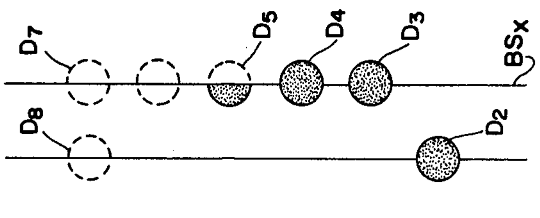
Figure 42:
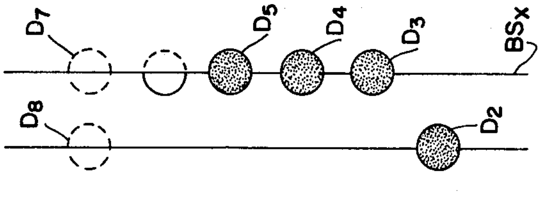
Figure 43:
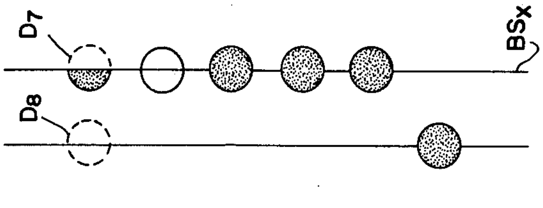

To understand more clearly the operation of the circuit in FIG. 38, note FIGS. 39–43 wherein an X turn around boundary line is indicated by a plurality of dots $D_1$ through $D_8$ making up a portion of a dot matrix. These successive FIGS. show the manner by which the X-Y coordinates corresponding to the successive dots are processed during each of a plurality successive clock cycles of the system. In particular, the solid dots represent corresponding output memory storage cells in which a binary one has been stored using the coordinate data supplied by the collector of FIG. 38 while the dashed circles represent dots whose X-Y coordinates are still being processed by the system circuitry. A dot which is only half filled in is indicative that the X-Y coordinates are then being used to access the output memory to cause a binary 1 to be stored therein. With particular reference to FIG. 39, it can be seen that the dots $D_6$ and $D_7$ have identical X-Y coordinates and are positioned at the terminal-point on an X turn around line corresponding to a CRT beam sweep $BS_x$. If the coordinates of dot $D_3$ are being used to access the output memory, the coordinates of dot $D_4$ would be stored in the input stage of the registers of the output memory with the exception that the four least significant Y coordinate bits would be stored in register 626 of FIG. 38. The Y coordinates of dot $D_5$ would be located in up-down counter and transfer register 616 while the X coordinate of dot $D_5$ would be held in register 628. The coordinates of dot $D_6$ would be located in transfer registers 580 and 582 with the coordinates of dot $D_7$ being presented to the input of registers 580 and 582. This condition would result in an output on lines 624 of the Y coordinate comparator 606 to store a one in the first stage of shift register 630 indicating that the Y coordinates of dots $D_6$ and $D_7$ are equal. During the next clock cycle, FIG. 40, the coordinates of dot $D_4$ would be used to access the output memory while the coordinates of dot $D_6$ would be moved to up-down counter and transfer register 616 and delay register 628. During this clock cycle, the coordinates of dot $D_7$ would reside within registers 580 and 582 with the coordinates of dot $D_8$ being presented to these registers as input. Accordingly, the X turn detector circuit 612 will produce an output indicating that an X turn around is about to occur thus storing a binary one in effect in the flip flop delay 634. During the next clock cycle, as represented in FIG. 41, the Y coordinates of dot $D_7$ will have been transferred to up-down counter and transfer register 616 and the binary one will have been shifted out of flip flop 634 so as to cause the up-down counter 616 to be enabled. A previous indication from the Y direction indicator circuit 617 that the Y coordinates were moving in an upward direction would result in the up-down counter 616 adding one to the Y coordinate of dot $D_7$ thereby moving the position indicated for this dot to that illustrated in FIG. 41. During the clock cycle of FIG. 41, the "Y coordinate equals" signal will have been transferred from the register 630 as a binary one to the input of AND gate data generator 632 simultaneously with the binary one "X turn indication" from flip flop 634 so as to produce a binary one on the output 622 of AND gate data generator 632. Thus, during the clock cycle represented by FIG. 42, the coordinates of dot D6 will be used to access the output memory and will cause a binary zero (resulting from the inversion of the binary one produced by a gate 632) to be stored in the memory location identified by the coordinates of dot $D_6$. During the final clock cycle represented in FIG. 42, a binary one will be stored at the location in the output memory represented by the coordinates of dot $D_7$, the Y coordinate of which has been increased by one during the clock cycle illustrated in FIG. 41.

The circuit of FIG. 38 is particularly advantageous because it insures that one dot position between the terminal points of an X turn around line will always be left open regardless of the number of dots in the line and regardless of the number of identical successive coordinates which identify the terminal dot on an X turn around line.

Figure 44:
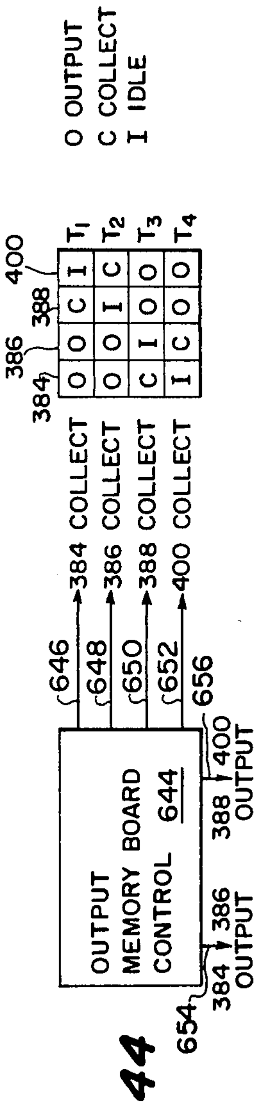
FIG. 44 is an illustration of the output memory board control circuit used to control the operation of the output memory circuits of the printer of FIG. 27.

FIG. 44 discloses an output memory board control 644 synchronized with the operation of the collector circuit in such a way as to cause the data generated by the collector circuit to be sent to one of the four high speed random access output memories 384, 386, 388, and 400 as illustrated in FIG. 27. In particular, only one of the four output memory circuits is designed to collect data from the collector circuit of FIG. 38 at any one time. Each output 646, 648, 650 and 652 connected, respectively, to output memories 384, 386, 388 and 400 are successively energized to direct the data generated in the collector circuit to the appropriate output memory while the output on lines 654 and 656 is designed to permit the data stored in the high speed random access memories 384 through 400 to be read out and used to control the operation of the CRT display. For reasons which will be discussed in more detail hereinbelow, memory 384 is used to collect data for controlling the CRT in order to create a first character image while memory 386 is used to collect data on a succeeding character image intended for photocomposition adjacent to the image stored in memory A. Similarly, the image data collected in memories 388 and 400 is also descriptive of characters which are to be photocomposed in succeeding positions in the textual material being photo composed. Thus the outputs from 654 and 656 are designed to cause memory boards 384 and 386 to read out character data simultaneously while output 652 is designed to cause memories 388 and 400 to output data simultaneously. The chart in FIG. 44 shows the condition of memories 384, 386, 388 and 400 in succeeding time intervals represented by rows $T_1$, $T_2$, $T_3$ and $T_4$.

Figure 45:
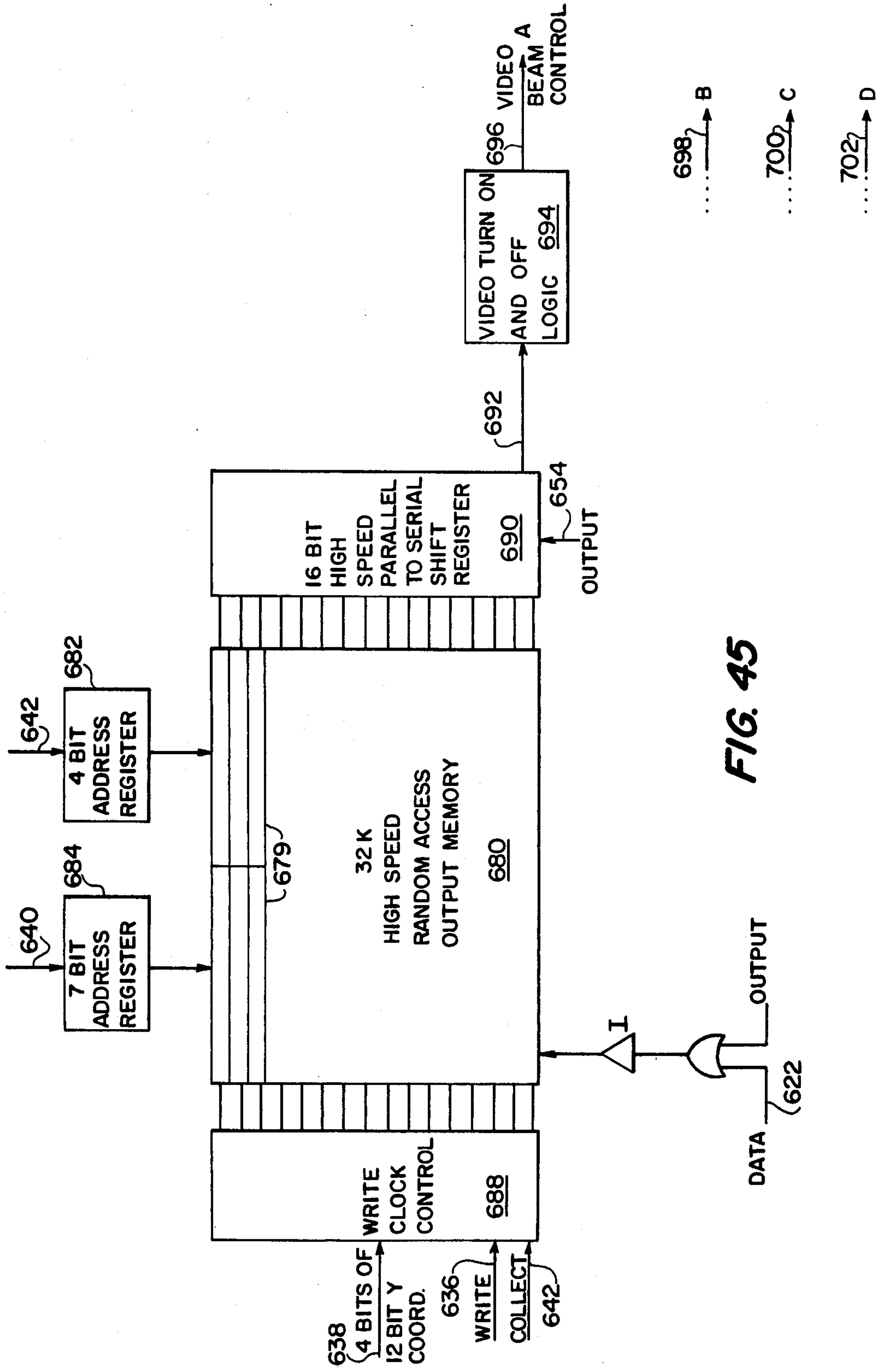
FIG. 45 is a schematic illustration of one of the high speed output memory circuits employed in the printer of FIG. 27.

Turning now to FIG. 45 one of the four high speed random access output memory circuits is disclosed which, for purposes of discussion, could be output memory 384 of FIG. 27. The remaining output memories 386, 388 and 400 are identical in construction and in operation. The random access memory is made up of two columns of sixteen one K by one bit random access memory circuits 679 such as an Intel 8102A random access memory. This composite random access memory is illustrated generally at 680 of FIG. 45. The random access memory 680 can be imagined as a matrix of storage cells having sixteen rows with each row having 2048 storage cells. Thus, the four least significant digits of the X coordinate number stored in register 642 may be combined with the seven most significant bits stored in the up-down counter and register 616 of FIG. 38 in order to define the appropriate column out of the 2048 columns defined by the random access memory 680. The four bit X coordinate number provided on output line 642 becomes the most significant bits in the 11 bit number while the seven bits of Y coordinate data supplied on line 640 become the least significant bits in the eleven bits in the eleven bit column identifying number. The four least significant bits stored in the Y register 626 are used to identify the appropriate row out of the 16 possible rows in the random access memory 680. Referring more particularly to FIG. 45, the four least significant X coordinate bits are stored in an address register 682 while the seven most significant bits of the Y coordinate are stored in address register 684. Finally, the four least significant bits of the eleven bit Y coordinate number are provided to the write clock control 688. If, as noted above, the random access memory 680 is visualized as a matrix of storage cells having 2048 columns and 16 rows, the numbers stored in register 682, being the most significant, will identify 16 groups of columns with each group including 128 columns of 16 storage cells each. The number stored in register 684 will define which of the 128 columns in each group is to be accessed while the number supplied to the write clock control circuit 688 on line 638 will define the actual storage cell in the identified column which is to be accessed. If each vertical sweep of the CRT screen is assigned 2048 elemental areas, then each group of 128 columns in the random access memory would correspond to one of sixteen succeeding vertical sweeps of the CRT display screen. Ientification of one of the columns within one of these groups of columns could then be visualized as an identification of one of 128 sections positioned vertically along a particular vertical sweep while the number stored in register 688 identifies a particular position within one of these sections of a vertical sweep. Under control of the write signal supplied on line 636 by the collector circuit of FIG. 38 the data signal supplied to the random access memory from the data generator 632 over output line 622 has the effect of placing a binary 1 in a storage cell of the random access memory at a position which corresponds to a boundary point along the vertical sweep line of each of the sixten sweep paths making up a character slice being displayed conceptually on the CRT of the printer. During the read out phase of operation of the random access memory 680 initiated by a control signal supplied on line 654 a 16 bit high speed parallel to serial shift register 690 is employed to successively read out the data stored in each of the 2000 columns of storage cells. Since 128 such columns are equivalent to a single vertical sweep of the CRT screen, the CRT driver circuit, to be described in greater detail hereinbelow, is arranged to synchronize the CRT beam sweep so that one sweep is completed for each 128 cycles of the 16 bit high speed parallel to serial shift register 690. During each cycle, the data recorded in each of the 16 storage cells contained in a column of such cells is read into the shift register in parallel fashion and is provided to the output 692 in serial fashion. A video turn on and off logic circuit 694 receives the output on line 692 to provide a video enable signal at output 696 in accordance with the logic function discussed with relation to the necessary control signals for properly illuminating the dots in beam sweep $BS_4$ of FIG. 34. In other words, the output on line 696 should go high upon detection of the first stored binary 1 supplied on output 692 and should remain high until a stored zero is detected followed by another zero separated by one or more ones.

Figure 46:
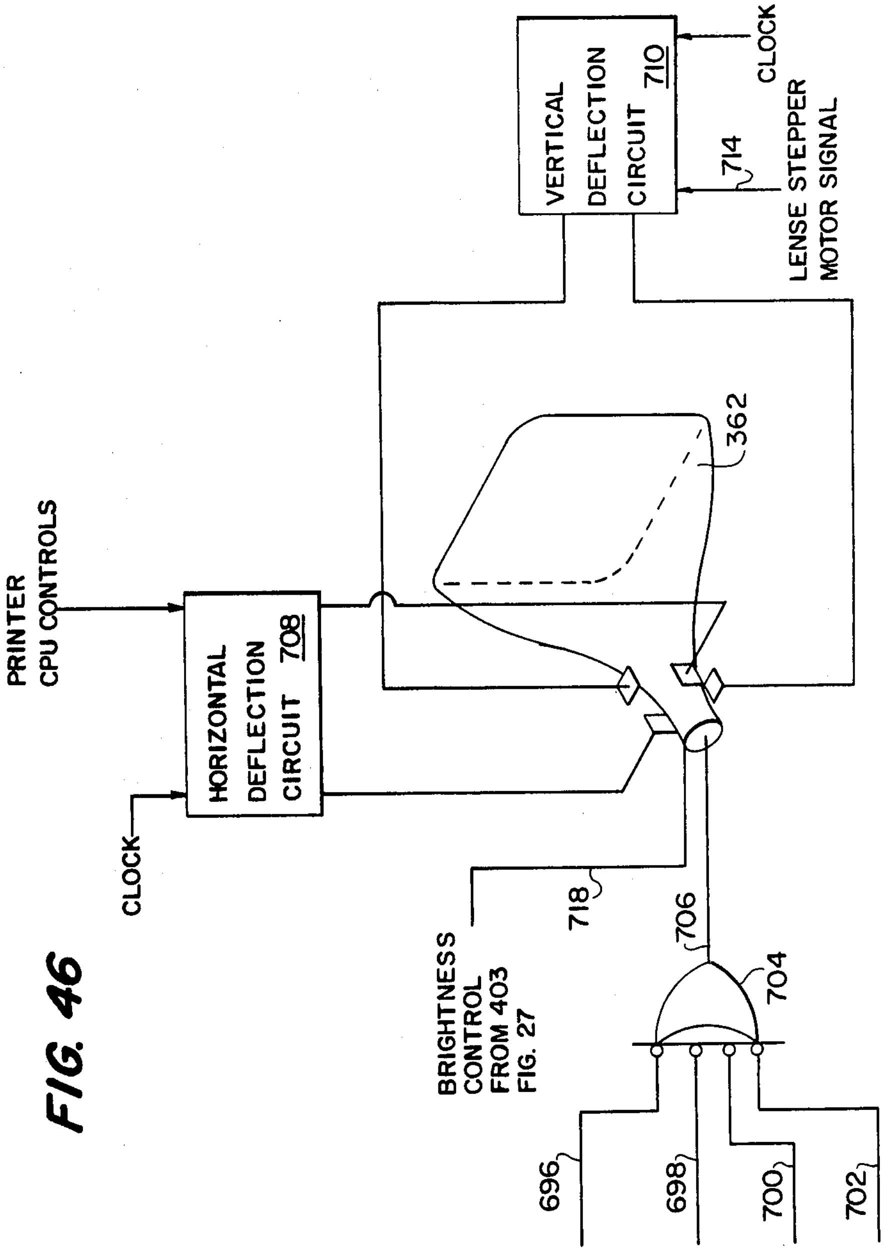
FIG. 46 is a schematic illustration of the scan control circuitry for the CRT display of the printer illustrated in FIG. 27.

Referring now to FIG. 46, the CRT driver circuit 402 is illustrated wherein video signals are provided simultaneously either on 696 and 698 or on 700 and 702. An OR gate 704 operates to provide the final video "on" signal on line 706 whenever any one of the output lines 696, 698, 700 and/or 702 provides a video enable signal. As noted above, the boundary data for two succeeding characters on a line of print actually being photocomposed are transmitted to the temporary boundary memory 476 of decoder circuit 376 (FIG. 27). The decoded signals representing the image of one character can thus be stored in one output memory (such as memory 384) and the decoded signals representing the image of the second character can be subsequently stored in another output memory (such as memory 386). Operation of OR gate 704 thus will cause the CRT beam to be turned on and off by the output of either of the two output memories from which data is being read out, whereby the CRT beam is appropriately controlled even if the character images are to be composed in an overlapped arrangement. This capability gives the subject system maximum flexibility and allows the photocomposer to adjust the spacing between letters in order to obtain the best possible fit or to achieve a special effect such as by running two letter designs in an overlapped condition.

As referred to in reference to FIG. 1, the lense 14, which projects the image from CRT 12 onto the photosensitive master 16, is displaced in steps along a horizontal track by means of a stepper motor (not illustrated). The amount and timing of lens 14 displacement defines the lines of print being photocomposed on master 16 and further defines the spacing between letters and between word forming groups of letters. The photocomposition instructions from circuit 8 concerning the margin spacing indentation and special letter spacing (curning) are combined by the printer control 374 (FIG. 27) with the spacing information received from the working disc including encoded alphabet set size and selected set size and character width information to provide the control signals for the lens stepper motor.

Deflection of the CRT beam is, of course, synchronized with the receipt of character information on the CRT 362 and with the movement of the lense 14 by horizontal deflection circuit 708 and vertical deflection circuit 710. The horizontal deflection circuit is advanced to cause the vertical scan line being illuminated on the CRT display to be moved horizontally in sequence with the movement of the lens as each vertical of a character is exposed on the CRT display. In this way, the same display area of the CRT is not continually exposed during the photocomposition process. Control information from the printer control is provided to the horizontal deflection circuit 708 on line 712 while the lens stepper motor control signal is supplied to the vertical deflection circuit on line 714. The brightness of the CRT is adjusted by a signal from circuit 403, FIG. 27, supplied to CRT 362 on line 718.

It is now apparent that a revolutionary system of photocomposition has been disclosed capable of achieving extremely high resolution in the images of type characters formed on an electronic display by signals generated from a practical storage system. Numerous additional benefits and advantages can now be appreciated from the above detailed description of the preferred embodiments.

The following appendices include the various computer programs referred to above:

```
0400 C3 8D 59 00 71 23 70 2E C3 CA 21 46 2E E0 71 23
0410 CD 8A 26 71 23 70 24 2E C3 03 24 03 D6 01 9F 4F
0420 7C 92 C2 27 00 7D 93 C9 21 C8 00 22 32 38 22 3A
0430 38 CD F9 5A 22 32 38 CD FE 00 CD 94 24 11 F4 01
0440 CD 20 00 D2 37 00 2A 3A 38 22 52 38 CD FE 00 2A
0450 32 38 CD 94 24 11 F4 01 EB CD 20 00 D2 4C 00 2A
0460 3A 38 22 54 38 2A 52 38 EB 2A 54 38 CD F3 26 E5
0470 11 01 00 CD 20 00 DC 8A 26 EB 21 14 00 CD 20 00
0480 DC 8A 26 E1 7D 1F 4F 2A 52 38 06 00 09 22 56 38
0490 C9 56 2B 5E 2B 22 32 38 21 00 00 CD 20 00 CC 8A
04A0 26 CD E8 26 21 00 00 CD 20 00 CC 8A 26 EB 22 50
04B0 38 CD E8 26 21 00 00 CD 20 00 CC 8A 26 EB 22 4E
04C0 38 CD E8 26 21 00 00 CD 20 00 CC 8A 26 CD E8 26
04D0 21 00 00 CD 20 00 C4 8A 26 2A 4E 38 EB 2A 50 38
04E0 CD 20 00 D4 8A 26 EB CD F3 26 11 01 00 CD 20 00
04F0 DC 8A 26 11 14 00 EB CD 20 00 DC 8A 26 C9 CD E8
0500 26 21 00 00 CD 20 00 C2 FE 00 2A 3A 38 23 22 3A
0510 38 2A 32 38 11 00 80 CD 20 00 DC 8A 26 C9 21 C8
0520 00 22 32 38 CD F9 5A CD 91 00 2A 4E 38 22 3E 38
0530 11 64 00 CD 20 00 DC 8A 26 EB 21 F4 01 CD 20 00
0540 DC 8A 26 21 E8 03 22 32 38 CD F9 5A CD 91 00 2A
0550 3E 38 EB 2A 4E 38 CD 20 00 D2 5D 01 EB CD F3 26
0560 11 04 00 EB CD 20 00 DC 8A 26 2A 3E 38 22 4E 38
0570 CD 28 00 21 CF 00 EB 2A 56 38 CD 20 00 DC 8A 26
0580 EB 21 00 03 CD 20 00 DC 8A 26 2A 56 38 11 70 01
0590 C3 C9 02 EB 2A 17 38 CD F3 26 22 17 38 2A 4E 38
05A0 11 A9 00 CD F3 26 22 58 38 2A 4E 38 11 71 01 CD
05B0 F3 26 22 5A 38 CD 5E 26 CD FE 58 3A 6D 38 1F D2
05C0 BB 01 AF 32 6D 38 3A 5E 38 FE 4D C2 BB 01 3A 5D
05D0 38 FE 24 CA DE 01 FE 32 CA EC 01 C3 BB 01 3E FF
05E0 32 22 38 CD 5E 26 CD 2B 59 C3 F6 01 AF 32 22 38
05F0 CD 5E 26 CD 2B 59 3A 6D 38 1F D2 F6 01 AF 32 6D
0600 38 3A 5E 38 FE 4D C2 F6 01 3A 5D 38 FE 2D C2 F6
0610 01 21 08 00 22 24 38 22 26 38 CD 0D 21 CD 7F 02
0620 CD 27 27 21 00 00 22 11 38 C3 2C 02 CD 5E 26 CD
0630 59 59 CD 5C 23 CD 6E 59 3A 6D 38 1F D2 38 02 AF
0640 32 6D 38 3A 5E 38 FE 4D C2 2C 02 3A 5D 38 FE 25
0650 CA 76 02 FE 48 CA 5B 02 C3 2C 02 CD 0D 21 CD 6A
0660 27 D2 70 02 CD FA 26 CD 27 27 21 00 00 22 11 38
0670 CD 00 20 C3 2C 02 CD FA 26 CD 27 27 C3 2C 02 21
0680 07 00 22 32 38 CD F9 5A 22 32 38 21 00 00 22 3A
0690 38 21 7F BF 22 32 38 CD FE 00 CD 94 24 11 64 00
06A0 CD 20 00 DA 97 02 2A 3A 38 22 24 38 CD FE 00 CD
06B0 94 24 11 64 00 CD 20 00 D2 AC 02 2A 3A 38 EB 21
06C0 FF 07 CD F3 26 22 26 38 C9 CD F3 26 29 C3 93 01
06D0 B0 E6 23 D3 F1 79 D3 F2 DB F0 4F DB F1 E6 02 CA
06E0 B6 01 C3 0D 03 CD C4 01 CD A5 01 79 FE 58 C2 F7
06F0 02 3E 00 32 8D 03 C9 FE 59 C2 02 03 3E 20 32 8D
0700 03 C9 FE 5A C2 B6 01 3E 20 32 8D 03 C9 37 C9 09
0710 7D AB C2 C1 01 7C AA CA 0D 03 C3 C1 01 CD C4 01
0720 CD A5 01 79 0E 00 FE 54 C8 FE 46 C2 B6 01 0E FF
0730 C9 DB F1 A7 CA B6 01 C9 21 FF 03 CD 0F 03 DA 4D
0740 03 21 FF 01 CD 0F 03 D0 3E FE C3 0D 03 3E FC C3
0750 0D 03 79 FE 30 FA C1 01 FE 39 FA 0D 03 CA 0D 03
0760 FE 41 FA C1 01 FE 47 F2 C1 01 C3 0D 03 79 FE 2C
0770 CA 0D 03 FE 0D CA 0D 03 FE 20 CA 0D 03 C3 C1 01
0780 78 E6 FC CA 0D 03 C3 C1 01 FF FF FF FF FF 00 00
0790 E9 00 72 00 65 00 4D 00 43 45 50 54 30 31 32 33
07A0 34 35 36 37 38 39 41 42 43 44 45 46 00 D6 01 9F
07B0 4F 3E 01 21 BF 1E 96 9F A1 0F D2 D0 13 0E 02 CD
07C0 79 0B D6 20 CA D0 13 0E 00 CD 79 0B 21 1C 20 77
07D0 21 1C 20 4E 25 2E 34 71 79 D6 1F DA E3 13 24 2E
07E0 1C 36 02 3E 0A 21 1C 20 96 DC DD 0A 3E 04 21 34
07F0 1F 96 DA 45 14 C3 22 11 C3 45 14 29 01 05 14 09
```

```
0400 E1 C3 00 28 E1 C3 0B 28 E1 C3 18 28 E1 C3 25 28
0410 E1 C3 32 28 E1 C3 3F 28 E1 C3 4E 28 E1 C3 5B 28
0420 E1 C3 68 28 E1 C3 75 28 E1 C3 84 28 E1 C3 93 28
0430 E1 C3 A2 28 E1 C3 AF 28 E1 C3 BE 28 E1 C3 CB 28
0440 E1 C3 D8 28 E1 C3 E5 28 E1 C3 F4 28 E1 C3 03 29
0450 E1 C3 12 29 E1 C3 21 29 E1 C3 32 29 E1 C3 41 29
0460 E1 C3 50 29 E1 C3 5D 29 E1 C3 6C 29 E1 C3 7B 29
0470 E1 C3 8A 29 E1 C3 97 29 E1 C3 A6 29 E1 C3 B3 29
0480 E1 C3 C0 29 E1 C3 CD 29 E1 C3 DC 29 E1 C3 EB 29
0490 E1 C3 FA 29 E1 C3 09 2A E1 C3 1A 2A E1 C3 29 2A
04A0 E1 C3 38 2A E1 C3 47 2A E1 C3 58 2A E1 C3 69 2A
04B0 E1 C3 7A 2A E1 C3 89 2A E1 C3 9A 2A E1 C3 A9 2A
04C0 E1 C3 B8 2A E1 C3 C5 2A E1 C3 D4 2A E1 C3 E3 2A
04D0 E1 C3 F2 2A E1 C3 01 2B E1 C3 12 2B E1 C3 21 2B
04E0 E1 C3 30 2B E1 C3 3D 2B E1 C3 4C 2B E1 C3 5B 2B
04F0 E1 C3 6A 2B E1 C3 77 2B E1 C3 86 2B E1 C3 93 2B
0500 E1 C3 A0 2B E1 C3 AD 2B E1 C3 BC 2B E1 C3 CB 2B
0510 E1 C3 DA 2B E1 C3 E9 2B E1 C3 FA 2B E1 C3 09 2C
0520 E1 C3 18 2C E1 C3 27 2C E1 C3 38 2C E1 C3 49 2C
0530 E1 C3 5A 2C E1 C3 69 2C E1 C3 7A 2C E1 C3 89 2C
0540 E1 C3 98 2C E1 C3 A7 2C E1 C3 B8 2C E1 C3 C9 2C
0550 E1 C3 DA 2C E1 C3 EB 2C E1 C3 FE 2C E1 C3 0F 2D
0560 E1 C3 20 2D E1 C3 2F 2D E1 C3 40 2D E1 C3 51 2D
0570 E1 C3 62 2D E1 C3 71 2D E1 C3 82 2D E1 C3 91 2D
0580 E1 C3 A0 2D E1 C3 AD 2D E1 C3 BC 2D E1 C3 CB 2D
0590 E1 C3 DA 2D E1 C3 E9 2D E1 C3 FA 2D E1 C3 09 2E
05A0 E1 C3 18 2E E1 C3 27 2E E1 C3 38 2E E1 C3 49 2E
05B0 E1 C3 5A 2E E1 C3 69 2E E1 C3 7A 2E E1 C3 89 2E
05C0 E1 C3 98 2E E1 C3 A5 2E E1 C3 B4 2E E1 C3 C3 2E
05D0 E1 C3 D2 2E E1 C3 E1 2E E1 C3 F2 2E E1 C3 01 2F
05E0 E1 C3 10 2F E1 C3 1D 2F E1 C3 2C 2F E1 C3 3B 2F
05F0 E1 C3 4A 2F E1 C3 57 2F E1 C3 66 2F E1 C3 73 2F
0600 E1 C3 80 2F E1 C3 8C 2F E1 C3 9A 2F E1 C3 A8 2F
0610 E1 C3 B6 2F E1 C3 C4 2F E1 C3 D4 2F E1 C3 E2 2F
0620 E1 C3 F0 2F E1 C3 FE 2F E1 C3 0E 30 E1 C3 1E 30
0630 E1 C3 2E 30 E1 C3 3C 30 E1 C3 4C 30 E1 C3 5A 30
0640 E1 C3 68 30 E1 C3 76 30 E1 C3 86 30 E1 C3 96 30
0650 E1 C3 A6 30 E1 C3 B6 30 E1 C3 C8 30 E1 C3 D8 30
0660 E1 C3 E8 30 E1 C3 F6 30 E1 C3 06 31 E1 C3 16 31
0670 E1 C3 26 31 E1 C3 34 31 E1 C3 44 31 E1 C3 52 31
0680 E1 C3 60 31 E1 C3 6E 31 E1 C3 7E 31 E1 C3 8E 31
0690 E1 C3 9E 31 E1 C3 AE 31 E1 C3 C0 31 E1 C3 D0 31
06A0 E1 C3 E0 31 E1 C3 F0 31 E1 C3 02 32 E1 C3 14 32
06B0 E1 C3 26 32 E1 C3 36 32 E1 C3 48 32 E1 C3 58 32
06C0 E1 C3 68 32 E1 C3 76 32 E1 C3 86 32 E1 C3 96 32
06D0 E1 C3 A6 32 E1 C3 B6 32 E1 C3 C8 32 E1 C3 D8 32
06E0 E1 C3 E8 32 E1 C3 F6 32 E1 C3 06 33 E1 C3 16 33
06F0 E1 C3 26 33 E1 C3 34 33 E1 C3 44 33 E1 C3 52 33
0700 E1 C3 60 33 E1 C3 6C 33 E1 C3 7A 33 E1 C3 88 33
0710 E1 C3 96 33 E1 C3 A4 33 E1 C3 B4 33 E1 C3 C2 33
0720 E1 C3 D0 33 E1 C3 DE 33 E1 C3 EE 33 E1 C3 FE 33
0730 E1 C3 0E 34 E1 C3 1C 34 E1 C3 2C 34 E1 C3 3A 34
0740 E1 C3 48 34 E1 C3 56 34 E1 C3 66 34 E1 C3 76 34
0750 E1 C3 86 34 E1 C3 96 34 E1 C3 A8 34 E1 C3 B8 34
0760 E1 C3 C8 34 E1 C3 D6 34 E1 C3 E6 34 E1 C3 F6 34
0770 E1 C3 06 35 E1 C3 14 35 E1 C3 24 35 E1 C3 32 35
0780 E1 C3 40 35 E1 C3 4C 35 E1 C3 5A 35 E1 C3 68 35
0790 E1 C3 76 35 E1 C3 84 35 E1 C3 94 35 E1 C3 A2 35
07A0 E1 C3 B0 35 E1 C3 BE 35 E1 C3 CE 35 E1 C3 DE 35
07B0 E1 C3 EE 35 E1 C3 FC 35 E1 C3 0C 36 E1 C3 1A 36
07C0 E1 C3 28 36 E1 C3 34 36 E1 C3 42 36 E1 C3 50 36
07D0 E1 C3 5E 36 E1 C3 6C 36 E1 C3 7C 36 E1 C3 8A 36
07E0 E1 C3 98 36 E1 C3 A4 36 E1 C3 B2 36 E1 C3 C0 36
07F0 E1 C3 CE 36 E1 C3 DA 36 E1 C3 E8 36 E1 C3 F4 36
```

| | | | | | | | | | | | | | | | | |
|---|---|---|---|---|---|---|---|---|---|---|---|---|---|---|---|---|
| 0400 | FC | F9 | F3 | E7 | CF | 9F | 3F | 7E | 00 | 00 | 00 | 00 | 00 | 3E | 45 | 49 |
| 0410 | 51 | 3E | 00 | 41 | 7F | 01 | 00 | 21 | 43 | 45 | 49 | 31 | 42 | 41 | 51 | 69 |
| 0420 | 46 | 0C | 14 | 24 | 7F | 04 | 72 | 51 | 51 | 51 | 4E | 1E | 29 | 49 | 49 | 06 |
| 0430 | 40 | 47 | 48 | 50 | 60 | 36 | 49 | 49 | 49 | 36 | 30 | 49 | 49 | 4A | 3C | 3F |
| 0440 | 48 | 48 | 48 | 3F | 7F | 49 | 49 | 49 | 36 | 3E | 41 | 41 | 41 | 22 | 7F | 41 |
| 0450 | 41 | 22 | 1C | 7F | 49 | 49 | 49 | 41 | 7F | 48 | 48 | 48 | 40 | 3E | 41 | 41 |
| 0460 | 49 | 4F | 7F | 08 | 08 | 08 | 7F | 00 | 41 | 7F | 41 | 00 | 7F | 08 | 14 | 22 |
| 0470 | 41 | 7F | 01 | 01 | 01 | 01 | 7F | 20 | 18 | 20 | 7F | 7F | 10 | 08 | 04 | 7F |
| 0480 | 3E | 41 | 41 | 41 | 3E | 7F | 48 | 48 | 48 | 30 | 7F | 48 | 4C | 4A | 31 | 31 |
| 0490 | 49 | 49 | 49 | 46 | 40 | 40 | 7F | 40 | 40 | 7E | 01 | 01 | 01 | 7E | 40 | 20 |
| 04A0 | 1F | 20 | 40 | 43 | 45 | 49 | 51 | 61 | 0E | 0A | 21 | B1 | 58 | CD | 6A | 26 |
| 04B0 | C9 | 44 | 58 | 8A | 58 | 67 | 58 | 5D | 58 | 62 | 58 | 94 | 58 | 7B | 58 | 53 |
| 04C0 | 58 | 8F | 58 | 8F | 58 | 0E | 18 | 21 | CE | 58 | CD | 6A | 26 | C9 | 08 | 58 |
| 04D0 | 44 | 58 | 8A | 58 | 67 | 58 | 5D | 58 | 62 | 58 | 94 | 58 | 7B | 58 | 53 | 58 |
| 04E0 | 8F | 58 | 8F | 58 | 08 | 58 | 80 | 58 | 8A | 58 | 08 | 58 | 3F | 58 | 71 | 58 |
| 04F0 | 67 | 58 | 5D | 58 | 7B | 58 | 76 | 58 | 53 | 58 | 7B | 58 | 94 | 58 | 0E | 12 |
| 0500 | 21 | 07 | 59 | CD | 6A | 26 | C9 | 4E | 58 | 67 | 58 | 8F | 58 | 85 | 58 | 71 |
| 0510 | 58 | 3F | 58 | 9E | 58 | 08 | 58 | 80 | 58 | 8A | 58 | 08 | 58 | 8A | 58 | 53 |
| 0520 | 58 | 5D | 58 | 99 | 58 | 71 | 58 | 3F | 58 | 8A | 58 | 0E | 04 | 21 | 34 | 59 |
| 0530 | CD | 6A | 26 | C9 | 76 | 58 | 3F | 58 | 8F | 58 | 6C | 58 | 0E | 0A | 21 | 45 |
| 0540 | 59 | CD | 6A | 26 | C9 | 67 | 58 | 7B | 58 | 67 | 58 | 94 | 58 | 67 | 58 | 3F |
| 0550 | 58 | 71 | 58 | 67 | 58 | A3 | 58 | 53 | 58 | 0E | 06 | 21 | 62 | 59 | CD | 6A |
| 0560 | 26 | C9 | 7B | 58 | 99 | 58 | 76 | 58 | 44 | 58 | 53 | 58 | 8A | 58 | 0E | 0B |
| 0570 | 21 | 77 | 59 | CD | 6A | 26 | C9 | 8A | 58 | 53 | 58 | 3F | 58 | 4E | 58 | 08 |
| 0580 | 58 | 80 | 58 | 8A | 58 | 08 | 58 | 53 | 58 | 7B | 58 | 4E | 58 | 31 | 00 | C0 |
| 0590 | 3E | FF | 32 | B0 | C1 | 3E | 0C | 32 | B8 | C1 | AF | 32 | B1 | C2 | 32 | 90 |
| 05A0 | C3 | 32 | 98 | C1 | 32 | 60 | C1 | D3 | 7F | 32 | 50 | C3 | 32 | 81 | C3 | CD |
| 05B0 | 5E | 26 | AF | 32 | 82 | C3 | 21 | 00 | 38 | CD | D4 | 59 | 7C | 17 | 17 | D2 |
| 05C0 | B9 | 59 | 21 | 00 | 80 | 31 | 00 | 3C | CD | D4 | 59 | 7C | 17 | 17 | D2 | C8 |
| 05D0 | 59 | C3 | ED | 59 | 3E | 55 | 77 | 7E | FE | 55 | C4 | 8A | 26 | 3E | AA | 77 |
| 05E0 | 7E | FE | AA | C4 | 8A | 26 | AF | 77 | 23 | C9 | 3A | 80 | C0 | 3A | A8 | C0 |
| 05F0 | E6 | 08 | C2 | 00 | 5A | 3E | FF | 32 | 4C | 38 | CD | 86 | 25 | C3 | ED | 59 |
| 0600 | AF | 32 | 4C | 38 | 21 | 00 | F0 | 22 | 15 | 38 | CD | 86 | 25 | 3A | A8 | C0 |
| 0610 | E6 | 08 | C2 | 00 | 5A | 21 | 00 | 00 | 22 | 15 | 38 | 21 | 32 | 00 | CD | 11 |
| 0620 | 26 | 21 | 00 | 00 | 22 | 15 | 38 | 21 | 38 | 18 | 22 | 17 | 38 | 3E | FF | 32 |
| 0630 | 22 | 38 | FB | CD | 5E | 26 | CD | A8 | 58 | 3A | 6D | 38 | 1F | D2 | 39 | 5A |
| 0640 | AF | 32 | 6D | 38 | 3A | 5E | 38 | FE | 4D | C2 | 39 | 5A | 3A | 5D | 38 | FE |
| 0650 | 22 | C2 | 39 | 5A | 21 | FC | 03 | 22 | 24 | 38 | 22 | 26 | 38 | CD | 0D | 21 |
| 0660 | 21 | 00 | 04 | 22 | 32 | 38 | CD | F9 | 5A | 22 | 32 | 38 | CD | 94 | 24 | CD |
| 0670 | DF | 24 | CD | 7B | 5A | CD | C5 | 58 | C3 | C7 | 5A | 21 | 2C | 38 | 22 | 46 |
| 0680 | 38 | 21 | 32 | 38 | 22 | 48 | 38 | 3E | 05 | 32 | 4A | 38 | 2A | 46 | 38 | 7E |
| 0690 | 4F | 81 | 81 | 81 | 81 | 4F | 06 | 00 | 2B | 22 | 46 | 38 | 21 | 0D | 58 | 09 |
| 06A0 | EB | 2A | 48 | 38 | 73 | 23 | 72 | 23 | 22 | 48 | 38 | 3A | 4A | 38 | 3D | 32 |
| 06B0 | 4A | 38 | C2 | 8C | 5A | CD | 5E | 26 | 0E | 06 | 21 | 08 | 58 | 22 | 3C | 38 |
| 06C0 | 21 | 32 | 38 | CD | 6A | 26 | C9 | 3A | 6D | 38 | 1F | D2 | C7 | 5A | AF | 32 |
| 06D0 | 6D | 38 | 3A | 5E | 38 | FE | 4D | C2 | C7 | 5A | 3A | 5D | 38 | FE | 22 | CA |
| 06E0 | 54 | 5A | FE | 21 | C2 | C7 | 5A | 21 | B4 | 00 | 22 | 24 | 38 | 21 | 84 | 03 |
| 06F0 | 22 | 26 | 38 | CD | 0D | 21 | C3 | 1E | 01 | 21 | 7F | BF | 22 | 34 | 38 | 2A |
| 0700 | 32 | 38 | 22 | 36 | 38 | 2A | 34 | 38 | 46 | 2B | 4E | 2B | 22 | 34 | 38 | 11 |
| 0710 | 00 | 80 | CD | 20 | 00 | DC | 8A | 26 | 59 | 50 | 21 | 00 | 00 | CD | 20 | 00 |
| 0720 | C2 | 05 | 5B | 2A | 36 | 38 | 2B | 22 | 36 | 38 | 11 | 00 | 00 | CD | 20 | 00 |
| 0730 | C2 | 05 | 5B | 2A | 34 | 38 | C9 | 3A | 22 | 38 | 1F | D8 | C3 | 71 | 5B | EB |
| 0740 | 21 | 7F | BF | 22 | 32 | 38 | CD | F3 | 26 | EB | D5 | CD | E8 | 26 | 21 | 00 |
| 0750 | 00 | CD | 20 | 00 | CA | 66 | 5B | EB | 11 | C8 | 00 | CD | F3 | 26 | EB | 2A |
| 0760 | 32 | 38 | 23 | 73 | 23 | 72 | 2A | 32 | 38 | D1 | CD | 20 | 00 | C2 | 4A | 5B |
| 0770 | C9 | 2A | 0F | 38 | EB | 21 | FF | BF | CD | F3 | 26 | E5 | 21 | FF | BF | 3A |
| 0780 | 6E | 38 | 1F | DA | 89 | 5B | 21 | 7F | BF | 22 | 32 | 38 | D1 | C3 | 4A | 5B |
| 0790 | 2A | 2A | 2A | 2A | 2A | 2A | 2A | 2A | 20 | 42 | 45 | 47 | 20 | 50 | 41 | 47 |
| 07A0 | 45 | 20 | 55 | 2E | 20 | 53 | 54 | 45 | 50 | 20 | 53 | 55 | 42 | 52 | 4F | 55 |
| 07B0 | 54 | 49 | 4E | 45 | 2A | 2A | 2A | 2A | 2A | 2A | 2A | 2A | 2A | 2A | 2A | 0D |
| 07C0 | 0A | 0D | 0A | 3B | 43 | 48 | 45 | 43 | 4B | 53 | 20 | 53 | 54 | 45 | 50 | 20 |
| 07D0 | 52 | 49 | 47 | 48 | 54 | 20 | 46 | 4F | 52 | 20 | 44 | 49 | 52 | 45 | 43 | 54 |
| 07E0 | 49 | 4F | 4E | 2C | 41 | 44 | 4A | 55 | 53 | 54 | 53 | 20 | 50 | 4F | 53 | 49 |
| 07F0 | 54 | 49 | 4F | 4E | 20 | 43 | 4F | 55 | 4E | 54 | 45 | 52 | 2C | 0D | 0A | 3B |

| | | | | | | | | | | | | | | | | |
|---|---|---|---|---|---|---|---|---|---|---|---|---|---|---|---|---|
| 0400 | 21 | FF | BF | 22 | 32 | 38 | 2A | 0F | 38 | 01 | 00 | 00 | 11 | 00 | 03 | CD |
| 0410 | 20 | 00 | DA | 1C | 20 | 03 | CD | F3 | 26 | C3 | 0F | 20 | 69 | 60 | 22 | 1C |
| 0420 | 38 | 21 | 00 | 00 | 22 | 1A | 38 | AF | 32 | 00 | 38 | 32 | 19 | 38 | 32 | 02 |
| 0430 | 38 | CD | A7 | 27 | CD | DC | 25 | 3A | 19 | 38 | FE | 00 | CA | 4C | 20 | FE |
| 0440 | 01 | CA | 65 | 20 | FE | 02 | CA | B0 | 20 | CD | 8A | 26 | CD | 95 | 27 | DA |
| 0450 | 58 | 20 | CD | 4B | 26 | C3 | 34 | 20 | CD | 83 | 27 | 3E | 24 | 32 | 40 | C1 |
| 0460 | 3E | 01 | 32 | 19 | 38 | 2A | 1A | 38 | 11 | 00 | 03 | CD | 20 | 00 | C2 | 7F |
| 0470 | 20 | 3E | 02 | 32 | 19 | 38 | 21 | 00 | 00 | 22 | 1A | 38 | C3 | B0 | 20 | CD |
| 0480 | 95 | 27 | DA | 8B | 20 | CD | 4B | 26 | C3 | 34 | 20 | 0E | 08 | CD | E8 | 26 |
| 0490 | CD | 83 | 27 | 7B | 32 | 40 | C1 | CD | 83 | 27 | 7A | 32 | 40 | C1 | 2A | 1A |
| 04A0 | 38 | 23 | 23 | 22 | 1A | 38 | 0D | C2 | 8D | 20 | CD | 4B | 26 | C3 | 34 | 20 |
| 04B0 | 3A | 00 | 38 | 1F | DA | D2 | 20 | 3A | A8 | C0 | E6 | 04 | C2 | C5 | 20 | CD |
| 04C0 | 4B | 26 | C3 | 34 | 20 | C3 | D8 | 23 | FE | 20 | C4 | 8A | 26 | 3E | FF | 32 |
| 04D0 | 00 | 38 | 2A | 11 | 38 | 11 | 06 | 00 | 19 | 22 | 11 | 38 | 3E | 00 | 32 | 19 |
| 04E0 | 38 | 32 | 00 | 38 | 2A | 1C | 38 | 11 | 00 | 00 | CD | 20 | 00 | CA | FA | 20 |
| 04F0 | 2B | 22 | 1C | 38 | CD | 4B | 26 | C3 | 34 | 20 | 2A | 03 | 38 | EB | 2A | 15 |
| 0500 | 38 | CD | 20 | 00 | CA | 2C | 02 | CD | 4B | 26 | C3 | E1 | 23 | 21 | 00 | 00 |
| 0510 | 39 | 22 | 44 | 38 | AF | 01 | 01 | 00 | 11 | 00 | 80 | 21 | 7E | C0 | 12 | 13 |
| 0520 | 09 | D2 | 1E | 21 | 2A | 24 | 38 | 29 | EB | 2A | 17 | 38 | CD | F3 | 26 | 22 |
| 0530 | 03 | 38 | CD | 11 | 26 | AF | 32 | 4C | 38 | 32 | 01 | 38 | 32 | 6E | 38 | 00 |
| 0540 | 00 | 00 | 00 | 2A | 24 | 38 | 29 | EB | 21 | 7F | BF | CD | F3 | 26 | EB | 21 |
| 0550 | 7F | BF | AF | 77 | 2B | 77 | 2B | CD | 20 | 00 | C2 | 52 | 21 | D5 | 2A | 24 |
| 0560 | 38 | EB | 2A | 26 | 38 | 19 | EB | 21 | 00 | 08 | CD | F3 | 26 | 22 | 1E | 38 |
| 0570 | 29 | EB | 2A | 15 | 38 | CD | F3 | 26 | 22 | 15 | 38 | 2A | 1E | 38 | EB | 21 |
| 0580 | FF | FF | CD | F3 | 26 | 23 | 22 | 1E | 38 | E1 | 23 | F9 | 21 | 00 | 00 | E5 |
| 0590 | 21 | 01 | 00 | 11 | 00 | 50 | 0E | 80 | 06 | 02 | 3E | FF | 32 | 4D | 38 | D3 |
| 05A0 | 7F | C3 | A1 | 21 | 11 | 00 | 00 | 2A | 26 | 38 | 23 | D5 | 2B | CD | 20 | 00 |
| 05B0 | C2 | AB | 21 | 21 | 00 | 00 | 39 | 2B | EB | 21 | FF | BF | CD | F3 | 26 | 22 |
| 05C0 | 0F | 38 | 2A | 44 | 38 | F9 | CD | 37 | 5B | C9 | FB | 3A | 4D | 38 | 1F | D2 |
| 05D0 | ED | 21 | 0D | CA | D9 | 21 | C3 | 55 | 23 | 05 | 0E | 80 | CA | E2 | 21 | C3 |
| 05E0 | 55 | 23 | AF | 32 | 4D | 38 | 06 | 00 | 0E | BF | C3 | 55 | 23 | 0D | CA | 04 |
| 05F0 | 22 | 78 | 17 | 33 | 33 | E5 | DB | 7F | 47 | D2 | FD | 21 | 2F | 26 | 00 | 6F |
| 0600 | 29 | 29 | 19 | E9 | 33 | 33 | 3A | 01 | 38 | 1F | DA | 32 | 22 | 3E | FF | 32 |
| 0610 | 01 | 38 | 0C | 3A | 23 | 38 | 3D | 3D | E6 | 07 | 32 | 23 | 38 | 5F | 16 | 00 |
| 0620 | 21 | 00 | 58 | 19 | 7E | 32 | B8 | C1 | 1F | 1F | 1F | 1F | 32 | B0 | C1 | C3 |
| 0630 | A1 | 21 | AF | 32 | 01 | 38 | 21 | 00 | 00 | E5 | 2A | 1E | 38 | 01 | 01 | 00 |
| 0640 | 09 | 22 | 1E | 38 | DA | 56 | 23 | 21 | 00 | 00 | 39 | 11 | 00 | 88 | CD | 20 |
| 0650 | 00 | DA | 9A | 22 | 3A | 8B | C0 | 17 | DA | 68 | 22 | 21 | 01 | 00 | 11 | 00 |
| 0660 | 50 | 0E | BF | 06 | 00 | C3 | A1 | 21 | AF | D3 | 7F | CD | 4B | 26 | CD | 4B |
| 0670 | 26 | CD | 4B | 26 | 2A | 1E | 38 | EB | 21 | FF | FF | CD | F3 | 26 | 23 | 22 |
| 0680 | 1E | 38 | 29 | EB | 2A | 15 | 38 | 19 | 22 | 15 | 38 | 2A | 1E | 38 | EB | 2A |
| 0690 | 26 | 38 | 19 | 23 | 11 | 00 | 00 | C3 | AB | 21 | AF | D3 | 7F | 21 | 00 | 00 |
| 06A0 | 39 | 2B | EB | 21 | FF | BF | CD | F3 | 26 | 22 | 0F | 38 | CD | 37 | 5B | CD |
| 06B0 | 6A | 27 | D2 | C1 | 22 | CD | FA | 26 | CD | 27 | 27 | 21 | 00 | 00 | 22 | 11 |
| 06C0 | 38 | 01 | 00 | 00 | 11 | 00 | 03 | 2A | 0F | 38 | CD | 20 | 00 | DA | D7 | 22 |
| 06D0 | 03 | CD | F3 | 26 | C3 | CA | 22 | 22 | 0F | 38 | 60 | 69 | 22 | 1C | 38 | 21 |
| 06E0 | FF | BF | 22 | 32 | 38 | CD | 9E | 27 | CD | 83 | 27 | 3E | 24 | 32 | 40 | C1 |
| 06F0 | 01 | 80 | 02 | CD | E8 | 26 | CD | 83 | 27 | 7B | 32 | 40 | C1 | CD | 83 | 27 |
| 0700 | 7A | 32 | 40 | C1 | 0D | C2 | F3 | 22 | 05 | C2 | F3 | 22 | CD | 8C | 27 | 3A |
| 0710 | 80 | C0 | FE | 20 | C4 | 8A | 26 | 2A | 11 | 38 | 11 | 06 | 00 | 19 | 22 | 11 |
| 0720 | 38 | 2A | 1C | 38 | 2B | 22 | 1C | 38 | 11 | 00 | 00 | CD | 20 | 00 | C2 | E5 |
| 0730 | 22 | 01 | FF | BF | CD | E8 | 26 | 7A | 02 | 0B | 7B | 02 | 0B | 2A | 0F | 38 |
| 0740 | 2B | 2B | 22 | 0F | 38 | 11 | 00 | 00 | CD | 20 | 00 | C2 | 34 | 23 | 60 | 69 |
| 0750 | 23 | F9 | C3 | E7 | 23 | C9 | AF | D3 | 7F | C3 | A4 | 21 | 3A | 6D | 38 | 1F |
| 0760 | D2 | 5C | 23 | AF | 32 | 6D | 38 | 3A | 5D | 38 | FE | 4D | CA | 7A | 23 | 3A |
| 0770 | 60 | 38 | FE | 4D | CA | 8D | 23 | C3 | 5C | 23 | 3A | 20 | 38 | 3C | 32 | 20 |
| 0780 | 38 | 26 | 00 | 6F | CD | DF | 24 | CD | 7B | 5A | C3 | B6 | 23 | 3A | 5D | 38 |
| 0790 | E6 | 0F | 32 | 2A | 38 | 3A | 5E | 38 | E6 | 0F | 32 | 29 | 38 | 3A | 5F | 38 |
| 07A0 | E6 | 0F | 32 | 28 | 38 | AF | 32 | 2B | 38 | 32 | 2C | 38 | CD | 45 | 24 | 7D |
| 07B0 | 32 | 20 | 38 | CD | 7B | 5A | 3A | 20 | 38 | 4F | 06 | FF | C3 | CE | 23 | 1E |
| 07C0 | 20 | 70 | 2B | 70 | 2B | 71 | 2B | 72 | 2B | 1D | C2 | C1 | 23 | C9 | 21 | FF |
| 07D0 | BF | 3A | 22 | 38 | 57 | C3 | BF | 23 | CD | 8C | 27 | 3A | 80 | C0 | C3 | C8 |
| 07E0 | 20 | CD | DC | 25 | C3 | FA | 20 | 3E | FF | 32 | 6E | 38 | C3 | 90 | 21 | 0D |
| 07F0 | 0A | 09 | 53 | 48 | 4C | 44 | 09 | 41 | 4D | 4F | 55 | 4E | 54 | 0D | 0A | 09 |

```
0400 C3 A1 21 F5 C5 D5 E5 AF 32 90 C3 32 98 C1 3A 21
0410 38 1F DA 3F 24 21 5D 38 16 00 3A 5C 38 5F 19 1C
0420 7B 32 5C 38 3A 8B C0 77 3A 5C 38 FE 10 CC 8A 26
0430 7E FE 4D C2 3F 24 3E FF 32 6D 38 AF 32 5C 38 E1
0440 D1 C1 F1 FB C9 21 00 00 3A 2C 38 11 10 27 B7 CA
0450 57 24 19 3D C2 52 24 3A 2B 38 B7 11 E8 03 CA 66
0460 24 19 3D C2 61 24 3A 2A 38 B7 11 64 00 CA 75 24
0470 19 3D C2 70 24 3A 29 38 B7 11 0A 00 CA 84 24 19
0480 3D C2 7F 24 3A 28 38 11 01 00 B7 CA 93 24 19 3D
0490 C2 8E 24 C9 2A 32 38 22 38 38 21 00 00 22 3C 38
04A0 3E FF 32 28 38 CD E8 26 21 00 00 CD 20 00 CA D5
04B0 24 3A 28 38 1F D2 C3 24 EB 22 34 38 AF 32 28 38
04C0 C3 A5 24 2A 34 38 EB CD F3 26 EB 2A 3C 38 19 22
04D0 3C 38 C3 A0 24 2A 38 38 22 32 38 2A 3C 38 C9 22
04E0 13 38 AF 21 28 38 0E 0A 77 23 0D C2 E8 24 21 32
04F0 38 0E 14 77 23 0D C2 F3 24 2A 13 38 11 10 27 CD
0500 20 00 DA 15 25 CD F3 26 22 13 38 3A 2C 38 3C 32
0510 2C 38 C3 F9 24 2A 13 38 11 E8 03 CD 20 00 DA 31
0520 25 CD F3 26 22 13 38 3A 2B 38 3C 32 2B 38 C3 15
0530 25 2A 13 38 11 64 00 CD 20 00 DA 4D 25 CD F3 26
0540 22 13 38 3A 2A 38 3C 32 2A 38 C3 31 25 2A 13 38
0550 11 0A 00 CD 20 00 DA 69 25 CD F3 26 22 13 38 3A
0560 29 38 3C 32 29 38 C3 4D 25 2A 13 38 11 01 00 CD
0570 20 00 DA 85 25 CD F3 26 22 13 38 3A 28 38 3C 32
0580 28 38 C3 69 25 C9 3A 4C 38 1F D2 AA 25 2A 15 38
0590 23 22 15 38 EB 21 64 19 CD 20 00 DC 8A 26 3A 23
05A0 38 3C E6 07 32 23 38 C3 C3 25 2A 15 38 11 00 00
05B0 CD 20 00 CC 8A 26 2B 22 15 38 3A 23 38 3D E6 07
05C0 32 23 38 3A 23 38 5F 16 00 21 00 58 19 7E 32 B8
05D0 C1 1F 1F 1F 1F 32 B0 C1 CD 4B 26 C9 3A 02 38 1F
05E0 D8 3A 23 38 3C E6 07 32 23 38 5F 16 00 21 00 58
05F0 19 7E 32 B8 C1 1F 1F 1F 1F 32 B0 C1 2A 15 38 23
0600 22 15 38 EB 2A 03 38 CD 20 00 C0 3E FF 32 02 38
0610 C9 EB 2A 15 38 CD 20 00 CA 4A 26 DA 2B 26 AF 32
0620 4C 38 CD F3 26 22 32 38 C3 37 26 3E FF 32 4C 38
0630 EB CD F3 26 22 32 38 CD 86 25 2A 32 38 2B 22 32
0640 38 11 00 00 CD 20 00 C2 37 26 C9 F5 C5 D5 E5 21
0650 6F FE 11 01 00 19 D2 55 26 E1 D1 C1 F1 C9 3E 7F
0660 0E DE 32 80 C3 0D C2 62 26 C9 E5 5E 23 56 06 05
0670 1A 2F 32 80 C3 13 05 C2 70 26 E1 3E FF 32 80 C3
0680 32 80 C3 23 23 0D C2 6A 26 C9 CD 5E 26 AF E1 7C
0690 E6 F0 1F 1F 1F 1F 5F 7C E6 0F 57 7D E6 F0 1F 1F
06A0 1F 1F 47 7D E6 0F F5 C5 D5 21 53 58 22 05 38 D1
06B0 D5 4B CD DB 26 22 07 38 D1 4A CD DB 26 22 09 38
06C0 C1 48 CD DB 26 22 0B 38 F1 4F CD DB 26 22 0D 38
06D0 21 05 38 0E 05 CD 6A 26 E1 76 76 21 0D 58 11 05
06E0 00 0C 0D C8 19 C3 E2 26 2A 32 38 56 2B 5E 2B 22
06F0 32 38 C9 7D 93 6F 7C 9A 67 C9 01 00 03 CD 9E 27
0700 CD 83 27 3E 24 32 40 C1 CD 9E 27 CD 83 27 3E FF
0710 32 40 C1 0D C2 08 27 05 C2 08 27 CD 8C 27 3A 80
0720 C0 FE 20 C4 8A 26 C9 CD 5E 26 CD 3C 59 3A 6D 38
0730 1F D2 2D 27 AF 32 6D 38 3A 5E 38 FE 4D C2 2D 27
0740 3A 5D 38 FE 29 C2 2D 27 CD A7 27 CD 83 27 3E 22
0750 32 40 C1 CD 8C 27 3A 80 C0 FE 20 C2 27 27 CD 9E
0760 27 CD 83 27 3E 23 C3 B6 27 C9 2A 0F 38 11 00 06
0770 19 24 29 6C 26 00 EB 2A 11 38 19 EB 21 D2 07 CD
0780 20 00 C9 3A A8 C0 E6 02 CA 83 27 C9 3A A8 C0 E6
0790 04 CA 8C 27 C9 3A A8 C0 E6 02 37 C0 3F C9 3A A8
07A0 C0 E6 04 C4 8A 26 C9 3A A8 C0 E6 04 C8 3A 80 C0
07B0 FE 21 CC 8A 26 C9 32 40 C1 21 00 00 22 11 38 C9
07C0 49 4E 52 09 41 0D 0A 09 41 4E 49 09 30 37 48 0D
07D0 0A 09 53 54 41 09 50 48 41 53 45 0D 0A 09 4D 4F
07E0 56 09 45 2C 41 0D 0A 09 4D 56 49 09 44 2C 30 0D
07F0 0A 09 4C 58 49 09 48 2C 50 48 41 53 30 0D 33 33
```

| | | | | | | | | | | | | | | | | |
|---|---|---|---|---|---|---|---|---|---|---|---|---|---|---|---|---|
| 0400 | 23 | 23 | 23 | 23 | 23 | 23 | 23 | 23 | C3 | 00 | 24 | E5 | 23 | E5 | 23 | 23 |
| 0410 | 23 | 23 | 23 | 23 | 23 | C3 | 00 | 24 | 23 | E5 | 23 | E5 | 23 | 23 | 23 | 23 |
| 0420 | 23 | 23 | C3 | 00 | 24 | E5 | 23 | 23 | E5 | 23 | 23 | 23 | 23 | 23 | 23 | C3 |
| 0430 | 00 | 24 | 23 | 23 | E5 | 23 | E5 | 23 | 23 | 23 | 23 | 23 | C3 | 00 | 24 | E5 |
| 0440 | 23 | E5 | 23 | E5 | 23 | E5 | 23 | 23 | 23 | 23 | 23 | C3 | 00 | 24 | 23 | E5 |
| 0450 | 23 | 23 | E5 | 23 | 23 | 23 | 23 | 23 | C3 | 00 | 24 | E5 | 23 | 23 | 23 | E5 |
| 0460 | 23 | 23 | 23 | 23 | 23 | C3 | 00 | 24 | 23 | 23 | 23 | E5 | 23 | E5 | 23 | 23 |
| 0470 | 23 | 23 | C3 | 00 | 24 | E5 | 23 | E5 | 23 | 23 | E5 | 23 | E5 | 23 | 23 | 23 |
| 0480 | 23 | C3 | 00 | 24 | 23 | E5 | 23 | E5 | 23 | E5 | 23 | E5 | 23 | 23 | 23 | 23 |
| 0490 | C3 | 00 | 24 | E5 | 23 | 23 | E5 | 23 | E5 | 23 | E5 | 23 | 23 | 23 | 23 | C3 |
| 04A0 | 00 | 24 | 23 | 23 | E5 | 23 | 23 | E5 | 23 | 23 | 23 | 23 | C3 | 00 | 24 | E5 |
| 04B0 | 23 | E5 | 23 | E5 | 23 | 23 | E5 | 23 | 23 | 23 | 23 | C3 | 00 | 24 | 23 | E5 |
| 04C0 | 23 | 23 | 23 | E5 | 23 | 23 | 23 | 23 | C3 | 00 | 24 | E5 | 23 | 23 | 23 | 23 |
| 04D0 | E5 | 23 | 23 | 23 | 23 | C3 | 00 | 24 | 23 | 23 | 23 | 23 | E5 | 23 | E5 | 23 |
| 04E0 | 23 | 23 | C3 | 00 | 24 | E5 | 23 | E5 | 23 | 23 | 23 | E5 | 23 | E5 | 23 | 23 |
| 04F0 | 23 | C3 | 00 | 24 | 23 | E5 | 23 | E5 | 23 | 23 | E5 | 23 | E5 | 23 | 23 | 23 |
| 0500 | C3 | 00 | 24 | E5 | 23 | 23 | E5 | 23 | 23 | E5 | 23 | E5 | 23 | 23 | 23 | C3 |
| 0510 | 00 | 24 | 23 | 23 | E5 | 23 | E5 | 23 | E5 | 23 | E5 | 23 | 23 | 23 | C3 | 00 |
| 0520 | 24 | E5 | 23 | E5 | 23 | E5 | 23 | E5 | 23 | E5 | 23 | E5 | 23 | 23 | 23 | C3 |
| 0530 | 00 | 24 | 23 | E5 | 23 | 23 | E5 | 23 | E5 | 23 | E5 | 23 | 23 | 23 | C3 | 00 |
| 0540 | 24 | E5 | 23 | 23 | 23 | E5 | 23 | E5 | 23 | E5 | 23 | 23 | 23 | C3 | 00 | 24 |
| 0550 | 23 | 23 | 23 | E5 | 23 | 23 | E5 | 23 | 23 | 23 | C3 | 00 | 24 | E5 | 23 | E5 |
| 0560 | 23 | 23 | E5 | 23 | 23 | E5 | 23 | 23 | 23 | C3 | 00 | 24 | 23 | E5 | 23 | E5 |
| 0570 | 23 | E5 | 23 | 23 | E5 | 23 | 23 | 23 | C3 | 00 | 24 | E5 | 23 | 23 | E5 | 23 |
| 0580 | E5 | 23 | 23 | E5 | 23 | 23 | 23 | C3 | 00 | 24 | 23 | 23 | E5 | 23 | 23 | 23 |
| 0590 | E5 | 23 | 23 | 23 | C3 | 00 | 24 | E5 | 23 | E5 | 23 | E5 | 23 | 23 | 23 | E5 |
| 05A0 | 23 | 23 | 23 | C3 | 00 | 24 | 23 | E5 | 23 | 23 | 23 | 23 | E5 | 23 | 23 | 23 |
| 05B0 | C3 | 00 | 24 | E5 | 23 | 23 | 23 | 23 | 23 | E5 | 23 | 23 | 23 | C3 | 00 | 24 |
| 05C0 | 23 | 23 | 23 | 23 | 23 | E5 | 23 | E5 | 23 | 23 | C3 | 00 | 24 | E5 | 23 | E5 |
| 05D0 | 23 | 23 | 23 | 23 | E5 | 23 | E5 | 23 | 23 | C3 | 00 | 24 | 23 | E5 | 23 | E5 |
| 05E0 | 23 | 23 | 23 | E5 | 23 | E5 | 23 | 23 | C3 | 00 | 24 | E5 | 23 | 23 | E5 | 23 |
| 05F0 | 23 | 23 | E5 | 23 | E5 | 23 | 23 | C3 | 00 | 24 | 23 | 23 | E5 | 23 | E5 | 23 |
| 0600 | 23 | E5 | 23 | E5 | 23 | 23 | C3 | 00 | 24 | E5 | 23 | E5 | 23 | E5 | 23 | E5 |
| 0610 | 23 | 23 | E5 | 23 | E5 | 23 | 23 | C3 | 00 | 24 | 23 | E5 | 23 | 23 | E5 | 23 |
| 0620 | 23 | E5 | 23 | E5 | 23 | 23 | C3 | 00 | 24 | E5 | 23 | 23 | 23 | E5 | 23 | 23 |
| 0630 | E5 | 23 | E5 | 23 | 23 | C3 | 00 | 24 | 23 | 23 | 23 | E5 | 23 | E5 | 23 | E5 |
| 0640 | 23 | E5 | 23 | 23 | C3 | 00 | 24 | E5 | 23 | E5 | 23 | 23 | E5 | 23 | E5 | 23 |
| 0650 | E5 | 23 | E5 | 23 | 23 | C3 | 00 | 24 | 23 | E5 | 23 | E5 | 23 | E5 | 23 | E5 |
| 0660 | 23 | E5 | 23 | E5 | 23 | 23 | C3 | 00 | 24 | E5 | 23 | 23 | E5 | 23 | E5 | 23 |
| 0670 | E5 | 23 | E5 | 23 | E5 | 23 | 23 | C3 | 00 | 24 | 23 | 23 | E5 | 23 | 23 | E5 |
| 0680 | 23 | E5 | 23 | E5 | 23 | 23 | C3 | 00 | 24 | E5 | 23 | E5 | 23 | E5 | 23 | 23 |
| 0690 | E5 | 23 | E5 | 23 | E5 | 23 | 23 | C3 | 00 | 24 | 23 | E5 | 23 | 23 | 23 | E5 |
| 06A0 | 23 | E5 | 23 | E5 | 23 | 23 | C3 | 00 | 24 | E5 | 23 | 23 | 23 | 23 | E5 | 23 |
| 06B0 | E5 | 23 | E5 | 23 | 23 | C3 | 00 | 24 | 23 | 23 | 23 | 23 | E5 | 23 | 23 | E5 |
| 06C0 | 23 | 23 | C3 | 00 | 24 | E5 | 23 | E5 | 23 | 23 | 23 | E5 | 23 | 23 | E5 | 23 |
| 06D0 | 23 | C3 | 00 | 24 | 23 | E5 | 23 | E5 | 23 | 23 | E5 | 23 | 23 | E5 | 23 | 23 |
| 06E0 | C3 | 00 | 24 | E5 | 23 | 23 | E5 | 23 | 23 | E5 | 23 | 23 | E5 | 23 | 23 | C3 |
| 06F0 | 00 | 24 | 23 | 23 | E5 | 23 | E5 | 23 | E5 | 23 | 23 | E5 | 23 | 23 | C3 | 00 |
| 0700 | 24 | E5 | 23 | E5 | 23 | E5 | 23 | E5 | 23 | E5 | 23 | 23 | E5 | 23 | 23 | C3 |
| 0710 | 00 | 24 | 23 | E5 | 23 | 23 | E5 | 23 | E5 | 23 | 23 | E5 | 23 | 23 | C3 | 00 |
| 0720 | 24 | E5 | 23 | 23 | 23 | E5 | 23 | E5 | 23 | 23 | E5 | 23 | 23 | C3 | 00 | 24 |
| 0730 | 23 | 23 | 23 | E5 | 23 | 23 | 23 | E5 | 23 | 23 | C3 | 00 | 24 | E5 | 23 | E5 |
| 0740 | 23 | 23 | E5 | 23 | 23 | 23 | E5 | 23 | 23 | C3 | 00 | 24 | 23 | E5 | 23 | E5 |
| 0750 | 23 | E5 | 23 | 23 | 23 | E5 | 23 | 23 | C3 | 00 | 24 | E5 | 23 | 23 | E5 | 23 |
| 0760 | E5 | 23 | 23 | 23 | F5 | 23 | 23 | C3 | 00 | 24 | 23 | 23 | E5 | 23 | 23 | 23 |
| 0770 | 23 | E5 | 23 | 23 | C3 | 00 | 24 | E5 | 23 | E5 | 23 | E5 | 23 | 23 | 23 | 23 |
| 0780 | E5 | 23 | 23 | C3 | 00 | 24 | 23 | E5 | 23 | 23 | 23 | 23 | 23 | E5 | 23 | 23 |
| 0790 | C3 | 00 | 24 | E5 | 23 | 23 | 23 | 23 | 23 | 23 | E5 | 23 | 23 | C3 | 00 | 24 |
| 07A0 | 23 | 23 | 23 | 23 | 23 | 23 | E5 | 23 | E5 | 23 | C3 | 00 | 24 | E5 | 23 | E5 |
| 07B0 | 23 | 23 | 23 | 23 | 23 | E5 | 23 | E5 | 23 | C3 | 00 | 24 | 23 | E5 | 23 | E5 |
| 07C0 | 23 | 23 | 23 | 23 | E5 | 23 | E5 | 23 | C3 | 00 | 24 | E5 | 23 | 23 | E5 | 23 |
| 07D0 | 23 | 23 | 23 | E5 | 23 | E5 | 23 | C3 | 00 | 24 | 23 | 23 | E5 | 23 | E5 | 23 |
| 07E0 | 23 | 23 | E5 | 23 | E5 | 23 | C3 | 00 | 24 | E5 | 23 | E5 | 23 | E5 | 23 | E5 |
| 07F0 | 23 | 23 | 23 | E5 | 23 | E5 | 23 | C3 | 00 | 24 | 23 | E5 | 23 | 23 | E5 | 23 |

| | | | | | | | | | | | | | | | | |
|---|---|---|---|---|---|---|---|---|---|---|---|---|---|---|---|---|
| 0400 | 23 | 23 | E5 | 23 | E5 | 23 | C3 | 00 | 24 | E5 | 23 | 23 | 23 | E5 | 23 | 23 |
| 0410 | 23 | E5 | 23 | E5 | 23 | C3 | 00 | 24 | 23 | 23 | 23 | E5 | 23 | E5 | 23 | 23 |
| 0420 | E5 | 23 | E5 | 23 | C3 | 00 | 24 | E5 | 23 | E5 | 23 | 23 | E5 | 23 | E5 | 23 |
| 0430 | 23 | E5 | 23 | E5 | 23 | C3 | 00 | 24 | 23 | E5 | 23 | E5 | 23 | E5 | 23 | E5 |
| 0440 | 23 | 23 | E5 | 23 | E5 | 23 | C3 | 00 | 24 | E5 | 23 | 23 | E5 | 23 | E5 | 23 |
| 0450 | E5 | 23 | 23 | E5 | 23 | E5 | 23 | C3 | 00 | 24 | 23 | 23 | E5 | 23 | 23 | E5 |
| 0460 | 23 | 23 | E5 | 23 | E5 | 23 | C3 | 00 | 24 | E5 | 23 | E5 | 23 | E5 | 23 | 23 |
| 0470 | E5 | 23 | 23 | E5 | 23 | E5 | 23 | C3 | 00 | 24 | 23 | E5 | 23 | 23 | 23 | E5 |
| 0480 | 23 | 23 | E5 | 23 | E5 | 23 | C3 | 00 | 24 | E5 | 23 | 23 | 23 | 23 | E5 | 23 |
| 0490 | 23 | E5 | 23 | E5 | 23 | C3 | 00 | 24 | 23 | 23 | 23 | 23 | E5 | 23 | E5 | 23 |
| 04A0 | E5 | 23 | E5 | 23 | C3 | 00 | 24 | E5 | 23 | E5 | 23 | 23 | 23 | E5 | 23 | E5 |
| 04B0 | 23 | E5 | 23 | E5 | 23 | C3 | 00 | 24 | 23 | E5 | 23 | E5 | 23 | 23 | E5 | 23 |
| 04C0 | E5 | 23 | E5 | 23 | E5 | 23 | C3 | 00 | 24 | E5 | 23 | 23 | E5 | 23 | 23 | E5 |
| 04D0 | 23 | E5 | 23 | E5 | 23 | E5 | 23 | C3 | 00 | 24 | 23 | 23 | E5 | 23 | E5 | 23 |
| 04E0 | E5 | 23 | E5 | 23 | E5 | 23 | E5 | 23 | C3 | 00 | 24 | E5 | 23 | E5 | 23 | E5 |
| 04F0 | 23 | E5 | 23 | E5 | 23 | E5 | 23 | E5 | 23 | E5 | 23 | C3 | 00 | 24 | 23 | E5 |
| 0500 | 23 | 23 | E5 | 23 | E5 | 23 | E5 | 23 | E5 | 23 | E5 | 23 | C3 | 00 | 24 | E5 |
| 0510 | 23 | 23 | 23 | E5 | 23 | E5 | 23 | E5 | 23 | E5 | 23 | E5 | 23 | C3 | 00 | 24 |
| 0520 | 23 | 23 | 23 | E5 | 23 | 23 | E5 | 23 | E5 | 23 | E5 | 23 | C3 | 00 | 24 | E5 |
| 0530 | 23 | E5 | 23 | 23 | E5 | 23 | 23 | E5 | 23 | E5 | 23 | E5 | 23 | C3 | 00 | 24 |
| 0540 | 23 | E5 | 23 | E5 | 23 | E5 | 23 | 23 | E5 | 23 | E5 | 23 | E5 | 23 | C3 | 00 |
| 0550 | 24 | E5 | 23 | 23 | E5 | 23 | E5 | 23 | 23 | E5 | 23 | E5 | 23 | E5 | 23 | C3 |
| 0560 | 00 | 24 | 23 | 23 | E5 | 23 | 23 | 23 | E5 | 23 | E5 | 23 | E5 | 23 | C3 | 00 |
| 0570 | 24 | E5 | 23 | E5 | 23 | E5 | 23 | 23 | 23 | E5 | 23 | E5 | 23 | E5 | 23 | C3 |
| 0580 | 00 | 24 | 23 | E5 | 23 | 23 | 23 | 23 | E5 | 23 | E5 | 23 | E5 | 23 | C3 | 00 |
| 0590 | 24 | E5 | 23 | 23 | 23 | 23 | 23 | E5 | 23 | E5 | 23 | E5 | 23 | C3 | 00 | 24 |
| 05A0 | 23 | 23 | 23 | 23 | 23 | E5 | 23 | 23 | E5 | 23 | C3 | 00 | 24 | E5 | 23 | E5 |
| 05B0 | 23 | 23 | 23 | 23 | E5 | 23 | 23 | E5 | 23 | C3 | 00 | 24 | 23 | E5 | 23 | E5 |
| 05C0 | 23 | 23 | 23 | E5 | 23 | 23 | E5 | 23 | C3 | 00 | 24 | E5 | 23 | 23 | E5 | 23 |
| 05D0 | 23 | 23 | E5 | 23 | 23 | E5 | 23 | C3 | 00 | 24 | 23 | 23 | E5 | 23 | E5 | 23 |
| 05E0 | 23 | E5 | 23 | 23 | E5 | 23 | C3 | 00 | 24 | E5 | 23 | E5 | 23 | E5 | 23 | E5 |
| 05F0 | 23 | 23 | E5 | 23 | 23 | E5 | 23 | C3 | 00 | 24 | 23 | E5 | 23 | 23 | E5 | 23 |
| 0600 | 23 | E5 | 23 | 23 | E5 | 23 | C3 | 00 | 24 | E5 | 23 | 23 | 23 | E5 | 23 | 23 |
| 0610 | E5 | 23 | 23 | E5 | 23 | C3 | 00 | 24 | 23 | 23 | 23 | E5 | 23 | E5 | 23 | E5 |
| 0620 | 23 | 23 | E5 | 23 | C3 | 00 | 24 | E5 | 23 | E5 | 23 | 23 | E5 | 23 | E5 | 23 |
| 0630 | E5 | 23 | 23 | E5 | 23 | C3 | 00 | 24 | 23 | E5 | 23 | E5 | 23 | E5 | 23 | E5 |
| 0640 | 23 | E5 | 23 | 23 | E5 | 23 | C3 | 00 | 24 | E5 | 23 | 23 | E5 | 23 | E5 | 23 |
| 0650 | E5 | 23 | E5 | 23 | 23 | E5 | 23 | C3 | 00 | 24 | 23 | 23 | E5 | 23 | 23 | E5 |
| 0660 | 23 | E5 | 23 | 23 | E5 | 23 | C3 | 00 | 24 | E5 | 23 | E5 | 23 | E5 | 23 | 23 |
| 0670 | E5 | 23 | E5 | 23 | 23 | E5 | 23 | C3 | 00 | 24 | 23 | E5 | 23 | 23 | 23 | E5 |
| 0680 | 23 | E5 | 23 | 23 | E5 | 23 | C3 | 00 | 24 | E5 | 23 | 23 | 23 | 23 | E5 | 23 |
| 0690 | E5 | 23 | 23 | E5 | 23 | C3 | 00 | 24 | 23 | 23 | 23 | 23 | E5 | 23 | 23 | 23 |
| 06A0 | E5 | 23 | C3 | 00 | 24 | E5 | 23 | E5 | 23 | 23 | 23 | E5 | 23 | 23 | 23 | E5 |
| 06B0 | 23 | C3 | 00 | 24 | 23 | E5 | 23 | E5 | 23 | 23 | E5 | 23 | 23 | 23 | E5 | 23 |
| 06C0 | C3 | 00 | 24 | E5 | 23 | 23 | E5 | 23 | 23 | E5 | 23 | 23 | 23 | E5 | 23 | C3 |
| 06D0 | 00 | 24 | 23 | 23 | E5 | 23 | E5 | 23 | E5 | 23 | 23 | 23 | E5 | 23 | C3 | 00 |
| 06E0 | 24 | E5 | 23 | E5 | 23 | E5 | 23 | E5 | 23 | E5 | 23 | 23 | 23 | E5 | 23 | C3 |
| 06F0 | 00 | 24 | 23 | E5 | 23 | 23 | E5 | 23 | E5 | 23 | 23 | 23 | E5 | 23 | C3 | 00 |
| 0700 | 24 | E5 | 23 | 23 | 23 | E5 | 23 | E5 | 23 | 23 | 23 | E5 | 23 | C3 | 00 | 24 |
| 0710 | 23 | 23 | 23 | E5 | 23 | 23 | 23 | 23 | E5 | 23 | C3 | 00 | 24 | E5 | 23 | E5 |
| 0720 | 23 | 23 | E5 | 23 | 23 | 23 | 23 | E5 | 23 | C3 | 00 | 24 | 23 | E5 | 23 | E5 |
| 0730 | 23 | E5 | 23 | 23 | 23 | 23 | E5 | 23 | C3 | 00 | 24 | E5 | 23 | 23 | E5 | 23 |
| 0740 | E5 | 23 | 23 | 23 | 23 | E5 | 23 | C3 | 00 | 24 | 23 | 23 | E5 | 23 | 23 | 23 |
| 0750 | 23 | 23 | E5 | 23 | C3 | 00 | 24 | E5 | 23 | E5 | 23 | E5 | 23 | 23 | 23 | 23 |
| 0760 | 23 | E5 | 23 | C3 | 00 | 24 | 23 | E5 | 23 | 23 | 23 | 23 | 23 | 23 | E5 | 23 |
| 0770 | C3 | 00 | 24 | E5 | 23 | 23 | 23 | 23 | 23 | 23 | 23 | E5 | 23 | C3 | 00 | 24 |
| 0780 | 23 | 23 | 23 | 23 | 23 | 23 | 23 | E5 | 23 | C3 | 00 | 24 | E5 | 23 | E5 | 23 |
| 0790 | 23 | 23 | 23 | 23 | 23 | E5 | 23 | C3 | 00 | 24 | 23 | E5 | 23 | E5 | 23 | 23 |
| 07A0 | 23 | 23 | 23 | E5 | 23 | C3 | 00 | 24 | E5 | 23 | 23 | E5 | 23 | 23 | 23 | 23 |
| 07B0 | 23 | E5 | 23 | C3 | 00 | 24 | 23 | 23 | E5 | 23 | E5 | 23 | 23 | 23 | 23 | E5 |
| 07C0 | 23 | C3 | 00 | 24 | E5 | 23 | E5 | 23 | E5 | 23 | E5 | 23 | 23 | 23 | 23 | E5 |
| 07D0 | 23 | C3 | 00 | 24 | 23 | E5 | 23 | 23 | E5 | 23 | 23 | 23 | 23 | E5 | 23 | C3 |
| 07E0 | 00 | 24 | E5 | 23 | 23 | 23 | E5 | 23 | 23 | 23 | 23 | E5 | 23 | C3 | 00 | 24 |
| 07F0 | 23 | 23 | 23 | E5 | 23 | E5 | 23 | 23 | 23 | E5 | 23 | C3 | 00 | 24 | E5 | 23 |

| | | | | | | | | | | | | | | | | |
|---|---|---|---|---|---|---|---|---|---|---|---|---|---|---|---|---|
| 0400 | E5 | 23 | 23 | E5 | 23 | E5 | 23 | 23 | 23 | E5 | 23 | C3 | 00 | 24 | 23 | E5 |
| 0410 | 23 | E5 | 23 | E5 | 23 | E5 | 23 | 23 | 23 | E5 | 23 | C3 | 00 | 24 | E5 | 23 |
| 0420 | 23 | E5 | 23 | E5 | 23 | E5 | 23 | 23 | 23 | E5 | 23 | C3 | 00 | 24 | 23 | 23 |
| 0430 | E5 | 23 | 23 | E5 | 23 | 23 | 23 | E5 | 23 | C3 | 00 | 24 | E5 | 23 | E5 | 23 |
| 0440 | E5 | 23 | 23 | E5 | 23 | 23 | 23 | E5 | 23 | C3 | 00 | 24 | 23 | E5 | 23 | 23 |
| 0450 | 23 | E5 | 23 | 23 | 23 | E5 | 23 | C3 | 00 | 24 | E5 | 23 | 23 | 23 | 23 | E5 |
| 0460 | 23 | 23 | 23 | E5 | 23 | C3 | 00 | 24 | 23 | 23 | 23 | 23 | E5 | 23 | E5 | 23 |
| 0470 | 23 | E5 | 23 | C3 | 00 | 24 | E5 | 23 | E5 | 23 | 23 | 23 | E5 | 23 | E5 | 23 |
| 0480 | 23 | E5 | 23 | C3 | 00 | 24 | 23 | E5 | 23 | E5 | 23 | 23 | E5 | 23 | E5 | 23 |
| 0490 | 23 | E5 | 23 | C3 | 00 | 24 | E5 | 23 | 23 | E5 | 23 | 23 | E5 | 23 | E5 | 23 |
| 04A0 | 23 | E5 | 23 | C3 | 00 | 24 | 23 | 23 | E5 | 23 | E5 | 23 | E5 | 23 | E5 | 23 |
| 04B0 | 23 | E5 | 23 | C3 | 00 | 24 | E5 | 23 | E5 | 23 | E5 | 23 | E5 | 23 | E5 | 23 |
| 04C0 | E5 | 23 | 23 | E5 | 23 | C3 | 00 | 24 | 23 | E5 | 23 | 23 | E5 | 23 | E5 | 23 |
| 04D0 | E5 | 23 | 23 | E5 | 23 | C3 | 00 | 24 | E5 | 23 | 23 | 23 | E5 | 23 | E5 | 23 |
| 04E0 | E5 | 23 | 23 | E5 | 23 | C3 | 00 | 24 | 23 | 23 | 23 | E5 | 23 | 23 | E5 | 23 |
| 04F0 | 23 | E5 | 23 | C3 | 00 | 24 | E5 | 23 | E5 | 23 | 23 | E5 | 23 | 23 | E5 | 23 |
| 0500 | 23 | E5 | 23 | C3 | 00 | 24 | 23 | E5 | 23 | E5 | 23 | E5 | 23 | 23 | E5 | 23 |
| 0510 | 23 | E5 | 23 | C3 | 00 | 24 | E5 | 23 | 23 | E5 | 23 | E5 | 23 | 23 | E5 | 23 |
| 0520 | 23 | E5 | 23 | C3 | 00 | 24 | 23 | 23 | E5 | 23 | 23 | 23 | E5 | 23 | 23 | E5 |
| 0530 | 23 | C3 | 00 | 24 | E5 | 23 | E5 | 23 | E5 | 23 | 23 | 23 | E5 | 23 | 23 | E5 |
| 0540 | 23 | C3 | 00 | 24 | 23 | E5 | 23 | 23 | 23 | 23 | E5 | 23 | 23 | E5 | 23 | C3 |
| 0550 | 00 | 24 | E5 | 23 | 23 | 23 | 23 | 23 | E5 | 23 | 23 | E5 | 23 | C3 | 00 | 24 |
| 0560 | 23 | 23 | 23 | 23 | 23 | E5 | 23 | E5 | 23 | E5 | 23 | C3 | 00 | 24 | E5 | 23 |
| 0570 | E5 | 23 | 23 | 23 | 23 | E5 | 23 | E5 | 23 | E5 | 23 | C3 | 00 | 24 | 23 | E5 |
| 0580 | 23 | E5 | 23 | 23 | 23 | E5 | 23 | E5 | 23 | E5 | 23 | C3 | 00 | 24 | E5 | 23 |
| 0590 | 23 | E5 | 23 | 23 | 23 | E5 | 23 | E5 | 23 | E5 | 23 | C3 | 00 | 24 | 23 | 23 |
| 05A0 | E5 | 23 | E5 | 23 | 23 | E5 | 23 | E5 | 23 | E5 | 23 | C3 | 00 | 24 | E5 | 23 |
| 05B0 | E5 | 23 | E5 | 23 | E5 | 23 | 23 | E5 | 23 | E5 | 23 | E5 | 23 | C3 | 00 | 24 |
| 05C0 | 23 | E5 | 23 | 23 | E5 | 23 | 23 | E5 | 23 | E5 | 23 | E5 | 23 | C3 | 00 | 24 |
| 05D0 | E5 | 23 | 23 | 23 | E5 | 23 | 23 | E5 | 23 | E5 | 23 | E5 | 23 | C3 | 00 | 24 |
| 05E0 | 23 | 23 | 23 | E5 | 23 | E5 | 23 | E5 | 23 | E5 | 23 | E5 | 23 | C3 | 00 | 24 |
| 05F0 | E5 | 23 | E5 | 23 | 23 | E5 | 23 | E5 | 23 | E5 | 23 | E5 | 23 | E5 | 23 | C3 |
| 0600 | 00 | 24 | 23 | E5 | 23 | E5 | 23 | E5 | 23 | E5 | 23 | E5 | 23 | E5 | 23 | E5 |
| 0610 | 23 | C3 | 00 | 24 | E5 | 23 | 23 | E5 | 23 | E5 | 23 | E5 | 23 | E5 | 23 | E5 |
| 0620 | 23 | E5 | 23 | C3 | 00 | 24 | 23 | 23 | E5 | 23 | 23 | E5 | 23 | E5 | 23 | E5 |
| 0630 | 23 | E5 | 23 | C3 | 00 | 24 | E5 | 23 | E5 | 23 | E5 | 23 | 23 | E5 | 23 | E5 |
| 0640 | 23 | E5 | 23 | E5 | 23 | C3 | 00 | 24 | 23 | E5 | 23 | 23 | 23 | E5 | 23 | E5 |
| 0650 | 23 | E5 | 23 | E5 | 23 | C3 | 00 | 24 | E5 | 23 | 23 | 23 | 23 | E5 | 23 | E5 |
| 0660 | 23 | E5 | 23 | E5 | 23 | C3 | 00 | 24 | 23 | 23 | 23 | 23 | E5 | 23 | 23 | E5 |
| 0670 | 23 | E5 | 23 | C3 | 00 | 24 | E5 | 23 | E5 | 23 | 23 | 23 | E5 | 23 | 23 | E5 |
| 0680 | 23 | E5 | 23 | C3 | 00 | 24 | 23 | E5 | 23 | E5 | 23 | 23 | E5 | 23 | 23 | E5 |
| 0690 | 23 | E5 | 23 | C3 | 00 | 24 | E5 | 23 | 23 | E5 | 23 | 23 | E5 | 23 | 23 | E5 |
| 06A0 | 23 | E5 | 23 | C3 | 00 | 24 | 23 | 23 | E5 | 23 | E5 | 23 | E5 | 23 | 23 | E5 |
| 06B0 | 23 | E5 | 23 | C3 | 00 | 24 | E5 | 23 | E5 | 23 | E5 | 23 | E5 | 23 | E5 | 23 |
| 06C0 | 23 | E5 | 23 | E5 | 23 | C3 | 00 | 24 | 23 | E5 | 23 | 23 | E5 | 23 | E5 | 23 |
| 06D0 | 23 | E5 | 23 | E5 | 23 | C3 | 00 | 24 | E5 | 23 | 23 | 23 | E5 | 23 | E5 | 23 |
| 06E0 | 23 | E5 | 23 | E5 | 23 | C3 | 00 | 24 | 23 | 23 | 23 | E5 | 23 | 23 | 23 | E5 |
| 06F0 | 23 | E5 | 23 | C3 | 00 | 24 | E5 | 23 | E5 | 23 | 23 | E5 | 23 | 23 | 23 | E5 |
| 0700 | 23 | E5 | 23 | C3 | 00 | 24 | 23 | E5 | 23 | E5 | 23 | E5 | 23 | 23 | 23 | E5 |
| 0710 | 23 | E5 | 23 | C3 | 00 | 24 | E5 | 23 | 23 | E5 | 23 | E5 | 23 | 23 | 23 | E5 |
| 0720 | 23 | E5 | 23 | C3 | 00 | 24 | 23 | 23 | E5 | 23 | 23 | 23 | 23 | E5 | 23 | E5 |
| 0730 | 23 | C3 | 00 | 24 | E5 | 23 | E5 | 23 | E5 | 23 | 23 | 23 | 23 | E5 | 23 | E5 |
| 0740 | 23 | C3 | 00 | 24 | 23 | E5 | 23 | 23 | 23 | 23 | 23 | E5 | 23 | E5 | 23 | C3 |
| 0750 | 00 | 24 | E5 | 23 | 23 | 23 | 23 | 23 | 23 | E5 | 23 | E5 | 23 | C3 | 00 | 24 |
| 0760 | 23 | 23 | 23 | 23 | 23 | 23 | E5 | 23 | 23 | C3 | 00 | 24 | E5 | 23 | E5 | 23 |
| 0770 | 23 | 23 | 23 | 23 | E5 | 23 | 23 | C3 | 00 | 24 | 23 | E5 | 23 | E5 | 23 | 23 |
| 0780 | 23 | 23 | E5 | 23 | 23 | C3 | 00 | 24 | E5 | 23 | 23 | E5 | 23 | 23 | 23 | 23 |
| 0790 | E5 | 23 | 23 | C3 | 00 | 24 | 23 | 23 | E5 | 23 | E5 | 23 | 23 | 23 | E5 | 23 |
| 07A0 | 23 | C3 | 00 | 24 | E5 | 23 | E5 | 23 | E5 | 23 | E5 | 23 | 23 | 23 | E5 | 23 |
| 07B0 | 23 | C3 | 00 | 24 | 23 | E5 | 23 | 23 | E5 | 23 | 23 | 23 | E5 | 23 | 23 | C3 |
| 07C0 | 00 | 24 | E5 | 23 | 23 | 23 | E5 | 23 | 23 | 23 | E5 | 23 | 23 | C3 | 00 | 24 |
| 07D0 | 23 | 23 | 23 | E5 | 23 | E5 | 23 | 23 | E5 | 23 | 23 | C3 | 00 | 24 | E5 | 23 |
| 07E0 | E5 | 23 | 23 | E5 | 23 | E5 | 23 | 23 | E5 | 23 | 23 | C3 | 00 | 24 | 23 | E5 |
| 07F0 | 23 | E5 | 23 | E5 | 23 | E5 | 23 | 23 | E5 | 23 | 23 | C3 | 00 | 24 | E5 | 23 |

```
0400 23 E5 23 E5 23 E5 23 23 E5 23 23 C3 00 24 23 23
0410 E5 23 23 E5 23 23 E5 23 23 C3 00 24 E5 23 E5 23
0420 E5 23 23 E5 23 23 E5 23 23 C3 00 24 23 E5 23 23
0430 23 E5 23 23 E5 23 23 C3 00 24 E5 23 23 23 23 E5
0440 23 23 E5 23 23 C3 00 24 23 23 23 23 E5 23 E5 23
0450 E5 23 23 C3 00 24 E5 23 E5 23 23 23 E5 23 E5 23
0460 E5 23 23 C3 00 24 23 E5 23 E5 23 23 E5 23 E5 23
0470 E5 23 23 C3 00 24 E5 23 23 E5 23 23 E5 23 E5 23
0480 E5 23 23 C3 00 24 23 23 E5 23 E5 23 E5 23 E5 23
0490 E5 23 23 C3 00 24 E5 23 E5 23 E5 23 E5 23 E5 23
04A0 E5 23 E5 23 23 C3 00 24 23 E5 23 23 E5 23 E5 23
04B0 E5 23 E5 23 23 C3 00 24 E5 23 23 23 E5 23 E5 23
04C0 E5 23 E5 23 23 C3 00 24 23 23 23 E5 23 23 E5 23
04D0 E5 23 23 C3 00 24 E5 23 E5 23 23 E5 23 23 E5 23
04E0 E5 23 23 C3 00 24 23 E5 23 E5 23 E5 23 23 E5 23
04F0 E5 23 23 C3 00 24 E5 23 23 E5 23 E5 23 23 E5 23
0500 E5 23 23 C3 00 24 23 23 E5 23 23 23 E5 23 E5 23
0510 23 C3 00 24 E5 23 E5 23 E5 23 23 23 E5 23 E5 23
0520 23 C3 00 24 23 E5 23 23 23 23 E5 23 E5 23 23 C3
0530 00 24 E5 23 23 23 23 23 E5 23 E5 23 23 C3 00 24
0540 23 23 23 23 23 E5 23 23 23 C3 00 24 E5 23 E5 23
0550 23 23 23 E5 23 23 23 C3 00 24 23 E5 23 E5 23 23
0560 23 E5 23 23 23 C3 00 24 E5 23 23 E5 23 23 23 E5
0570 23 23 23 C3 00 24 23 23 E5 23 E5 23 23 E5 23 23
0580 23 C3 00 24 E5 23 E5 23 E5 23 E5 23 23 E5 23 23
0590 23 C3 00 24 23 E5 23 23 E5 23 23 E5 23 23 23 C3
05A0 00 24 E5 23 23 23 E5 23 23 E5 23 23 23 C3 00 24
05B0 23 23 23 E5 23 E5 23 E5 23 23 23 C3 00 24 E5 23
05C0 E5 23 23 E5 23 E5 23 E5 23 23 23 C3 00 24 23 E5
05D0 23 E5 23 E5 23 E5 23 E5 23 23 23 C3 00 24 E5 23
05E0 23 E5 23 E5 23 E5 23 E5 23 23 23 C3 00 24 23 23
05F0 E5 23 23 E5 23 E5 23 23 23 C3 00 24 E5 23 E5 23
0600 E5 23 23 E5 23 E5 23 23 23 C3 00 24 23 E5 23 23
0610 23 E5 23 E5 23 23 23 C3 00 24 E5 23 23 23 23 E5
0620 23 E5 23 23 23 C3 00 24 23 23 23 23 E5 23 23 23
0630 23 C3 00 24 E5 23 E5 23 23 23 E5 23 23 23 23 C3
0640 00 24 23 E5 23 E5 23 23 E5 23 23 23 23 C3 00 24
0650 E5 23 23 E5 23 23 E5 23 23 23 23 C3 00 24 23 23
0660 E5 23 E5 23 E5 23 23 23 23 C3 00 24 E5 23 E5 23
0670 E5 23 E5 23 E5 23 23 23 23 C3 00 24 23 E5 23 23
0680 E5 23 E5 23 23 23 23 C3 00 24 E5 23 23 23 E5 23
0690 E5 23 23 23 23 C3 00 24 23 23 23 E5 23 23 23 23
06A0 23 C3 00 24 E5 23 E5 23 23 E5 23 23 23 23 23 C3
06B0 00 24 23 E5 23 E5 23 E5 23 23 23 23 23 C3 00 24
06C0 E5 23 23 E5 23 E5 23 23 23 23 23 C3 00 24 23 23
06D0 E5 23 23 23 23 23 23 C3 00 24 E5 23 E5 23 E5 23
06E0 23 23 23 23 23 C3 00 24 23 E5 23 23 23 23 23 23
06F0 23 C3 00 24 E5 23 23 23 23 23 23 23 23 C3 00 24
0700 0D 0A 09 4A 4D 50 09 58 32 35 34 0D 0A 09 50 4F
0710 50 09 48 0D 0A 09 4A 4D 50 09 58 32 35 35 0D 0A
0720 0D 0A 0D 0A 09 45 4E 44 0D 0A 0D 0A FF 32 34 33
0730 0D 0A 09 50 4F 50 09 48 0D 0A 09 4A 4D 50 09 58
0740 32 34 34 0D 0A 09 50 4F 50 09 48 0D 0A 09 4A 4D
0750 50 09 58 32 34 35 0D 0A 09 50 4F 50 09 48 0D 0A
0760 09 4A 4D 50 09 58 32 34 36 0D 0A 09 50 4F 50 09
0770 48 0D 0A 09 4A 4D 50 09 58 32 34 37 0D 0A 09 50
0780 4F 50 09 48 0D 0A 09 4A 4D 50 09 58 32 34 38 0D
0790 0A 09 50 4F 50 09 48 0D 0A 09 4A 4D 50 09 58 32
07A0 34 39 0D 0A 09 50 4F 50 09 48 0D 0A 09 4A 4D 50
07B0 09 58 32 35 30 0D 0A 09 50 4F 50 09 48 0D 0A 09
07C0 4A 4D 50 09 58 32 35 31 0D 0A 09 50 4F 50 09 48
07D0 0D 0A 09 4A 4D 50 09 58 32 35 32 0D 0A 09 50 4F
07E0 50 09 48 0D 0A 09 4A 4D 50 09 58 32 35 33 0D 0A
07F0 09 50 4F 50 09 48 0D 0A 09 4A 4D 50 09 58 32 35
```

| | | | | | | | | | | | | | | | | |
|---|---|---|---|---|---|---|---|---|---|---|---|---|---|---|---|---|
| 0400 | C3 | 03 | F0 | AF | D3 | F8 | 21 | 00 | 00 | 22 | B8 | 13 | 24 | 22 | AE | 13 |
| 0410 | 32 | B0 | 13 | 4C | 31 | 0A | 13 | CD | 1B | F1 | 3E | 02 | F5 | 32 | B7 | 13 |
| 0420 | D3 | F8 | DB | F8 | E6 | 04 | 2F | CA | 2B | F0 | 1F | CD | D4 | F0 | F1 | 07 |
| 0430 | D2 | 1C | F0 | 31 | 0A | 13 | CD | 3C | F0 | C3 | 33 | F0 | 3E | 03 | CD | 1B |
| 0440 | F1 | 3A | B8 | 13 | FE | 08 | C2 | 56 | F0 | 3A | BB | 13 | FE | 4D | DA | 64 |
| 0450 | F0 | 3E | 03 | C3 | 90 | F1 | 79 | 3C | C8 | 0D | C0 | 97 | D3 | F8 | 32 | B7 |
| 0460 | 13 | C3 | 33 | F0 | 3A | B7 | 13 | 4F | 3A | BA | 13 | C6 | EF | 6F | 26 | F3 |
| 0470 | 7E | D3 | F8 | 32 | B7 | 13 | A9 | E6 | E7 | CA | 81 | F0 | 3E | 05 | CD | 1B |
| 0480 | F1 | CD | F3 | F3 | 3A | B0 | 13 | 1F | DA | E8 | F3 | 3A | BC | 13 | 32 | B6 |
| 0490 | 13 | 3A | BF | 13 | 32 | B2 | 13 | 2A | BD | 13 | 22 | B4 | 13 | 3A | B9 | 13 |
| 04A0 | FE | 06 | CA | 3C | F3 | CD | 23 | F1 | 3A | BB | 13 | 4F | 78 | 04 | CA | A5 |
| 04B0 | F0 | 91 | C2 | CE | F0 | 3A | B9 | 13 | 3D | CA | 1C | F2 | 3D | CA | A6 | F1 |
| 04C0 | 3D | CA | 1C | F2 | C3 | 51 | F0 | AF | 32 | B8 | 13 | 0E | 2A | C9 | CD | D4 |
| 04D0 | F0 | C3 | A5 | F0 | 47 | B7 | FA | F5 | F0 | 3A | B7 | 13 | 4F | E6 | F7 | F6 |
| 04E0 | 10 | 57 | DB | F8 | E6 | 04 | 3E | 02 | CA | 1B | F1 | CD | 03 | F1 | 05 | CA |
| 04F0 | E6 | F0 | C3 | E2 | F0 | 78 | 2F | 3C | 47 | 3A | B7 | 13 | 4F | F6 | 18 | 57 |
| 0500 | C3 | EB | F0 | 7A | D3 | F8 | 79 | D3 | F8 | C5 | 06 | FE | 22 | 0C | F1 | 22 |
| 0510 | 0F | F1 | 22 | 12 | F1 | 05 | C2 | 0C | F1 | C1 | C9 | CD | 09 | F1 | 3D | C2 |
| 0520 | 1B | F1 | C9 | DB | F8 | E6 | 10 | 3E | 01 | C2 | 90 | F1 | 21 | B1 | 13 | 35 |
| 0530 | 3E | 04 | CA | 90 | F1 | 3A | BC | 13 | 57 | DB | F4 | B7 | C2 | 39 | F1 | DB |
| 0540 | F5 | FE | FE | C2 | 39 | F1 | DB | F4 | 47 | DB | F4 | 6F | DB | F4 | 4F | DB |
| 0550 | F4 | 67 | DB | F4 | DB | F4 | DB | F4 | DB | F8 | 17 | D0 | 21 | B3 | 13 | 35 |
| 0560 | 3E | 02 | CA | 90 | F1 | 3A | B9 | 13 | FE | 06 | CA | 60 | F1 | CD | F8 | F3 |
| 0570 | 7E | FE | 28 | 01 | FF | FF | C0 | DB | F8 | E6 | 04 | 3E | 01 | C2 | 82 | F1 |
| 0580 | 3E | FF | E1 | CD | D4 | F0 | C3 | 8B | F0 | CD | 5C | F1 | C3 | 8B | F0 | AF |
| 0590 | 32 | B8 | 13 | 3A | B9 | 13 | FE | 06 | CA | 33 | F0 | 3E | 4D | CD | D4 | F0 |
| 05A0 | 0E | FF | AF | C3 | 5C | F0 | DB | F8 | E6 | 20 | 3E | 05 | CA | 90 | F1 | 3A |
| 05B0 | 07 | F0 | 1F | DA | CC | F2 | CD | 2C | F1 | 7A | B9 | C2 | AF | F1 | 2A | BD |
| 05C0 | 13 | EB | 0E | 22 | 0D | C2 | C4 | F1 | 0E | 06 | AF | 0D | D3 | F1 | C2 | CB |
| 05D0 | F1 | 3E | FB | D3 | F0 | 0E | 40 | 1A | D3 | F1 | 13 | 1A | 0D | D3 | F1 | 13 |
| 05E0 | C2 | D7 | F1 | D3 | F2 | D3 | F2 | 3E | FF | D3 | F1 | EB | 22 | BD | 13 | CD |
| 05F0 | F8 | F3 | 21 | BF | 13 | 35 | CA | 03 | F2 | 21 | BC | 13 | 34 | 7E | FE | 1B |
| 0600 | C2 | AF | F1 | 3A | B2 | 13 | 32 | BF | 13 | 3A | B6 | 13 | 32 | BC | 13 | 2A |
| 0610 | B4 | 13 | 22 | BD | 13 | 3A | 07 | F0 | 1F | DA | C7 | F0 | CD | 2C | F1 | 7A |
| 0620 | B9 | C2 | 1C | F2 | EB | 2A | BD | 13 | 3A | 07 | F0 | 1F | DA | 35 | F2 | 11 |
| 0630 | 7F | 00 | C3 | 48 | F2 | 3A | B9 | 13 | 3D | CA | 41 | F2 | 23 | 23 | C3 | 46 |
| 0640 | F2 | 71 | 23 | 73 | 23 | 72 | 23 | 1B | EB | 3A | B9 | 13 | 47 | DB | F4 | B7 |
| 0650 | C2 | 4D | F2 | 05 | 01 | FF | FF | CA | 6D | F2 | DB | F5 | E6 | F8 | FE | F8 |
| 0660 | C2 | 5A | F2 | DB | F4 | 13 | 09 | DA | 63 | F2 | C3 | 7E | F2 | DB | F5 | E6 |
| 0670 | F8 | FE | F8 | C2 | 6D | F2 | DB | F4 | 12 | 13 | 09 | DA | 76 | F2 | DB | F4 |
| 0680 | DB | F4 | DB | F4 | DB | F8 | 17 | D2 | 97 | F2 | 3A | B3 | 13 | 3D | C2 | 89 |
| 0690 | F1 | 32 | AF | 13 | C3 | 89 | F1 | EB | 22 | BD | 13 | CD | F3 | F3 | 21 | BC |
| 06A0 | 13 | 34 | 46 | 11 | 07 | F0 | 1A | 1F | DA | B7 | F2 | 78 | FE | 1B | C2 | B7 |
| 06B0 | F2 | 36 | 01 | 21 | BB | 13 | 34 | 21 | BF | 13 | 35 | CA | C7 | F0 | 1A | 1F |
| 06C0 | DA | 1C | F2 | 78 | FE | 1B | C2 | 1C | F2 | C3 | 81 | F0 | 2A | BD | 13 | EB |
| 06D0 | DB | F8 | E6 | 40 | CA | CC | F2 | DB | F8 | E6 | 40 | C2 | D7 | F2 | 26 | 4E |
| 06E0 | 3E | FF | D3 | F1 | 25 | C2 | E2 | F2 | 06 | 0A | 97 | D3 | F1 | 05 | C2 | EB |
| 06F0 | F2 | 3E | FE | D3 | F0 | 1A | 47 | 13 | 3A | BB | 13 | D3 | F1 | 1A | 6F | 13 |
| 0700 | D3 | F1 | 78 | D3 | F1 | 1A | 67 | 13 | D3 | F1 | 2B | D3 | F2 | D3 | F2 | 06 |
| 0710 | 07 | 97 | D3 | F1 | 05 | C2 | 12 | F3 | 3E | FB | D3 | F0 | 01 | FF | FF | 1A |
| 0720 | D3 | F1 | 13 | 09 | DA | 1F | F3 | D3 | F2 | D3 | F2 | 21 | BF | 13 | 78 | 35 |
| 0730 | D3 | F1 | C2 | E8 | F2 | EB | 22 | BD | 13 | C3 | DB | F3 | 3A | BB | 13 | B7 |
| 0740 | C2 | 55 | F3 | 3E | 4D | CD | D4 | F0 | 3E | FF | CD | D4 | F0 | 3E | 01 | CD |
| 0750 | D4 | F0 | C3 | 5A | F3 | 3E | FF | CD | D4 | F0 | 3E | 06 | CD | 1B | F1 | 3E |
| 0760 | 1A | 32 | BF | 13 | 21 | BC | 13 | 36 | 01 | DB | F8 | E6 | 40 | CA | 69 | F3 |
| 0770 | 0E | 4F | DB | F8 | E6 | 40 | C2 | 72 | F3 | 3E | FF | D3 | F1 | 0D | C2 | 7B |
| 0780 | F3 | AF | 0E | 06 | D3 | F1 | 0D | C2 | 84 | F3 | 3E | FE | D3 | F0 | 3A | BB |
| 0790 | 13 | D3 | F1 | AF | D3 | F1 | 7E | D3 | F1 | AF | D3 | F1 | D3 | F2 | 0E | 0B |
| 07A0 | D3 | F2 | 78 | D3 | F1 | 0D | C2 | A3 | F3 | 0E | 06 | AF | D3 | F1 | 0D | C2 |
| 07B0 | AC | F3 | 3E | FB | D3 | F0 | 0E | 80 | 3E | 20 | D3 | F1 | 0D | C2 | BA | F3 |
| 07C0 | D3 | F2 | 0E | 18 | D3 | F2 | 78 | D3 | F1 | 0D | C2 | C7 | F3 | 34 | D3 | F1 |
| 07D0 | D3 | F1 | 7E | FE | 1B | 78 | D3 | F1 | C2 | 81 | F3 | 78 | D3 | F1 | DB | F8 |
| 07E0 | E6 | 40 | C2 | DB | F3 | C3 | 03 | F2 | 97 | 32 | B0 | 13 | C3 | 9B | F2 | 42 |
| 07F0 | 44 | 60 | C0 | 3E | FF | 32 | B3 | 13 | 3E | 3C | 32 | B1 | 13 | C9 | 14 | 09 |

```
0400 31 00 14 97 32 0A 13 00 00 00 00 3E C1 32 03 80
0410 21 01 80 36 70 36 D0 3A 02 80 E6 20 CA 17 00 3A
0420 00 80 47 3A 0A 13 1F D2 68 00 2A 0B 13 70 23 22
0430 0B 13 3E 13 BC C3 DE 00 21 02 00 22 B9 13 21 00
0440 10 22 BD 13 3E 06 32 BF 13 21 B8 13 36 08 7E FE
0450 08 CA 4E 00 B7 C2 60 00 06 20 CD D2 00 C3 17 00
0460 06 21 CD D2 00 C3 17 00 78 FE 22 C2 A9 00 21 06
0470 00 22 B9 13 97 32 BB 13 3E 01 32 BC 13 3E 1A 32
0480 BF 13 21 B8 13 36 08 7E FE 08 CA 87 00 B7 C2 A1
0490 00 3A BB 13 FE 4D C2 78 00 06 20 CD D2 00 C3 17
04A0 00 06 21 CD D2 00 C3 17 00 FE 23 C2 B7 00 21 00
04B0 01 22 BB 13 C3 17 00 FE 24 C2 CA 00 21 00 10 22
04C0 0B 13 3E 01 32 0A 13 C3 17 00 06 21 CD D2 00 C3
04D0 17 00 3A 02 80 17 D2 D2 00 78 32 00 80 C9 C2 17
04E0 00 97 32 0A 13 C3 38 00 E4 07 C3 ED 07 C3 51 0E
04F0 C3 17 0F C3 2E 0F C3 37 0F C3 3C 0F C3 41 0F C3
0500 46 0F C3 5E 12 C3 DE 12 C3 B6 12 C3 94 12 C3 D3
0510 11 C3 99 13 C3 3E 12 C3 06 13 C3 0F 13 C3 20 13
0520 C3 37 13 C3 3D 13 C3 6F 13 C3 75 13 C3 7B 13 C3
0530 8C 13 C3 A2 13 C3 A7 13 C3 92 33 C3 BA 13 C3 6B
0540 35 C3 FC 13 C3 32 31 C3 AF 31 C3 27 19 C3 E7 1A
0550 C3 53 1B C3 00 28 C3 C8 31 C3 00 28 C3 4D 15 C3
0560 FF 14 C3 7D 19 C3 EC 14 C3 49 14 C3 18 17 C3 BF
0570 01 C3 B0 01 C3 78 23 C3 DF 16 C3 C0 31 C3 2F 00
0580 C3 74 01 C3 FD 09 C3 B7 1B C3 1A 16 C3 E7 1F C3
0590 12 2B C3 DA 1C C3 B8 1C C3 C8 1C C3 68 1C C3 24
05A0 34 C3 71 1C C3 2C 34 C3 84 1C C3 7F 1D C3 63 23
05B0 C3 15 16 C3 27 35 C3 A2 20 C3 A2 20 C3 A2 20 C3
05C0 FB 34 C3 1F 31 C3 E5 03 C3 4B 34 DA 98 2B 21 26
05D0 3B 7E 23 B6 C2 EB 2B C3 1B 2B CD 5F 21 3E 01 32
05E0 46 3B C9 FF FF FF FF FF FF FF FE 3B 06 15 CA 64
05F0 34 FE 0D 06 12 CA 64 34 FE 83 0E 29 C3 53 34 34
0600 F5 E5 32 98 81 3A 1D 3B 0F DA 71 35 3A 2D 3B 0F
0610 C3 D8 30 97 32 28 3B C3 2D 35 67 6F 22 79 38 3A
0620 8B 80 C3 E5 30 C2 2A 22 26 54 FE 7F C2 31 22 26
0630 4F FE 4B C2 3E 22 3E 01 32 51 3B C3 59 22 6F 3A
0640 51 3B 0F C3 20 30 7D FE 59 CA 55 22 FE 4C CA 55
0650 22 7C F6 60 67 97 32 51 3B 7C 2A BB 38 26 39 C3
0660 5E 35 2C 7D 32 BB 38 C3 17 31 C9 3A 8B 80 87 FE
0670 B8 C2 67 22 97 C3 0E 31 32 78 81 CD 71 21 F1 F1
0680 F1 FB C9 15 20 26 39 D2 9B 22 97 32 0C 3B 7E E6
0690 7F FE 59 CA AF 22 FE 4C CA B4 22 7E 07 32 0B 3B
06A0 7E E6 7F 4F 06 2F 0A 5F 3E 80 81 4F 0A 57 C9 1E
06B0 B0 C3 B6 22 1E B1 97 57 C9 3A 8F 80 4F 3A 97 80
06C0 E6 0F 47 CD 0F 20 EB 2A E1 2E 4D 44 CD 00 20 65
06D0 6A 7B 17 D2 D7 22 23 EB 2A 29 3A EB 3A 2B 3A 07
06E0 DC 5A 20 22 DA 38 3A 8D 80 E6 0F 32 CB 38 3A 22
06F0 3B 0F 2F 47 3A 8C 80 E6 03 0F A0 32 D5 38 0F DA
0700 07 23 3E 01 32 46 3B 3A 94 80 E6 0F FE 03 D2 17
0710 23 47 87 87 80 C6 0F 32 D9 38 3A 8C 80 E6 10 3E
0720 03 C2 25 23 3C 32 D6 38 3A C7 38 32 C6 38 21 00
0730 00 22 D3 38 97 32 D7 38 32 E9 38 32 1C 3B 22 1A
0740 3B 32 BF 38 32 C3 38 32 31 3B 32 37 3B 32 2B 3B
0750 32 33 3B 32 3F 3B 22 40 3B 32 54 3B 32 CD 38 32
0760 57 3B C9 E5 CD 2A 20 E1 FE 1C CA 70 23 FE 28 D8
0770 7B FE 45 C8 00 FE 6B C9 C5 77 C3 81 23 00 C3 6C
0780 34 01 5C 3A FE 5E 3E 01 CA 8C 34 0A 3D CA 7F 34
0790 3D 3E 00 CA 8C 34 00 7E FE 71 01 B5 17 CA 64 34
07A0 FE 72 06 10 CA 64 34 FE 70 06 18 CA 64 34 FE 79
07B0 0E AF CA 64 34 FE BD 06 10 CA 64 34 FE BF 06 17
07C0 CA 64 34 FE 73 0E A9 CA 64 34 FE 9A 0E A5 CA 64
07D0 34 FE 82 0E A1 CA 64 34 FE 8A 01 21 13 CA 64 34
07E0 FE 81 01 35 12 CA 64 34 FE A0 06 15 CA 64 34 FE
07F0 89 06 13 CA 64 34 FE 88 0E 2F CA 64 34 C3 EA 21
```

| | | | | | | | | | | | | | | | | |
|---|---|---|---|---|---|---|---|---|---|---|---|---|---|---|---|---|
| 0400 | C3 | 00 | 14 | 00 | 00 | 00 | 00 | FF | FF | FF | FF | FF | FF | FF | FF | FF |
| 0410 | FF | FF | FF | FF | FF | FF | FF | FF | FF | FF | FF | FF | FF | FF | FF | FF |
| 0420 | CD | 76 | 05 | 2A | 1B | 10 | 23 | 23 | 22 | 1F | 10 | 97 | 32 | 27 | 10 | 67 |
| 0430 | 6F | 22 | 23 | 10 | 2A | 1F | 10 | 5E | 23 | 7E | E6 | 7F | 57 | EB | 22 | 25 |
| 0440 | 10 | 01 | 27 | 10 | 7D | B4 | CA | A6 | 00 | 0A | 2F | 02 | EB | 2A | 0E | 10 |
| 0450 | CD | D6 | 0B | DA | 65 | 00 | EB | 22 | 23 | 10 | 2A | 1F | 10 | 23 | 23 | 22 |
| 0460 | 1F | 10 | C3 | 37 | 00 | 0A | 47 | 3A | 28 | 10 | A8 | C2 | B2 | 00 | 2A | 1D |
| 0470 | 10 | 23 | 23 | 5E | 23 | 56 | 2A | 25 | 10 | 7B | B2 | CA | 89 | 00 | 7A | 07 |
| 0480 | DA | 89 | 00 | CD | D6 | 0B | D2 | 0D | 01 | 22 | 0E | 10 | 2A | 1F | 10 | 22 |
| 0490 | 1D | 10 | 2A | 1D | 10 | 23 | 7E | 07 | DA | A0 | 00 | C3 | 42 | 0C | 77 | C9 |
| 04A0 | 3E | 01 | 32 | 2A | 10 | C9 | 0A | A7 | C4 | 3A | 0B | 3A | 28 | 10 | A7 | C2 |
| 04B0 | FB | 00 | 2A | 1D | 10 | 2B | 7E | 07 | DA | EA | 00 | 56 | 2B | 5E | 7B | B2 |
| 04C0 | CA | EA | 00 | 2A | 23 | 10 | CD | D6 | 0B | D2 | EA | 00 | EB | 22 | 0E | 10 |
| 04D0 | 2A | 1D | 10 | 2B | 2B | 22 | 1D | 10 | 21 | 28 | 10 | 7E | 2F | 77 | 21 | 29 |
| 04E0 | 10 | 7E | 2F | 77 | CD | 76 | 05 | C3 | 92 | 00 | 2A | 23 | 10 | 22 | 0E | 10 |
| 04F0 | 2A | 1F | 10 | 2B | 2B | 22 | 1D | 10 | C3 | 92 | 00 | 2A | 1D | 10 | 23 | 23 |
| 0500 | 5E | 23 | 7E | 07 | DC | 3A | 0B | 56 | 7A | B3 | CC | 3A | 0B | EB | 22 | 0E |
| 0510 | 10 | 2A | 1D | 10 | 23 | 23 | C3 | D5 | 00 | 00 | 3A | 29 | 10 | B7 | C2 | 39 |
| 0520 | 02 | 2A | 4E | 10 | EB | 2A | 0E | 10 | CD | D6 | 0B | D2 | 39 | 02 | CD | C5 |
| 0530 | 01 | 11 | 06 | 00 | CD | D6 | 0B | D2 | 89 | 02 | 4D | CD | D0 | 01 | 11 | 07 |
| 0540 | 00 | CD | D6 | 0B | D2 | 2C | 02 | 45 | 79 | FE | 01 | CA | DB | 01 | FE | 02 |
| 0550 | CA | 89 | 01 | FE | 03 | CA | 7D | 01 | FE | 04 | CA | 6A | 01 | B7 | CA | DB |
| 0560 | 01 | 78 | FE | 03 | DA | 92 | 01 | CD | B3 | 01 | 2A | 4C | 10 | 23 | 22 | 0C |
| 0570 | 10 | 2A | 4E | 10 | 22 | 0E | 10 | CD | 39 | 02 | C3 | DB | 01 | 78 | FE | 03 |
| 0580 | D2 | 6A | 01 | 2A | 4C | 10 | C3 | 6E | 01 | 78 | FE | 03 | DA | 95 | 01 | C3 |
| 0590 | 6A | 01 | CD | B3 | 01 | 3A | 16 | 10 | FE | 04 | D4 | 3A | 0B | 2A | 4C | 10 |
| 05A0 | 23 | 22 | 0C | 10 | 2A | 12 | 10 | 2B | 2B | 2B | 22 | 0E | 10 | CD | 39 | 02 |
| 05B0 | C3 | DB | 01 | 2A | 4C | 10 | 23 | 23 | 22 | 0C | 10 | 2A | 12 | 10 | 22 | 0E |
| 05C0 | 10 | CD | 39 | 02 | C9 | 2A | 4C | 10 | EB | 2A | 10 | 10 | CD | DC | 0B | C9 |
| 05D0 | 2A | 12 | 10 | EB | 2A | 4E | 10 | CD | DC | 0B | C9 | CD | C5 | 01 | 7D | FE |
| 05E0 | 02 | D4 | 3A | 0B | 3D | CA | F4 | 01 | CD | D0 | 01 | 7D | B7 | CA | F4 | 01 |
| 05F0 | 3D | C4 | 3A | 0B | 31 | FD | 7F | 2A | 1B | 10 | 11 | 82 | 52 | CD | D6 | 0B |
| 0600 | DA | 1C | 02 | 06 | 05 | 2B | 7E | 2B | B6 | CA | 15 | 02 | 23 | 7E | F6 | 80 |
| 0610 | 77 | 2B | C3 | 05 | 02 | 05 | CA | 01 | 0A | C3 | 05 | 02 | 2A | 1B | 10 | E5 |
| 0620 | CD | 1B | 06 | EB | E1 | 7B | B5 | 5F | EB | C3 | 03 | 02 | 2A | 0C | 10 | EB |
| 0630 | 2A | 4C | 10 | CD | D6 | 0B | CA | 6A | 01 | 2A | 10 | 10 | EB | 2A | 0C | 10 |
| 0640 | CD | DC | 0B | 7D | 32 | 14 | 10 | 2A | 12 | 10 | EB | 2A | 0E | 10 | CD | DC |
| 0650 | 0B | EB | D2 | 64 | 02 | 21 | 02 | 00 | 19 | DA | 73 | 02 | 3E | FD | 32 | 15 |
| 0660 | 10 | C3 | 87 | 02 | 21 | FD | FF | 19 | D2 | 73 | 02 | 3E | 03 | 32 | 15 | 10 |
| 0670 | C3 | 87 | 02 | 7B | 32 | 15 | 10 | 3A | 14 | 10 | A7 | FA | 84 | 02 | FE | 03 |
| 0680 | C0 | C3 | 87 | 02 | FE | FD | C0 | 2A | 14 | 10 | EB | 3A | 16 | 10 | 4F | FE |
| 0690 | 02 | DA | B9 | 02 | FE | 05 | D2 | C0 | 02 | 7B | B7 | CA | A1 | 02 | F4 | 3A |
| 06A0 | 0B | 7A | 17 | D2 | B3 | 02 | 79 | FE | 04 | C2 | E8 | 02 | 97 | 32 | 15 | 10 |
| 06B0 | C3 | E8 | 02 | 79 | FE | 02 | C3 | A9 | 02 | B7 | C2 | D8 | 02 | C3 | C3 | 02 |
| 06C0 | CA | D8 | 02 | 7B | B7 | FA | 50 | 0D | 7A | B7 | F2 | D3 | 02 | 79 | FE | 06 |
| 06D0 | C3 | A9 | 02 | 79 | B7 | C3 | A9 | 02 | 7A | 17 | 79 | D2 | E3 | 02 | FE | 05 |
| 06E0 | C3 | A9 | 02 | FE | 01 | C3 | A9 | 02 | 3A | 15 | 10 | FE | 03 | CA | 03 | 03 |
| 06F0 | FE | FD | CA | 03 | 03 | 3A | 14 | 10 | FE | 03 | CA | 03 | 03 | FE | FD | CA |
| 0700 | 03 | 03 | C9 | 2A | 16 | 10 | 26 | 00 | 29 | 11 | 12 | 03 | 19 | 5E | 23 | 56 |
| 0710 | EB | E9 | 22 | 03 | F7 | 03 | E6 | 03 | D1 | 03 | BC | 03 | A6 | 03 | 90 | 03 |
| 0720 | 79 | 03 | 3A | 14 | 10 | FE | 03 | C2 | 32 | 03 | 3A | 15 | 10 | C6 | 09 | C3 |
| 0730 | 34 | 03 | C6 | 03 | 6F | 26 | 00 | 11 | 0B | 04 | 19 | 7E | E6 | 0F | 47 | 11 |
| 0740 | 16 | 10 | 1A | 80 | E6 | 07 | 12 | 7E | E6 | F0 | 0F | 0F | 0F | 0F | FE | 08 |
| 0750 | DA | 5B | 03 | D6 | 08 | F5 | 97 | CD | 18 | 04 | E1 | CD | 18 | 04 | 2A | 0C |
| 0760 | 10 | 22 | 10 | 10 | 3A | 15 | 10 | 5F | 16 | 00 | 07 | D2 | 6F | 03 | 15 | 2A |
| 0770 | 12 | 10 | 19 | 22 | 12 | 10 | C3 | 1A | 01 | 3A | 15 | 10 | FE | 03 | 21 | 14 |
| 0780 | 10 | 02 | 8A | 03 | 3E | 00 | 96 | 03 | 34 | 03 | C6 | 03 | 86 | C3 | 34 | 03 |
| 0790 | 3A | 15 | 10 | FE | 03 | C2 | A1 | 03 | 21 | 14 | 10 | 3E | 09 | 96 | C3 | 34 |
| 07A0 | 03 | 06 | 03 | C3 | 34 | 03 | 3A | 14 | 10 | FE | FD | 21 | 15 | 10 | C2 | B4 |
| 07B0 | 03 | 03 | 84 | 03 | 57 | 3E | 03 | 92 | 86 | C3 | 34 | 03 | 3A | 14 | 10 | FE |
| 07C0 | FD | 02 | CA | 03 | 21 | 15 | 10 | C3 | 9B | 03 | 57 | 3E | 03 | 92 | C3 | 34 |
| 07D0 | 03 | 3A | 15 | 10 | FE | FD | 21 | 14 | 10 | C2 | E2 | 03 | 3E | 0C | 86 | C3 |
| 07E0 | 34 | 03 | 86 | 03 | CA | 03 | 3A | 15 | 10 | FE | FD | 02 | CA | 03 | 21 | 14 |
| 07F0 | 10 | 3E | 09 | 86 | C3 | 34 | 03 | 3A | 14 | 10 | FE | 03 | 21 | 15 | 10 | C2 |

```
0400 05 04 C3 DC 03 C6 03 96 C3 34 03 D2 E2 F2 71 61
0410 51 40 3F 2F 1F 9E AE BE 47 FE 04 C2 96 04 21 17
0420 10 7E 0F D2 49 04 0F D2 6C 04 0F D2 91 04 97 77
0430 3C 32 18 10 CD 0E 05 2B 36 01 2B CD 18 05 2B 36
0440 00 2A 19 10 23 22 19 10 C9 3A 18 10 0F DA 55 04
0450 36 01 C3 9C 04 CD 0E 05 2B 34 CD 18 05 7E D6 07
0460 C2 41 04 32 17 10 32 18 10 C3 41 04 3A 18 10 0F
0470 DA 78 04 36 03 C3 9C 04 0F DA 84 04 3E 03 32 18
0480 10 C3 9C 04 97 77 CD 0E 05 2B 2B 77 06 01 C3 9C
0490 04 36 07 C3 9C 04 21 00 00 22 17 10 2A 19 10 23
04A0 22 19 10 3A 0B 10 FE 0B C2 05 05 21 00 10 5E 23
04B0 7E 07 07 07 B3 5F 23 7E 1F 1F 1F F5 B3 5F F1 23
04C0 7E 17 57 23 7E 07 07 07 07 B2 57 23 7E 0F E6 80
04D0 B2 57 7E 1F 4F 23 7E 07 07 B1 4F 23 7E 0F 0F 0F
04E0 B1 4F 23 7E 32 00 10 23 7E 32 01 10 23 7E 32 02
04F0 10 2A 21 10 CD 20 0C 73 23 72 23 71 23 22 21 10
0500 3E 03 32 0B 10 CD 0E 05 70 21 0B 10 34 C9 2A 0B
0510 10 26 00 11 00 10 19 C9 E5 2A 43 10 23 22 43 10
0520 E1 C9 D5 11 30 51 CD D6 0B DA 74 05 C5 E5 3A 3F
0530 10 CD 85 0A 97 32 3F 10 2A 41 10 EB E1 CD DC 0B
0540 4D 44 21 00 40 1A 77 23 13 0B 79 B0 C2 45 05 E5
0550 2A 41 10 EB 2A 2E 10 CD DC 0B EB 21 00 40 22 41
0560 10 19 22 2E 10 2A 2C 10 34 2A 45 10 22 34 10 E1
0570 22 21 10 C1 D1 C9 3A 29 10 2A 1B 10 0F D2 A3 05
0580 11 80 61 CD D6 0B DA 8F 05 CD C8 05 2A 1B 10 23
0590 23 22 1B 10 7E 23 B6 2B C2 8F 05 2A 0C 10 23 22
05A0 0C 10 C9 11 00 52 CD D6 0B CC 1B 06 2B 7E 2B B6
05B0 C2 A6 05 22 1B 10 2A 0C 10 2B 22 0C 10 C9 11 80
05C0 61 2A 1D 10 CD D6 0B D8 21 00 52 22 BD 13 3E 1F
05D0 32 BF 13 2A 3A 10 22 BB 13 CD 11 07 2A BB 13 22
05E0 3A 10 7C 3C 32 BC 13 0E 80 2A BD 13 EB 21 00 52
05F0 1A 77 23 13 0D C2 F0 05 22 BD 13 3E 1F 32 BF 13
0600 EB 2A 1D 10 7D E6 7F 6F 62 22 1D 10 2A 1B 10 7D
0610 E6 7F 62 6F 22 1B 10 CD B6 06 C9 21 80 52 22 BD
0620 13 3E 1F 32 BF 13 2A 3A 10 24 22 BB 13 CD 11 07
0630 3A 3A 10 FE 02 DA 58 06 3E 1F 32 BF 13 47 3A 3B
0640 10 3D C2 4B 06 21 3A 10 35 3E 1A 05 C2 41 06 32
0650 3B 10 21 80 61 C3 7B 06 B7 CA AF 06 3A 3B 10 FE
0660 07 D2 38 06 3D C6 1A 32 BF 13 21 00 01 22 3A 10
0670 11 80 00 21 00 52 19 3D C2 76 06 22 1B 10 11 00
0680 52 0E 80 1A 77 13 23 0D C2 83 06 2B EB 2A 1D 10
0690 7B E6 80 B5 6F 62 22 1D 10 2A 3A 10 22 BB 13 21
06A0 00 52 22 BD 13 CD B6 06 11 00 52 2A 1B 10 C9 3A
06B0 3B 10 3D C3 67 06 3E 01 32 B9 13 97 32 AE 13 00
06C0 32 BA 13 3A BB 13 FE 4B 3A BF 13 DA E8 06 3A 3B
06D0 10 C2 0B 07 FE 15 06 00 DA E1 06 47 3E 34 C3 E4
06E0 06 3A BF 13 90 32 BF 13 32 47 10 2A BB 13 7C B7
06F0 CA 01 07 FE 1B DA 07 07 26 01 2C 22 BB 13 C3 07
0700 07 26 1A 2D C3 FE 06 CD C9 0B C9 47 3E 1A C3 E4
0710 06 3E 02 C3 B8 06 21 00 00 22 0C 10 22 10 10 2A
0720 38 10 24 22 BB 13 21 00 52 22 BD 13 22 1D 10 3E
0730 20 32 BF 13 2A BB 13 22 3A 10 CD B6 06 2A 1D 10
0740 CD BE 0B CA D6 07 7B B2 C2 72 07 2B 22 1B 10 EB
0750 2A 0C 10 23 22 0C 10 22 10 10 EB 23 23 11 80 61
0760 CD D6 0B DA 40 07 22 1B 10 CD C8 05 2A 1B 10 C3
0770 40 07 7A 17 DA 9A 08 EB 22 12 10 EB 7A F6 80 77
0780 23 22 1D 10 CD BE 05 2A 1D 10 5E 23 7E 17 DC 3A
0790 0B 7E C3 00 0C 56 7E F6 80 77 EB 22 0E 10 97 32
07A0 28 10 32 2A 10 2F 32 29 10 3E 05 32 16 10 EB 2B
07B0 22 1D 10 EB 2A 1B 10 EB CD DC 0B 7D E6 02 C8 3E
07C0 FF 32 28 10 C9 E5 2A 0C 10 11 F0 07 CD D6 0B E1
07D0 DC 3A 0B C3 4B 07 2B C3 C0 0C 23 23 CD BE 0B CA
07E0 B2 08 7A 32 40 10 7B 32 49 10 3A 3D 10 B7 CA F8
07F0 07 21 3F 10 34 CD B8 08 2A 2C 10 3A 40 10 77 47
```

APPENDIX D

```
0400 EB 2A 00 63 23 22 00 63 2B EB 3A 48 10 B7 CA 21
0410 08 2B 2B 2B 2B 2B 7E B8 CA A9 08 1B 7B B2 C2 11
0420 08 2A 2C 10 23 3A 49 10 77 23 3A 3E 10 77 22 2C
0430 10 21 00 52 EB 2A 1D 10 CD DC 0B 7C 87 67 7D 17
0440 D2 44 08 24 3A 3B 10 84 FE 1B DA 70 08 D6 1A 32
0450 39 10 3A 3A 10 3C 32 38 10 3A 39 10 FE 1B DA 79
0460 08 D6 1A 32 39 10 3A 38 10 3C 32 38 10 C3 79 08
0470 32 39 10 3A 3A 10 32 38 10 21 00 00 22 0C 10 22
0480 10 10 21 01 01 22 3C 10 2A 1D 10 11 80 00 19 EB
0490 2A 21 10 22 41 10 EB C3 9B 08 23 EB 2A BD 13 EB
04A0 CD D6 0B DA 40 07 C3 26 07 23 23 36 77 2B 2B C3
04B0 1B 08 3E 01 32 2B 10 C9 2A 21 10 97 77 23 36 F8
04C0 23 22 21 10 EB 2A 41 10 EB CD DC 0B 11 03 00 CD
04D0 DC 0B EB 2A 2C 10 23 73 23 72 23 22 2C 10 2A 41
04E0 10 23 73 23 72 23 23 E5 EB 11 0B 00 CD DC 0B EB
04F0 E1 23 73 23 72 E5 D5 2A 43 10 54 5D 29 19 11 03
0500 00 97 7C 1F 67 7D 1F 6F DA 12 09 1D C2 01 09 C3
0510 16 09 14 C3 0B 09 7A B7 CA 1C 09 23 D1 19 E5 21
0520 FB 04 CD D6 0B DA 97 0C 4B 42 D1 CD D6 0B DA 98
0530 0C 21 E8 03 CD D6 0B D2 87 0C D5 59 50 CD D6 0B
0540 DA 86 0C CD DC 0B 0E 05 CD AE 0B 5D 16 00 E1 E5
0550 CD DC 0B 11 E8 03 C3 80 0C 97 67 6F 22 19 10 21
0560 00 40 22 21 10 CD 16 07 3A 2B 10 0F D8 2A 10 10
0570 EB 2A 21 10 22 2E 10 3A 3C 10 B7 CA 4E 0A 3D 32
0580 3C 10 22 41 10 3A 40 10 77 23 23 23 3E 80 73 23
0590 B2 77 23 23 23 23 23 22 34 10 23 23 97 77 01 08
05A0 B8 23 EB 22 4C 10 EB E5 2A 12 10 22 4E 10 E1 73
05B0 78 B2 23 77 23 EB 2A 12 10 EB 73 23 72 23 79 0E
05C0 FF B7 CA D7 09 71 23 3D C2 C5 09 22 21 10 21 00
05D0 00 22 32 10 C3 DD 09 22 21 10 21 00 00 22 19 10
05E0 CD 19 01 CD 20 00 2A 0C 10 EB 2A 32 10 CD DC 0B
05F0 D2 F7 09 EB 22 32 10 3A 2A 10 0F D2 E0 09 C3 07
0600 0C CD 54 0A 2A 32 10 EB 2A 34 10 73 23 72 2A 3A
0610 10 22 BB 13 21 00 52 22 BD 13 3A 47 10 3C FE 15
0620 DA 25 0A 3E 20 32 BF 13 CD 11 07 2A 19 10 11 1E
0630 00 CD D6 0B DA 50 0C 97 2A 21 10 77 23 77 23 22
0640 21 10 C3 D4 0C 2A 2E 10 22 21 10 C3 DF 0C 01 00
0650 A0 C3 A2 09 00 3A 0B 10 FE 09 DA 64 0A 97 CD 18
0660 04 C3 55 0A FE 04 DA 5D 0A 97 CD 18 04 3A 0B 10
0670 D6 04 C2 64 0A 32 0B 10 97 2A 21 10 2B BE C0 22
0680 21 10 C3 79 0A 32 BF 13 97 32 B0 13 3C 32 BA 13
0690 32 AE 13 32 BC 13 3C 32 B9 13 3A 3E 10 32 BB 13
06A0 21 00 40 22 BD 13 CD C9 0B 21 3E 10 34 C9 4F 31
06B0 FF 7F 97 0E 49 21 00 10 77 23 0D C2 B8 0A 6F 67
06C0 22 50 10 32 B8 13 32 B0 13 32 3F 10 32 AE 13 3C
06D0 32 BA 13 32 3E 10 32 B9 13 21 09 40 22 45 10 CD
06E0 E3 0B 2A 00 63 11 20 20 CD D6 0B CA 2C 0B 5D 54
06F0 29 29 19 11 00 63 19 23 23 22 4A 10 22 2C 10 2B
0700 2B 2B 7E FE 4C DA 0D 0B 2B 2B C3 FF 0A 3C 32 3E
0710 10 21 48 10 34 CD 59 09 C3 A3 0C 3A 3F 10 3C C3
0720 69 0C 97 CD 41 0D CD E3 0B C3 30 14 97 21 00 63
0730 77 23 77 23 C3 16 0C 00 00 00 31 FD 7F 21 68 09
0740 E5 3E 88 2A 2C 10 77 23 23 23 22 2C 10 2A 41 10
0750 22 21 10 97 32 3D 10 00 00 00 21 3F 10 35 21 00
0760 00 22 50 10 2A 1D 10 CD BE 0B CA 91 0B 23 EB 2A
0770 BD 13 CD D6 0B EB C3 60 0C 2A BB 13 22 3A 10 3E
0780 20 32 BF 13 CD 9F 06 EB 22 1B 10 22 1D 10 C3 67
0790 0B 3A 3F 10 3C 32 3F 10 C3 D6 07 21 3F 10 35 2A
07A0 2C 10 2B 2B 2B 36 99 2A 41 10 22 21 10 C9 06 08
07B0 79 29 7C 91 FA B9 0B 23 67 05 C2 B1 0B C9 5E 23
07C0 56 7B A2 3C C9 76 2E 06 4E 3E 08 32 B8 13 3A B8
07D0 13 B7 C2 CE 0B C9 7C BA C0 7D BB C9 7D 93 6F 7C
```

```
07E0 9A 67 C9 3E 0A 32 BF 13 21 00 01 22 BB 13 21 00
07F0 63 22 BD 13 CD C9 0B C9 25 2E B5 7E D6 03 CA 0B
0400 B3 CA C5 07 C3 95 07 2A 19 10 11 1E 00 CD D6 0B
0410 DA 0E 0A C3 2E 01 22 2C 10 22 4A 10 C3 15 0B 21
0420 D5 E5 11 00 40 CD DC 0B 11 1B 00 3A 3F 10 3C 19
0430 3D C2 2F 0C 11 00 13 CD D6 0B E1 DA 23 05 C3 2C
0440 05 56 7E 2B B6 CC 3A 0B 23 7E F6 80 C3 9E 00 03
0450 2A 2E 10 EB 2A 41 10 CD D6 0B CA 3A 0B C3 45 0A
0460 CA 79 0B D2 67 0B C3 79 0B B7 C2 78 0C 32 BA 13
0470 3E 02 32 B9 13 C3 22 0B CD 85 0A C3 22 0B 49 00
0480 CD D6 0B DA 93 0C D1 E1 23 73 23 72 21 00 00 22
0490 43 10 C9 E1 C3 87 0C E1 E1 CD 9B 0B C3 8C 0C E1
04A0 C3 93 0C 2A 2C 10 2B 2B 2B 7E FE 4D DC B5 0C 3A
04B0 3F 10 C3 69 0C CD B8 08 C3 1B 0B 00 49 00 49 00
04C0 E5 2A 50 10 22 43 10 21 00 00 22 50 10 E1 22 1D
04D0 10 C3 DA 07 2A 43 10 EB 2A 50 10 19 22 50 10 21
04E0 00 00 22 43 10 C3 65 09 97 32 3C 10 21 00 63 4E
04F0 23 23 5D 54 23 23 7E FE 77 CA 26 0D 3A 3C 10 B7
0500 CA 12 0D 2B 2B 06 05 7E 12 13 23 05 C2 07 0D C3
0510 30 0D 23 23 23 0D C2 F2 0C C9 3A 3C 10 47 3A 00
0520 63 90 32 00 63 C9 3A 3C 10 3C 32 3C 10 23 23 23
0530 0D C2 F4 0C EB CD D6 0B CA 1A 0D 36 20 23 C3 35
0540 0D 32 AE 13 C3 E8 0C 00 49 00 49 00 49 00 49 00
0550 79 FE 07 CC 3A 0B CD 0E 05 2B 46 2B 3E 04 BE C2
0560 94 0D 2B 97 B6 C2 93 0D 3C 90 C2 87 0D 3E 03 36
0570 04 23 3D C2 6F 0D 79 B7 21 16 10 C2 8D 0D 06 05
0580 34 CD A3 04 C3 87 02 23 23 35 C3 76 0D 35 06 03
0590 C3 81 0D 23 23 3E 04 BE 79 CA C8 0D DA B8 0D B7
05A0 CA AE 0D 3D 06 01 32 16 10 36 00 C3 81 0D 06 04
05B0 3C 32 16 10 70 C3 87 02 B7 CA C2 0D 06 04 3D C3
05C0 B1 0D 06 07 3C C3 A6 0D B7 C2 D1 0D 06 05 C3 B0
05D0 0D 06 03 C3 BE 0D 49 00 49 00 49 00 49 00 49 00
05E0 49 00 49 00 49 00 49 00 49 00 49 00 49 00 49 00
05F0 49 00 49 00 49 00 49 00 49 00 49 00 49 00 49 00
0600 49 00 49 00 49 00 49 00 49 00 49 00 49 00 49 00
0610 49 00 49 00 49 00 49 00 49 00 49 00 49 00 49 00
0620 49 00 49 00 49 00 49 00 49 00 49 00 49 00 49 00
0630 49 00 49 00 49 00 49 00 49 00 49 00 49 00 49 00
0640 49 00 49 00 49 00 49 00 49 00 49 00 49 00 49 00
0650 49 00 49 00 49 00 49 00 49 00 49 00 49 00 49 00
0660 49 00 49 00 49 00 49 00 49 00 49 00 49 00 49 00
0670 49 00 49 00 49 00 49 00 49 00 49 00 49 00 49 00
0680 49 00 49 00 49 00 49 00 49 00 49 00 49 00 49 00
0690 49 00 49 00 49 00 49 00 49 00 49 00 49 00 49 00
06A0 49 00 49 00 49 00 49 00 49 00 49 00 49 00 49 00
06B0 49 00 49 00 49 00 49 00 49 00 49 00 49 00 49 00
06C0 49 00 49 00 49 00 49 00 49 00 49 00 49 00 49 00
06D0 49 00 49 00 49 00 49 00 49 00 49 00 49 00 49 00
06E0 49 00 49 00 49 00 49 00 49 00 49 00 49 00 49 00
06F0 49 00 49 00 49 00 49 00 49 00 49 00 49 00 49 00
0700 49 00 49 00 49 00 49 00 49 00 49 00 49 00 49 00
0710 49 00 49 00 49 00 49 00 49 00 49 00 49 00 49 00
0720 49 00 49 00 49 00 49 00 49 00 49 00 49 00 49 00
0730 49 00 49 00 49 00 49 00 49 00 49 00 49 00 49 00
0740 49 00 49 00 49 00 49 00 49 00 49 00 49 00 49 00
0750 49 00 49 00 49 00 49 00 49 00 49 00 49 00 49 00
0760 49 00 49 00 49 00 49 00 49 00 49 00 49 00 49 00
0770 49 00 49 00 49 00 49 00 49 00 49 00 49 00 49 00
0780 49 00 49 00 49 00 49 00 49 00 49 00 49 00 49 00
0790 49 00 49 00 49 00 49 00 49 00 49 00 49 00 49 00
07A0 49 00 49 00 49 00 49 00 49 00 49 00 49 00 49 00
07B0 49 00 49 00 49 00 49 00 49 00 49 00 49 00 49 00
07C0 49 00 49 00 49 00 46 05 46 FE 3A 3A DA 03 89 03
07D0 9E FC D1 01 A6 03 2D 00 A9 01 B5 02 DA 0F 41 01
07E0 D1 00 FF 0F DD 00 A9 01 9B 01 57 01 FF 0F DD 00
```

| | | | | | | | | | | | | | | | | |
|---|---|---|---|---|---|---|---|---|---|---|---|---|---|---|---|---|
| 07F0 | 49 | 00 | 49 | 00 | 49 | 00 | 49 | 00 | 49 | 00 | 49 | 00 | 49 | 00 | 49 | 00 |
| 0400 | 31 | FF | 7F | 3E | C1 | 32 | 03 | 80 | 3E | 09 | 32 | 03 | 80 | 3E | 70 | 32 |
| 0410 | 01 | 80 | 3E | F0 | 32 | 01 | 80 | DB | 00 | E6 | 08 | CA | 89 | 14 | DB | 00 |
| 0420 | E6 | 08 | C2 | 1E | 14 | DB | 00 | E6 | 10 | CA | 54 | 14 | C3 | AF | 0A | 00 |
| 0430 | 3E | D0 | 32 | 01 | 80 | 3D | C2 | 35 | 14 | C3 | 12 | 14 | 00 | 00 | 00 | 00 |
| 0440 | 3E | D0 | 32 | 01 | 80 | DB | 00 | E6 | 08 | CA | 45 | 14 | 3E | F0 | 32 | 01 |
| 0450 | 80 | C3 | 1E | 14 | 21 | 00 | 01 | 22 | BB | 13 | 97 | 32 | AE | 13 | 3C | 32 |
| 0460 | BA | 13 | 21 | 00 | 40 | 22 | BD | 13 | 3E | 1A | 32 | BF | 13 | 3E | 06 | 32 |
| 0470 | B9 | 13 | 3C | 3C | 32 | B8 | 13 | 3A | B8 | 13 | B7 | C2 | 77 | 14 | 3A | BB |
| 0480 | 13 | FE | 4D | C2 | 65 | 14 | C3 | DB | 19 | 21 | 01 | 00 | 11 | 01 | 00 | 19 |
| 0490 | D2 | 8F | 14 | 3E | D0 | 32 | 01 | 80 | 19 | D2 | 98 | 14 | C3 | 12 | 14 | 2C |
| 04A0 | 46 | 2A | 20 | 1D | 09 | EB | 01 | 62 | 1E | 7B | 91 | 5F | 7A | 98 | 21 | 34 |
| 04B0 | 1D | 73 | 23 | 77 | 2E | 32 | 73 | 23 | 77 | 2E | 3D | 36 | 00 | 25 | 2E | B1 |
| 04C0 | 36 | 00 | 2E | AF | 36 | 00 | 21 | 00 | 1E | 36 | 20 | 25 | 2E | 2A | 36 | 00 |
| 04D0 | AF | 25 | 2E | BD | 96 | 9F | 77 | 24 | 2E | 0C | 7E | 0F | D2 | E8 | 14 | 25 |
| 04E0 | 2E | B0 | 36 | 00 | CD | 7C | 06 | C9 | C3 | E9 | 0E | C3 | EE | 14 | 21 | 37 |
| 04F0 | 1D | 7E | D6 | 02 | D6 | 01 | 9F | 2D | 4F | 7E | D6 | 03 | D6 | 01 | 9F | A1 |
| 0500 | 7A | BC | C0 | 7B | BD | C9 | 7B | 91 | 5F | 7A | 98 | 57 | C9 | EB | 21 | 01 |
| 0510 | 00 | 22 | B9 | 13 | 2A | 1E | 10 | 3E | 4C | BD | C2 | 2C | 15 | 3A | BF | 13 |
| 0520 | 84 | FE | 1B | DA | 2C | 15 | 3E | 1B | 94 | 32 | BF | 13 | 22 | BB | 13 | 3E |
| 0530 | 08 | 32 | B8 | 13 | 3A | B8 | 13 | B7 | C2 | 34 | 15 | 2A | BB | 13 | 22 | 1E |
| 0540 | 10 | EB | C9 | 21 | 02 | 01 | 22 | B9 | 13 | 2A | 20 | 10 | 22 | BB | 13 | 3E |
| 0550 | 08 | 32 | B8 | 13 | 3A | B8 | 13 | B7 | C2 | 54 | 15 | 2A | BB | 13 | 22 | 20 |
| 0560 | 10 | C9 | 11 | 00 | 4F | CD | 00 | 15 | D2 | 71 | 15 | 22 | 00 | 10 | CD | 74 |
| 0570 | 18 | 7E | 4F | 23 | B6 | 23 | C2 | 85 | 15 | EB | 2A | 24 | 10 | 23 | 22 | 24 |
| 0580 | 10 | EB | C3 | 62 | 15 | 2B | 79 | A6 | 3C | CA | AF | 15 | 2B | 4D | 44 | 2A |
| 0590 | 24 | 10 | 11 | F0 | 07 | CD | 00 | 15 | D2 | A5 | 15 | 97 | 69 | 60 | 77 | 23 |
| 05A0 | 77 | 23 | C3 | 79 | 15 | 11 | 05 | 00 | 19 | 22 | 24 | 10 | 69 | 60 | C9 | 23 |
| 05B0 | 7E | 3C | CA | BC | 15 | 3D | CA | DC | 15 | 2B | 2B | C9 | 23 | 7E | 3C | CA |
| 05C0 | E5 | 15 | 3E | 07 | 32 | 19 | 10 | 3C | 3C | 3C | 32 | 1A | 10 | 11 | 7D | 00 |
| 05D0 | 19 | EB | 21 | 00 | 00 | 22 | 24 | 10 | EB | C3 | 62 | 15 | 23 | 3E | 05 | 32 |
| 05E0 | 19 | 10 | C3 | C8 | 15 | 3C | 32 | 11 | 10 | C9 | 23 | 7E | 17 | 2B | D0 | 01 |
| 05F0 | 01 | 00 | 71 | 23 | 70 | 2B | C9 | 06 | 77 | 23 | 7E | 2B | B8 | C0 | 7E | B8 |
| 0600 | C9 | 23 | 7E | 2B | B6 | C9 | 97 | 32 | 1B | 10 | 2A | 02 | 10 | CD | EA | 15 |
| 0610 | DA | 2A | 16 | CD | F7 | 15 | C2 | 1E | 16 | 23 | 23 | C3 | 13 | 16 | CD | 01 |
| 0620 | 16 | C2 | 2A | 16 | 23 | 23 | 22 | 02 | 10 | C9 | 22 | 02 | 10 | 23 | 23 | CD |
| 0630 | F7 | 15 | CA | 2D | 16 | CD | 01 | 16 | C2 | 43 | 16 | 3A | 1B | 10 | 1F | D4 |
| 0640 | 40 | 14 | C9 | CD | EA | 15 | 22 | 04 | 10 | 2A | 04 | 10 | EB | 2A | 02 | 10 |
| 0650 | 4E | 23 | 46 | 2B | 3A | 1B | 10 | B7 | 3A | 1A | 10 | C2 | 61 | 16 | 3A | 19 |
| 0660 | 10 | 81 | 4F | D2 | 67 | 16 | 04 | E5 | 1A | 6F | 13 | 1A | 67 | EB | E1 | CD |
| 0670 | 06 | 15 | 3A | 1B | 10 | 2F | 32 | 1B | 10 | 2A | 04 | 10 | DA | 8C | 16 | 23 |
| 0680 | 23 | CD | 01 | 16 | CA | 24 | 16 | 2B | 2B | C3 | 2A | 16 | 3E | 77 | 77 | 23 |
| 0690 | 77 | 23 | EB | 2A | 02 | 10 | 77 | 23 | 77 | EB | CD | 01 | 16 | CA | 24 | 16 |
| 06A0 | CD | F7 | 15 | C2 | AB | 16 | 23 | 23 | C3 | 9A | 16 | CD | EA | 15 | 22 | 04 |
| 06B0 | 10 | EB | 2A | 02 | 10 | CD | F7 | 15 | C2 | C0 | 16 | 2B | 2B | C3 | B5 | 16 |
| 06C0 | CD | 01 | 16 | C2 | CA | 16 | EB | C3 | 2A | 16 | 22 | 02 | 10 | C3 | 50 | 16 |
| 06D0 | 97 | 32 | 18 | 10 | 2A | 0C | 10 | 23 | 23 | 22 | 0C | 10 | 7E | 23 | B6 | C2 |
| 06E0 | E7 | 16 | 3C | 32 | 10 | 10 | C9 | 2A | 08 | 10 | 3A | 1B | 10 | 2F | 32 | 1B |
| 06F0 | 10 | B7 | C8 | 23 | 23 | C9 | 3A | 0E | 10 | B7 | C8 | E5 | 2A | 0C | 10 | 4E |
| 0700 | 23 | 46 | 21 | 28 | 10 | 5E | 23 | 56 | [illegible] | 79 | 12 | 13 | 78 | 12 | 3A | 0E |
| 0710 | 10 | 3D | 32 | 0E | 10 | C2 | 05 | 17 | [illegible] | C9 | 3A | 1B | 10 | B7 | C2 | 3B |
| 0720 | 17 | 01 | 04 | 00 | 09 | CD | 01 | 16 | C0 | 3C | 32 | 18 | 10 | 23 | 23 | CD |
| 0730 | 01 | 16 | C0 | C1 | 3C | 32 | 12 | 10 | C3 | 3A | 18 | 23 | 23 | CD | 01 | 16 |
| 0740 | 23 | 23 | C0 | C3 | 29 | 17 | 97 | 32 | 14 | 10 | 4E | 23 | 46 | 2B | E5 | 2A |
| 0750 | 0C | 10 | 5E | 23 | 56 | CD | 06 | 15 | 21 | 05 | 00 | DA | 77 | 17 | B3 | C3 |
| 0760 | A0 | 1A | 3C | 32 | 14 | 10 | E1 | C9 | CD | 00 | 15 | D2 | 66 | 17 | 21 | 02 |
| 0770 | 00 | 22 | 14 | 10 | C3 | 66 | 17 | 7B | 2F | 5F | 7A | 2F | 57 | 13 | CD | 00 |
| 0780 | 15 | D2 | 66 | 17 | 21 | 02 | 01 | C3 | 71 | 17 | 97 | 32 | 12 | 10 | 32 | 10 |
| 0790 | 10 | 32 | 1B | 10 | 2A | 00 | 10 | 22 | 0C | 10 | 2A | 08 | 10 | E5 | 21 | 28 |
| 07A0 | 10 | 22 | 26 | 10 | 21 | FF | FF | 22 | 1C | 10 | E1 | 97 | 32 | 0E | 10 | CD |
| 07B0 | 46 | 17 | 3A | 14 | 10 | B7 | CA | 30 | 18 | 1F | D2 | C3 | 17 | CD | F6 | 16 |
| 07C0 | C3 | 3A | 18 | 4D | 44 | 2A | 10 | 10 | CD | 00 | 15 | D2 | DE | 17 | 2A | 26 |
| 07D0 | 10 | 71 | 23 | 70 | 3A | 15 | 10 | 32 | 16 | 10 | EB | 22 | 10 | 10 | 69 | 60 |
| 07E0 | CD | 1A | 17 | 3A | 18 | 10 | B7 | C2 | F3 | 17 | CD | 46 | 17 | 3A | 14 | 10 |
| 07F0 | C3 | B9 | 17 | 97 | 32 | 18 | 10 | 3A | 0E | 10 | B7 | C2 | 1B | 18 | 3C | 32 |

```
0400 0E 10 EB 21 FF FF 22 1C 10 2A 26 10 23 23 22 26
0410 10 3A 16 10 32 17 10 EB C3 AF 17 47 3A 16 10 4F
0420 3A 17 10 91 C2 BD 17 78 FE 03 C2 FE 17 C3 3A 18
0430 CD 1A 17 3A 18 10 B7 CA AF 17 CD D0 16 3A 10 10
0440 B7 CA 9D 17 2A 08 10 CD 01 16 23 23 C2 47 18 22
0450 0A 10 2A 02 10 22 06 10 2A 00 10 22 02 10 CD 06
0460 16 2A 08 10 22 00 10 2A 0A 10 22 08 10 2A 06 10
0470 22 02 10 C9 2A 00 10 22 0C 10 2A BD 13 22 22 10
0480 21 00 40 7D 32 13 10 23 EB 2A 00 10 EB CD 00 15
0490 DA 41 19 7E 17 DA D8 18 7E FE 77 CA AA 18 3A 13
04A0 10 B7 C2 CA 18 23 23 C3 88 18 2B BE 23 C2 9E 18
04B0 3A 13 10 B7 CA BF 18 2B 11 05 00 19 C3 88 18 2B
04C0 4D A4 3E 01 32 13 10 C3 B8 18 2B 1E 02 7E 02 23
04D0 03 1D C2 CD 18 C3 A6 18 7E 2B B6 3C C4 40 14 3A
04E0 13 10 B7 C2 E8 18 4D 44 CD 26 19 C2 FB 18 CD 2A
04F0 19 23 C3 88 18 CD 26 19 CA FF 18 0B C3 F5 18 CD
0500 36 19 C5 EB 2A 00 10 EB CD 00 15 CA 15 19 7E 02
0510 03 23 C3 08 19 69 60 22 00 10 3E 01 32 13 10 C1
0520 69 60 23 C3 88 18 3E 7F A1 C9 3A 13 10 B7 C2 36
0530 19 21 80 00 09 C9 1E 80 7E 02 03 23 1D C2 38 19
0540 C9 3A 13 10 B7 CA 4D 19 69 60 22 00 10 2A 00 10
0550 7C E6 0F 87 67 7D 17 D2 5B 19 24 7C 32 BF 13 21
0560 00 40 22 BD 13 CD 43 15 2A 00 10 EB 01 00 40 2A
0570 BD 13 CD 00 15 CA 7F 19 7E 02 23 03 C3 72 19 69
0580 60 22 00 10 2A 22 10 EB 2A 0C 10 CD 00 15 CA 98
0590 19 7E 02 03 23 C3 8B 19 69 60 22 BD 13 5D 54 01
05A0 00 40 CD 06 15 7A E6 0F 87 4F 7D 17 0C D2 B1 19
05B0 0C 3E 20 91 32 BF 13 3A 11 10 B7 C0 C3 90 1A 1E
05C0 00 CD 01 16 23 23 C2 C1 19 7B B7 C2 D1 19 22 08
05D0 10 1C FE 05 C2 C1 19 22 02 10 C9 31 FF 7F 21 00
05E0 00 22 24 10 24 22 1E 10 22 20 10 97 32 AE 13 32
05F0 11 10 3E 20 32 BF 13 21 00 40 22 BD 13 CD 0D 15
0600 CD 62 15 3A 11 10 B7 C2 79 1A 3E 04 32 0E 10 22
0610 00 10 22 02 10 CD 06 16 22 08 10 CD 06 16 3A 0E
0620 10 3D 32 0E 10 C2 1B 1A CD 8A 17 3A 12 10 B7 C2
0630 59 1A 2A 02 10 11 00 4F CD 00 15 D2 44 1A CD 74
0640 18 2A 02 10 7E 00 23 B6 2B CA 28 1A CD 06 16 2A
0650 24 10 23 22 24 10 C3 28 1A CD 8A 17 2A 02 10 E5
0660 2A 08 10 22 02 10 CD 06 16 2A 0A 10 22 02 10 CD
0670 06 16 E1 22 02 10 C3 00 1A 11 80 00 19 22 00 10
0680 CD 74 18 C3 30 14 76 00 00 00 00 00 00 00 00 00
0690 CD 0D 15 2A 00 10 C3 BF 19 00 00 00 00 00 00 00
06A0 C2 68 17 69 60 CD 00 15 CA 66 17 3E 01 C3 63 17
06B0 00 00 00 00 00 00 00 00 00 00 00 00 00 00 00 00
06C0 00 00 00 00 00 00 00 00 00 00 00 00 00 00 00 00
06D0 00 00 00 00 00 00 00 00 00 00 00 00 00 00 00 00
06E0 00 00 00 00 00 00 00 00 00 00 00 00 00 00 00 00
06F0 00 00 00 00 00 00 00 00 00 00 00 00 00 00 00 00
0700 31 FF 7F C3 67 1F 00 01 00 01 00 01 00 01 01 01
0710 00 01 01 01 00 01 01 01 01 01 01 01 01 01 01 01
0720 01 00 01 01 01 00 01 01 01 00 01 00 01 00 01 00
0730 FF 01 FF 01 FF 01 FF 01 00 01 FF 01 00 01 FF 01
0740 00 01 00 01 00 01 00 01 00 01 01 01 00 01 01 01
0750 00 01 01 01 01 01 01 01 01 01 00 00 00 00 00 00
0760 FF 01 FF 01 FF 00 FF 01 FF 00 FF 00 FF 00 FF 00
0770 FF 00 00 00 00 00 00 00 01 00 01 00 01 00 01 01
0780 01 00 01 00 01 01 01 01 01 00 2A 4A 10 7E 37 BC
0790 13 23 7E 32 26 11 23 7E C3 83 1F 23 5E 23 56 23
07A0 22 4A 10 21 20 20 CD D6 0B CA 55 1F CD 21 1C 21
07B0 00 11 97 06 27 77 23 05 C2 B5 1B 21 00 51 01 00
07C0 10 36 00 0B 23 79 B0 C2 C1 1B 3A 26 11 B7 C2 DA
07D0 1B 21 03 05 22 1C 11 C3 E0 1B 21 05 07 22 1C 11
07E0 21 00 40 11 0C 00 19 3E 08 32 1B 11 3E 03 32 1A
07F0 11 CD 2F 1C CD 9D 1C 7E B7 CA 8A 1B EB 2A 10 11
```

| | | | | | | | | | | | | | | | | |
|---|---|---|---|---|---|---|---|---|---|---|---|---|---|---|---|---|
| 0400 | 7D | B4 | CA | 11 | 1C | 2A | 14 | 11 | 2B | 2B | 22 | 14 | 11 | 29 | 22 | 16 |
| 0410 | 11 | 06 | 07 | 21 | 0B | 11 | 97 | 77 | 05 | 23 | C2 | 17 | 1C | EB | C3 | E7 |
| 0420 | 1B | 3E | 01 | 32 | BF | 13 | 21 | 00 | 40 | 22 | BD | 13 | C3 | C9 | 0B | 5E |
| 0430 | 23 | 7E | E6 | 07 | 57 | 7E | E6 | E0 | 07 | 07 | 07 | 32 | 09 | 11 | EB | 22 |
| 0440 | 00 | 11 | 22 | 04 | 11 | EB | 7E | 23 | 5E | 23 | 56 | 23 | EB | 22 | 02 | 11 |
| 0450 | E6 | 18 | EB | CA | 5A | 1C | 01 | 08 | 00 | 09 | 22 | 12 | 11 | C9 | 1E | 07 |
| 0460 | 3A | 1B | 11 | A7 | 57 | 2A | 12 | 11 | 7E | CD | 92 | 1C | DA | 70 | 1C | 1D |
| 0470 | 15 | CD | 92 | 1C | DA | 79 | 1C | 1D | 1D | 15 | CD | 92 | 1C | DA | 84 | 1C |
| 0480 | 1D | 1D | 1D | 1D | 15 | 77 | 22 | 12 | 11 | 7A | 32 | 1B | 11 | 7B | 32 | 08 |
| 0490 | 11 | C9 | CC | 98 | 1C | B7 | 1F | C9 | 23 | 7E | 16 | 08 | C9 | 06 | 04 | 3A |
| 04A0 | 1A | 11 | FE | 03 | C2 | 04 | 1D | CD | 5E | 1C | A7 | CA | C3 | 1C | B8 | 3A |
| 04B0 | 09 | 11 | DA | BF | 1C | C2 | BB | 1C | C3 | 39 | 1D | 3C | C3 | 39 | 1D | 3D |
| 04C0 | C3 | 39 | 1D | CD | 5E | 1C | A7 | C2 | CD | 1C | 23 | 23 | C9 | B8 | 3A | 09 |
| 04D0 | 11 | DA | F0 | 1C | C2 | FF | 1C | E6 | 07 | 32 | 0A | 11 | CD | 5E | 1C | 0E |
| 04E0 | 09 | 47 | 07 | 80 | 81 | 32 | 1A | 11 | 3E | 04 | 32 | 08 | 11 | C3 | 3E | 1D |
| 04F0 | 3D | 3D | E6 | 07 | 32 | 0A | 11 | 3A | 08 | 11 | C6 | 08 | C3 | EA | 1C | 3C |
| 0500 | 3C | C3 | F2 | 1C | 3A | 1A | 11 | FE | 02 | DA | 33 | 1D | 2A | 1F | 11 | 22 |
| 0510 | 06 | 11 | CD | DD | 1D | 2A | 21 | 11 | 22 | 06 | 11 | CD | DD | 1D | 3A | 1A |
| 0520 | 11 | B7 | C2 | 33 | 1D | 3A | 0A | 11 | 32 | 09 | 11 | 3E | 03 | 32 | 1A | 11 |
| 0530 | C3 | 9D | 1C | CD | DD | 1D | C3 | 1E | 1D | E6 | 07 | 32 | 0A | 11 | 97 | 47 |
| 0540 | 16 | 06 | 3A | 08 | 11 | 3D | 4F | 07 | 81 | 07 | 4F | 3A | 09 | 11 | 5F | 0F |
| 0550 | DA | 59 | 1D | 21 | 06 | 1B | C3 | 5C | 1D | 21 | 30 | 1B | 09 | 01 | 1D | 11 |
| 0560 | 7E | 02 | 23 | 03 | 15 | C2 | 60 | 1D | 21 | 79 | 1D | 7B | 32 | 25 | 11 | 07 |
| 0570 | 83 | 5F | 19 | 11 | 1D | 11 | 0E | 03 | E9 | C3 | 8E | 1D | C3 | A1 | 1D | C3 |
| 0580 | A1 | 1D | C3 | B1 | 1D | C3 | B1 | 1D | C3 | C0 | 1D | C3 | C0 | 1D | EB | 7E |
| 0590 | 23 | 46 | 2B | 70 | 23 | 2F | C6 | 01 | 77 | 23 | 0D | C2 | 8F | 1D | C3 | C0 |
| 05A0 | 1D | EB | 79 | 07 | 4F | 7E | 2F | 3C | 77 | 23 | 0D | C2 | A5 | 1D | C3 | C0 |
| 05B0 | 1D | EB | 46 | 23 | 7E | 2F | 3C | 2B | 77 | 23 | 70 | 23 | 0D | C2 | B2 | 1D |
| 05C0 | 2A | 1D | 11 | 22 | 06 | 11 | CD | DD | 1D | C3 | 04 | 1D | 79 | 93 | 4F | 78 |
| 05D0 | 9A | 47 | C9 | E5 | 09 | 73 | 23 | 72 | E1 | 23 | 23 | C9 | C9 | 2A | 02 | 11 |
| 05E0 | 22 | 23 | 11 | EB | C3 | 60 | 1F | 3A | 07 | 11 | 6F | 17 | 60 | D2 | F1 | 1D |
| 05F0 | 61 | 19 | 22 | 02 | 11 | 3A | 06 | 11 | A7 | C2 | 44 | 1E | 4F | 3A | 0B | 11 |
| 0600 | A7 | CA | 13 | 1E | 2A | 10 | 11 | 23 | 22 | 10 | 11 | 3A | 1A | 11 | 3D | 32 |
| 0610 | 1A | 11 | C9 | CD | CE | 1E | 21 | 0B | 11 | 36 | 01 | 2A | 0E | 11 | 22 | 0C |
| 0620 | 11 | 2A | 00 | 11 | EB | 01 | 00 | 51 | 2A | 14 | 11 | CD | D3 | 1D | 22 | 14 |
| 0630 | 11 | 2A | 23 | 11 | EB | 01 | 00 | 56 | 2A | 16 | 11 | CD | D3 | 1D | 22 | 16 |
| 0640 | 11 | C3 | 04 | 1E | 2A | 00 | 11 | FE | 02 | DA | 4D | 1E | 41 | 22 | 0E | 11 |
| 0650 | 4F | 09 | 22 | 00 | 11 | CD | CE | 1E | 3A | 0B | 11 | A7 | CA | 0B | 1E | 2A |
| 0660 | 0C | 11 | 7D | B4 | C2 | AB | 1E | 2A | 10 | 11 | 3A | 1C | 11 | 5F | 16 | 00 |
| 0670 | CD | D6 | 0B | DA | 4A | 1F | 2A | 23 | 11 | 44 | 4D | 11 | FF | 55 | 2A | 16 |
| 0680 | 11 | 19 | 56 | 2B | 5E | C5 | E5 | CD | CC | 1D | 78 | 17 | E1 | C1 | D2 | 9B |
| 0690 | 1E | 71 | 23 | 70 | 23 | 73 | 23 | 72 | C3 | A0 | 1E | 23 | 23 | 71 | 23 | 70 |
| 06A0 | 2A | 16 | 11 | 23 | 23 | 22 | 16 | 11 | C3 | C1 | 1E | EB | 2A | 00 | 11 | CD |
| 06B0 | D6 | 0B | CA | 67 | 1E | 2A | 14 | 11 | 2B | 2B | 22 | 14 | 11 | 29 | 22 | 16 |
| 06C0 | 11 | 97 | 32 | 0B | 11 | 21 | 00 | 00 | 22 | 10 | 11 | C3 | 0B | 1E | 21 | 00 |
| 06D0 | 00 | 22 | 18 | 11 | EB | 2A | 14 | 11 | CD | D6 | 0B | C8 | 21 | 00 | 51 | 19 |
| 06E0 | 5E | 23 | 56 | 2A | 00 | 11 | CD | D6 | 0B | CA | F4 | 1E | 2A | 18 | 11 | 23 |
| 06F0 | 23 | C3 | D1 | 1E | 2A | 18 | 11 | 29 | EB | 21 | 00 | 56 | 19 | 5E | 23 | 56 |
| 0700 | E5 | 2A | 02 | 11 | CD | D6 | 0B | DA | 26 | 1F | CA | 26 | 1F | E1 | 23 | 4E |
| 0710 | 23 | 46 | 3A | 1C | 11 | 6F | 26 | 00 | 09 | EB | 2A | 02 | 11 | CD | D6 | 0B |
| 0720 | DA | 35 | 1F | C3 | EC | 1E | 3A | 1C | 11 | 4F | 06 | 00 | 09 | C1 | EB | CD |
| 0730 | D6 | 0B | C3 | 7D | 1F | 59 | 50 | CD | D6 | 0B | D2 | 4A | 1F | 2A | 04 | 11 |
| 0740 | EB | 2A | 00 | 11 | CD | D6 | 0B | CA | EC | 1E | 2A | 4A | 10 | 2B | 2B | 2B |
| 0750 | 36 | 66 | C3 | 00 | 1B | 97 | C3 | 72 | 1F | CD | E3 | 0B | C3 | 30 | 14 | 76 |
| 0760 | 97 | 47 | 2F | 4F | C3 | E7 | 1D | 3E | 01 | 32 | AE | 13 | 32 | B9 | 13 | C3 |
| 0770 | 8A | 1B | 32 | AE | 13 | 3E | 02 | 32 | B9 | 13 | C3 | 59 | 1F | D2 | EC | 1E |
| 0780 | C3 | 3D | 1F | FE | 4C | DA | 91 | 1F | 23 | 23 | 23 | 22 | 4A | 10 | C3 | 8A |
| 0790 | 1B | 32 | BB | 13 | C3 | 9B | 1B | 00 | 00 | 00 | 00 | 00 | 00 | 00 | 00 | 00 |
| 07A0 | 00 | 00 | 00 | 00 | 00 | 00 | 00 | 00 | 00 | 00 | 00 | 00 | 00 | 00 | 00 | 00 |
| 07B0 | 00 | 00 | 00 | 00 | 00 | 00 | 00 | 00 | 00 | 00 | 00 | 00 | 00 | 00 | 00 | 00 |
| 07C0 | 00 | 00 | 00 | 00 | 00 | 00 | 00 | 00 | 00 | 00 | 00 | 00 | 00 | 00 | 00 | 00 |
| 07D0 | 00 | 00 | 00 | 00 | 00 | 00 | 00 | 00 | 00 | 00 | 00 | 00 | 00 | 00 | 00 | 00 |
| 07E0 | 00 | 00 | 00 | 00 | 00 | 00 | 00 | 00 | 00 | 00 | 00 | 00 | 00 | 00 | 00 | 00 |
| 07F0 | 00 | 00 | 00 | 00 | 00 | 00 | 00 | 00 | 00 | 00 | 00 | 00 | 00 | 00 | 00 | 00 |

APPENDIX E

| | | | | | | | | | | | | | | | | |
|---|---|---|---|---|---|---|---|---|---|---|---|---|---|---|---|---|
| 0000H= | C3H | 21H | 00H | EAH | FBH | C3H | 9CH | 01H | CDH | 0DH | 01H | 46H | FBH | C3H | ACH | 01H |
| 0010H= | CDH | 0DH | 01H | 71H | FBH | C3H | 73H | 01H | CDH | 0DH | 01H | 03H | CDH | 0DH | 01H | 4FH |
| 0020H= | 7EH | 31H | C2H | 7FH | 3EH | 34H | D3H | CBH | D3H | D3H | 3EH | 70H | D3H | CBH | D3H | D3H |
| 0030H= | 3EH | B0H | D3H | CBH | D3H | D3H | 3EH | 16H | D3H | C0H | 97H | D3H | C1H | 3EH | D5H | D3H |
| 0040H= | C1H | 06H | E0H | 3EH | FFH | D3H | DDH | 05H | 2AH | 00H | 00H | C2H | 45H | 00H | 21H | 00H |
| 0050H= | 40H | 36H | FFH | 7EH | 3CH | C2H | 5CH | 01H | 77H | 7EH | B7H | C2H | 5CH | 01H | 23H | 3EH |
| 0060H= | BFH | BCH | D2H | 51H | 00H | DBH | DDH | 06H | F0H | A0H | B8H | C4H | 0DH | 01H | FBH | 3EH |
| 0070H= | 52H | D3H | DAH | 21H | ABH | 61H | CDH | C1H | 01H | 3AH | C2H | 7FH | 1FH | D4H | 0DH | 01H |
| 0080H= | DDH | DDH | E6H | 10H | C2H | 79H | 00H | 3EH | 34H | D3H | CBH | 3EH | 70H | D3H | CBH | CDH |
| 0090H= | C4H | 02H | 3EH | 72H | D3H | DAH | 21H | 64H | 00H | CDH | C1H | 01H | 21H | B8H | 88H | CDH |
| 00A0H= | D6H | 01H | 3AH | C3H | 7FH | 1FH | D4H | 0DH | 01H | DBH | DDH | E6H | 40H | C2H | A2H | 00H |
| 00B0H= | 3EH | 34H | D3H | D3H | 3EH | 70H | D3H | D3H | CDH | C4H | 02H | 3EH | 36H | D3H | DAH | 21H |
| 00C0H= | A0H | 00H | CDH | D6H | 01H | 21H | FFH | 7FH | 36H | 7FH | 2BH | 36H | 40H | 2BH | 06H | 00H |
| 00D0H= | 70H | 2BH | 36H | 01H | 2BH | 70H | 2BH | 70H | 2BH | 36H | 01H | 2BH | 36H | 08H | CDH | 02H |
| 00E0H= | 01H | 21H | FFH | 7FH | 36H | 80H | 2BH | 36H | 80H | 2BH | 70H | 2BH | 36H | 19H | 2BH | 2BH |
| 00F0H= | 2BH | 2BH | 36H | 08H | CDH | 02H | 01H | 3AH | 00H | 40H | FEH | CDH | C4H | 0DH | 01H | C3H |
| 0100H= | 20H | 40H | 7EH | FEH | 08H | CAH | 02H | 01H | B7H | C8H | CDH | 0DH | 01H | 11H | F5H | 03H |
| 0110H= | C1H | C5H | 0BH | 0BH | 0BH | 3EH | 04H | 32H | C5H | 7FH | 21H | C6H | 7FH | 78H | 0FH | 0FH |
| 0120H= | 0FH | 0FH | CDH | 4CH | 01H | 78H | CDH | 4CH | 01H | 79H | 0FH | 0FH | 0FH | 0FH | CDH | 4CH |
| 0130H= | 01H | 79H | CDH | 4CH | 01H | 97H | 32H | C4H | 7FH | 21H | C5H | 7FH | EBH | CDH | EBH | 01H |
| 0140H= | 3AH | C4H | 7FH | B7H | CAH | 40H | 01H | 97H | 32H | C4H | 7FH | C9H | CDH | 52H | 01H | 77H |
| 0150H= | 23H | C9H | E6H | 0FH | C6H | 30H | FEH | 3AH | D8H | C6H | 07H | C9H | 7CH | 17H | 3EH | 77H |
| 0160H= | D2H | 65H | 01H | 3EH | 6BH | 26H | E0H | D3H | DDH | 25H | 22H | 00H | 00H | C2H | 67H | 01H |
| 0170H= | C3H | 70H | 01H | F5H | D5H | E5H | DBH | DDH | E6H | 0FH | 21H | B4H | 02H | 5FH | 16H | 00H |
| 0180H= | 19H | 56H | 3AH | C4H | 7FH | FEH | 05H | CAH | 97H | 01H | 6FH | 26H | 00H | 3CH | 32H | C4H |
| 0190H= | 7FH | 7AH | 11H | CBH | 7FH | 19H | 77H | E1H | D1H | C3H | B9H | 01H | F5H | 3EH | 34H | D3H |
| 01A0H= | CBH | 3EH | 70H | D3H | CBH | 97H | 32H | C2H | 7FH | C3H | B9H | 01H | F5H | 3EH | 34H | D3H |
| 01B0H= | D3H | 3EH | 70H | D3H | D3H | 97H | 32H | C3H | 7FH | 3EH | 20H | F3H | D3H | C0H | F1H | FBH |
| 01C0H= | C9H | 2BH | 7DH | D3H | C9H | 7CH | D3H | C9H | 3EH | 00H | D3H | C8H | 3EH | 0EH | D3H | C8H |
| 01D0H= | 3EH | 01H | 32H | C2H | 7FH | C9H | 2BH | 7DH | D3H | D1H | 7CH | D3H | D1H | 3EH | 00H | D3H |
| 01E0H= | D0H | 3EH | 0EH | D3H | D0H | 3EH | 01H | 32H | C3H | 7FH | C9H | 3EH | FFH | D3H | DDH | 1AH |
| 01F0H= | 86H | 47H | E5H | CDH | 15H | 02H | D1H | 3EH | 25H | 90H | 47H | C3H | 00H | 02H | 06H | 26H |
| 0200H= | 0EH | 06H | 3EH | FFH | D3H | DDH | 0DH | 22H | 00H | 00H | C2H | 04H | 02H | 05H | C2H | 00H |
| 0210H= | 02H | CDH | 15H | 02H | C9H | EBH | 4EH | 23H | 7EH | E5H | CDH | 23H | 02H | E1H | 0DH | C2H |
| 0220H= | 17H | 02H | C9H | FEH | 61H | DAH | 2FH | 02H | FEH | 7BH | D2H | 2FH | 02H | D6H | 20H | 21H |
| 0230H= | CEH | 02H | D6H | 20H | D8H | FEH | 3BH | D0H | 5FH | 16H | 00H | 19H | 19H | 19H | 19H | 19H |
| 0240H= | 16H | 05H | 7EH | D3H | DDH | 23H | 15H | C2H | 42H | 02H | 3EH | FFH | D3H | DDH | C9H | E5H |
| 0250H= | 42H | 4BH | 11H | 00H | 00H | 21H | 01H | 00H | 78H | 1FH | 47H | 79H | 1FH | 4FH | D2H | 69H |
| 0260H= | 02H | 7BH | 85H | 27H | 5FH | 7AH | 8CH | 27H | 57H | 3EH | 68H | BDH | CAH | 7AH | 02H | 7DH |
| 0270H= | 85H | 27H | 6FH | 7CH | 8CH | 27H | 67H | C3H | 58H | 02H | E1H | 06H | 02H | 7AH | 0FH | 0FH |
| 0280H= | 0FH | 0FH | CDH | 4CH | 01H | 7AH | CDH | 4CH | 01H | 53H | 05H | C2H | 7DH | 02H | C9H | E5H |
| 0290H= | 21H | 00H | 00H | E3H | 7EH | 23H | E3H | 29H | 54H | 5DH | 29H | 29H | 19H | E6H | 0FH | 5FH |
| 02A0H= | 16H | 00H | 19H | 05H | C2H | 93H | 02H | D1H | C9H | 06H | E0H | 3EH | FFH | D3H | DDH | 05H |
| 02B0H= | C2H | ADH | 02H | C9H | 09H | 0BH | 06H | 05H | 0CH | 03H | 02H | 0DH | 0EH | 00H | 0FH | 01H |
| 02C0H= | 04H | 07H | 08H | 0AH | 06H | 82H | 2AH | 00H | 00H | 05H | C2H | C6H | 02H | C9H | FFH | FFH |
| 02D0H= | FFH | FFH | FFH | 7FH | 7FH | 02H | 7FH | 7FH | 7FH | 4FH | 0FH | 3FH | 7FH | 6BH | 00H | 6BH |
| 02E0H= | 00H | 6BH | 6DH | 55H | 00H | 55H | 5BH | 1DH | 1BH | 77H | 6CH | 5CH | 79H | 46H | 32H | 4DH |
| 02F0H= | 7AH | 7FH | 6FH | 0FH | 1FH | 7FH | FFH | 63H | 5DH | 3EH | FFH | FFH | 3EH | 5DH | 63H | FFH |
| 0300H= | 6BH | 77H | 41H | 77H | 6BH | 77H | 77H | 41H | 77H | 77H | 7FH | 7EH | 79H | 7FH | 7FH | FFH |
| 0310H= | 77H | 77H | 77H | FFH | FFH | FCH | FCH | FFH | FFH | 7DH | 7BH | 77H | 6FH | 5FH | 41H | 3AH |
| 0320H= | 36H | 2EH | 41H | 7FH | 5EH | 00H | 7EH | 7FH | 5EH | 3CH | 3AH | 36H | 4EH | 3DH | 3EH | 2EH |
| 0330H= | 16H | 39H | 73H | 6BH | 5BH | 00H | 7BH | 0DH | 2EH | 2EH | 2EH | 31H | 61H | 56H | 36H | 36H |
| 0340H= | 79H | 3FH | 3BH | 37H | 2FH | 1FH | 49H | 36H | 36H | 36H | 49H | 4FH | 36H | 36H | 35H | 43H |
| 0350H= | FFH | 1CH | 1CH | FFH | FFH | 7FH | 7EH | 19H | 7FH | 7FH | 7FH | 77H | 6BH | 5DH | 7FH | 6BH |
| 0360H= | 6BH | 6BH | 6BH | 6BH | 7FH | 5DH | 6BH | 77H | 7FH | 5FH | 3FH | 3AH | 37H | 4FH | 63H | 5DH |
| 0370H= | 22H | 2AH | 42H | 40H | 37H | 37H | 37H | 40H | 00H | 36H | 36H | 36H | 49H | 41H | 3EH | 3EH |
| 0380H= | 3EH | 5DH | 00H | 3EH | 3EH | 5DH | 63H | 00H | 36H | 36H | 36H | 3EH | 00H | 37H | 37H | 37H |
| 0390H= | 3FH | 41H | 3EH | 3EH | 36H | 30H | 00H | 77H | 77H | 77H | 00H | 7FH | 3EH | 00H | 3EH | 7FH |
| 03A0H= | 7DH | FEH | 3EH | 01H | 3FH | 00H | 77H | 6BH | 5DH | 3EH | 00H | 7EH | 7EH | 7EH | 7EH | 00H |
| 03B0H= | 5FH | 67H | 5FH | 00H | 00H | 6FH | 77H | 7BH | 00H | 41H | 3EH | 3EH | 3EH | 41H | 00H | 37H |
| 03C0H= | 37H | 37H | 4FH | 41H | 3EH | 3AH | 3DH | 42H | 00H | 37H | 33H | 35H | 4EH | 4EH | 36H | 36H |
| 03D0H= | 36H | 39H | 3FH | 3FH | 00H | 3FH | 3FH | 01H | FEH | FEH | FEH | 01H | 03H | 7DH | FEH | 7DH |
| 03E0H= | 03H | 01H | 7EH | 71H | 7EH | 01H | 1CH | 6BH | 77H | 6BH | 1CH | 0FH | 77H | 7BH | 77H | 0FH |
| 03F0H= | 3CH | 3AH | 36H | 2EH | 1EH | 05H | 46H | 41H | 54H | 41H | 4CH | 20H | 45H | 52H | 52H | 4FH |

APPENDIX F

```
4000H=CDH 0DH 01H 00H FBH C3H 71H 4CH FBH C3H 9AH 66H FBH C3H AFH 4EH
4010H=FBH C3H 89H 4BH FBH C3H 73H 01H FBH C3H 00H 00H CDH 0DH 01H 00H
4020H=3EH 16H D3H C0H 3EH 40H D3H C1H 3EH 81H D3H C1H 3EH FFH D3H 88H
4030H=D3H 98H 00H 00H 00H 21H 1BH 01H 22H DEH 7FH 11H AFH 77H CDH FEH
4040H=01H 97H 32H C4H 7FH 3AH C4H 7FH B7H CAH 45H 40H 3AH 7CH 78H B7H
4050H=06H 0DH CAH 57H 40H 06H 06H 3AH CBH 7FH B8H DAH 67H 40H 11H E8H
4060H=77H CDH 10H 01H C3H 78H 40H 07H 6FH 26H 00H 11H 85H 40H 19H 5EH
4070H=23H 56H EBH 11H 78H 40H D5H E9H 21H 7DH 78H 7EH B7H CAH 3BH 40H
4080H=36H 00H C3H 41H 40H D8H 41H 49H 42H E5H 40H 9FH 40H A4H 41H 1CH
4090H=42H 75H B7H A9H B7H 00H B0H 30H B7H B2H B6H 27H B6H 41H B6H 11H
40A0H=DEH 77H CDH FEH 01H 2AH 0FH 7BH EBH 21H C6H 7FH CDH 4FH 02H 3EH
40B0H=04H 11H C5H 7FH 12H CDH 15H 02H 3EH 2DH CDH 23H 02H 97H 32H C4H
40C0H=7FH 06H 04H CDH F3H 4AH CDH 2CH 4BH 06H 04H 21H CBH 7FH CDH 8FH
40D0H=02H 11H B8H 0BH CDH 75H 55H D2H E1H 40H 11H E8H 77H CDH 10H 01H
40E0H=C9H 22H 0FH 7BH C9H 11H F6H 77H CDH FEH 01H 3AH 7EH 78H 5FH 16H
40F0H=00H 21H C5H 7FH CDH 4FH 02H 11H C6H 7FH 3EH 02H 12H CDH 15H 02H
4100H=3EH 2DH CDH 23H 02H 97H 32H C4H 7FH 06H 02H CDH F3H 4AH CDH 2CH
4110H=4BH 06H 02H 21H CBH 7FH CDH 8FH 02H 7DH FEH 04H DAH 9DH 41H FEH
4120H=11H D2H 9DH 41H 32H 7EH 78H 6FH 26H 00H 29H 29H 29H 29H 11H ABH
4130H=A6H CDH 7BH 55H 65H 6AH 11H 18H FCH 19H 22H 72H 78H 11H 02H 78H
4140H=CDH FEH 01H 3AH 7FH 78H 5FH 16H 00H 21H C5H 7FH CDH 4FH 02H 11H
4150H=C6H 7FH 3EH 02H 12H CDH 15H 02H 3EH 2DH CDH 23H 02H 97H 32H C4H
4160H=7FH 06H 02H CDH F3H 4AH CDH 2CH 4BH 06H 02H 21H CBH 7FH CDH 8FH
4170H=02H 7DH FEH 05H DAH 96H 41H FEH 15H D2H 96H 41H 32H 7FH 78H 6FH
4180H=26H 00H 29H 29H 29H 29H 11H 4AH 48H CDH 7BH 55H 65H 6AH 11H C0H
4190H=F4H 19H 22H 74H 78H C9H 11H E8H 77H CDH 10H 01H C9H 11H E8H 77H
41A0H=CDH 10H 01H C9H 11H 0FH 78H CDH FEH 01H 3AH 80H 78H C6H 30H CDH
41B0H=23H 02H 3EH 2DH CDH 23H 02H 97H 32H C4H 7FH 06H 01H CDH F3H 4AH
41C0H=CDH 2CH 4BH 3AH CBH 7FH E6H 0FH FEH 03H D2H D1H 41H 32H 80H 78H
41D0H=C9H 11H E8H 77H CDH 10H 01H C9H 3AH 89H 78H B7H C0H CDH A9H 02H
41E0H=3EH 01H 32H 7DH 78H 32H 7CH 78H CDH 95H 4AH CDH 0CH 4AH 2AH 83H
41F0H=78H EBH 2AH 99H 78H CDH 75H 55H C8H 7EH FEH 81H CAH 0DH 42H FEH
4200H=0DH CAH 12H 42H CDH 23H 02H CDH A1H 4AH C3H E8H 41H 97H 32H 7DH
4210H=78H C9H CDH A1H 4AH 2AH 99H 78H 22H 6FH 78H C9H CDH A9H 02H 00H
4220H=00H 00H 00H 00H 2AH ADH 77H 36H 82H CDH 5EH 55H 22H ADH 77H 21H
4230H=00H 00H 22H 8CH 78H 22H 8EH 78H 22H 6DH 78H 00H 00H 00H 00H 00H
4240H=00H 00H 22H 90H 78H 22H 92H 78H C9H 11H 16H 78H CDH FEH 01H 3AH
4250H=80H 78H 47H 78H B7H CAH 78H 42H 21H 2AH 76H 3DH CAH 62H 42H 21H
4260H=3CH 76H 5EH 23H 56H 2AH 0FH 7BH C5H CDH 7BH 55H C1H 11H FFH 02H
4270H=CDH 75H 55H 78H 05H DAH 53H 42H 32H 96H 78H CDH 95H 4AH 97H C3H
4280H=67H 68H 3CH 32H 7CH 78H 3AH 89H 78H B7H C2H F8H 44H 21H A2H 78H
4290H=01H 18H 02H 3EH FFH 77H 23H 0DH C2H 95H 42H 05H C2H 95H 42H 97H
42A0H=32H A1H 78H 97H 32H 69H 76H 32H 77H 76H 21H 00H 80H 22H 28H 77H
42B0H=22H 2BH 77H 21H C0H 6FH 22H 21H 77H 22H 23H 77H 21H C7H 73H 11H
42C0H=00H 02H 77H 23H 1DH C2H C2H 42H 15H C2H C2H 42H 21H C7H 70H 11H
42D0H=00H 03H 77H 23H 1DH C2H D2H 42H 15H C2H D2H 42H 3EH 01H 32H 98H
42E0H=78H CDH 0CH 4AH 3AH 97H 78H B7H C2H FBH 42H 2AH 99H 78H 7EH FEH
42F0H=81H CAH F8H 42H 97H 32H 98H 78H CDH A1H 4AH 3AH 98H 78H B7H CAH
4300H=DCH 42H 3AH 97H 78H B7H C2H F8H 44H 97H 32H 98H 78H CDH 0CH 4AH
4310H=3AH 97H 78H B7H CAH 1FH 43H 3EH 01H 32H 98H 78H C3H EAH 44H 3AH
4320H=9BH 78H B7H CAH 49H 43H 2AH 99H 78H 7EH FEH 0DH CAH 42H 43H FEH
4330H=02H C2H E7H 44H 3EH 01H 32H 97H 78H 11H 23H 78H CDH 10H 01H C3H
4340H=E7H 44H 97H 32H 9BH 78H C3H E7H 44H 2AH 99H 78H 7EH FEH 20H CAH
4350H=6EH 43H D6H 30H DAH 5CH 43H FEH 0AH DAH C5H 43H FEH DDH CAH DBH
4360H=43H FEH 52H C2H E7H 44H 3EH 01H 32H 98H 78H C3H E7H 44H 3AH 9CH
4370H=78H B7H CAH E7H 44H 47H 21H 9DH 78H CDH 8FH 02H 11H A1H 78H 1AH
4380H=1FH D2H ABH 43H 1FH D2H BCH 43H 1FH DAH B2H 43H 21H 9DH 78H 06H
4390H=02H CDH 8FH 02H 29H 29H 29H 3AH 9FH 78H B7H CAH A2H 43H 01H 04H
43A0H=00H 09H 22H E6H 79H 3EH 07H 12H C3H B2H 43H 7DH 32H E4H 79H 3EH
43B0H=01H 12H 97H 32H 9CH 78H C3H E7H 44H C3H E7H 44H 22H E2H 79H 3EH
43C0H=03H 12H C3H B2H 43H 47H 21H 9CH 78H 7EH FEH 04H CAH E7H 44H 34H
43D0H=21H 9DH 78H 5FH 16H 00H 19H 70H C3H E7H 44H 97H 32H A1H 78H 3CH
```

```
43E0H=32H 9BH 78H 2AH 99H 78H 22H 6FH 78H 3AH 81H 78H 32H E9H 79H 3EH
43F0H=01H 32H EAH 79H 3AH E9H 79H 32H 1DH 7BH 21H 1BH 7BH CDH C6H 4AH
4400H=3AH F8H 7FH B7H CAH 1DH 44H 3EH 01H 32H 97H 78H 11H CBH 77H 3AH
4410H FAH 7FH C6H 30H 32H DDH 77H CDH 10H 01H C3H D9H 44H 2AH 03H 80H
4420H=EBH 21H 04H 80H 7AH 96H C2H 07H 44H 2BH 7BH 96H C2H 07H 44H 2AH
4430H=01H 80H 11H 03H 80H 19H 11H 05H 80H E5H D5H 2AH E2H 79H 1AH BDH
4440H=C2H 58H 44H 13H 1AH BCH C2H 58H 44H 2AH E6H 79H 13H 1AH BDH C2H
4450H=58H 44H 13H 1AH BCH CAH 68H 44H D1H 21H 09H 00H 19H EBH E1H CDH
4460H=75H 55H DAH 39H 44H C3H 81H 44H D1H E1H 2AH E4H 79H 26H 00H 01H
4470H=A2H 78H 29H 29H 29H 09H 22H F7H 79H 06H 08H CDH 6DH 53H C3H D9H
4480H=44H 21H E9H 79H 3AH EEH 76H BEH CAH 93H 44H 34H 97H 32H EAH 79H
4490H=C3H D9H 44H 3EH 01H 32H 97H 78H 3AH E4H 79H 5FH 16H 00H 21H 9DH
44A0H=78H CDH 4FH 02H 2AH 9FH 78H 22H 30H 7BH 2AH E2H 79H EBH 21H 33H
44B0H=7BH CDH 4FH 02H 2AH E6H 79H 06H 03H CDH 13H 55H 3EH 30H D2H C3H
44C0H=44H 3EH 35H 32H 3BH 7BH EBH 21H 9DH 78H CDH 4FH 02H 2AH 9FH 78H
44D0H=22H 38H 7BH 11H 23H 7BH CDH 10H 01H 3AH 97H 78H B7H C2H E7H 44H
44E0H=3AH EAH 79H B7H CAH EFH 43H CDH A1H 4AH 3AH 97H 78H B7H C2H F8H
44F0H=44H 3AH 98H 78H B7H CAH 09H 43H 3AH 97H 78H B7H C2H 02H 45H CDH
4500H=37H 45H 3AH 97H 78H B7H C2H 10H 45H 3AH EBH 79H B7H CAH 86H 42H
4510H=3AH 89H 78H B7H C2H 29H 45H 21H 1BH 01H 22H DEH 7FH 21H 80H 7BH
4520H=22H 99H 78H 22H 83H 78H 22H 6FH 78H 2AH ADH 77H EBH 2AH 10H 77H
4530H=CDH 75H 55H C2H 29H 45H C9H 97H 32H 89H 78H 32H EBH 79H 2AH ADH
4540H=77H 22H 85H 78H 2AH 99H 78H 22H 6FH 78H 97H 06H 0BH 21H ECH 79H
4550H=77H 23H 05H C2H 50H 45H 2AH 6FH 78H 22H 99H 78H 2AH 92H 78H 22H
4560H=87H 78H 2AH F7H 79H 22H 13H 7BH CDH 0CH 4AH 2AH 85H 78H CDH 5EH
4570H=55H CDH 20H 4BH 3AH 97H 78H B7H C2H 96H 45H 2AH 99H 78H 5EH 21H
4580H=F9H 79H 16H 00H 19H 7EH B7H F2H 90H 45H CDH C0H 45H C3H 93H 45H
4590H=CDH 70H 48H CDH A1H 4AH 3AH 97H 78H B7H C2H A4H 45H 3AH F0H 79H
45A0H=B7H CAH 68H 45H 3AH 97H 78H B7H C2H B2H 45H 3AH EDH 79H B7H CAH
45B0H=4AH 45H 2AH ADH 77H EBH 2AH 10H 77H CDH 75H 55H C2H B2H 45H C9H
45C0H=FEH 90H DAH CAH 45H FEH A4H DAH D9H 45H E6H 7FH 07H 6FH 26H 00H
45D0H=11H 3BH 4BH 19H 7EH 23H 66H 6FH E9H D6H 90H 6FH 26H 00H 11H F9H
45E0H=7AH 19H E5H C3H 9AH 68H 19H 7EH FEH 70H DAH F4H 45H 00H 00H 3EH
45F0H=01H 32H 6AH 78H E1H 7EH CDH 70H 48H C9H 2AH 99H 78H 23H 5EH 2AH
4600H=F3H 79H 16H 00H 19H 22H F3H 79H C9H 2AH 99H 78H 24H 5EH 2AH F5H
4610H=79H 16H 00H 19H 22H F5H 79H C9H 3AH EEH 79H B7H CAH 97H 46H CDH
4620H=5FH 49H 2AH 85H 78H CDH 5EH 55H CDH 20H 4BH CDH C9H 49H 22H F1H
4630H=79H E5H 2AH 6BH 78H CDH 12H 4BH 11H 2CH 01H 19H EBH 2AH ADH 77H
4640H=23H 23H 23H 73H 2AH 85H 78H 36H 81H 23H 72H 23H D1H 73H 23H 72H
4650H=CDH 5EH 55H 22H 85H 78H 2AH ADH 77H 23H 7EH 23H 66H 6FH 19H EBH
4660H=2AH 6DH 78H EBH CDH 75H 55H D2H 86H 46H 22H 6DH 78H EBH 2AH 72H
4670H=78H EBH CDH 75H 55H D2H 86H 46H 3EH 01H 32H 97H 78H 32H 89H 78H
4680H=11H 35H 78H CDH 10H 01H 3AH 97H 78H B7H C2H 97H 46H 2AH 85H 78H
4690H=22H ADH 77H 97H 32H 71H 78H 3AH ECH 79H B7H CAH ACH 46H 2AH 6FH
46A0H=78H 2BH 2BH 22H 99H 78H 3EH 01H 32H F0H 79H C9H 3EH 01H 32H F0H
46B0H=79H 3AH EFH 79H B7H CAH BEH 46H 3EH 01H 32H 71H 78H C9H CDH A1H
46C0H=4AH 2AH 99H 78H 22H 6FH 78H 2AH 90H 78H 22H 92H 78H 2AH 13H 7BH
46D0H=22H F7H 79H 2AH 8EH 78H 22H 8CH 78H C9H 2AH 99H 78H 23H 7EH 32H
46E0H=8AH 78H C9H 2AH 99H 78H 23H 66H 3AH 8AH 78H 6FH 22H 8AH 78H EBH
46F0H=2AH 87H 78H 7AH B7H FAH FCH 46H 19H C3H 02H 47H E6H 7FH 57H CDH
4700H=A8H 55H 22H 87H 78H EBH 2AH 74H 78H EBH CDH 75H 55H D2H 26H 47H
4710H=2AH 6DH 78H 11H 09H 6FH CDH 7BH 55H EBH 00H 00H C3H 9FH 67H 21H
4720H=00H 00H 22H 90H 78H C9H 2AH 87H 78H 22H 90H 78H C9H 2AH 99H 78H
4730H=23H 7EH 32H 8EH 78H C9H 2AH 99H 78H 23H 66H 3AH 8EH 78H 6FH EBH
4740H=21H 00H 00H CDH 75H 55H CAH 4DH 47H 2AH 8CH 78H 19H 22H 8CH 78H
4750H=22H 8EH 78H C9H CDH C9H 49H 22H F1H 79H 21H 00H 00H 22H F5H 79H
4760H=22H F3H 79H 2AH 99H 78H 23H 6EH 45H 26H 00H 29H 29H 29H 11H A2H
4770H=78H 19H 7EH FEH FFH C2H 93H 47H 3EH 01H 32H 97H 78H 58H 16H 00H
4780H=21H 9DH 78H CDH 4FH 02H 2AH 9FH 78H 22H 55H 78H 11H 43H 78H CDH
4790H=10H 01H C9H 3AH EEH 79H B7H CAH A6H 47H E5H CDH 5FH 49H E1H 22H
47A0H=13H 7BH CDH 5FH 49H C9H 22H 13H 7BH C9H CDH A1H 4AH CDH 0CH 4AH
47B0H=2AH 99H 78H 7EH FEH FFH C2H BEH 47H 3EH 01H 32H EBH 79H 3EH 01H
47C0H=32H F0H 77H 32H EDH 79H C9H 3AH 71H 78H B7H C2H D4H 47H 3EH 01H
47D0H=32H EFH 79H C9H 2AH 87H 78H E5H CDH F3H 48H D1H 2AH 6BH 78H CDH
47E0H=75H 55H C2H FDH 47H CDH C9H 49H 22H 78H 78H 2AH 99H 78H 36H 20H
```

```
47F0H=23H 7EH 32H 7AH 78H 36H 00H 3EH 01H 32H 69H 78H C9H 3EH 01H 32H
4800H=EFH 79H C9H 21H 69H 78H 7EH B7H C8H 36H 00H 2AH 99H 78H 36H 20H
4810H=23H 56H 36H 00H 3AH 7AH 78H 5FH 21H 21H 01H CDH 75H 55H DAH 2DH
4820H=48H 3EH 01H 32H 97H 78H 11H 57H 78H CDH 10H 01H C9H 2AH 85H 78H
4830H=36H 85H 23H 73H 23H 72H 23H EBH 2AH 78H 78H EBH 73H CDH 5EH 55H
4840H=D5H CDH 20H 4BH D1H 36H 86H 23H 72H E5H CDH C9H 49H EBH E1H 23H
4850H=73H 23H 72H CDH 5EH 55H 22H 85H 78H C9H 21H 00H 00H 22H 87H 78H
4860H=22H 90H 78H C9H 3EH 01H 32H 97H 78H 11H 57H 78H CDH 10H 01H C9H
4870H=47H 2AH 87H 78H 11H 6AH 78H 1AH B7H CAH 82H 48H 97H 12H 11H E0H
4880H=FFH 19H E5H C5H CDH F3H 48H C1H D1H 2AH 6BH 78H CDH 75H 55H C2H
4890H=DFH 48H 2AH 13H 7BH 23H 23H 5EH 23H 56H 21H 91H 00H 3AH 12H 7BH
48A0H=B7H CAH B2H 48H CDH 75H 55H D2H C0H 48H 3EH 01H 32H ECH 79H C3H
48B0H=E4H 48H CDH 75H 55H DAH C0H 48H 3EH 01H 32H ECH 79H C3H E4H 48H
48C0H=C5H CDH C9H 49H EBH 2AH 85H 78H C1H 70H 23H 36H 00H 23H 73H 23H
48D0H=72H CDH 5EH 55H 22H 85H 78H 2AH 99H 78H 36H 20H C3H E4H 48H 3EH
48E0H=01H 32H ECH 79H 2AH 99H 78H 23H 5EH 2AH F3H 79H 16H 00H 19H 22H
48F0H=F3H 79H C9H 11H EEH 79H 1AH B7H C0H 3EH 01H 12H 22H 6BH 78H 2AH
4900H=8CH 78H CDH 4FH 49H E5H CDH C9H 49H D1H 19H EBH 2AH 85H 78H 36H
4910H=80H 23H 73H 23H 72H CDH 5EH 55H 22H 85H 78H CDH 5EH 55H CDH 20H
4920H=4BH 21H 00H 00H 22H F3H 79H 22H F5H 79H 22H F1H 79H 2AH 13H 7BH
4930H=23H 23H 5EH 23H 56H 21H 90H 00H EBH CDH 75H 55H 3EH 01H DAH 42H
4940H=49H 97H 32H 12H 7BH CDH 5FH 49H CDH 5EH 55H CDH 20H 4BH C9H 11H
4950H=8EH 93H CDH 7BH 55H 29H 29H 7AH 07H 07H E6H 03H B5H 6FH C9H 2AH
4960H=85H 78H 36H 83H 23H 3AH 96H 78H 77H 23H EBH 2AH 13H 7BH 7EH 12H
4970H=23H 13H 7EH 12H EBH 13H D5H CDH 5EH 55H CDH 20H 4BH 36H 84H 23H
4980H=D1H E5H 1AH 6FH 13H 1AH 67H D5H 11H 90H 00H CDH 75H 55H D1H 3AH
4990H=12H 7BH 3FH CEH 00H 1FH DAH 9BH 49H E1H C9H 29H 29H 29H 29H 29H
49A0H=44H 7DH E6H F0H 4FH 13H 1AH 6FH 13H 1AH 67H 29H 29H 29H 29H 29H
49B0H=EBH E1H 72H 23H 7BH 0FH 0FH 0FH 0FH E6H 0FH B1H 77H 23H 70H CDH
49C0H=5EH 55H CDH 20H 4BH 22H 85H 78H C9H 2AH F5H 79H CDH 4FH 49H E5H
49D0H=2AH 13H 7BH 23H 23H 23H 23H 5EH 23H 56H 21H 29H 83H CDH 7BH 55H
49E0H=E5H 2AH F3H 79H E5H CDH 7BH 55H D1H E3H CDH 7BH 55H 65H 6AH 29H
49F0H=29H 29H 29H 7BH 0FH 0FH 0FH 0FH E6H 0FH B5H 6FH D1H EBH 06H 04H
4A00H=CDH 13H 55H 19H D1H 19H EBH 2AH F1H 79H 19H C9H 3AH 81H 78H B7H
4A10H=CAH 00H 00H 2AH 99H 78H EBH 2AH 83H 78H CDH 75H 55H C0H 21H E2H
4A20H=7FH 36H 07H 3AH DEH 7FH FEH 4CH C2H 38H 4AH 3AH DFH 7FH FEH 15H
4A30H=DAH 38H 4AH 47H 3EH 1BH 90H 77H E5H 2AH 83H 78H 22H E0H 7FH EBH
4A40H=2AH 6FH 78H CDH 75H 55H DAH 4CH 4AH 21H 00H 7FH CDH A8H 55H 29H
4A50H=7CH E1H B7H C8H BEH D2H 59H 4AH 77H 21H DCH 7FH 3EH 01H 77H 2BH
4A60H=36H 08H 2BH 77H 97H 32H E3H 7FH 3AH DAH 7FH 0FH 0FH D2H 68H 4AH
4A70H=3AH DBH 7FH B7H CAH 8EH 4AH 3EH 01H 32H 97H 78H 2AH 83H 78H 22H
4A80H=99H 78H 3EH 30H 32H DDH 77H 11H CBH 77H CDH 10H 01H C9H 2AH E0H
4A90H=7FH 22H 83H 78H C9H 21H 11H 7BH 7EH B7H C0H 36H 01H CDH CBH 57H
4AA0H=C9H 2AH 99H 78H 23H 23H 11H FFH 7EH CDH 75H 55H D2H B2H 4AH 21H
4AB0H=80H 7BH 22H 99H 78H 2AH 83H 78H 11H 00H 7FH CDH 75H 55H C0H 21H
4AC0H=80H 7BH 22H 83H 78H C9H 7EH 32H EEH 7FH 23H EBH 21H F9H 7FH 06H
4AD0H=07H CDH 6DH 53H 3EH 08H 32H F8H 7FH CDH EAH 4AH C9H 1AH 77H 13H
4AE0H=23H 0DH C2H DDH 4AH 05H C2H DDH 4AH C9H 3AH F8H 7FH FEH 08H CAH
4AF0H=EAH 4AH C9H 3AH C4H 7FH 5FH 16H 00H 3AH C4H 7FH BBH CAH F9H 4AH
4B00H=21H CBH 7FH 19H 7EH C5H CDH 52H 01H CDH 23H 02H C1H 05H C2H F3H
4B10H=4AH C9H 11H 11H B1H CDH 7BH 55H 29H 7AH 07H E6H 01H B5H 6FH C9H
4B20H=EBH 2AH CAH 75H CDH 75H 55H CAH 21H 4BH EBH C9H 11H 00H 40H 2AH
4B30H=00H 00H 1DH C2H 2FH 4BH 15H C2H 2FH 4BH C9H 64H 48H 18H 46H 64H
4B40H=48H AAH 47H FAH 45H 09H 46H DAH 46H E3H 46H 2DH 47H 36H 47H 54H
4B50H=47H C7H 47H 03H 48H 5AH 48H 64H 48H 21H 13H 77H 7EH 1FH DAH 7EH
4B60H=4BH 3EH 0BH D3H C0H DBH C0H 47H E6H 10H CAH 7EH 4BH 78H E6H 02H
4B70H=C2H 7EH 4BH 36H 01H 3EH 20H F3H D3H C0H FBH C3H CFH 57H E1H D1H
4B80H=C1H 3EH 20H F3H D3H C0H F1H FBH C9H F5H C5H D5H E5H 3AH 0DH 77H
4B90H=E6H 02H CAH A3H 4BH 3AH EDH 76H F6H 08H 32H EDH 76H D3H DAH 97H
4BA0H=32H 0DH 77H 97H 32H 12H 77H 32H 25H 77H C3H 59H 4BH 3AH C2H 7FH
4BB0H=B7H C4H 0DH 01H 7CH B7H C2H D1H 4BH 7DH FEH 04H D2H D1H 4BH FEH
4BC0H=00H C8H FEH 01H CCH 0DH 01H AFH 32H 98H 77H 22H 96H 77H C3H 38H
4BD0H=4CH 7DH E6H 03H FEH 01H CAH F4H 4BH FEH 00H CAH E9H 4BH E5H 6FH
4BE0H=26H 00H 22H 96H 77H E1H C3H 00H 4CH E5H 21H 04H 00H 22H 96H 77H
4BF0H=E1H C3H FCH 4BH E5H 21H 05H 00H 22H 96H 77H E1H 2BH 2BH 2BH 2BH
```

| | | | | | | | | | | | | | | | | |
|---|---|---|---|---|---|---|---|---|---|---|---|---|---|---|---|---|
| 4C00H= | 0EH | 02H | AFH | 7CH | 1FH | 67H | 7DH | 1FH | 6FH | 0DH | C2H | 02H | 4CH | 32H | 98H | 77H |
| 4C10H= | 7CH | B7H | 3AH | 95H | 77H | 4FH | C2H | 1EH | 4CH | 7DH | B9H | DAH | 38H | 4CH | 7DH | 91H |
| 4C20H= | 6FH | 7CH | DEH | 00H | 67H | E5H | D1H | 19H | 19H | 19H | EBH | 2AH | 96H | 77H | 19H | 22H |
| 4C30H= | 96H | 77H | 3AH | 95H | 77H | 32H | 98H | 77H | 2AH | 96H | 77H | 2BH | 22H | 96H | 77H | 3AH |
| 4C40H= | 98H | 77H | B7H | CAH | 47H | 4CH | 3DH | 32H | 99H | 77H | 21H | 3AH | 4DH | 22H | A6H | 77H |
| 4C50H= | 3EH | FFH | 32H | 9AH | 77H | 32H | C2H | 7FH | 3EH | 70H | D3H | CBH | 3EH | 01H | D3H | C9H |
| 4C60H= | 97H | D3H | C9H | 3EH | 34H | D3H | C9H | 2AH | 38H | 4DH | 7DH | D3H | C8H | 7CH | D3H | C8H |
| 4C70H= | C9H | F5H | D5H | E5H | 3AH | 9AH | 77H | 1FH | D2H | F5H | 4CH | 3AH | 99H | 77H | B7H | CAH |
| 4C80H= | ABH | 4CH | 2AH | A6H | 77H | 5EH | 23H | 56H | 23H | 22H | A6H | 77H | 21H | 99H | 77H | 35H |
| 4C90H= | 3EH | 70H | D3H | CBH | 3EH | 01H | D3H | C9H | 97H | D3H | C9H | 7BH | D3H | C8H | 7AH | D3H |
| 4CA0H= | C8H | E1H | D1H | 3EH | 20H | F3H | D3H | C0H | F1H | FBH | C9H | 32H | 9AH | 77H | 2AH | 96H |
| 4CB0H= | 77H | BDH | C2H | B9H | 4CH | BCH | CAH | F5H | 4CH | 3AH | 0DH | 77H | 1FH | D2H | D2H | 4CH |
| 4CC0H= | 3EH | 01H | 32H | 25H | 77H | 3CH | 32H | 0DH | 77H | 2AH | 0BH | 77H | 7DH | D3H | CAH | 7CH |
| 4CD0H= | D3H | CAH | 3EH | 70H | D3H | CBH | 2AH | 96H | 77H | 7DH | D3H | C9H | 7CH | D3H | C9H | 3AH |
| 4CE0H= | 98H | 77H | 21H | 95H | 77H | BEH | C2H | A1H | 4CH | 2AH | 9BH | 77H | 7DH | D3H | C8H | 7CH |
| 4CF0H= | D3H | C8H | C3H | A1H | 4CH | 21H | EDH | 76H | 7EH | E6H | F7H | 77H | D3H | DAH | 00H | 00H |
| 4D00H= | 00H | 00H | 00H | 00H | 00H | 00H | 00H | 21H | 0FH | 77H | 7EH | D6H | 03H | C2H | 11H | 4DH |
| 4D10H= | 77H | 21H | 99H | 77H | 3AH | 98H | 77H | 96H | CAH | 29H | 4DH | 34H | 2AH | A6H | 77H | 2BH |
| 4D20H= | 56H | 2BH | 5EH | 22H | A6H | 77H | C3H | 90H | 4CH | 97H | 32H | C2H | 7FH | 3EH | 34H | D3H |
| 4D30H= | CBH | 3EH | 70H | D3H | CBH | C3H | A1H | 4CH | 00H | 23H | 80H | 11H | ABH | 0BH | 3EH | 0AH |
| 4D40H= | 41H | 09H | 82H | 08H | EDH | 07H | 72H | 07H | 0CH | 07H | B5H | 06H | 6AH | 06H | 28H | 06H |
| 4D50H= | EDH | 05H | B9H | 05H | 89H | 05H | 5EH | 05H | 37H | 05H | 13H | 05H | F2H | 04H | D3H | 04H |
| 4D60H= | B6H | 04H | 9BH | 04H | 82H | 04H | 6BH | 04H | 55H | 04H | 40H | 04H | 2CH | 04H | 1AH | 04H |
| 4D70H= | 08H | 04H | F7H | 03H | E7H | 03H | D8H | 03H | C8H | 03H | BBH | 03H | AEH | 03H | A1H | 03H |
| 4D80H= | 95H | 03H | 89H | 03H | 7DH | 03H | 73H | 03H | 68H | 03H | 5EH | 03H | 54H | 03H | 4AH | 03H |
| 4D90H= | 41H | 03H | 38H | 03H | 30H | 03H | 27H | 03H | 1FH | 03H | 17H | 03H | 0FH | 03H | 08H | 03H |
| 4DA0H= | 01H | 03H | 00H | 03H | F3H | 02H | ECH | 02H | E6H | 02H | E0H | 02H | D9H | 02H | D3H | 02H |
| 4DB0H= | CEH | 02H | C8H | 02H | C2H | 02H | BDH | 02H | B7H | 02H | B2H | 02H | ADH | 02H | A8H | 02H |
| 4DC0H= | A3H | 02H | 9FH | 02H | 9AH | 02H | 95H | 02H | 91H | 02H | 8CH | 02H | 88H | 02H | 84H | 02H |
| 4DD0H= | 80H | 02H | 7CH | 02H | 78H | 02H | 74H | 02H | 70H | 02H | 6CH | 02H | 69H | 02H | 65H | 02H |
| 4DE0H= | 61H | 02H | 5EH | 02H | 5AH | 02H | 57H | 02H | 54H | 02H | 3AH | C3H | 7FH | B7H | C4H | 0DH |
| 4DF0H= | 01H | 7CH | B7H | C2H | 0EH | 4EH | 7DH | FEH | 04H | D2H | 0EH | 4EH | FEH | 00H | C8H | FEH |
| 4E00H= | 01H | CCH | 0DH | 01H | 22H | 9FH | 77H | AFH | 32H | A1H | 77H | C3H | 75H | 4EH | 7DH | E6H |
| 4E10H= | 03H | FEH | 01H | CAH | 31H | 4EH | FEH | 00H | CAH | 26H | 4EH | E5H | 6FH | 26H | 00H | 22H |
| 4E20H= | 9FH | 77H | E1H | C3H | 3DH | 4EH | E5H | 21H | 04H | 00H | 22H | 9FH | 77H | E1H | C3H | 39H |
| 4E30H= | 4EH | E5H | 21H | 05H | 00H | 22H | 9FH | 77H | E1H | 2BH | 2BH | 2BH | 2BH | 0EH | 02H | AFH |
| 4E40H= | 7CH | 1FH | 67H | 7DH | 1FH | 6FH | 0DH | C2H | 3FH | 4EH | 32H | A1H | 77H | 7CH | B7H | 3AH |
| 4E50H= | 9EH | 77H | 4FH | C2H | 5BH | 4EH | 7DH | B9H | DAH | 75H | 4EH | 7DH | 91H | 6FH | 7CH | DEH |
| 4E60H= | 00H | 67H | E5H | D1H | 19H | 19H | 19H | EBH | 2AH | 9FH | 77H | 19H | 22H | 9FH | 77H | 3AH |
| 4E70H= | 9EH | 77H | 32H | A1H | 77H | 2AH | 9FH | 77H | 2BH | 22H | 9FH | 77H | 3AH | A1H | 77H | B7H |
| 4E80H= | CAH | 84H | 4EH | 3DH | 32H | A4H | 77H | 21H | 3AH | 4DH | 22H | A2H | 77H | 3EH | FFH | 32H |
| 4E90H= | A5H | 77H | 32H | C3H | 7FH | 3EH | 70H | D3H | D3H | 3EH | 01H | D3H | D1H | 3EH | 00H | D3H |
| 4EA0H= | D1H | 3EH | 34H | D3H | D3H | 2AH | 38H | 4DH | 7DH | D3H | D0H | 7CH | D3H | D0H | C9H | F5H |
| 4EB0H= | D5H | E5H | 3AH | A5H | 77H | 1FH | D2H | 1AH | 4FH | 3AH | A4H | 77H | B7H | CAH | E9H | 4EH |
| 4EC0H= | 2AH | A2H | 77H | 5EH | 23H | 56H | 23H | 22H | A2H | 77H | 21H | A4H | 77H | 35H | 3EH | 70H |
| 4ED0H= | D3H | D3H | 3EH | 01H | D3H | D1H | 97H | D3H | D1H | 7BH | D3H | D0H | 7AH | D3H | D0H | E1H |
| 4EE0H= | D1H | F3H | 3EH | 20H | D3H | C0H | F1H | FBH | C9H | 32H | A5H | 77H | 2AH | 9FH | 77H | BDH |
| 4EF0H= | C2H | F7H | 4EH | BCH | CAH | 1AH | 4FH | 3EH | 70H | D3H | D3H | 2AH | 9FH | 77H | 7DH | D3H |
| 4F00H= | D1H | 7CH | D3H | D1H | 3AH | A1H | 77H | 21H | 9EH | 77H | BEH | C2H | DFH | 4EH | 2AH | AAH |
| 4F10H= | 77H | 7DH | D3H | D0H | 7CH | D3H | D0H | C3H | DFH | 4EH | 21H | A4H | 77H | 3AH | A1H | 77H |
| 4F20H= | 96H | CAH | 32H | 4FH | 34H | 2AH | A2H | 77H | 2BH | 56H | 2BH | 5EH | 22H | A2H | 77H | C3H |
| 4F30H= | CEH | 4EH | 97H | 32H | C3H | 7FH | 3EH | 34H | D3H | D3H | 3EH | 70H | D3H | D3H | C3H | DFH |
| 4F40H= | 4EH | 3AH | 0EH | 77H | 1FH | DAH | CBH | 50H | 2AH | 3DH | 77H | EBH | 2AH | 3BH | 77H | CDH |
| 4F50H= | 75H | 55H | DAH | 64H | 4FH | EBH | 2AH | 39H | 77H | EBH | CDH | A8H | 55H | 7DH | 32H | 5BH |
| 4F60H= | 77H | C3H | 6FH | 4FH | 2AH | 39H | 77H | EBH | CDH | A8H | 55H | 7DH | 32H | 5BH | 77H | 7CH |
| 4F70H= | B7H | CAH | 7CH | 4FH | 3EH | FFH | 32H | 5BH | 77H | C3H | B5H | 50H | 3AH | 5AH | 77H | 32H |
| 4F80H= | 17H | 77H | 21H | FFH | FFH | 22H | 19H | 77H | 97H | 32H | 18H | 77H | 01H | 17H | 77H | 0AH |
| 4F90H= | B7H | CAH | 3EH | 50H | 1FH | D2H | A9H | 4FH | 3EH | 01H | 32H | 18H | 77H | 2AH | 5DH | 77H |
| 4FA0H= | 22H | 19H | 77H | 21H | 5DH | 77H | 22H | 1BH | 77H | 0AH | E6H | 02H | CAH | CBH | 4FH | 2AH |
| 4FB0H= | 6BH | 77H | EBH | 2AH | 19H | 77H | CDH | 75H | 55H | D2H | CBH | 4FH | EBH | 22H | 19H | 77H |
| 4FC0H= | 3EH | 02H | 32H | 18H | 77H | 21H | 6BH | 77H | 22H | 1BH | 77H | 0AH | E6H | 04H | CAH | EDH |
| 4FD0H= | 4FH | 2AH | 79H | 77H | EBH | 2AH | 19H | 77H | CDH | 75H | 55H | D2H | EDH | 4FH | EBH | 22H |
| 4FE0H= | 19H | 77H | 21H | 79H | 77H | 22H | 1BH | 77H | 3EH | 04H | 32H | 18H | 77H | 0AH | E6H | 08H |
| 4FF0H= | CAH | 0FH | 50H | 2AH | 87H | 77H | EBH | 2AH | 19H | 77H | CDH | 75H | 55H | D2H | 0FH | 50H |
| 5000H= | EBH | 22H | 19H | 77H | 21H | 87H | 77H | 22H | 1BH | 77H | 3EH | 08H | 32H | 18H | 77H | 2AH |

```
5010H=39H 77H EBH 2AH 5BH 77H 26H 00H 19H 23H EBH 2AH 19H 77H CDH 75H
5020H=55H DAH 2DH 50H CAH 59H 50H CDH 4CH 53H C3H 7CH 4FH 2BH 22H 72H
5030H=52H 97H 32H 18H 77H 21H 70H 52H 22H 1BH 77H C3H 59H 50H 2AH 39H
5040H=77H EBH 2AH 5BH 77H 26H 00H 19H 11H 03H 00H 19H 22H 72H 52H 97H
5050H=32H 18H 77H 21H 70H 52H 22H 1BH 77H 2AH 39H 77H EBH 2AH 5BH 77H
5060H=26H 00H 19H 22H 19H 77H EBH 2AH 3BH 77H CDH 75H 55H C2H 9DH 50H
5070H=2AH 3DH 77H CDH 75H 55H C2H 7FH 50H CDH ADH 52H C3H 7CH 4FH 2AH
5080H=54H 77H 22H 1DH 77H CDH 90H 52H D2H 97H 50H 21H 17H 77H 3AH 18H
5090H=77H 2FH A6H 77H C3H 82H 4FH CDH ADH 52H C3H B5H 50H 2AH 3DH 77H
50A0H=CDH 75H 55H C4H 0DH 01H 2AH 4FH 77H 22H 1DH 77H CDH 90H 52H DAH
50B0H=BFH 50H CDH F5H 52H 2AH 39H 77H 23H 22H 39H 77H C3H 40H 52H 21H
50C0H=17H 77H 3AH 18H 77H 2FH A6H 77H C3H 82H 4FH 2AH 3DH 77H EBH 2AH
50D0H=3BH 77H CDH 75H 55H D2H E6H 50H EBH 2AH 39H 77H CDH A8H 55H 7DH
50E0H=32H 5BH 77H C3H F0H 50H 2AH 39H 77H CDH A8H 55H 7DH 32H 5BH 77H
50F0H=7CH B7H CAH FDH 50H 3EH FFH 32H 5BH 77H C3H 39H 52H 3AH 5AH 77H
5100H=32H 17H 77H 21H 00H 00H 22H 19H 77H 97H 32H 18H 77H 01H 17H 77H
5110H=0AH B7H CAH BEH 51H 1FH D2H 2AH 51H 3EH 01H 32H 18H 77H 2AH 5FH
5120H=77H 22H 19H 77H 21H 5DH 77H 22H 1BH 77H 0AH E6H 02H CAH 4BH 51H
5130H=2AH 19H 77H EBH 2AH 6DH 77H CDH 75H 55H D2H 4BH 51H 22H 19H 77H
5140H=21H 6BH 77H 22H 1BH 77H 3EH 02H 32H 18H 77H 0AH E6H 04H CAH 6CH
5150H=51H 2AH 19H 77H EBH 2AH 7BH 77H CDH 75H 55H D2H 6CH 51H 22H 19H
5160H=77H 21H 79H 77H 22H 1BH 77H 3EH 04H 32H 18H 77H 0AH E6H 08H CAH
5170H=8DH 51H 2AH 19H 77H EBH 2AH 89H 77H CDH 75H 55H D2H 8DH 51H 22H
5180H=19H 77H 21H 87H 77H 22H 1BH 77H 3EH 08H 32H 18H 77H 2AH 5BH 77H
5190H=EBH 2AH 39H 77H 16H 00H CDH A8H 55H 2BH EBH 2AH 19H 77H CDH 75H
51A0H=55H CAH DBH 51H D2H ADH 51H CDH 4CH 53H C3H FDH 50H 23H 22H 70H
51B0H=52H 97H 32H 18H 77H 21H 70H 52H 22H 1BH 77H C3H DBH 51H 2AH 5BH
51C0H=77H EBH 2AH 39H 77H 16H 00H CDH A8H 55H 11H FDH FFH 19H 22H 70H
51D0H=52H 97H 32H 18H 77H 21H 70H 52H 22H 1BH 77H 2AH 5BH 77H EBH 2AH
51E0H=39H 77H 16H 00H CDH A8H 55H 22H 19H 77H EBH 2AH 3BH 77H CDH 75H
51F0H=55H C2H 21H 52H 2AH 3DH 77H CDH 75H 55H C2H 03H 52H CDH ADH 52H
5200H=C3H FDH 50H 2AH 54H 77H 22H 1DH 77H CDH 90H 52H D2H 1BH 52H 21H
5210H=17H 77H 3AH 18H 77H 2FH A6H 77H C3H 03H 51H CDH ADH 52H C3H 39H
5220H=52H 2AH 3DH 77H CDH 75H 55H C4H 0DH 01H 2AH 4FH 77H 22H 1DH 77H
5230H=CDH 90H 52H DAH 60H 52H CDH F5H 52H 2AH 39H 77H 2BH 22H 39H 77H
5240H=2AH 4FH 77H EBH 2AH 51H 77H 1AH 77H 23H 23H 23H 13H 1AH 77H 13H
5250H=1AH D3H D2H 13H 1AH D3H D2H 13H 1AH D3H D8H 13H 1AH D3H D9H C9H
5260H=21H 17H 77H 3AH 18H 77H 2FH A6H 77H C3H 03H 51H FFH 00H 00H 00H
5270H=00H 00H 00H 00H 6CH 52H 0FH 00H 07H FFH 0DH 00H 7EH 52H 00H 00H
5280H=F8H FFH 07H FFH 07H FFH 07H 00H 00H 00H 00H C0H 00H 00H 00H F8H
5290H=2AH 1BH 77H 11H 06H 00H 19H 5EH 23H 56H 2AH 1DH 77H 01H FEH FFH
52A0H=09H 7EH 23H 66H 6FH 19H 11H FDH 03H C3H A9H 67H 00H CDH 2BH 53H
52B0H=2AH 1BH 77H 06H 07H 3AH 0EH 77H 1FH DAH C0H 52H 06H 05H 23H 23H
52C0H=5EH 23H 56H EBH 22H 3BH 77H 68H 26H 00H 19H 22H 4FH 77H 23H 23H
52D0H=23H 23H 5EH 23H 56H 21H 06H 00H 19H 22H 51H 77H 01H 53H 77H CDH
52E0H=E3H 52H C9H 21H 59H 77H 0AH 2FH A6H 77H 3AH 18H 77H 02H 2FH 21H
52F0H=5AH 77H A6H 77H C9H CDH 2BH 53H 2AH 1BH 77H 06H 07H 3AH 0EH 77H
5300H=1FH DAH 08H 53H 06H 05H 23H 23H 5EH 23H 56H EBH 22H 3DH 77H 68H
5310H=26H 00H 19H 22H 54H 77H 23H 23H 23H 23H 5EH 23H 56H 21H 06H 00H
5320H=19H 22H 56H 77H 01H 58H 77H CDH E3H 52H C9H 2AH 1BH 77H 23H 23H
5330H=23H 23H 5EH 23H 56H 1AH 47H 13H 1AH F6H 80H 12H 0FH E6H 80H B0H
5340H=4FH 06H 00H 21H C7H 73H 09H 09H 3CH C8H 35H C9H 2AH 1BH 77H 23H
5350H=23H 23H 23H 5EH 23H 56H 13H 1AH F6H 40H 12H 11H 18H 77H 21H 59H
5360H=77H 1AH 2FH A6H 77H 21H 5AH 77H 1AH 2FH A6H 77H C9H 1AH 77H 13H
5370H=23H 05H C2H 6DH 53H C9H 1AH BEH C0H 13H 23H 05H C2H 76H 53H C9H
5380H=2AH 26H 77H CDH 5EH 55H 22H 26H 77H 3EH 01H 32H 14H 77H C9H D5H
5390H=11H C6H 70H CDH 75H 55H D2H 9CH 53H 21H 77H 70H D1H C9H D5H 11H
53A0H=76H 70H CDH 75H 55H D2H ABH 53H 21H C0H 6FH D1H C9H 2AH 21H 77H
53B0H=EBH 2AH 23H 77H CDH 75H 55H CAH BAH 54H 1AH 4FH 06H 00H 21H C7H
53C0H=73H 09H 09H 7EH B7H CAH 8CH 54H 13H 13H 13H EBH CDH 9EH 53H 4EH
53D0H=EBH 2AH 23H 77H CDH 75H 55H CAH BAH 54H 06H 00H 21H C7H 73H 09H
53E0H=09H 7EH B7H C2H C8H 53H 2AH 21H 77H 46H 21H 61H 77H 3AH 59H 77H
53F0H=1FH D2H FAH 53H CDH BBH 54H CAH BAH 54H 21H 6FH 77H 3AH 59H 77H
5400H=E6H 02H CAH 0BH 54H CDH BBH 54H CAH BAH 54H 21H 7DH 77H 3AH 59H
5410H=77H E6H 04H CAH 1CH 54H CDH BBH 54H CAH BAH 54H 21H 8BH 77H 3AH
```

```
5420H= 59H 77H E6H 08H CAH 2DH 54H CDH BBH 54H CAH BAH 54H 2AH 2BH 77H
5430H= EBH D5H 2AH 28H 77H 23H 4EH 23H 46H 2BH 2BH EBH 03H 03H 03H 79H
5440H= B7H CAH 45H 54H 04H CDH DDH 4AH CDH AFH 55H 22H 2BH 77H EBH CDH
5450H= AFH 55H 22H 28H 77H 2AH 21H 77H 7EH E3H EBH 2AH 23H 77H 22H 00H
5460H= 7FH 77H 4FH 23H 73H 23H 72H 23H CDH 9EH 53H 22H 23H 77H E1H 23H
5470H= 23H 23H CDH 9EH 53H 22H 21H 77H 21H C7H 73H 06H 00H 09H 09H 23H
5480H= 3AH 00H 7FH 77H 3EH 01H 32H 14H 77H C3H BAH 54H 2AH 28H 77H 23H
5490H= 5EH 23H 56H 2BH 2BH 13H 13H 13H 19H CDH AFH 55H 22H 28H 77H 21H
54A0H= C7H 70H 09H 09H 09H 7EH E6H 7FH 77H 2AH 21H 77H 23H 23H 23H CDH
54B0H= 9EH 53H 22H 21H 77H 3EH 01H 32H 14H 77H C9H 5EH 23H 56H 1AH 4FH
54C0H= 13H 1AH 0FH E6H 80H B1H B8H C9H 3AH 46H 23H 7EH 0FH E6H 07H 4FH
54D0H= 78H 07H 07H 07H 47H E6H F8H B1H 4FH 78H E6H 07H 47H 7EH 07H 07H
54E0H= 07H E6H 07H 5FH 23H 7EH 07H 07H 07H 57H E6H F8H B3H 5FH 7AH E6H
54F0H= 07H 57H C9H 2AH 2BH 77H 11H 00H 80H CDH A8H 55H E5H 2AH 28H 77H
5500H= CDH A8H 55H D1H CDH 75H 55H DAH 0EH 55H 01H 00H 40H 09H CDH A8H
5510H= 55H 2BH C9H B7H 7CH 1FH 67H 7DH 1FH 6FH 05H C2H 13H 55H C9H 1EH
5520H= 11H 7CH 67H 7AH 17H 57H 7DH 17H 6FH 1DH C8H 7CH 17H D2H 35H 55H
5530H= 90H 37H C3H 22H 55H 90H 3FH DAH 22H 55H 80H B7H C3H 22H 55H 7BH
5540H= ADH E6H FCH C0H 7CH BAH C9H 2BH 2BH 2BH 2BH 7DH E6H FCH 6FH D5H
5550H= 11H BFH 69H CDH 75H 55H DAH 5CH 55H 21H BCH 6FH D1H C9H 23H 23H
5560H= 23H 23H 7DH E6H FCH 6FH D5H 11H BFH 6FH CDH 75H 55H D2H 73H 55H
5570H= 21H C0H 69H D1H C9H 7AH BCH C0H 7BH BDH C9H 7DH E5H 0EH 02H 06H
5580H= 08H 21H 00H 00H 29H 17H D2H 8CH 55H 19H CEH 00H 05H C2H 84H 55H
5590H= 0DH CAH 9FH 55H C1H E5H 6CH 67H E5H 78H 0EH 01H C3H 7FH 55H D1H
55A0H= 19H CEH 00H D1H 55H 6CH 67H C9H 7DH 93H 6FH 7CH 9AH 67H C9H D5H
55B0H= 11H FFH BFH CDH 75H 55H D2H BFH 55H 11H 00H C0H 19H D1H C9H 11H
55C0H= FFH 7FH CDH 75H 55H DAH CCH 55H 11H 00H 40H 19H D1H C9H EBH 2AH
55D0H= DFH 76H CDH 75H 55H CAH 13H 56H 01H EDH 76H DAH 09H 56H EBH CDH
55E0H= A8H 55H 11H 01H 00H CDH 75H 55H DAH F4H 55H 21H 02H 00H CDH 14H
55F0H= 56H C3H 13H 56H 0AH F6H 40H 02H D3H DAH E5H CDH EAH 4DH D1H 2AH
5600H= DFH 76H 19H 22H DFH 76H C3H 13H 56H CDH A8H 55H 11H 0AH 00H 19H
5610H= CDH 14H 56H C9H 0AH E6H BFH 02H D3H DAH E5H CDH EAH 4DH D1H 2AH
5620H= DFH 76H CDH A8H 55H 22H DFH 76H C9H EBH 2AH E7H 76H CDH 75H 55H
5630H= CAH 7CH 56H 01H EDH 76H E5H DAH 5CH 56H EBH CDH A8H 55H 11H 01H
5640H= 00H CDH 75H 55H DAH 49H 56H 23H 23H 0AH F6H 20H 02H D3H DAH E5H
5650H= CDH ADH 4BH D1H E1H 19H 22H E7H 76H C3H 7CH 56H CDH A8H 55H 11H
5660H= 01H 00H CDH 75H 55H DAH 6AH 56H 23H 23H 0AH E6H DFH 02H D3H DAH
5670H= E5H CDH ADH 4BH D1H E1H CDH A8H 55H 22H E7H 76H C9H E5H 2AH EAH
5680H= 76H 22H 9BH 77H E1H 3AH E9H 76H 32H 95H 77H CDH 29H 56H C9H 21H
5690H= E3H 75H 01H ECH 76H 0AH E6H 8FH B6H 02H D3H DBH 2AH E1H 75H EBH
56A0H= 2AH 0FH 7BH CDH 7BH 55H 29H 29H 7AH 07H 07H E6H 03H B5H 6FH EBH
56B0H= 2AH 94H 78H EBH 22H 94H 78H CDH 75H 55H CAH 40H 57H EBH 2AH 19H
56C0H= 7BH 3AH CEH 75H FEH 03H C2H CCH 56H 2AH 0DH 7BH CDH 7BH 55H 29H
56D0H= 29H 29H 29H 29H 29H 7CH 1FH E6H 7FH F5H 2FH 5FH 16H FFH 13H D3H
56E0H= 98H 01H EDH 76H 0AH F6H 20H 02H D3H DAH 00H 00H 00H 01H 00H 00H
56F0H= DBH DFH 03H 79H E6H 0FH C2H F0H 56H 7CH 2FH D3H 88H D3H A0H 19H
5700H= 78H D6H 20H C2H 0BH 57H 57H F1H 5FH 06H A2H FEH A2H C2H F0H 56H
5710H= D3H 98H 2AH EAH 75H 11H 00H 00H CDH 75H 55H CAH 22H 57H 11H F7H
5720H= FEH 19H EBH 2AH E7H 76H CDH A8H 55H 11H 4AH FDH 19H 2CH 2DH CAH
5730H= 33H 57H 24H DBH DFH 2DH C2H 33H 57H 25H C2H 33H 57H 2AH 94H 78H
5740H= 11H FFH 03H 19H 7DH 2FH D3H 88H 7CH 2FH D3H 90H C9H 2AH CCH 75H
5750H= EBH 2AH DFH 76H CDH 75H 55H 37H C2H CAH 57H 3AH C3H 7FH 1FH D2H
5760H= A2H 57H FEH 25H CAH 89H 57H FEH 54H CAH 70H 57H 37H C3H CAH 57H
5770H= 3AH A5H 77H 1FH DAH 80H 57H 21H A1H 77H 3EH 2EH BEH C3H CAH 57H
5780H= 21H 9EH 77H 3EH 0FH BEH C3H CAH 57H 3AH 9AH 77H 1FH DAH 99H 57H
5790H= 21H A1H 77H 3EH 0BH BEH C3H CAH 57H 21H 9EH 77H 3EH 04H BEH C3H
57A0H= CAH 57H 3AH ECH 76H E6H 04H 37H CAH CAH 57H 3AH DCH 75H FEH 09H
57B0H= D2H CAH 57H 3AH 12H 77H 1FH D2H CAH 57H 3EH 80H D3H CBH DBH CAH
57C0H= 6FH DBH CAH 67H 11H 5BH C2H CDH 75H 55H C9H F5H C5H D5H E5H 3AH
57D0H= F0H 76H 1FH DAH E6H 5AH 2AH F1H 76H EBH 2AH ADH 77H CDH 3FH 55H
57E0H= CAH E6H 5AH 2AH EFH 75H CDH 3FH 55H C2H 45H 58H 1AH FEH 80H C2H
57F0H= 26H 58H 13H 1AH 6FH 13H 1AH 67H 22H F3H 76H 13H 1AH 32H F1H 75H
5800H= EBH 2AH E3H 76H EBH CDH 75H 55H DCH 0DH 01H 3EH 02H 32H F9H 76H
5810H= 21H 00H 00H 22H F5H 76H 22H F7H 76H 97H 32H FFH 76H 32H ECH 75H
5820H= 32H EFH 76H C3H D8H 5AH FEH 82H C4H 0DH 01H 21H 00H 00H 22H F4H
```

```
5830H=75H 21H 0FH 00H 22H F6H 75H 2AH DDH 76H 22H F1H 75H 3EH 01H 32H
5840H=F0H 76H C3H D8H 5AH 1AH FEH 87H D4H 0DH 01H FEH 80H DAH D8H 5AH
5850H=FEH 84H C2H BEH 58H EBH CDH 47H 55H 7EH FEH 83H C4H 0DH 01H 23H
5860H=7EH 32H FAH 76H CDH 5EH 55H EBH 13H 1AH 67H 13H 1AH 0FH 0FH 0FH
5870H=0FH E6H E0H 6FH 22H FDH 76H 1AH E6H E0H 6FH 13H 1AH 67H 22H FBH
5880H=76H 3AH F9H 76H 47H 3AH FAH 76H B8H D2H 6FH 58H 32H F9H 76H EBH
5890H=2AH F7H 76H EBH CDH 75H 55H D2H 9DH 58H 22H F7H 76H 11H 00H 12H
58A0H=CDH 75H 55H DAH ABH 58H 3EH 01H 32H FFH 76H 2AH F5H 76H EBH 2AH
58B0H=FDH 76H CDH 75H 55H D2H D8H 5AH 22H F5H 76H C3H D8H 5AH FEH B1H
58C0H=C2H BEH 5AH 2AH F7H 76H 11H 00H 12H CDH 75H 55H D2H DEH 58H 3AH
58D0H=FFH 76H 1FH DCH 0DH 01H 3EH 03H 32H F3H 75H C3H F7H 58H 11H 00H
58E0H=0BH CDH 75H 55H DAH F2H 58H 3AH F9H 76H E6H 03H 32H F3H 75H C3H
58F0H=F7H 58H 3EH 00H 32H F3H 75H 3AH F8H 76H FEH 0EH DAH 01H 59H 3EH
5900H=0DH FEH 05H D2H 08H 59H 3EH 05H 87H 87H 6FH 26H 00H 11H 71H 76H
5910H=3AH F3H 75H 47H FEH 01H CAH 1EH 59H FEH 02H C2H 21H 59H 11H 95H
5920H=76H 19H 5EH 23H 56H 23H 4EH 78H 23H 46H FEH 03H C2H 3AH 59H 2AH
5930H=D9H 76H 19H EBH 2AH D7H 76H 09H 44H 4DH EBH 22H FCH 75H 3AH EFH
5940H=76H B7H CAH 52H 59H 97H 32H F3H 75H 01H A6H FFH 21H 00H 00H 22H
5950H=FCH 75H 2AH F1H 76H 23H 66H 3AH F1H 75H 6FH E5H 09H 22H F1H 75H
5960H=D1H 2AH DBH 76H EBH CDH 75H 55H DCH 0DH 01H 3AH F3H 75H 87H 47H
5970H=87H 87H 87H 80H 6FH 26H 00H 11H 13H 76H 19H 11H 01H 76H EBH 06H
5980H=12H CDH 6DH 53H 3AH F6H 76H FEH 05H D2H 8EH 59H 3EH 05H FEH 12H
5990H=DAH 95H 59H 3EH 11H 6FH 26H 00H 11H C4H 76H 19H 4EH 3EH 18H 91H
59A0H=6FH 3AH F3H 75H FEH 01H CAH AEH 59H FEH 02H C2H B4H 59H 7DH D6H
59B0H=02H E6H FEH 6FH 7DH 32H FEH 75H C5H 2AH F1H 76H 23H 23H 5EH 23H
59C0H=56H EBH 22H EDH 75H 55H 6CH 26H 00H 3AH 04H 76H 47H CDH 1FH 55H
59D0H=65H 6AH 11H 1CH 00H 19H C1H 06H 00H 09H 3AH F3H 75H FEH 01H CAH
59E0H=E7H 59H FEH 02H C2H EDH 59H 23H 23H 7DH E6H FEH 6FH 22H FFH 75H
59F0H=EBH 2AH F3H 76H 19H DCH 0DH 01H EBH 2AH E3H 76H EBH CDH 75H 55H
5A00H=DCH 0DH 01H 2AH FEH 75H 26H 00H 2BH 3AH F3H 75H FEH 01H CAH 16H
5A10H=5AH FEH 02H C2H 17H 5AH 2BH 3AH 04H 76H 5FH 16H 00H CDH 7BH 55H
5A20H=42H 4BH 2AH F3H 76H EBH 2AH E1H 76H 19H EBH 2AH 0DH 76H EBH CDH
5A30H=A8H 55H E5H 09H 22H 00H 7FH 2AH FFH 75H 23H 23H 3AH F3H 75H FEH
5A40H=01H CAH 49H 5AH FEH 02H C2H 4BH 5AH 23H 23H 3AH 04H 76H 5FH 16H
5A50H=00H CDH 7BH 55H E1H 19H EBH 2AH 11H 76H CDH 7BH 55H EBH 22H 02H
5A60H=7FH 13H 13H 2AH 0FH 76H 19H EBH 2AH 01H 76H 26H 00H 29H E5H 19H
5A70H=22H F6H 75H 2AH 00H 7FH EBH 2AH 11H 76H CDH 7BH 55H 4BH 42H EBH
5A80H=13H 13H 2AH 0FH 76H 19H D1H CDH A8H 55H 22H F4H 75H 58H 16H 01H
5A90H=2AH 02H 76H CDH 7BH 55H 22H F8H 75H 2AH 02H 7FH EBH 21H 00H 00H
5AA0H=CDH A8H 55H 5CH 16H FFH 2AH E5H 76H 19H EBH 2AH 02H 76H CDH 7BH
5AB0H=55H 65H 6AH 22H FAH 75H 3EH 01H 32H F0H 76H C3H D8H 5AH FEH 80H
5AC0H=CCH 0DH 01H FEH 82H CCH 0DH 01H FEH 85H C2H D8H 5AH 3EH 01H 32H
5AD0H=EFH 76H 32H ECH 75H C3H D8H 5AH 2AH F1H 76H CDH 5EH 55H 22H F1H
5AE0H=76H 3EH 01H 32H 14H 77H 3AH 0FH 77H 1FH DAH 33H 5BH 2AH EFH 75H
5AF0H=EBH 2AH 10H 77H CDH 75H 55H C2H 1DH 5BH 3AH F0H 76H 1FH D2H 4BH
5B00H=68H 21H C7H 75H 11H ECH 75H 06H 25H CDH 6DH 53H 2AH F1H 76H 22H
5B10H=EFH 75H 97H 32H F0H 76H 3CH 32H 0FH 77H C3H EBH 5CH 2AH 10H 77H
5B20H=7EH 17H DAH EBH 5CH 23H 7EH 17H DAH EBH 5CH 3EH 01H 32H 0FH 77H
5B30H=C3H EBH 5CH 1FH DAH EBH 5CH 3AH 12H 77H 1FH DAH A0H 5BH 2AH DFH
5B40H=76H EBH 2AH CCH 75H CDH 75H 55H CAH 7AH 5BH 3AH ECH 76H E6H 04H
5B50H=C2H 60H 5BH 3AH C3H 7FH 1FH DAH A0H 5BH CDH CEH 55H C3H A0H 5BH
5B60H=11H ECH 76H 1AH E6H FBH 12H D3H DBH 3EH 01H 02H 32H 12H 77H 3EH
5B70H=00H D3H CAH 3EH 46H D3H CAH C3H A0H 5BH 01H ECH 76H 0AH E6H 04H
5B80H=C2H A0H 5BH 3AH C3H 7FH 1FH DAH A0H 5BH 0AH F6H 04H 02H D3H DBH
5B90H=3EH 01H 32H 25H 77H 32H 12H 77H 3EH 00H D3H CAH 3EH D2H D3H CAH
5BA0H=3AH C2H 7FH 1FH DAH EBH 5CH 3AH C7H 75H B7H C2H 63H 5CH 2AH E7H
5BB0H=76H EBH 2AH D1H 75H D5H CDH 75H 55H DAH BDH 5BH EBH CDH A8H 55H
5BC0H=D1H E5H 2AH CFH 75H CDH 75H 55H DAH CCH 5BH EBH CDH A8H 55H D1H
5BD0H=CDH 75H 55H D2H 63H 5CH 2AH E7H 76H EBH 2AH D1H 75H CDH 75H 55H
5BE0H=C2H 5DH 5CH CDH 8FH 56H CDH 4DH 57H DAH EBH 5CH 97H D3H DFH 2AH
5BF0H=DAH 75H 7DH F6H 80H D3H DFH 3AH CEH 75H FEH 01H CAH 64H 5CH FEH
5C00H=02H C2H 0AH 5CH 7CH 1FH 67H 7DH 1FH 6FH 22H 39H 77H 22H 3BH 77H
5C10H=22H 3DH 77H 3EH 01H 32H 0EH 77H 97H 32H 53H 77H 32H 58H 77H 32H
5C20H=59H 77H 32H 5AH 77H CDH 41H 4FH 3EH 01H 32H 0DH 77H 2AH D5H 75H
5C30H=22H 0BH 77H 2AH EFH 75H CDH 47H 55H 22H 3FH 77H 3AH E0H 75H F6H
```

```
5C40H=A0H D3H DFH 2AH DDH 75H 22H 9BH 77H 3AH DCH 75H 32H 95H 77H 2AH
5C50H=CFH 75H CDH 29H 56H 3EH 03H 32H 0FH 77H C3H EBH 5CH CDH 7DH 56H
5C60H=C3H EBH 5CH 2AH E7H 76H EBH 2AH CFH 75H CDH 75H 55H C2H E8H 5CH
5C70H=CDH 8FH 56H CDH 4DH 57H DAH EBH 5CH 97H D3H DFH 67H 3AH D9H 75H
5C80H=6FH F6H 80H D3H DFH 3AH CEH 75H FEH 01H CAH 92H 5CH FEH 02H C2H
5C90H=98H 5CH 7CH 1FH 67H 7DH 1FH 6FH 22H 39H 77H 22H 3BH 77H 22H 3DH
5CA0H=77H 97H 32H 0EH 77H 32H 53H 77H 32H 58H 77H 32H 59H 77H 32H 5AH
5CB0H=77H CDH 41H 4FH 3EH 01H 32H 0DH 77H 2AH D3H 75H 22H 0BH 77H 2AH
5CC0H=CAH 75H 22H 3FH 77H 3AH E0H 75H F6H 80H E6H DFH D3H DFH 2AH DDH
5CD0H=75H 22H 9BH 77H 3AH DCH 75H 32H 95H 77H 2AH D1H 75H CDH 29H 56H
5CE0H=3EH 03H 32H 0FH 77H C3H EBH 5CH CDH 7DH 56H 3AH F8H 7FH 47H FEH
5CF0H=08H CAH 90H 5DH 3AH 2FH 77H E6H 03H 4FH CAH 48H 5DH 78H B7H CAH
5D00H=1EH 5DH 3AH FAH 7FH C6H 30H 32H DDH 77H 11H CBH 77H CDH 10H 01H
5D10H=3EH 08H 32H F8H 7FH 11H 16H 78H CDH FEH 01H C3H 90H 5DH 79H 1FH
5D20H=3EH 03H 21H DBH 7FH D2H 31H 5DH 32H D0H 7FH 21H D1H 7FH C3H 34H
5D30H=5DH 32H DAH 7FH 11H F8H 7FH 06H 08H CDH 6DH 53H 3EH 01H 32H 14H
5D40H=77H 97H 32H 2FH 77H C3H 90H 5DH 3AH D0H 7FH FEH 01H C2H 6DH 5DH
5D50H=3EH 01H 32H EEH 7FH 21H D8H 7FH 11H FFH 7FH 06H 08H 7EH 12H 2BH
5D60H=1BH 05H C2H 5DH 5DH 3EH 01H 32H 2FH 77H C3H 90H 5DH 3AH DAH 7FH
5D70H=FEH 01H C2H 90H 5DH 3AH E3H 7FH 32H EEH 7FH 21H E2H 7FH 11H FFH
5D80H=7FH 06H 08H 7EH 12H 2BH 1BH 05H C2H 83H 5DH 3EH 02H 32H 2FH 77H
5D90H=21H D0H 7FH 7EH FEH 03H C2H 1BH 5FH 36H 00H 2AH 2DH 77H 11H 00H
5DA0H=00H CDH 75H 55H CAH B4H 5DH EBH 2AH D6H 7FH CDH AFH 55H CDH 75H
5DB0H=55H C4H 0DH 01H 2AH 2BH 77H 3AH 31H 77H BEH C4H 0DH 01H 3AH 30H
5DC0H=77H 1FH DAH ACH 5EH 1FH DAH 61H 5EH 3AH 38H 77H 1FH D2H DDH 5DH
5DD0H=EBH 2AH 34H 77H EBH 3AH 36H 77H 77H 23H 73H 23H 72H 2AH D6H 7FH
5DE0H=CDH AFH 55H 22H 2BH 77H 21H 37H 77H 35H CAH 36H 5EH 2AH 2BH 77H
5DF0H=2BH 2BH 2BH CDH AFH 55H 22H D6H 7FH 22H 2BH 77H 7EH 32H 36H 77H
5E00H=23H 5EH 23H 56H EBH 22H 34H 77H 3EH 01H 32H D8H 7FH 32H D0H 7FH
5E10H=32H 38H 77H 21H D5H 7FH 35H 2BH 34H 3EH 08H 32H D1H 7FH 21H 00H
5E20H=00H 3AH 37H 77H 3DH C2H 2BH 5EH 2AH 32H 77H 22H 2DH 77H 3EH 04H
5E30H=32H 30H 77H C3H 1BH 5FH 2AH 23H 77H 5EH 23H 4EH 23H 46H 23H CDH
5E40H=9EH 53H 22H 23H 77H 21H 00H 00H 55H 19H 19H 19H 11H C7H 70H 19H
5E50H=7EH F6H 80H 77H 23H 7EH 03H 02H 23H 03H 7EH E6H 3FH 02H C3H 1BH
5E60H=5FH E5H 2AH 60H 76H 29H 29H 29H 29H 29H 16H 00H 3AH 63H 76H 47H
5E70H=CDH 1FH 55H 65H 6AH 22H 67H 76H 22H 65H 76H 21H 69H 76H 01H C7H
5E80H=70H 7EH 1FH D2H 91H 5EH 21H 77H 76H 7EH 1FH DCH 0DH 01H 01H 47H
5E90H=72H C5H 11H 5BH 76H 06H 0EH CDH 6DH 53H E1H D1H 13H 13H 13H 06H
5EA0H=FFH CDH 6DH 53H 06H 81H CDH 6DH 53H C3H 1BH 5FH 11H 05H 00H 19H
5EB0H=CDH AFH 55H EBH D5H 21H 5CH 76H 06H 06H CDH 76H 53H CAH 07H 5FH
5EC0H=E1H 11H 09H 00H 19H CDH AFH 55H EBH 2AH D6H 7FH CDH AFH 55H CDH
5ED0H=75H 55H C2H B4H 5EH 21H D3H 7FH 3AH EEH 76H BEH CCH 0DH 01H 34H
5EE0H=23H 36H 00H 23H 36H 83H 2AH 2BH 77H 22H D6H 7FH 3EH 01H 32H D0H
5EF0H=7FH 32H D8H 7FH 3EH 08H 32H D1H 7FH 3EH 01H 32H 30H 77H 21H 00H
5F00H=00H 22H 2DH 77H C3H 1BH 5FH D1H 2AH 1FH 77H 06H 09H CDH 6DH 53H
5F10H=3AH D3H 7FH 77H 23H CDH 8FH 53H 22H 1FH 77H 2AH ADH 77H EBH 2AH
5F20H=26H 77H CDH 75H 55H CAH C4H 61H 7EH FEH 87H D4H 0DH 01H FEH 80H
5F30H=D2H 35H 60H 23H 7EH E6H 20H CAH 40H 5FH CDH 80H 53H C3H C4H 61H
5F40H=2BH 3AH 2AH 77H 0FH B6H 4FH 06H 00H EBH 21H C7H 70H 09H 09H 09H
5F50H=7EH 17H D2H 6CH 5FH 21H C7H 73H 09H 09H 7EH 3CH CAH C4H 61H 34H
5F60H=EBH 23H 7EH F6H 20H 77H CDH 80H 53H C3H C4H 61H FEH 9AH C2H 7FH
5F70H=5FH 2AH 26H 77H 23H 7EH F6H 80H 77H CDH 80H 53H C3H C4H 61H 3AH
5F80H=D0H 7FH 1FH DAH C4H 61H E5H CDH F3H 54H EBH C1H 03H 0AH 6FH 03H
5F90H=0AH E6H 3FH 67H 23H 23H 23H CDH 75H 55H DAH 2FH 60H E5H C5H 2AH
5FA0H=21H 77H EBH 2AH 23H 77H 23H 23H 23H CDH 9EH 53H CDH 75H 55H C1H
5FB0H=E1H CAH 2FH 60H EBH 2AH 2BH 77H 19H CDH AFH 55H 22H 32H 77H 0AH
5FC0H=07H 07H E6H 03H 3CH 32H 37H 77H 3DH CAH CFH 5FH 21H 00H 00H 22H
5FD0H=2DH 77H 0BH 0BH 0AH E6H 7FH 32H D4H 7FH 2AH 26H 77H 7EH 32H D5H
5FE0H=7FH 32H 31H 77H 3AH 2AH 77H 1FH 7EH 11H 72H 76H D2H F4H 5FH F6H
5FF0H=80H 11H 80H 76H 4FH 06H 00H 2AH 23H 77H E5H 77H 1AH 32H D3H 7FH
6000H=23H EBH 2AH 2BH 77H EBH 73H 23H 72H 21H C7H 73H 09H 09H 36H 00H
6010H=23H C1H 71H EBH 22H D6H 7FH 3EH 01H 32H D0H 7FH 32H D8H 7FH 32H
6020H=D2H 7FH 3EH 08H 32H D1H 7FH 3EH 04H 32H 30H 77H C3H C4H 61H CDH
6030H=ADH 53H C3H C4H 61H FEH 84H C2H C1H 61H CDH 47H 55H 7EH FEH 83H
6040H=C4H 0DH 01H 23H 23H 5EH 23H 56H EBH 22H 5CH 76H EBH CDH 5EH 55H
```

```
6050H=23H CDH C9H 54H EBH 22H 5EH 76H 60H 69H 22H 60H 76H 3AH 69H 76H
6060H= 1FH D2H 74H 60H 11H 5CH 76H 21H 6AH 76H 06H 06H CDH 76H 53H 3EH
6070H= 00H CAH 8BH 60H 3AH 77H 76H 1FH D2H 94H 60H 11H 5CH 76H 21H 78H
6080H= 76H 06H 06H CDH 76H 53H C2H 94H 60H 3EH 01H 32H 2AH 77H CDH 80H
6090H= 53H C3H C4H 61H 3AH 69H 76H 1FH D2H FFH 60H 3AH 77H 76H 1FH D2H
60A0H= FFH 60H 21H C7H 73H 06H 80H 97H BEH C2H B6H 60H 23H 23H 05H C2H
60B0H= A8H 60H 4FH C3H C7H 60H 21H C7H 74H 06H 80H BEH C2H C4H 61H 23H
60C0H= 23H 05H C2H BBH 60H 0EH 80H 2AH 23H 77H EBH 2AH 21H 77H CDH 75H
60D0H= 55H CAH E4H 60H 7EH E6H 80H B9H CAH F9H 60H 23H 23H 23H CDH 9EH
60E0H= 53H C3H CEH 60H 79H 21H 69H 76H 17H D2H EFH 60H 21H 77H 76H 36H
60F0H= 00H 3EH 01H 32H 14H 77H C3H C4H 61H CDH ADH 53H C3H C4H 61H 3AH
6100H= D0H 7FH 1FH DAH C4H 61H 21H 77H 70H 0EH 08H E5H 11H 5CH 76H 06H
6110H=06H CDH 76H 53H E1H CAH 23H 61H 11H 0AH 00H 19H 0DH C2H 0BH 61H
6120H=C3H 7FH 61H 11H 06H 00H 19H 7EH 32H 62H 76H 23H 7EH 32H 63H 76H
6130H=23H 23H 7EH 32H 64H 76H E5H CDH F3H 54H 11H 88H 01H CDH 75H 55H
6140H=E1H D2H 79H 61H 7EH 2BH 66H 6FH 22H D3H 7FH 21H 08H 01H 22H D1H
6150H=7FH 3EH 82H 32H D5H 7FH 32H 31H 77H 2AH 2BH 77H 22H D6H 7FH 11H
6160H= 89H 01H 19H CDH AFH 55H 22H 2DH 77H 3EH 02H 32H 30H 77H 3EH 01H
6170H= 32H D8H 7FH 32H D0H 7FH C3H C4H 61H CDH ADH 53H C3H C4H 61H CDH
6180H= F3H 54H 11H 28H 02H CDH 75H 55H D2H BBH 61H 21H 08H 01H 22H D1H
6190H= 7FH 2AH 81H 78H 26H 00H 22H D3H 7FH 3EH 83H 32H D5H 7FH 32H 31H
61A0H=77H 2AH 2BH 77H 22H D6H 7FH 21H 00H 00H 22H 2DH 77H 3EH 01H 32H
61B0H=30H 77H 32H D8H 7FH 32H D0H 7FH C3H C4H 61H CDH ADH 53H C3H C4H
61C0H= 61H CDH 80H 53H 3AH 0FH 77H FEH 03H C2H 43H 66H 3AH 59H 77H FEH
61D0H= 0FH C2H DEH 61H 3AH 68H 78H B7H CAH 43H 66H C3H C4H 61H 2AH 3FH
61E0H= 77H EBH 2AH EFH 75H 3AH 0EH 77H 1FH D2H EFH 61H 2AH CAH 75H CDH
61F0H=75H 55H CAH 43H 66H 1AH FEH 80H DAH 27H 64H FEH 84H C2H C8H 62H
6200H=EBH CDH 47H 55H 23H 23H 7EH 32H 00H 7FH 23H 7EH 32H 01H 7FH CDH
6210H=5EH 55H 23H CDH C9H 54H EBH 22H 02H 7FH 60H 69H 22H 04H 7FH 3AH
6220H= 69H 76H 1FH D2H 36H 62H 21H 00H 7FH 11H 6AH 76H 06H 06H CDH 76H
6230H= 53H 3EH 00H CAH 4FH 62H 3AH 77H 76H 1FH D2H 4DH 62H 21H 00H 7FH
6240H=11H 78H 76H 06H 06H CDH 76H 53H 3EH 01H CAH 4FH 62H 3EH 02H 32H
6250H=00H 77H FEH 02H CAH 2AH 66H 21H 73H 76H 3DH C2H 61H 62H 21H 81H
6260H=76H 11H 00H 7FH EBH 06H 04H CDH 6DH 53H 2AH 02H 7FH EBH 2AH E6H
6270H=75H CDH 7BH 55H 7DH E6H FEH 6FH 29H 29H 29H 29H D2H 82H 62H 21H
6280H=FFH FFH 22H 01H 77H 11H 68H 01H CDH 7BH 55H EBH 21H A0H 01H CDH
6290H= A8H 55H 22H 03H 77H 2AH 00H 7FH EBH 2AH E4H 75H CDH 7BH 55H 7DH
62A0H= E6H FEH 6FH 29H 29H 29H 29H D2H ADH 62H 21H FFH FFH 22H 05H 77H
62B0H=11H 71H 01H CDH 7BH 55H EBH 21H 71H 01H CDH A8H 55H EBH 2AH D7H
62C0H=75H 19H 22H 07H 77H C3H 2AH 66H FEH 86H C2H 2AH 66H 3AH 68H 78H
62D0H=B7H C2H 46H 63H 2AH 3FH 77H CDH 47H 55H 23H 5EH 23H 56H E5H 21H
62E0H=1CH 07H CDH 7BH 55H 65H 6AH 22H 1DH 67H 11H A0H 08H CDH 7BH 55H
62F0H=3EH 45H 95H 32H 21H 67H E1H 23H 5EH 2AH 3FH 77H 23H 56H 23H 7EH
6300H=23H 66H 6FH EBH 22H 64H 78H EBH CDH A8H 55H 11H ABH 0AH CDH 7BH
6310H=55H 23H 22H 66H 78H 2AH 1DH 76H CDH 7BH 55H 06H 04H CDH 13H 55H
6320H=22H 15H 7BH 2EH FFH 11H 00H 2DH CDH 7BH 55H C3H 2EH 68H EBH CDH
6330H= A8H 55H 22H 17H 7BH 2AH 1DH 76H 11H 70H 00H CDH 7BH 55H 22H 03H
6340H=77H 3EH 01H 32H 68H 78H 2AH 64H 78H EBH 2AH 1DH 76H CDH 7BH 55H
6350H=97H 29H CEH 00H 29H CEH 00H 5FH 7AH 07H 07H E6H 03H B5H 6FH 3AH
6360H= 03H 77H 85H 6FH 3AH 04H 77H 8CH 67H 7BH CEH 00H 5FH 3AH 66H 78H
6370H=3DH C2H 89H 63H 3AH 67H 78H B7H C2H 89H 63H 3AH 17H 7BH 85H 6FH
6380H= 3AH 18H 7BH 8CH 67H 7BH CEH 00H 5FH 7DH 32H 4AH 77H 7CH 0FH 0FH
6390H=0FH 0FH E6H 70H 47H F6H 0FH 32H 49H 77H 3AH 66H 78H 3DH C2H B7H
63A0H=63H 3AH 67H 78H B7H C2H B7H 63H 3AH 16H 7BH B0H 32H 49H 77H 4DH
63B0H=44H 2AH 3DH 7BH C3H BAH 63H 01H 68H 01H 97H 09H 8BH F5H 06H 04H
63C0H=CDH 13H 55H F1H 0FH 0FH 0FH 0FH B4H 67H 22H 41H 77H 11H 03H 00H
63D0H= 19H 22H 43H 77H 00H 00H 00H 00H 00H 00H 00H 00H 00H 00H 00H 21H
63E0H= 6CH 52H 22H 45H 77H 21H 5EH 01H 22H 47H 77H 21H 77H 00H 22H 4BH
63F0H=77H 21H 16H 67H 22H 4DH 77H CDH E1H 65H 2AH 66H 78H 2BH 22H 66H
6400H=78H 11H 00H 00H CDH 75H 55H C2H 11H 64H 97H 32H 68H 78H C3H 2AH
6410H=66H 2AH 64H 78H 11H 18H 00H 19H 22H 64H 78H 2AH 3FH 77H CDH 47H
6420H=55H 22H 3FH 77H C3H 2AH 66H 13H 1AH 07H DAH 2AH 66H 3AH 00H 77H
6430H=FEH 02H CAH 26H 66H 1BH 3DH 1AH 13H C2H 45H 64H F6H 80H 4FH 1AH
6440H=F6H 01H C3H 4BH 64H E6H 7FH 4FH 1AH E6H FEH 12H 06H 00H 21H C7H
6450H=70H 09H 09H 09H 7EH 17H D2H 1FH 66H 1AH E6H 20H C2H 75H 64H 21H
```

```
6460H=C7H 73H 09H 09H 7EH 3CH C2H 70H 64H 1AH F6H 40H 12H C3H 2AH 66H
6470H=77H 1AH F6H 20H 12H 1BH EBH 22H 45H 77H 23H 23H 5EH 23H 56H 2AH
6480H=C8H 75H EBH CDH 75H 55H DCH 0DH 01H E5H 21H C7H 73H 09H 09H 23H
6490H=6EH 26H 6FH C3H 92H 67H 56H 13H 13H 13H 13H 13H 1AH 6FH 13H 1AH
64A0H=67H 2BH 2BH 22H 4BH 77H 1BH 1BH 1BH EBH 22H 00H 7FH D1H 2AH E6H
64B0H=75H CDH 7BH 55H 7AH 17H 7DH 17H 6FH 7CH 17H 67H 97H 29H 17H EBH
64C0H=2AH 03H 77H 19H CEH 00H E5H F5H 7DH 32H 4AH 77H 7CH 0FH 0FH 0FH
64D0H=0FH E6H 70H 4FH 2AH 01H 77H 06H 05H CDH 13H 55H 79H B4H 32H 49H
64E0H=77H 7DH 32H 02H 7FH 3AH 07H 77H 32H 03H 7FH 2AH 05H 77H 06H 05H
64F0H=CDH 13H 55H 3AH 08H 77H 0FH 0FH 0FH 0FH E6H F0H B4H 67H 22H 04H
6500H=7FH 2AH 00H 7FH 5EH 23H 7EH 17H D4H 0DH 01H 3FH 1FH 57H 23H 22H
6510H=00H 7FH 2AH 01H 77H CDH 7BH 55H F1H D1H D5H F5H 19H CEH 0FH E6H
6520H=10H 4FH 06H 04H 3AH CEH 75H 3DH CAH 2FH 65H 3DH C2H 34H 65H 06H
6530H=05H 79H 0FH 4FH CDH 13H 55H 79H B4H 67H 22H 41H 77H 2AH 00H 7FH
6540H=23H 23H 7EH 32H 47H 77H 23H 7EH 32H 48H 77H 23H 5EH 23H 7EH 17H
6550H=DCH 0DH 01H 22H 00H 7FH 56H 23H 7EH B7H C4H 0DH 01H 22H 4DH 77H
6560H=79H 0FH 4FH 2AH 01H 77H CDH 7BH 55H F1H D1H 19H CEH 0FH E6H 10H
6570H=4FH 06H 04H 3AH CEH 75H 3DH CAH 7EH 65H 3DH C2H 80H 65H 06H 05H
6580H=CDH 13H 55H 79H B4H 67H 22H 43H 77H C3H E1H 67H 11H 06H 00H 19H
6590H=3AH 02H 7FH 77H 23H 23H 3AH 04H 7FH 77H 23H 3AH 05H 7FH 77H 23H
65A0H=23H 23H 3AH 03H 7FH 77H 2AH 5BH 77H 26H 00H EBH 2AH 39H 77H 3AH
65B0H=0EH 77H 1FH DAH BEH 65H 19H EBH 2AH 41H 77H C3H C6H 65H CDH A8H
65C0H=55H EBH 2AH 43H 77H EBH 13H 13H 13H 13H CDH 75H 55H D2H D6H 65H
65D0H=CDH E1H 65H C3H 2AH 66H 2AH 45H 77H 23H 7EH F6H 40H 77H C3H 2AH
65E0H=66H 3AH 59H 77H 21H 5DH 77H 0EH 01H 1FH D2H 08H 66H 21H 6BH 77H
65F0H=0EH 02H 1FH D2H 08H 66H 21H 79H 77H 0EH 04H 1FH D2H 08H 66H 21H
6600H=87H 77H 0EH 08H 1FH DCH 0DH 01H 11H 41H 77H 06H 0EH CDH 6DH 53H
6610H=F3H 3AH 59H 77H B1H 32H 59H 77H 3AH 5AH 77H B1H C3H 01H 68H 1AH
6620H=F6H 40H 12H C3H 2AH 66H 1AH F6H 40H 12H 2AH 3FH 77H 3AH 0EH 77H
6630H=1FH D2H 3AH 66H CDH 47H 55H C3H 3DH 66H CDH 5EH 55H 22H 3FH 77H
6640H=C3H C4H 61H 2AH EFH 75H EBH 2AH 10H 77H CDH 75H 55H CAH 74H 66H
6650H=7EH 17H D2H 63H 66H CDH 5EH 55H 22H 10H 77H 3EH 01H 32H 14H 77H
6660H=C3H 74H 66H 23H 7EH 17H D2H 74H 66H CDH 5EH 55H 22H 10H 77H 3EH
6670H=01H 32H 14H 77H 21H 14H 77H 7EH 36H 00H 1FH DAH 97H 66H 97H 32H
6680H=13H 77H 3AH 25H 77H 1FH DAH 92H 66H 2AH 15H 77H 7DH D3H CAH 7CH
6690H=D3H CAH E1H D1H C1H F1H C9H C3H CFH 57H F5H C5H D5H E5H 3AH 5BH
66A0H=77H B7H CAH DEH 66H 3DH 32H 5BH 77H DBH DEH 2AH 39H 77H 3AH 0EH
66B0H=77H 1FH DAH BCH 66H 23H 22H 39H 77H C3H C0H 66H 2BH 22H 39H 77H
66C0H=21H 5CH 77H 7EH 1FH D2H D3H 66H 36H 02H 21H ECH 76H 7EH F6H 08H
66D0H=77H D3H DBH E1H D1H C1H F3H 3EH 20H D3H C0H F1H FBH C9H D3H DCH
66E0H=2AH 54H 77H EBH 2AH 56H 77H 1AH 77H 23H 23H 23H 13H 1AH 77H 13H
66F0H=1AH C6H 03H D3H D2H 13H 1AH CEH 00H D3H D2H 13H 1AH D3H D8H 13H
6700H=1AH D3H D9H D3H DCH DBH DEH 21H 5CH 77H 7EH B7H C2H 10H 67H 34H
6710H=CDH 41H 4FH C3H 59H 4BH 00H 68H B9H 45H 00H FFH FFH FFH FFH FFH
6720H=FFH FFH FFH E0H C1H 83H 07H 0FH 1EH 3CH 78H F0H E0H C1H 83H 07H
6730H=0FH 1EH 3CH 78H F0H E0H C1H 83H 07H 0FH 1EH 3CH 78H F0H E0H C1H
6740H=83H 07H 0FH 1EH 3CH 78H F0H E0H C1H 83H 07H 0FH 1EH 3CH 78H F0H
6750H=E0H C1H 83H 07H 4FH C2H E0H C1H C1H E0H C1H 83H 07H 0FH 1EH 3CH
6760H=78H F0H E0H C1H 83H 07H 0FH 1EH 3CH 78H F0H E0H C1H 83H 07H 0FH
6770H=1EH 3CH 78H F0H E0H C1H 83H 07H 0FH 1EH 3CH 78H F0H E0H C1H 83H
6780H=07H 0FH 1EH 3CH 78H F0H E0H C1H 83H 07H 4FH 18H 3CH 38H 00H 00H
6790H=00H F8H 7DH FEH C0H D2H 99H 67H 24H 23H 5EH 23H C3H 96H 64H 2AH
67A0H=76H 78H 19H 22H 8EH 78H C3H 1FH 47H CDH 75H 55H D0H 2AH 1BH 77H
67B0H=3EH 52H BCH CAH B8H 67H 37H C9H 3EH 01H 32H 3CH 7BH 2AH 1DH 77H
67C0H=11H F8H FFH 19H EBH 21H 70H 52H 06H 04H CDH 6DH 53H B7H C9H D3H
67D0H=DCH 3AH 3CH 7BH 1FH DAH DAH 67H DBH DEH 97H 32H 3CH 7BH C3H 07H
67E0H=67H 2AH 47H 77H 11H E8H 03H CDH 75H 55H D2H FBH 67H 2AH 41H 77H
67F0H=2BH 22H 41H 77H 2AH 43H 77H 23H 22H 43H 77H 2AH 00H 7FH C3H 8CH
6800H=65H 32H 5AH 77H FBH C9H 22H AEH B8H 2AH A7H B8H 23H 5EH 23H 56H
6810H=2AH B0H B8H 23H 73H 23H 72H C3H 7EH B3H 3AH 99H B8H 77H CDH C9H
6820H=B5H C3H 3BH B3H 21H FBH 7FH 34H 2AH FDH 7FH C3H 91H B3H 22H 3DH
6830H=7BH 11H 68H 01H C3H 2EH 63H 11H 09H 84H 3AH FBH 7FH 47H C3H DBH
6840H=B5H 97H 32H FBH 7FH CDH D8H B5H C3H 42H B5H 21H ECH 76H 7EH E6H
6850H=8BH 77H D3H DBH 3EH 01H 32H 25H 77H 32H 12H 77H 3EH 00H D3H CAH
6860H=3EH 46H D3H CAH C3H EBH 5CH 32H 97H 78H 32H 9BH 78H C3H 82H 42H
```

```
6870H=2AH AEH B8H 22H B0H B9H 3AH F8H 7FH C3H 0BH B1H 22H AEH B8H 22H
6880H=B0H B8H C3H BCH B4H CAH E2H B5H 3CH B8H C2H 19H B6H 62H 6BH 23H
6890H=23H 7EH E6H C0H CAH 19H B6H C3H E2H B5H 2AH 13H 7BH 11H 06H 00H
68A0H=C3H E6H 45H C3H E6H 45H 64H DBH 74H DBH 54H 6BH F4H 9BH 54H ABH
68B0H=63H A4H 6BH A4H EBH B5H 49H B4H 4AH B4H 49H 34H 6BH B1H 40H B9H
68C0H=B6H 4FH F4H 8BH 94H 0BH B4H 4BH 36H 8BH 34H EBH 34H 9BH D4H 8BH
68D0H=4FH F6H 4BH A6H EBH B6H 4BH A6H 2AH 74H 40H B6H 4AH BBH 4EH BDH
68E0H=B7H 8BH 96H 4BH B4H 4BH ADH 4BH F6H 5BH D5H 1BH 94H CBH F4H 6BH
68F0H=BBH 04H BBH 64H 9BH 40H BBH 04H BBH 54H 2BH 54H 1BH 74H ABH E4H
6900H=B4H 5AH 34H 63H F6H 5BH 94H CBH B4H C9H B6H CBH 34H 8BH C4H BBH
6910H=1BH D4H 5BH B4H CAH B5H 4BH B4H 46H B5H 4AH B7H 47H BDH 43H BBH
6920H=BFH 49H BAH 41H BBH 4BH B4H 42H BBH 0BH BCH 4BH B5H 4BH B4H 4AH
6930H=4BH D5H 5BH 34H 4BH 95H 4BH 30H CBH B2H 0BH F6H 4AH B2H 43H B4H
6940H=66H 2BH E5H 8BH 94H 5BH 64H EBH D4H 6BH 54H 8BH C4H BBH D4H 9BH
6950H=0BH D4H 0BH F4H 8BH 94H 5BH 94H CBH 75H 4BH 94H 4BH BBH 49H B4H
6960H=A4H CEH B7H 4BH BCH 0BH 34H 48H F4H 0BH 9DH 5BH 24H EBH 54H 8BH
6970H=4BH F3H 4BH B4H 43H B4H 4EH B4H C3H 37H 4EH BFH 45H BBH 4DH BBH
6980H=F6H 4BH B5H CBH D4H DFH 84H 8BH F4H FBH 94H ABH 64H 0BH 24H 9BH
6990H=BBH C4H FBH 44H BBH C4H 2BH 54H BBH D4H 9BH 85H 2BH C4H 9BH C4H
69A0H=B6H EAH F7H 4BH FCH 8BH 74H 1BH 74H 9BH E4H 8BH 34H DBH 34H ABH
69B0H=4BH F4H 4BH B4H 4BH 35H CBH E5H 49H 35H 4BH F0H 4BH 9FH 4AH ABH
69C0H=82H 4AH BCH 4FH B4H 41H B2H 43H B5H 6DH B6H 53H BCH C9H BEH 6FH
69D0H=4AH B4H 4BH B4H 59H BDH 4BH B9H 43H B4H 44H B7H 48H BAH 46H BBH
69E0H=B6H CBH 34H ABH 74H 0BH 5CH DBH 54H 9BH D4H BBH D4H BBH 54H 2BH
69F0H=8BH 34H 4BH 95H 2BH E4H 6BH 96H 76H B4H CBH B7H 4FH B5H 4BH BDH
6A00H=F5H 4BH B4H 4BH B4H 43H A4H 03H A5H 4BH 95H 2BH 54H 9BH 64H 8BH
6A10H=4AH B6H 4FH B4H 43H BDH C3H BDH 47H 32H 4AH BDH 49H B3H 4EH BBH
6A20H=B4H 0BH B6H CBH 78H 59H F4H 49H F4H EBH 74H 4BH 54H ABH A4H 8BH
6A30H=6BH A4H 3BH 06H 4BH D4H 5BH 94H CBH DCH 4BH B5H CBH F4H 5BH BCH
6A40H=36H E9H F5H 48H BCH 0BH B5H CBH B4H 4BH F4H FBH 34H 8BH 24H 8BH
6A50H=5BH B4H 7BH A4H 8BH 7CH 0BH BDH 4FH 72H 4BH B6H 4BH B6H 4BH B4H
6A60H=34H 44H B0H 4EH BDH 5FH B6H 4DH B3H CBH 93H 4BH B8H 49H B7H CBH
6A70H=4EH B4H 4BH B5H 4EH BFH C8H 9DH CDH BAH 4FH B7H 4DH B9H 4AH BAH
6A80H=A4H DBH F6H 0BH F4H 5BH 74H ABH 44H BBH C4H BBH 54H DBH 54H BBH
6A90H=42H B4H 4BH 34H C9H B4H 4BH B0H 4BH B1H 4FH BCH CBH AAH 46H B2H
6AA0H=F7H 0BH F4H FBH B4H 4BH B0H 4BH A5H 8BH 14H 3BH 54H DBH 44H CBH
6AB0H=42H B6H EBH 36H CBH B7H 4FH B6H 43H B1H 46H BBH 45H BFH 45H BAH
6AC0H=B6H 4AH B7H 4BH B5H 5BH B6H 5AH 35H 2BH E6H 0FH 14H E9H F4H 9BH
6AD0H=4BH B4H 8BH 1CH 6BH D4H 1BH 14H 4BH BFH 4AH F4H 63H AEH 47H B4H
6AE0H=B6H 5BH 3CH 0BH A4H 4BH B4H 4BH D4H 0BH 14H CBH 34H BBH C4H 6BH
6AF0H=4BH 95H 4FH B4H DBH 91H 4AH B7H 4AH BFH 4BH B3H 4FH 39H 4FH BCH
6B00H=BCH 4CH B6H 4CH BFH 44H BFH 4DH F4H 49H B4H 4BH B4H CBH B2H 6BH
6B10H=4CH BCH 4DH BFH 49H B3H 45H BBH 41H B9H 44H B3H 47H B9H 44H BAH
6B20H=EEH 1BH 64H CBH C4H 3BH F4H DBH 54H 9BH 64H ABH 44H BBH 44H BBH
6B30H=48H 94H 4BH 95H 4EH B9H 48H BBH 44H B9H 44H B6H 40H BBH 44H BFH
6B40H=E4H CFH F7H CBH A5H 59H 84H 9BH 44H CBH 36H EBH 54H 8BH D4H 9BH
6B50H=EFH B9H 4BH F3H 4BH B5H 4AH B5H 4EH B3H 48H BBH 40H BBH 4AH B9H
6B60H=F4H C9H 34H 4BH B4H 0BH B0H CBH E4H 9AH B5H 8BH 64H BBH E4H 1BH
6B70H=6BH 54H EBH 10H 49H 84H EBH B0H 5FH B4H 48H B1H 6BH B4H 4BH B4H
6B80H=B4H CBH B4H 1AH B4H 6BH B4H CBH F7H 8BH 74H 1BH 24H BBH C4H 8BH
6B90H=44H B6H 49H B8H 4CH BAH 47H BBH 44H B3H 44H BBH 44H BBH 44H BBH
6BA0H=B7H 48H BBH 49H A7H 4BH B6H 5BH B4H 4BH B4H 4BH B4H 4BH F6H 4BH
6BB0H=62H B6H 45H BCH 4BH FCH 47H B5H 45H BEH 46H 3FH 46H BBH 4BH BEH
6BC0H=54H 99H A6H 4BH 64H 8BH 64H DBH 54H BBH 44H 9BH 44H 9BH 44H 3BH
6BD0H=48H BFH 4BH 3CH 42H 9DH 4CH B3H 45H BAH 4CH BFH 46H B1H 4CH B3H
6BE0H=74H 4BH B4H C9H 97H 4EH 74H 8BH 54H 8BH E4H ABH 64H CBH 04H ABH
6BF0H=46H BAH 46H BAH 46H BBH 44H B9H 44H BBH 44H BBH 44H BBH 46H BBH
6C00H=B4H 4BH B4H 6BH 34H 5BH B4H 4BH B4H 4BH B4H 6BH F4H 4BH B4H 4BH
6C10H=34H 03H F0H CBH F4H 5BH 8CH 7BH 74H 9BH A4H 0BH E4H BBH D4H 1BH
6C20H=B8H 45H B8H 4BH B6H 4FH B4H 4BH B4H 4AH B4H 6BH B4H 2BH F4H 4BH
6C30H=B6H 3BH BCH B3H 64H 9BH 66H 7FH 84H BBH 44H 3BH 44H 7BH 64H 2BH
6C40H=BEH 43H BCH 47H B4H 4BH B4H 4BH B4H 4BH B4H 4BH F4H 5BH B4H 4BH
6C50H=AAH 47H BFH 53H BDH 4FH D5H 8FH 94H FBH 84H 3BH 54H 8BH D4H ABH
6C60H=BCH 4BH BCH 43H B5H 4BH B4H 4BH B4H 4BH B4H 4BH B4H 4BH B4H 4BH
6C70H=36H 43H 14H 5BH A4H BBH 94H 2BH B4H 8BH 04H 9BH D4H CBH 74H ABH
```

```
6C80H=BBH 44H BEH 47H BFH 43H BCH 4BH B5H 4BH B4H 4BH B4H 4BH B4H 4BH
6C90H=F5H 13H 14H 0BH 94H 6BH 74H FBH 04H 1BH C4H BBH 64H 9BH C4H BBH
6CA0H=BCH 4BH B4H 4BH B4H 4BH B4H CBH B4H 4BH B4H 0BH A4H 4BH E4H CBH
6CB0H=E4H 7EH E4H BBH C4H 7BH D4H 8BH 44H DBH 04H CBH 84H BBH 44H 1BH
6CC0H=B4H 4BH BEH 4BH BCH 4BH B4H 43H B5H 4BH B4H 4BH A4H 4BH 94H 4BH
6CD0H=C4H EBH B4H 4BH A4H FBH 84H 8BH A4H CBH 24H FBH 84H EBH 54H 0BH
6CE0H=B4H 43H BDH 4AH BCH 4BH B4H 4BH B4H 4BH B4H 4BH B4H 4BH B4H 4BH
6CF0H=BFH 45H BFH 46H BBH 46H FFH 4BH B4H 43H B4H CBH A4H 7BH B4H CBH
6D00H=B4H 4BH BCH 4BH B4H 4BH 94H 4BH B4H 6BH 34H 4BH B4H 6BH B4H 4BH
6D10H=26H 63H 9CH DBH 24H 4BH 94H 1BH 54H ABH 34H FBH F4H ABH 04H FBH
6D20H=B6H 41H BDH 44H BFH 4AH BCH 43H B4H 4BH B4H 4BH B4H 4BH B4H 4BH
6D30H=74H 33H A4H 53H B4H 1BH B4H 7BH 24H 2BH 54H EBH C4H BBH 54H ABH
6D40H=B4H 4BH B4H 6BH A4H 43H B4H 4BH F4H 4BH 34H 4BH B4H 5BH 94H 0BH
6D50H=B2H 59H D4H 43H 8CH 13H F4H 6BH B4H 5BH 34H 8BH 04H 9BH 74H FBH
6D60H=BDH 4AH BCH 4BH B5H 4BH B4H 6BH B4H 4BH B4H 4BH B4H 4BH B4H 4BH
6D70H=A4H 7BH 94H EBH 64H FBH E4H 1BH 54H BBH A4H BBH 44H FBH 64H BBH
6D80H=B4H 43H BEH 4BH B4H 4BH BCH 4BH B4H 4BH B4H 4BH B4H DBH B4H 4BH
6D90H=9BH 4CH BBH 45H BBH 4DH BCH 43H BCH 4BH B4H 4BH B4H 4BH B4H 4BH
6DA0H=BCH 4BH B5H 4BH B4H 4BH B4H 4BH B4H 4BH B4H 4BH B4H CBH B4H 4BH
6DB0H=B4H 4BH 54H DBH D4H FBH 4CH 0BH 84H 3BH 24H 3BH C4H 9BH 54H 0BH
6DC0H=B6H 47H BAH 47H BBH 4BH BCH 4BH B4H 4BH B4H 4BH B4H 4BH B4H 4BH
6DD0H=54H FBH 44H EBH 44H FBH C4H 9BH 84H ABH 44H EBH 84H BBH 44H 3BH
6DE0H=BCH 4BH B4H 0BH D4H 4BH B4H 4BH B4H 4BH B4H CBH F4H CBH 94H 4BH
6DF0H=BCH 22H ACH 4BH F6H 1BH 94H CBH 74H 3BH A4H 6BH 34H 5BH F4H 4BH
6E00H=B5H 43H B5H 43H B4H 4BH B4H 4BH B4H 4BH A4H 4BH B4H 4BH B4H 4BH
6E10H=D6H 2BH 74H 2BH 04H ABH 44H FBH 44H BBH 44H 6BH 44H 9BH 64H BBH
6E20H=B4H 43H B4H 49H B4H 43H BCH 4BH B4H 4BH B4H 4BH B4H 4BH B4H 4BH
6E30H=B6H 64H 99H 63H B6H 0BH B4H 4BH A4H 4BH 54H 0BH A4H 4BH B4H 4BH
6E40H=B4H 4AH BEH 4BH BCH 4BH B4H 4BH B4H 4BH B4H 4BH B4H 4BH B4H 4BH
6E50H=8EH 73H BCH 1BH B4H 4BH 44H 3BH 84H 0BH 94H 5BH B4H 4BH 34H 6BH
6E60H=BBH 41H BBH 40H BDH 47H BCH 4AH B4H 4BH B4H 4BH B4H 4BH B4H 4BH
6E70H=44H 9BH CCH 1BH 74H BBH 44H BBH D4H BBH 44H 7BH E4H BBH C4H BBH
6E80H=B4H 4BH B4H 4BH B4H 6BH B4H 4BH B4H 4BH F4H 4BH 34H 4BH F4H 0BH
6E90H=44H DBH 2CH 4BH B4H 3BH F4H 9BH D4H BBH 14H ABH C4H BBH D4H 3BH
6EA0H=B7H 4AH BCH 49H BEH 4BH B4H 4BH B4H 4BH B4H 4BH B4H 4BH B4H 4BH
6EB0H=D4H 03H D4H EBH 84H 7BH 24H 7BH D4H 3BH 54H CBH 34H BBH 44H 6BH
6EC0H=BCH 48H BCH 4BH BCH 4BH B4H 4BH B4H 4BH B4H 4BH B4H 4BH B4H 4BH
6ED0H=BAH 49H BEH 4AH B4H EBH B4H 4BH 34H 8BH 74H 4BH 54H 9BH 54H 4BH
6EE0H=B4H 4BH B5H 43H B6H 49H B4H 6BH B4H 4BH B4H 4BH B4H 4BH B4H 4BH
6EF0H=34H 73H D4H 4BH F4H CBH 24H 4BH A4H 6BH E4H 2BH 64H DBH F4H CBH
6F00H=BAH 4AH BBH 41H BFH 41H BCH 4BH B4H 43H B4H 4BH B4H 4BH B4H 4BH
6F10H=44H 8BH 94H BBH 04H 9BH F4H BBH 04H 3BH C4H BBH 64H BBH 44H BBH
6F20H=BCH 4BH BCH 4BH B4H 4BH B4H 4BH B4H 6BH B4H 4BH B4H CBH B4H 4BH
6F30H=64H BBH 24H ABH 54H ABH 64H EBH 44H BBH 44H FBH 44H BBH 44H 2BH
6F40H=B3H 4FH BCH 4BH B4H 4BH B4H 4BH B4H 4BH B4H 4BH B4H 4BH B4H 4BH
6F50H=ACH 33H C4H 2BH 84H 9BH 14H EBH 04H BBH D4H BBH 44H DBH C4H 9BH
6F60H=FEH 4DH B4H 43H BCH 4BH B4H 4BH B4H 4BH B4H 4BH B4H 4BH 94H 4BH
6F70H=A2H 54H F4H 58H F4H C3H B4H 69H 54H 3BH 94H 0BH 34H CBH B4H 4BH
6F80H=B4H 4BH BCH 43H BCH 43H B4H 4BH B4H 4BH B4H 4BH A4H 4BH B4H 4BH
6F90H=04H 3BH 74H 1BH 64H 9BH C4H BBH 54H BBH 54H BBH 44H BBH 54H ABH
6FA0H=B3H 44H B3H 44H B1H 40H B4H 49H B5H 4BH B4H 4BH B4H 4BH B4H 4BH
6FB0H=F6H 2BH D4H 8BH 14H 4BH 44H 3BH D4H BBH 44H BBH 44H BBH 84H ABH
6FC0H=B7H 4BH B6H 4BH B4H 4BH B4H 4BH A4H 0BH 24H 4BH B4H 4BH B4H 4BH
6FD0H=86H BBH FCH 1BH 74H DBH 94H 9BH 44H 9BH E4H 3BH 44H 3BH 04H 19H
6FE0H=B2H 4BH BCH 41H BDH 4BH B4H 4BH B4H 4BH B4H 4BH B4H 4BH B4H 4BH
6FF0H=54H BBH 84H BBH 44H BBH D4H 9BH C4H DBH 44H BBH C4H BBH 44H 3BH
7000H=20H 53H 49H 5AH 45H 3AH 0DH 0AH 09H 09H 09H 3BH 20H 58H 58H 58H
7010H=58H 58H 2EH 58H 58H 58H 0DH 0AH 0DH 0AH 52H 41H 32H 44H 53H 3AH
7020H=09H 44H 53H 09H 31H 09H 3BH 52H 45H 53H 49H 44H 45H 4EH 54H 20H
7030H=41H 4CH 50H 48H 41H 42H 45H 54H 20H 32H 20H 44H 49H 53H 43H 20H
7040H=53H 45H 4CH 45H 43H 54H 3AH 0DH 0AH 0DH 0AH 41H 32H 50H 59H 4DH
7050H=3AH 09H 44H 53H 09H 32H 09H 3BH 41H 4CH 50H 48H 41H 42H 45H 54H
7060H=20H 32H 20H 50H 41H 52H 54H 49H 41H 4CH 20H 59H 20H 4DH 41H 47H
7070H=3AH 0DH 0AH 09H 09H 09H 3BH 20H 58H 58H 58H 2EH 58H 58H 58H 58H
7080H=58H 20H 58H 58H 58H 58H 58H 58H 58H 58H 0DH 0AH 0DH 0AH 41H 32H
```

```
7090H=50H 58H 4DH 3AH 09H 44H 53H 09H 32H 09H 3BH 41H 4CH 50H 48H 41H
70A0H=42H 45H 54H 20H 32H 20H 50H 41H 52H 54H 49H 41H 4CH 20H 59H 20H
70B0H=4DH 41H 47H 3AH 0DH 0AH 09H 09H 09H 3BH 20H 58H 58H 58H 2EH 58H
70C0H=58H 58H 58H 58H 20H 58H 58H 58H 58H 58H 58H 58H 58H 0DH 0AH 0DH
70D0H=0AH 3BH 2DH 2DH 2DH 2DH 2DH 2DH 2DH 2DH 2DH 2DH 2DH 2DH 2DH 2DH
70E0H=2DH 2DH 2DH 2DH 2DH 2DH 2DH 2DH 2DH 2DH 2DH 2DH 2DH 2DH 2DH 2DH
70F0H=2DH 2DH 2DH 2DH 2DH 2DH 2DH 2DH 2DH 2DH 2DH 2DH 2DH 2DH 2DH 2DH
7100H=2DH 2DH 2DH 2DH 2DH 2DH 2DH 2DH 2DH 2DH 2DH 2DH 2DH 2DH 0DH 0AH
7110H=53H 42H 53H 54H 3AH 09H 3BH 53H 54H 41H 4EH 44H 41H 52H 44H 20H
7120H=42H 41H 53H 45H 4CH 49H 4EH 45H 20H 53H 48H 49H 46H 54H 20H 54H
7130H=41H 42H 4CH 45H 2EH 0DH 0AH 3BH 2DH 2DH 2DH 2DH 2DH 2DH 2DH 2DH
7140H=2DH 2DH 2DH 2DH 2DH 2DH 2DH 2DH 2DH 2DH 2DH 2DH 2DH 2DH 2DH 2DH
7150H=2DH 2DH 2DH 2DH 2DH 2DH 2DH 2DH 2DH 2DH 2DH 2DH 2DH 2DH 2DH 2DH
7160H=2DH 2DH 2DH 2DH 2DH 2DH 2DH 2DH 2DH 2DH 2DH 2DH 2DH 2DH 2DH 2DH
7170H=2DH 2DH 2DH 2DH 0DH 0AH 0DH 0AH 09H 44H 57H 09H 35H 37H 30H 09H
7180H=3BH 49H 4EH 20H 33H 2FH 31H 36H 20H 4DH 49H 4CH 20H 55H 4EH 49H
7190H=54H 53H 2EH 0DH 0AH 09H 44H 57H 09H 31H 37H 31H 09H 3BH 49H 4EH
71A0H=20H 35H 2FH 38H 20H 4DH 49H 4CH 20H 55H 4EH 49H 54H 53H 2EH 0DH
71B0H=0AH 0DH 0AH 09H 44H 57H 09H 35H 31H 30H 0DH 0AH 09H 44H 57H 09H
71C0H=31H 35H 33H 0DH 0AH 0DH 0AH 09H 44H 57H 09H 34H 35H 30H 0DH 0AH
71D0H=09H 44H 57H 09H 31H 33H 35H 0DH 0AH 0DH 0AH 09H 44H 57H 09H 33H
71E0H=36H 30H 0DH 0AH 09H 44H 57H 09H 31H 30H 38H 0DH 0AH 0DH 0AH 09H
71F0H=44H 57H 09H 33H 30H 30H 0DH 0AH 09H 44H 57H 09H 39H 30H 0DH 0AH
7200H=0DH 0AH 09H 44H 57H 09H 32H 31H 30H 0DH 0AH 09H 44H 57H 09H 36H
7210H=33H 0DH 0AH 0DH 0AH 09H 44H 57H 09H 31H 35H 30H 0DH 0AH 09H 44H
7220H=57H 09H 34H 35H 0DH 0AH 0DH 0AH 09H 44H 57H 09H 36H 30H 0DH 0AH
7230H=09H 44H 57H 09H 31H 38H 0DH 0AH 0DH 0AH 09H 44H 57H 09H 30H 0DH
7240H=0AH 09H 44H 57H 09H 30H 0DH 0AH 0DH 0AH 0DH 0AH 3BH 2DH 2DH 2DH
7250H=2DH 2DH 2DH 2DH 2DH 2DH 2DH 2DH 2DH 2DH 2DH 2DH 2DH 2DH 2DH 2DH
7260H=2DH 2DH 2DH 2DH 2DH 2DH 2DH 2DH 2DH 2DH 2DH 2DH 2DH 2DH 2DH 2DH
7270H=2DH 2DH 2DH 2DH 2DH 2DH 2DH 2DH 2DH 2DH 2DH 2DH 2DH 2DH 2DH 2DH
7280H=2DH 2DH 0DH 0AH 5AH 42H 53H 54H 3AH 09H 3BH 5AH 49H 50H 20H 42H
7290H=41H 53H 45H 4CH 49H 4EH 45H 20H 53H 48H 49H 46H 54H 20H 54H 41H
72A0H=42H 4CH 45H 0DH 0AH 3BH 2DH 2DH 2DH 2DH 2DH 2DH 2DH 2DH 2DH 2DH
72B0H=2DH 2DH 2DH 2DH 2DH 2DH 2DH 2DH 2DH 2DH 2DH 2DH 2DH 2DH 2DH 2DH
72C0H=2DH 2DH 2DH 2DH 2DH 2DH 2DH 2DH 2DH 2DH 2DH 2DH 2DH 2DH 2DH 2DH
72D0H=2DH 2DH 2DH 2DH 2DH 2DH 2DH 2DH 2DH 2DH 2DH 0DH 0AH 0DH 0AH 09H
72E0H=44H 57H 09H 2DH 32H 34H 30H 0DH 0AH 09H 44H 57H 09H 2DH 37H 32H
72F0H=0DH 0AH 0DH 0AH 09H 44H 57H 09H 2DH 32H 31H 30H 0DH 0AH 09H 44H
7300H=57H 09H 2DH 36H 33H 0DH 0AH 0DH 0AH 09H 44H 57H 09H 2DH 31H 38H
7310H=30H 0DH 0AH 09H 44H 57H 09H 2DH 35H 34H 0DH 0AH 0DH 0AH 09H 44H
7320H=57H 09H 2DH 31H 38H 30H 0DH 0AH 09H 44H 57H 09H 2DH 35H 34H 0DH
7330H=0AH 0DH 0AH 09H 44H 57H 09H 2DH 31H 35H 30H 0DH 0AH 09H 44H 57H
7340H=09H 2DH 34H 35H 0DH 0AH 0DH 0AH 09H 44H 57H 09H 2DH 31H 35H 30H
7350H=0DH 0AH 09H 44H 57H 09H 2DH 34H 35H 0DH 0AH 0DH 0AH 09H 44H 57H
7360H=09H 2DH 31H 35H 30H 0DH 0AH 09H 44H 57H 09H 2DH 34H 35H 0DH 0AH
7370H=0DH 0AH 09H 44H 57H 09H 2DH 31H 35H 30H 0DH 0AH 09H 44H 57H 09H
7380H=2DH 34H 35H 0DH 0AH 0DH 0AH 3BH 2DH 2DH 2DH 2DH 2DH 2DH 2DH 2DH
7390H=2DH 2DH 2DH 2DH 2DH 2DH 2DH 2DH 2DH 2DH 2DH 2DH 2DH 2DH 2DH 2DH
73A0H=2DH 2DH 2DH 2DH 2DH 2DH 2DH 2DH 2DH 2DH 2DH 2DH 2DH 2DH 2DH 2DH
73B0H=2DH 2DH 2DH 2DH 2DH 2DH 2DH 2DH 2DH 2DH 2DH 2DH 0DH 0AH 53H 43H
73C0H=54H 3AH 09H 3BH 53H 54H 41H 52H 54H 49H 4EH 47H 20H 43H 4FH 47H
73D0H=20H 54H 41H 42H 4CH 45H 2EH 0DH 0AH 3BH 2DH 2DH 2DH 2DH 2DH 2DH
73E0H=2DH 2DH 2DH 2DH 2DH 2DH 2DH 2DH 2DH 2DH 2DH 2DH 2DH 2DH 2DH 2DH
73F0H=2DH 2DH 2DH 2DH 2DH 2DH 2DH 2DH 2DH 2DH 2DH 2DH 2DH 2DH 2DH 2DH
7400H=2DH 2DH 2DH 2DH 2DH 2DH 2DH 2DH 2DH 2DH 2DH 2DH 2DH 2DH 0DH 0AH
7410H=0DH 0AH 09H 44H 42H 09H 37H 0DH 0AH 09H 44H 42H 09H 38H 0DH 0AH
7420H=09H 44H 42H 09H 39H 0DH 0AH 09H 44H 42H 09H 31H 31H 0DH 0AH 09H
7430H=44H 42H 09H 31H 32H 0DH 0AH 09H 44H 42H 09H 31H 33H 0DH 0AH 09H
7440H=44H 42H 09H 31H 35H 0DH 0AH 09H 44H 42H 09H 31H 36H 0DH 0AH 09H
7450H=44H 42H 09H 31H 37H 0DH 0AH 09H 44H 42H 09H 31H 38H 0DH 0AH 09H
7460H=44H 42H 09H 32H 30H 0DH 0AH 09H 44H 42H 09H 32H 31H 0DH 0AH 09H
7470H=44H 42H 09H 32H 32H 0DH 0AH 09H 44H 42H 09H 32H 33H 0DH 0AH 0DH
7480H=0AH 0DH 0AH 3BH 2DH 2DH 2DH 2DH 2DH 2DH 2DH 2DH 2DH 2DH 2DH 2DH
7490H=2DH 2DH 2DH 2DH 2DH 2DH 2DH 2DH 2DH 2DH 2DH 2DH 2DH 2DH 2DH 2DH
```

74A0H=2DH 2DH 2DH 2DH 2DH 2DH 2DH 2DH 2DH 2DH 2DH 2DH 2DH 2DH 2DH 2DH
74B0H=2DH 2DH 2DH 2DH 2DH 2DH 2DH 2DH 0DH 0AH 0DH 0AH 4DH 33H 46H 4DH
74C0H=53H 3AH 09H 44H 57H 09H 2DH 31H 37H 30H 09H 3BH 4DH 4FH 44H 45H
74D0H=20H 33H 20H 46H 45H 45H 44H 20H 4DH 4FH 54H 4FH 52H 20H 53H 48H
74E0H=49H 46H 54H 3AH 0DH 0AH 09H 09H 09H 3BH 20H 56H 41H 4CH 55H 45H
74F0H=20H 41H 44H 44H 45H 44H 20H 54H 4FH 20H 44H 45H 53H 49H 52H 45H
7500H=44H 20H 46H 45H 45H 44H 0DH 0AH 09H 09H 09H 3BH 20H 4DH 4FH 54H
7510H=4FH 52H 20H 50H 4FH 53H 49H 54H 49H 4FH 4EH 20H 54H 54H 20H 41H
7520H=43H 4FH 55H 4EH 54H 20H 46H 4FH 52H 0DH 0AH 09H 09H 09H 3BH 20H
7530H=44H 49H 46H 46H 45H 52H 45H 4EH 54H 20H 4CH 45H 4EH 53H 2EH 0DH
7540H=0AH 0DH 0AH 4DH 33H 42H 53H 3AH 09H 44H 57H 09H 30H 09H 3BH 4DH
7550H=4FH 44H 45H 20H 33H 20H 42H 41H 53H 45H 20H 4CH 49H 4EH 45H 20H
7560H=53H 48H 49H 46H 54H 3AH 0DH 0AH 09H 09H 09H 3BH 20H 56H 41H 4CH
7570H=55H 45H 20H 41H 44H 44H 45H 44H 20H 54H 4FH 20H 42H 41H 53H 45H
7580H=4CH 49H 4EH 45H 20H 53H 48H 49H 46H 54H 0DH 0AH 09H 09H 09H 3BH
7590H=20H 54H 4FH 20H 41H 43H 43H 4FH 55H 4EH 54H 20H 46H 4FH 52H 20H
75A0H=44H 49H 46H 46H 45H 52H 45H 4EH 54H 20H 4CH 45H 4EH 53H 2EH 0DH
75B0H=0AH 0DH 0AH 4DH 59H 43H 3AH 09H 44H 57H 09H 32H 39H 32H 30H 30H
75C0H=26H 76H D0H 53H 5AH 29H 76H CCH 52H 5AH 80H 7BH C3H 53H 4DH 5AH
75D0H=33H 76H D3H 4CH 5AH 2CH 76H CCH 5AH 2DH 76H CDH 4CH 49H 5AH 2FH
75E0H=76H C3H 45H 5AH 31H 76H C1H 4FH 43H 5AH 28H 76H C3H 5AH A9H C0H
75F0H=69H 53H 42H 5AH 2AH 76H C2H 42H 5AH 25H 76H CCH 41H 5AH 83H B5H
7600H=B1H 31H 31H 5AH 19H B6H B2H 30H 31H 5AH DDH B5H B1H 30H 31H 5AH
7610H=EAH 4AH C4H 08H 25H 07H 08H 0DH 00H 40H 10H 00H 80H FFH 7FH D0H
7620H=00H 00H 00H 10H 5EH 25H 93H 03H 08H 1DH C5H 5CH 10H 00H 80H EDH
7630H=7FH D0H 00H 00H 00H 10H 5EH 54H 62H 02H 0CH 1DH 03H 75H 10H 00H
7640H=80H 3EH 55H 38H 01H 00H 00H 10H 5EH 08H 66H 07H 18H 07H 4BH 41H
7650H=20H 63H 2DH A5H 2AH 70H 02H 08H 0AH E0H 5AH 01H 76H CCH 5AH 54H
7660H=3FH 76H CDH 4CH 49H 5AH 54H 41H 76H 00H 45H 5AH 54H 43H 76H C1H
7670H=30H 43H 5AH 54H 3AH 76H C3H 00H 54H 3CH 76H C2H 42H 5AH 54H 37H
7680H=76H CCH 41H 5AH 54H 3AH 02H ABH 00H FEH 01H 99H 00H C2H 01H 87H
7690H=00H 68H 01H 6CH 00H 2CH 01H 5AH 00H D2H 00H 3FH 00H 96H 00H 2DH
76A0H=00H 3CH 00H 12H 00H 00H 00H 00H 00H 10H FFH B8H FFH 2EH FFH C1H
76B0H=FFH 4CH FFH CAH FFH 4CH FFH CAH FFH 6AH FFH D3H FFH 6AH FFH D3H
76C0H=FFH 6AH FFH D3H FFH 6AH FFH D3H FFH 07H 08H 09H 0BH 0CH 0DH 0FH
76D0H=10H 11H 12H 14H 15H 16H 17H 09H FFH 00H 00H 10H 72H C0H 76H C0H
76E0H=76H ACH 0DH AAH A6H E1H 02H 00H 00H 58H 55H 02H 00H F6H 03H 00H
76F0H=00H C0H 69H 96H B8H 00H 00H 00H 00H 00H 00H 00H 00H 00H 00H 00H
7700H=02H B2H 53H 42H 54H ABH B8H B1H 53H 00H 00H 00H 00H 00H 00H 00H
7710H=C0H 69H 00H 00H 00H 00H 38H 20H 87H C2H 54H A6H 77H D0H 46H 77H
7720H=70H C0H 6FH C0H 6FH 00H C0H 69H 00H 80H 00H 00H 80H 00H 00H 00H
7730H=00H 00H 00H 00H 37H 54H 15H 00H 00H 00H 00H 00H 00H 00H 00H C0H
7740H=69H 00H 00H 00H 00H 00H 00H 00H 00H 00H 00H 00H 00H 00H 00H 00H
7750H=00H 00H 00H 00H 00H 00H 00H 00H 00H 00H 00H 00H 00H 54H A9H B3H
7760H=B9H 36H 54H 30H B3H B8H 36H 54H ABH B2H B7H 36H 54H FFH B4H B3H
7770H=36H 54H F8H B4H B2H 36H 54H E9H B4H B0H 36H 54H AEH B2H B9H 35H
7780H=54H B5H B2H B8H 35H 54H A8H B2H B7H 35H 54H 7AH B2H B6H 35H 54H
7790H=8DH B2H B5H 35H 54H 09H 00H 00H 00H 00H 00H 00H 07H 01H 1FH 00H
77A0H=00H 00H 00H 00H 00H 00H 00H 00H 00H 00H E3H 03H 00H C0H 69H 08H
77B0H=43H 4FH 4DH 4DH 41H 4EH 44H 3FH 12H 43H 41H 4EH 27H 54H 20H 57H
77C0H=52H 49H 54H 45H 20H 44H 49H 53H 43H 20H 31H 12H 43H 41H 4EH 4EH
77D0H=4FH 54H 20H 52H 45H 41H 44H 20H 44H 49H 53H 43H 20H B6H 09H 45H
77E0H=58H 50H 4FH 53H 55H 52H 45H 20H 0DH 43H 4FH 4DH 4DH 41H 4EH 44H
77F0H=20H 45H 52H 52H 4FH 52H 0BH 46H 49H 4CH 4DH 20H 57H 49H 44H 54H
7800H=48H 20H 0CH 46H 49H 4CH 4DH 20H 4CH 45H 4EH 47H 54H 48H 20H 06H
7810H=53H 50H 45H 45H 44H 20H 0CH 50H 52H 49H 4EH 54H 45H 52H 20H 42H
7820H=55H 53H 59H 11H 43H 41H 4EH 4EH 4FH 54H 20H 52H 45H 41H 44H 20H
7830H=4DH 45H 4EH 55H 45H 0DH 46H 49H 4CH 4DH 20H 4FH 56H 45H 52H 46H
7840H=4CH 4FH 57H 13H 43H 41H 4EH 4EH 4FH 54H 20H 46H 49H 4EH 44H 20H
7850H=46H 4FH 4EH 54H 20H 30H 30H 0CH 49H 4CH 4CH 45H 47H 41H 4CH 20H
7860H=43H 4FH 44H 45H 00H 00H 00H 00H 00H 00H 00H 00H 00H 00H 00H 80H
7870H=7BH 00H 18H 79H EEH 21H D9H 00H 00H 00H 00H 00H 00H 00H 0CH 0AH
7880H=02H 01H 00H 80H 7BH C0H 69H 00H 00H 00H 00H 00H 00H 00H 00H 00H
7890H=00H 00H 00H 00H FFH FFH 00H 00H 00H 80H 7BH 00H 00H 6AH 78H C3H
78A0H=49H 00H B3H B8H D3H 50H 46H 53H 6BH 78H CCH 46H 53H 9AH B8H C1H

```
78B0H=46H 53H FCH 7FH D2H 54H 43H 45H 53H 1DH 76H C3H 45H 53H D4H 4AH
78C0H=B1H 43H 44H 53H C6H 4AH C3H 44H 53H C9H 76H D4H 43H 53H 39H 77H
78D0H=C3H 43H 53H 1FH 76H C1H 30H 43H 53H 16H 76H C3H 53H 85H 76H D4H
78E0H=53H 42H 53H 13H 76H CCH 41H 53H 79H B1H B6H 33H 53H 2CH B0H B5H
78F0H=33H 53H 63H B5H B2H 33H 53H 7BH B5H B1H 33H 53H B2H B0H B0H 33H
7900H=53H A8H 55H B2H 46H 32H 53H A7H B0H B9H 32H 53H 5EH B5H B8H 32H
7910H=53H 9EH B1H B7H 32H 53H 51H B1H B6H 32H 53H 93H B1H B5H 32H 53H
7920H=85H B1H B4H 32H 53H 44H B1H B3H 32H 53H 1BH B1H B8H 31H 53H 17H
7930H=B1H B7H 31H 53H 0FH B1H B6H 31H 53H 08H B1H B5H 31H 53H C8H B0H
7940H=B3H 31H 53H C4H B0H B1H 31H 53H 9AH B0H B0H 31H 53H 86H B0H B9H
7950H=30H 53H 5AH B0H B8H 30H 53H 56H B0H B7H 30H 53H 30H B0H B3H 30H
7960H=53H 24H B0H B2H 30H 53H 20H B0H B1H 30H 53H 2AH 77H D3H 41H 52H
7970H=53H 52H 78H 78H D0H 53H 52H 69H 78H D3H 52H 38H 77H C4H 52H 52H
7980H=80H 78H D3H 4FH 52H 26H 77H D0H 53H 42H 4CH 52H 0FH 7BH D6H 45H
7990H=52H 89H 78H C5H 45H 52H 34H 77H B2H 53H 44H 52H 36H 77H B1H 53H
79A0H=44H 52H F3H 4AH C3H 4BH 44H 52H 2DH 77H CCH 45H 44H 52H 37H 77H
79B0H=D4H 43H 52H 64H 78H D0H 43H 52H 32H 77H CCH 45H 43H 52H C7H 73H
79C0H=D4H 44H 43H 52H C0H 6FH D4H 41H 43H 52H D8H B5H D4H 43H 41H 52H
79D0H=77H 76H D4H 32H 41H 52H 80H 76H D3H 44H 32H 41H 52H 77H 76H C1H
79E0H=32H 41H 00H 00H 00H 00H 00H 00H 00H 00H 00H 00H 00H 00H 00H 00H
79F0H=00H 00H 00H 00H 00H 00H 00H 00H 00H 8EH 8EH 66H 64H 67H 63H 68H
7A00H=65H 69H 45H 6FH 7FH 70H 81H 44H 46H 7EH 75H 76H 77H 78H 79H 7AH
7A10H=7BH 7CH 7DH 38H 3AH 3CH 3EH 40H 42H 84H 5FH 74H 73H 51H 62H 36H
7A20H=57H 5AH 5BH 6AH 6EH 53H 56H 52H 6CH 50H 47H 48H 49H 4AH 4BH 4CH
7A30H=4DH 4EH 4FH 54H 55H 5CH 6DH 5DH 60H 72H 03H 05H 07H 09H 0BH 0DH
7A40H=0FH 11H 13H 15H 17H 19H 1BH 1DH 1FH 21H 23H 25H 27H 29H 2BH 2DH
7A50H=2FH 31H 33H 35H 01H 70H 59H 5EH 71H 58H 02H 04H 06H 08H 0AH 0CH
7A60H=0EH 10H 12H 14H 16H 18H 1AH 1CH 1EH 20H 22H 24H 26H 28H 2AH 2CH
7A70H=2EH 30H 32H 34H 6BH 61H 6AH 43H 8EH 8EH 82H 80H 8EH 8EH 8EH 8EH
7A80H=8EH 88H 89H 8EH 86H 87H 8EH 8EH 8EH 8EH 8EH 8EH 8EH 8EH 8EH 8EH
7A90H=8EH 8EH 8EH 90H 91H 92H 93H 94H 42H 8EH 8EH 8EH 8EH 8EH 8EH 8EH
7AA0H=8EH 8EH 8EH 8EH 8EH 8EH 8EH 8EH 8EH 8EH 8EH 8EH 8EH 8EH 8EH 8EH
7AB0H=8EH 8EH 8EH 8EH 8EH 8EH 8EH 8EH 8EH 8EH 8EH 8EH 8DH 8EH 8CH 8AH
7AC0H=8DH 8EH 8EH 8EH 8EH 8EH 8EH 8EH 8EH 8EH 8EH 8BH 8EH 84H 8EH 8EH
7AD0H=8EH 8EH 8EH 8EH 8EH 8EH 8EH 8EH 8EH 8EH 8EH 8EH 8EH 8EH 8EH 8EH
7AE0H=8EH 8EH 8EH 8EH 8EH 8EH 8EH 8EH 8EH 8EH 8EH 8EH 8EH 8EH 8EH 8EH
7AF0H=8EH 8EH 8EH 8EH 8EH 8EH 8EH 8EH 83H 39H 3BH 3DH 3FH 41H D3H 42H
7B00H=4CH 4FH CAH 75H D0H 42H 4CH 4FH E1H 75H C2H 42H 4CH 2EH 56H E8H
7B10H=03H 00H 00H 00H 00H 7FH C4H 57H 4BH 34H 3CH 01H 01H 01H 00H 83H
7B20H=00H 80H 01H 18H 43H 41H 4EH 4EH 4FH 54H 20H 46H 49H 4EH 44H 20H
7B30H=30H 30H 2DH 30H 30H 30H 30H 2DH 30H 30H 2EH 30H 43H 53H 4EH 66H
7B40H=78H C3H 52H 4EH F1H 75H C3H 59H 4CH 4EH F3H 76H C3H 58H 4CH 4EH
7B50H=ECH 75H C4H 55H 4CH 4EH ECH 75H D4H 4CH 4EH F5H 76H D3H 53H 4CH
7B60H=4EH F1H 76H D0H 53H 4CH 4EH F9H 76H D3H 4CH 4EH FFH 75H C3H 53H
7B70H=52H 4CH 4EH FAH 75H C4H 4FH 52H 4CH 4EH F6H 75H D2H 4DH 52H 4CH
7B80H=4EH 05H 76H CCH 52H 4CH 4EH F0H 76H D2H 4CH 4EH F7H 76H D3H 50H
7B90H=4CH 4EH 02H 76H D0H 53H 4DH 4CH 4EH 11H 76H C3H 53H 4DH 4CH 4EH
7BA0H=F3H 75H CDH 4CH 4EH FEH 75H C3H 53H 4CH 4CH 4EH 0FH 76H D3H 4CH
7BB0H=4CH 4EH F8H 75H C4H 4FH 4CH 4CH 4EH F4H 75H D2H 4DH 4CH 4CH 4EH
7BC0H=EDH 75H CCH 4CH 4CH 4EH 08H 76H CCH 4CH 4EH 09H 76H CDH 4CH 49H
7BD0H=4CH 4EH 0BH 76H C3H 45H 4CH 4EH 0DH 76H C1H 30H 43H 4CH 4EH 04H
7BE0H=76H C3H 4CH 4EH FCH 75H D3H 42H 4CH 4EH EFH 76H D2H 42H 4CH 4EH
7BF0H=EFH 75H D0H 42H 4CH 4EH 06H 76H C2H 42H 4CH 4EH 01H 76H CCH 41H
7C00H=4CH 4EH 8EH 78H D6H 49H 4EH 9CH 78H C3H 48H 4EH 9DH 78H C2H 48H
7C10H=4EH 90H 78H CCH 46H 4EH 10H 01H C5H 46H 4EH 5CH 76H CEH 46H 54H
7C20H=41H 4EH 5BH 76H D4H 41H 4EH 65H 76H CDH 59H 50H 41H 4EH 67H 76H
7C30H=CDH 58H 50H 41H 4EH 63H 76H D3H 53H 45H 41H 4EH 62H 76H D3H 50H
7C40H=45H 41H 4EH 60H 76H D3H 53H 44H 41H 4EH 64H 76H D3H 44H 41H 4EH
7C50H=5EH 76H D3H 50H 44H 41H 4EH EEH 76H C4H 41H 4EH 5BH 76H C1H 41H
7C60H=4EH 2BH B7H B5H 32H 4EH 29H B7H B3H 32H 4EH 1FH B7H B2H 32H 4EH
7C70H=1AH B7H B0H 32H 4EH 12H B7H B9H 31H 4EH F4H B6H B5H 31H 4EH ECH
7C80H=B6H B4H 31H 4EH E4H B6H B3H 31H 4EH C7H B6H B9H 30H 4EH 3DH B6H
7C90H=B6H 30H 4EH DBH 76H C3H 59H 4DH E3H 76H C3H 58H 4DH ECH 76H D3H
7CA0H=4CH 53H 4DH A9H 77H C2H 53H 4DH 41H B6H CDH 4DH E9H 79H C6H 57H
```

```
7CB0H=4CH 4DH EAH 76H D0H 53H 54H 4CH 4DH E2H 79H CEH 46H 54H 4CH 4DH
7CC0H=E6H 79H D3H 50H 53H 4CH 4DH E4H 79H D3H 46H 4CH 4DH E9H 76H CCH
7CD0H=41H 4CH 4DH 7DH 78H CDH 44H 4DH 6DH 53H C4H 48H 44H 44H 4DH 15H
7CE0H=77H D4H 55H 50H 43H 4DH 4AH 76H D0H 53H 33H 4DH 4DH 76H CCH 52H
7CF0H=33H 4DH 59H 76H C3H 53H 4DH 33H 4DH 57H 76H D3H 4CH 33H 4DH 0DH
7D00H=7BH C3H 45H 4CH 33H 4DH 50H 76H CCH 33H 4DH 51H 76H CDH 4CH 49H
7D10H=33H 4DH D7H 76H D3H 4DH 46H 33H 4DH 53H 76H C3H 45H 33H 4DH 55H
7D20H=76H C1H 30H 43H 33H 4DH 4CH 76H C3H 33H 4DH D9H 76H D3H 42H 33H
7D30H=4DH 4EH 76H C2H 42H 33H 4DH 49H 76H CCH 41H 33H 4DH 16H 78H B2H
7D40H=32H 4DH E3H 7FH D3H 53H 56H 4CH DEH 7FH D3H 54H 4CH C8H 00H D2H
7D50H=4DH 49H 54H 4CH 9BH 77H CDH 52H 45H 54H 4CH 96H 77H D0H 45H 54H
7D60H=53H 4CH B0H B8H C2H 54H 53H 4CH DFH 7FH D3H 53H 4CH A8H 77H C2H
7D70H=53H 4CH 15H 7BH CDH 58H 52H 4CH FDH 76H D3H 53H 52H 4CH FAH 76H
7D80H=D3H 52H 4CH FBH 76H D3H 50H 52H 4CH 17H 7BH C1H 46H 4CH 52H 4CH
7D90H=A5H B8H CEH 50H 4CH 0FH 77H D0H 49H 50H 4CH DAH 7FH D2H 44H 50H
7DA0H=4CH A9H B8H C3H 42H 50H 4CH A7H B8H C1H 50H 4CH DBH 7FH D7H 4BH
7DB0H=4FH 4CH E2H 7FH D3H 4EH 4CH E7H 76H D0H 4DH 4CH C2H 7FH D9H 53H
7DC0H=42H 4DH 4CH E1H 76H B0H 4DH 4CH 6DH 78H C3H 4CH 4CH 72H 78H C1H
7DD0H=4CH 49H 4CH 74H 78H C1H 4CH 46H 49H 4CH 8AH 78H D6H 46H 4CH A0H
7DE0H=B8H D3H 53H 53H 46H 4CH 9EH B8H D3H 50H 53H 46H 4CH 9CH B8H CEH
7DF0H=46H 46H 4CH A3H B8H D3H 53H 45H 46H 4CH A2H B8H D3H 50H 45H 46H
7E00H=4CH A4H B8H D4H 44H 43H 46H 4CH DDH 7FH D3H 44H 4CH E0H 7FH C1H
7E10H=43H 44H 4CH DCH 7FH D7H 43H 4CH ADH 77H D0H 4CH 42H 4CH C0H 69H
7E20H=C2H 4CH 99H 77H D4H 4EH 43H 41H 4CH C4H 7FH C3H 4CH 42H 4BH 73H
7E30H=01H D3H 49H 42H 4BH CBH 7FH C2H 49H 42H 4BH EBH 79H C4H 44H 4AH
7E40H=EDH 79H C4H 4AH C9H B5H D4H 4EH 53H 49H 5BH 77H C3H 49H 44H 53H
7E50H=49H 81H 78H D3H 49H F0H 79H C4H 4CH 49H F7H 79H D3H 46H 49H DDH
7E60H=76H D0H 4DH 46H 49H 92H 78H CCH 46H 49H 30H B7H C4H 49H ECH 79H
7E70H=D3H 43H 49H 7CH 78H D2H 43H 49H F9H 79H D4H 43H 43H 49H 99H 78H
7E80H=D0H 52H 42H 49H 83H 78H D0H 4CH 42H 49H 80H 7BH C2H 49H D9H 7FH
7E90H=D3H 53H 56H 48H D4H 7FH D3H 54H 48H D5H 7FH D3H 53H 48H EFH 79H
7EA0H=D3H 52H 48H 71H 78H CCH 52H 48H 7AH 78H C8H 52H 48H D0H 7FH D2H
7EB0H=44H 50H 48H D1H 7FH D7H 4BH 4FH 48H D8H 7FH D3H 4EH 48H D3H 7FH
7EC0H=D3H 44H 48H D6H 7FH C1H 43H 44H 48H D2H 7FH D7H 43H 48H 25H 77H
7ED0H=C2H 54H 50H A7H 7EH 78H D7H 46H D0H 00H D2H 4DH 49H 54H 46H AAH
7EE0H=77H CDH 52H 45H 54H 46H A2H 77H D0H 42H 41H 54H 46H 9FH 77H D0H
7EF0H=45H 54H 53H 46H B5H B8H CCH 52H 53H 46H 12H 77H C4H 43H 53H 46H
7F00H=A6H B8H D4H 50H 46H DFH 76H D0H 4DH 46H A1H 78H C6H 4CH 4DH 46H
7F10H=C3H 7FH D9H 53H 42H 4DH 46H A2H 78H CDH 46H 99H B8H D4H 4CH 46H
7F20H=7FH 78H CCH 46H E8H 79H C4H 46H 46H A1H 77H D0H 54H 53H 41H 46H
7F30H=ACH 77H C2H 54H 43H 41H 46H A4H 77H D4H 4EH 43H 41H 46H 9EH 77H
7F40H=CDH 4CH 43H 41H 46H A5H 77H CCH 45H 43H 41H 46H 00H B0H C1H 46H
7F50H=0DH 01H D2H 4FH 52H 52H 45H 2BH 77H D0H 52H 45H 23H 77H D4H 41H
7F60H=43H 52H 45H 3DH 77H B2H 43H 4FH 45H 3BH 77H B1H 43H 4FH 45H EAH
7F70H=79H B2H 4CH 45H 98H 78H B1H 4CH 45H 97H 78H C6H 43H 45H 19H 7BH
7F80H=00H 00H 00H 00H 00H 00H 00H 00H 00H 00H 00H 00H 00H 00H 00H 00H
7F90H=00H 00H 00H 00H 00H 00H 00H 00H 00H 00H 00H 00H 00H 00H 00H 00H
7FA0H=00H 00H 00H 00H 00H 00H 00H 00H 00H 00H 00H 00H 00H 00H 00H 00H
7FB0H=00H 00H 00H 00H 00H 00H 00H 00H 00H 00H 1DH 02H B7H 77H 14H 02H
7FC0H=41H 40H 00H 00H 00H 00H 00H 00H 00H 00H 00H 00H 00H 00H 00H 00H
7FD0H=00H 00H 00H 00H 00H 00H 00H 00H 00H 00H 00H 00H 00H 00H 1BH 01H
7FE0H=00H 00H 00H 00H 00H 00H FFH 17H 1FH F1H 42H F0H 3AH F0H 00H 01H
7FF0H=00H 3CH 16H FFH 00H B5H 01H 00H 00H 01H 00H 09H 17H 00H C0H 00H
8000H=11H 1BH B8H CDH FEH 01H 97H 32H B5H B8H 32H B2H B8H 21H 00H 00H
8010H=22H 96H B8H 32H 98H B8H 21H 1BH 7BH 97H 32H 1DH 7BH CDH C6H 4AH
8020H=B7H CAH 30H B0H 11H CBH 77H 3EH 30H 32H DDH 77H CDH 10H 01H C9H
8030H=2AH 03H 80H EBH 21H 02H 80H 23H 7BH 96H C2H 20H B0H 7AH 23H 96H
8040H=C2H 20H B0H 21H 20H 87H 22H AEH B8H 22H B0H B8H 97H 32H B2H B8H
8050H=21H 6EH B8H CDH C6H 4AH B7H CAH 86H B0H 21H 76H B8H CDH C6H 4AH
8060H=21H 02H 00H 22H 04H 82H 3EH 83H 32H 03H 82H 97H 32H 99H B8H 3EH
8070H=83H 32H 20H 87H 21H 00H 02H 22H 21H 87H 21H 23H 89H 22H AEH B8H
8080H=CDH C9H B5H C3H 08H B1H 2AH 06H 82H EBH 21H 04H 82H 23H 23H 7BH
8090H=96H C2H 20H B0H 23H 7AH 96H C2H 20H B0H 2AH 04H 82H 11H 05H 82H
80A0H=19H EBH 06H 00H 21H 08H 82H D5H 11H 08H 00H 19H 78H BEH D2H B2H
80B0H=B0H 46H 23H D1H CDH 75H 55H D2H A7H B0H 78H 32H 81H B8H 21H 7EH
```

```
B0C0H= B8H CDH C6H 4AH B7H C2H 0FH B1H CDH D8H B5H 21H F8H 7FH 7EH B7H
B0D0H= C2H 0FH B1H 11H 06H 84H 2AH FDH 7FH 22H B0H B8H 01H 89H 02H CDH
B0E0H= DDH 4AH 22H AEH B8H CDH C9H B5H 3AH FBH 7FH 32H 99H B8H CDH 9EH
B0F0H= B5H D2H 08H B1H 21H 99H B8H 34H 21H 20H 87H 22H AEH B8H 97H 32H
B100H= B2H B8H 21H 00H 00H 22H 96H B8H C3H 70H 68H B7H CAH 1BH B1H 11H
B110H= CBH 77H 3EH 31H 32H DDH 77H CDH 10H 01H C9H 97H 32H C4H 7FH 11H
B120H= 23H B8H CDH FEH 01H 06H 04H CDH F3H 4AH 21H CBH 7FH 06H 04H CDH
B130H= 8FH 02H 22H 9CH B8H 11H 30H B8H CDH 15H 02H 97H 32H C4H 7FH 06H
B140H= 01H CDH F3H 4AH 3AH CBH 7FH FEH 0AH CAH 85H B1H FEH 0BH CAH 93H
B150H= B1H 06H 01H CDH F3H 4AH 3EH 2EH CDH 23H 02H 06H 01H CDH F3H 4AH
B160H= CDH 2CH 4BH 21H CBH 7FH 06H 02H CDH 8FH 02H 29H 29H 29H 3AH CDH
B170H= 7FH B7H CAH 79H B1H 11H 04H 00H 19H 22H B3H B8H 21H B3H B8H 22H
B180H= 9AH B8H C3H 9EH B1H 21H B6H B8H 22H 9AH B8H 3EH 01H 32H B5H B8H
B190H= C3H 9EH B1H 21H D0H B8H 22H 9AH B8H 3EH 01H 32H B5H B8H 11H 1BH
B1A0H= B8H CDH FEH 01H 2AH 1FH 34H 22H 06H 82H 2AH 9AH B8H 11H 9EH B8H
B1B0H= 7EH 12H 23H 13H 7EH 12H 2AH 01H 80H 11H 03H 80H 19H 13H 13H E5H
B1C0H= 21H 9CH B8H 1AH BEH 13H 23H C2H 2AH B2H 1AH BEH C2H 2AH B2H 23H
B1D0H= 4EH 23H 46H EBH 23H 7EH 32H A2H B8H 23H 7EH 32H A3H B8H 23H 7EH
B1E0H= 32H A4H B8H 23H 5EH 23H 16H 00H 78H 23H BEH 2BH DAH 10H B2H C2H
B1E0H= 01H B2H 79H BEH DAH 10H B2H C2H 01H B2H 23H 23H 23H 23H C3H 15H
B200H= B2H 23H 23H 23H 23H 1DH 1DH 1DH 1DH CAH 31H B2H 14H C3H E8H B1H
B210H= 7AH B7H CAH 31H B2H 2BH 56H 2BH 5EH 2BH 7EH 2BH 6EH 67H EBH CDH
B220H= A8H 55H 09H 22H A0H B8H E1H C3H 49H B2H EBH 23H 23H 23H 23H 5EH
B230H= 23H 16H 00H 19H EBH E1H CDH 75H 55H DAH BFH B1H 11H 3DH B8H CDH
B240H= 10H 01H 97H 32H B5H B8H C3H 5EH B5H 2AH 04H 82H 11H 06H 82H 19H
B250H= 13H 13H 01H 00H 00H E5H D5H 21H 9CH B8H 1AH BEH C2H 8DH B2H 13H
B260H= 23H 1AH BEH C2H 8DH B2H 13H 23H 1AH BEH 13H 23H C2H 7AH B2H 1AH
B270H= BEH C2H 7AH B2H 01H 01H 01H C3H 8DH B2H 13H 23H 13H 23H 13H 23H
B280H= 1AH BEH C2H 8DH B2H 0EH 01H 13H 13H 1AH 32H A4H B8H D1H 21H 09H
B290H= 00H 19H EBH E1H CDH 75H 55H DAH 55H B2H 0DH C2H BBH B2H 05H CAH
B2A0H= E9H B4H CDH B3H B5H D2H B5H B2H 11H 52H B8H CDH 10H 01H 97H 32H
B2B0H= B5H B8H C3H E9H B4H 22H 04H 82H C3H E9H B4H 21H 8EH B8H 3AH A4H
B2C0H= B8H 32H 91H B8H CDH C6H 4AH 3AH F8H 7FH B7H C2H E9H B4H 97H 32H
B2D0H= A5H B8H 3AH A5H B8H 32H A6H B8H 97H 32H AAH B8H 3AH A5H B8H 5FH
B2E0H= 16H 00H 21H 00H 00H 19H 29H 19H 11H 95H 85H 19H 22H A7H B8H 23H
B2F0H= 23H 46H 78H E6H 3FH 77H 78H 07H 07H E6H 03H 32H A9H B8H 3AH A5H
B300H= B8H FEH 82H C2H 26H B3H 97H 32H A9H B8H 3CH 32H 98H B8H 2AH AEH
B310H= B8H 22H B0H B8H 11H 92H 85H 01H 89H 02H CDH DDH 4AH 22H AEH B8H
B320H= CDH C9H B5H C3H 7EH B3H 2AH A7H B8H 7EH 47H FEH 4DH CAH A9H B3H
B330H= 3AH AAH B8H B7H C2H 3FH B3H C3H 1AH 68H 00H 78H 32H FBH 7FH 3EH
B340H= 01H 32H F9H 7FH 32H FFH 7FH 97H 32H FAH 7FH 3AH A5H B8H 32H FCH
B350H= 7FH 2AH AEH B8H 22H FDH 7FH 00H 00H 00H 3EH 08H 32H F8H 7FH CDH
B360H= EAH 4AH 3AH AAH B8H B7H CAH 78H B3H 2AH ABH B8H EBH 2AH AEH B8H
B370H= 73H 23H 72H 23H 3AH ADH B8H 77H 2AH FDH 7FH C3H 06H 68H 3AH F8H
B380H= 7FH B7H C2H C9H B3H 21H A9H B8H 7EH B7H CAH B0H B3H 35H C3H 24H
B390H= 68H 2BH 7EH 32H ADH B8H 2BH 56H 2BH 5EH 22H AEH B8H EBH 22H ABH
B3A0H= B8H 3EH 01H 32H AAH B8H C3H FEH B2H 97H 32H A9H B8H C3H 7EH B3H
B3B0H= 21H A5H B8H 34H 7EH FEH 83H CAH C9H B3H CDH 9EH B5H DAH C9H B3H
B3C0H= 2AH AEH B8H 22H B0H B8H C3H D8H B2H 3AH F8H 7FH B7H C2H E9H B4H
B3D0H= 3AH 99H B8H FEH 4DH C2H E5H B3H 11H 52H B8H CDH 10H 01H 97H 32H
B3E0H= B5H B8H C3H E9H B4H 32H AAH B8H 2AH AEH B8H 11H 20H 87H CDH A8H
B3F0H= 55H EBH 2AH 96H B8H 19H 11H 19H 13H CDH A8H 55H DAH 34H B4H EBH
B400H= 2AH B0H B8H 7EH FEH 80H CAH 0EH B4H FEH 82H C2H 15H B4H 21H B2H
B410H= B8H 35H C3H 34H B4H 32H ABH B8H 13H EBH 22H ACH B8H 3EH 01H 32H
B420H= AAH B8H EBH 23H 7EH 93H 77H 23H 7EH 9AH 77H 2AH A7H B8H 23H 23H
B430H= 7EH F6H 40H 77H 3EH 01H 32H FAH 7FH 3CH 32H F9H 7FH 21H B2H B8H
B440H= 7EH 36H 00H 32H FFH 7FH 3AH 99H B8H 32H FBH 7FH 21H 20H 87H 22H
B450H= FDH 7FH 7EH 32H FCH 7FH CDH D4H 4AH 3AH FBH 7FH 32H A4H B8H 3CH
B460H= 32H 99H B8H CDH 7FH B5H C2H E9H B4H 21H 00H 00H 22H 96H B8H 2AH
B470H= FDH 7FH EBH 2AH AEH B8H CDH 75H 55H 21H 20H 87H CAH B9H B4H 2AH
B480H= AEH B8H CDH A8H 55H 4DH 44H 7DH B7H CAH 8DH B4H 04H 21H 20H 87H
B490H= 3AH AAH B8H 3DH C2H A9H B4H 32H AAH B8H 3AH ABH B8H 77H 23H 3AH
B4A0H= ACH B8H 77H 23H 3AH ADH B8H 77H 23H CDH DDH 4AH 3EH 01H 32H B2H
B4B0H= B8H E5H 21H 16H 00H 22H 96H B8H E1H C3H 7CH 68H 3AH 98H B8H B7H
```

```
B4C0H=CAH D2H B2H 11H 20H 87H CDH 75H 55H C2H 34H B4H 2AH 04H 82H 11H
B4D0H=06H 82H 19H CDH B3H B5H D2H E6H B4H 11H 52H B8H CDH 10H 01H 97H
B4E0H=32H B5H B8H C3H E9H B4H 22H 04H 82H 2AH 9AH B8H 23H 23H 22H 9AH
B4F0H=B8H 3AH F8H 7FH B7H C2H 5EH B5H 3AH B5H B8H B7H CAH 05H B5H 7EH
B500H=FEH FFH C2H A4H B1H 2AH 04H 82H 44H 4DH 11H 03H 82H 03H 03H 03H
B510H=21H 20H 87H 0CH 0DH CAH 19H B5H 04H CDH DDH 4AH 22H AEH B8H 3EH
B520H=01H 32H B2H B8H 21H 16H 00H 22H 96H B8H 3AH 10H 82H 32H 81H B8H
B530H=21H 7EH B8H CDH C6H 4AH 3AH F8H 7FH B7H C2H 5EH B5H C3H 41H 68H
B540H=00H 00H 3AH F8H 7FH B7H C2H 5EH B5H 2AH 1FH 10H 22H 06H 82H 3AH
B550H=B2H B8H 32H 8DH B8H 21H 86H B8H CDH C6H 4AH CDH 7FH B5H 3AH F8H
B560H=7FH B7H C8H 3AH FAH 7FH C6H 30H 32H CAH 77H 32H DDH 77H 3AH F9H
B570H=7FH 3DH 11H B8H 77H C2H 7BH B5H 11H CBH 77H CDH 10H 01H C9H 3AH
B580H=FFH 7FH 47H 2AH FDH 7FH 7EH 32H FCH 7FH 3EH 01H 32H FFH 7FH 3EH
B590H=03H 32H F9H 7FH CDH D4H 4AH B7H C0H 05H C2H 83H B5H C9H 2AH AEH
B5A0H=B8H 11H 20H 87H CDH A8H 55H EBH 2AH 96H B8H 19H 11H FEH 12H CDH
B5B0H=75H 55H C9H 11H 9CH B8H 06H 09H CDH 6DH 53H 2AH 04H 82H 11H 09H
B5C0H=00H 19H 11H 00H 02H CDH 75H 55H C9H 21H B2H B8H 34H 2AH 96H B8H
B5D0H=11H 16H 00H 19H 22H 96H B8H C9H C3H 37H 68H 0EH 00H 1AH B8H C3H
B5E0H=85H 68H 2AH AEH B8H 22H B0H B8H 22H FDH 7FH 3EH 01H 32H FFH 7FH
B5F0H=32H EEH 7FH 32H FAH 7FH 32H F9H 7FH 79H 32H FCH 7FH 00H 00H 00H
B600H=00H 3EH 08H 32H F8H 7FH CDH EAH 4AH 3AH F8H 7FH B7H C0H D5H CDH
B610H=C9H B5H D1H 2AH FDH 7FH 22H AEH B8H 0CH 13H 13H 13H 21H 92H 85H
B620H=CDH 75H 55H DAH DDH B5H C9H 11H E3H B7H CDH FEH 01H 21H 66H B8H
B630H=CDH C6H 4AH B7H C8H 3EH 31H 32H CAH 77H 11H B8H 77H CDH 10H 01H
B640H=C9H 11H 00H B8H CDH FEH 01H 97H 32H C4H 7FH 06H 04H CDH F3H 4AH
B650H=2AH CBH 7FH 7DH 07H 07H 07H 07H B4H 57H 2AH CDH 7FH 7DH 07H 07H
B660H=07H 07H B4H 6FH 62H 11H FFH 3FH CDH 75H 55H DAH 75H B6H 11H E8H
B670H=77H CDH 10H 01H C9H 46H E5H 21H 63H B8H 78H 0FH 0FH 0FH 0FH CDH
B680H=4CH 01H 78H CDH 4CH 01H 11H 61H B8H CDH 15H 02H 97H 32H C4H 7FH
B690H=06H 02H CDH F3H 4AH 2AH CBH 7FH 7DH 0FH 0FH 0FH 0FH B4H E1H 77H
B6A0H=23H 3AH C4H 7FH FEH 03H DAH A1H B6H 3AH CDH 7FH FEH 0AH CAH 65H
B6B0H=B6H C9H 11H EBH B7H CDH FEH 01H 00H 00H 00H 00H 00H 01H 60H 15H
B6C0H=11H 00H 01H 97H 32H EEH 7FH 21H FFH 7FH 71H 2BH 36H 80H 2BH 97H
B6D0H=77H 2BH 72H 2BH 73H 2BH 77H 2BH 36H 01H 2BH 36H 08H CDH EAH 4AH
B6E0H=B7H CAH F4H B6H 3EH 30H 32H DDH 77H 11H CBH 77H CDH 10H 01H 06H
B6F0H=01H C3H 1FH B7H 21H FFH 7FH 71H 2BH 36H 80H 2BH 97H 77H 2BH 72H
B700H=2BH 73H 2BH 36H 01H 2BH 36H 02H 2BH 36H 08H CDH EAH 4AH B7H CAH
B710H=1FH B7H 3EH 31H 32H CAH 77H 11H B8H 77H CDH 10H 01H 06H 01H 2AH
B720H=FBH 7FH EBH 3EH 02H B8H C2H 2BH B7H 0EH 52H 05H C2H C7H B6H C9H
B730H=11H F3H B7H CDH FEH 01H 21H 01H 00H 22H FAH 7FH 97H 32H EEH 7FH
B740H=3EH 06H 32H EEH 7FH 3EH 06H 32H F9H 7FH 3EH 1AH 32H FFH 7FH 3EH
B750H=01H 32H FCH 7FH 3EH 08H 32H F8H 7FH CDH EAH 4AH B7H CAH 6CH B7H
B760H=3EH 31H 32H CAH 77H 11H B8H 77H CDH 10H 01H C9H 3AH FBH 7FH FEH
B770H=4DH C2H 4AH B7H C9H 11H 09H B8H CDH FEH 01H 3AH 81H 78H C6H 30H
B780H=CDH 23H 02H 3EH 2DH CDH 23H 02H 97H 32H C4H 7FH 06H 01H CDH F3H
B790H=4AH CDH 2CH 4BH 3AH CBH 7FH E6H 0FH FEH 02H D2H A2H B7H 32H 81H
B7A0H=78H C9H 11H E8H 77H CDH 10H 01H C9H 11H 10H B8H CDH FEH 01H 3AH
B7B0H=82H 78H C6H 30H CDH 23H 02H 3EH 2DH CDH 23H 02H 97H 32H C4H 7FH
B7C0H=06H 01H CDH F3H 4AH CDH 2CH 4BH 3AH CBH 7FH E6H 0FH FEH 05H D2H
B7D0H=DCH B7H 32H 82H 78H 00H 00H 00H 00H 00H 00H C9H 11H E8H 77H CDH
B7E0H=10H 01H C9H 07H 57H 52H 49H 54H 49H 4EH 47H 07H 43H 4FH 50H 59H
B7F0H=49H 4EH 47H 0CH 49H 4EH 49H 54H 49H 41H 4CH 49H 5AH 49H 4EH 47H
B800H=08H 41H 44H 44H 52H 45H 53H 53H 20H 06H 49H 4EH 50H 55H 54H 20H
B810H=0AH 42H 41H 55H 44H 20H 52H 41H 54H 45H 20H 07H 4CH 4FH 41H 44H
B820H=49H 4EH 47H 0CH 46H 41H 43H 45H 20H 4EH 55H 4DH 42H 45H 52H 20H
B830H=0CH 20H 50H 4FH 49H 4EH 54H 20H 53H 49H 5AH 45H 20H 14H 43H 41H
B840H=4EH 4EH 4FH 54H 20H 46H 49H 4EH 44H 20H 41H 4CH 50H 48H 41H 42H
B850H=45H 54H 0EH 46H 4FH 4EH 54H 20H 44H 49H 53H 43H 20H 46H 55H 4CH
B860H=4CH 04H 20H 37H 38H 2DH 00H 02H 01H 00H 01H 00H 40H 00H 01H 01H
B870H=01H 00H 83H 03H 82H 01H 00H 01H 01H 00H 01H 03H 82H 01H 01H 01H
B880H=01H 01H 82H 06H 84H 01H 01H 02H 01H 00H 83H 20H 87H 01H 01H 01H
B890H=00H 00H 82H 92H 85H 01H 00H 00H 00H 00H 00H 00H 00H 00H 00H 00H
B8A0H=00H 00H 00H 00H 00H 00H 00H 00H 00H 00H 00H 00H 00H 00H 20H 87H
B8B0H=00H 00H 00H 00H 00H 00H 30H 00H 38H 00H 40H 00H 48H 00H 50H 00H
```

```
B8C0H=58H 00H 60H 00H 70H 00H FFH FFH FFH FFH FFH FFH FFH FFH FFH FFH
B8D0H=90H 00H 90H 00H A0H 00H C0H 00H F0H 00H 20H 01H 50H 01H 80H 01H
B8E0H=FFH FFH FFH FFH FFH FFH FFH FFH FFH FFH
```

APPENDIX G

```
F000H=C3H 03H F0H AFH D3H F8H 21H 00H 00H 22H F8H 7FH 24H 22H EEH 7FH
F010H=32H F0H 7FH 4CH 31H EEH 7FH CDH 1CH F1H 3EH 02H F5H 32H F7H 7FH
F020H=D3H F8H DBH F8H E6H 04H 3EH 05H CAH 2CH F0H 2FH CDH D5H F0H F1H
F030H=07H D2H 1CH F0H 31H EEH 7FH CDH 3DH F0H C3H 34H F0H 3EH 03H CDH
F040H=1CH F1H 3AH F8H 7FH FEH 08H C2H 57H F0H 3AH FBH 7FH FEH 4DH DAH
F050H=65H F0H 3EH 03H C3H 91H F1H 79H 3CH C8H 0DH C0H 97H D3H F8H 32H
F060H=F7H 7FH C3H 34H F0H 3AH F7H 7FH 4FH 3AH FAH 7FH C6H F0H 6FH 26H
F070H=F3H 7EH D3H F8H 32H F7H 7FH A9H E6H E7H CAH 82H F0H 3EH 05H CDH
F080H=1CH F1H CDH F4H F3H 3AH F0H 7FH 1FH DAH E9H F3H 3AH FCH 7FH 32H
F090H=F6H 7FH 3AH FFH 7FH 32H F2H 7FH 2AH FDH 7FH 22H F4H 7FH 3AH F9H
F0A0H=7FH FEH 06H CAH 3DH F3H CDH 24H F1H 3AH FBH 7FH 4FH 78H 04H CAH
F0B0H=A6H F0H 91H C2H CFH F0H 3AH F9H 7FH 3DH CAH 1DH F2H 3DH CAH A7H
F0C0H=F1H 3DH CAH 1DH F2H C3H 52H F0H AFH 32H F8H 7FH 0EH 2AH C9H CDH
F0D0H=D5H F0H C3H A6H F0H 47H B7H FAH F6H F0H 3AH F7H 7FH 4FH E6H F7H
F0E0H=F6H 10H 57H DBH F8H E6H 04H 3EH 02H CAH 1CH F1H CDH 04H F1H 05H
F0F0H=CAH E7H F0H C3H E3H F0H 78H 2FH 3CH 47H 3AH F7H 7FH 4FH F6H 18H
F100H=57H C3H ECH F0H 7AH D3H F8H 79H D3H F8H C5H 06H FEH 22H 0DH F1H
F110H=22H 10H F1H 22H 13H F1H 05H C2H 0DH F1H C1H C9H CDH 0AH F1H 3DH
F120H=C2H 1CH F1H C9H DBH F8H E6H 10H 3EH 01H C2H 91H F1H 21H F1H 7FH
F130H=35H 3EH 04H CAH 91H F1H 3AH FCH 7FH 57H DBH F4H B7H C2H 3AH F1H
F140H=DBH F5H FEH FEH C2H 3AH F1H DBH F4H 47H DBH F4H 6FH DBH F4H 4FH
F150H=DBH F4H 67H DBH F4H DBH F4H DBH F4H DBH F8H 17H D0H 21H F3H 7FH
F160H=35H 3EH 02H CAH 91H F1H 3AH F9H 7FH FEH 06H CAH 61H F1H CDH F9H
F170H=F3H 7EH FEH 28H 01H FFH FFH C0H DBH F8H E6H 04H 3EH 01H C2H 83H
F180H=F1H 3EH FFH E1H CDH D5H F0H C3H 8CH F0H CDH 5DH F1H C3H 8CH F0H
F190H=AFH 32H F8H 7FH 3AH F9H 7FH FEH 06H CAH 34H F0H 3EH 4DH CDH D5H
F1A0H=F0H 0EH FFH AFH C3H 5DH F0H DBH F8H E6H 20H 3EH 05H CAH 91H F1H
F1B0H=3AH EEH 7FH 1FH DAH CDH F2H CDH 2DH F1H 7AH B9H C2H B0H F1H 2AH
F1C0H=FDH 7FH EBH 0EH 22H 0DH C2H C5H F1H 0EH 06H AFH 0DH D3H F1H C2H
F1D0H=CCH F1H 3EH FBH D3H F0H 0EH 40H 1AH D3H F1H 13H 1AH 0DH D3H F1H
F1E0H=13H C2H D8H F1H D3H F2H D3H F2H 3EH FFH D3H F1H EBH 22H FDH 7FH
F1F0H=CDH F9H F3H 21H FFH 7FH 35H CAH 04H F2H 21H FCH 7FH 34H 7EH FEH
F200H=1BH C2H B0H F1H 3AH F2H 7FH 32H FFH 7FH 3AH F6H 7FH 32H FCH 7FH
F210H=2AH F4H 7FH 22H FDH 7FH 3AH EEH 7FH 1FH DAH C8H F0H CDH 2DH F1H
F220H=7AH B9H C2H 1DH F2H EBH 2AH FDH 7FH 3AH EEH 7FH 1FH DAH 36H F2H
F230H=11H 7FH 00H C3H 49H F2H 3AH F9H 7FH 3DH CAH 42H F2H 23H 23H C3H
F240H=47H F2H 71H 23H 73H 23H 72H 23H 1BH EBH 3AH F9H 7FH 47H DBH F4H
F250H=B7H C2H 4EH F2H 05H 01H FFH FFH CAH 6EH F2H DBH F5H E6H F8H FEH
F260H=F8H C2H 5BH F2H DBH F4H 13H 09H DAH 64H F2H C3H 7FH F2H DBH F5H
F270H=E6H F8H FEH F8H C2H 6EH F2H DBH F4H 12H 13H 09H DAH 77H F2H DBH
F280H=F4H DBH F4H DBH F4H DBH F8H 17H D2H 98H F2H 3AH F3H 7FH 3DH C2H
F290H=8AH F1H 32H EFH 7FH C3H 8AH F1H EBH 22H FDH 7FH CDH F4H F3H 21H
F2A0H=FCH 7FH 34H 46H 11H EEH 7FH 1AH 1FH DAH B8H F2H 78H FEH 1BH C2H
F2B0H=B8H F2H 36H 01H 21H FBH 7FH 34H 21H FFH 7FH 35H CAH C8H F0H 1AH
F2C0H=1FH DAH 1DH F2H 78H FEH 1BH C2H 1DH F2H C3H 82H F0H 2AH FDH 7FH
F2D0H=EBH DBH F8H E6H 40H CAH CDH F2H DBH F8H E6H 40H C2H D8H F2H 26H
F2E0H=4EH 3EH FFH D3H F1H 25H C2H E3H F2H 06H 0AH 97H D3H F1H 05H C2H
F2F0H=ECH F2H 3EH FEH D3H F0H 1AH 47H 13H 3AH FBH 7FH D3H F1H 1AH 6FH
F300H=13H D3H F1H 78H D3H F1H 1AH 67H 13H D3H F1H 2BH D3H F2H D3H F2H
F310H=06H 07H 97H D3H F1H 05H C2H 13H F3H 3EH FBH D3H F0H 01H FFH FFH
F320H=1AH D3H F1H 13H 09H DAH 20H F3H D3H F2H D3H F2H 21H FFH 7FH 78H
F330H=35H D3H F1H C2H E9H F2H EBH 22H FDH 7FH C3H DCH F3H 3AH FBH 7FH
F340H=B7H C2H 56H F3H 3EH 4DH CDH D5H F0H 3EH FFH CDH D5H F0H 3EH 01H
F350H=CDH D5H F0H C3H 5BH F3H 3EH FFH CDH D5H F0H 3EH 06H CDH 1CH F1H
F360H=3EH 1AH 32H FFH 7FH 21H FCH 7FH 36H 01H DBH F8H E6H 40H CAH 6AH
F370H=F3H 0EH 4FH DBH F8H E6H 40H C2H 73H F3H 3EH FFH D3H F1H 0DH C2H
F380H=7CH F3H AFH 0EH 06H D3H F1H 0DH C2H 85H F3H 3EH FEH D3H F0H 3AH
F390H=FBH 7FH D3H F1H AFH D3H F1H 7EH D3H F1H AFH D3H F1H D3H F2H 0EH
F3A0H=0BH D3H F2H 78H D3H F1H 0DH C2H A4H F3H 0EH 06H AFH D3H F1H 0DH
F3B0H=C2H ADH F3H 3EH FBH D3H F0H 0EH 80H 3EH 20H D3H F1H 0DH C2H BBH
F3C0H=F3H D3H F2H 0EH 18H D3H F2H 78H D3H F1H 0DH C2H C8H F3H 34H D3H
F3D0H=F1H D3H F1H 7EH FEH 1BH 78H D3H F1H C2H 82H F3H 78H D3H F1H DBH
F3E0H=F8H E6H 40H C2H DCH F3H C3H 04H F2H 97H 32H F0H 7FH C3H 9CH F2H
F3F0H=42H 44H 60H C0H 3EH FFH 32H F3H 7FH 3EH 3CH 32H F1H 7FH C9H 00H
```

APPENDIX H

```
ENNNFNNNNF ENNNFNNNNF ENNNFNNNNF ENNNNNNNNF
EPPPNNNNPF EPPPNNNNPF EPPPNNNNPF ENNNNNNNNF
EPPPNNNNPF EPPFNPNNPF EPPPNNNNPF ENNNNNNNNF
EPPPNPNNPF BPPPNNNNPF EPPPNPNNPF ENNNNNNNNF
ENNNNPNNPF ENNNNPNNPF ENNNNPNNPF ENNNNNNNNF
ENNFNPNNPF BNNFNFNNNF ENNFNPNNPF ENNNNNNNNF
ENNFNPNNNF ENNFNPNNPF ENNFNPNNNF BNNNNNNNNF
ENNPNPNNNF ENNPNPNNNF ENNPNPNNNF ENNNNNNNNF
ENNPPNNNNF ENNPPNNNNF ENNPPNNNNF ENNNNNNNNF
```

DIR NO Ø

| | | | |
|---|---|---|---|
| BNNNNPNNPF | ENNNNPNNPF | BNNNNPNNPF | BNNNNNNNNF |
| ENNNNPNNPF | BNNNNPNNNF | BNNNNPNNPF | BNNNNNNNNF |
| ENNNNPNNNF | BNNNNPNNPF | ENNNNPNNNF | BNNNNNNNNF |
| BNNPNPNNNF | BNNPNPNNNF | ENNPNPNNNF | ENNNNNNNNF |
| BNPNNPNNNF | ENPNNPNPNF | ENPNNPNNNF | BNNNNNNNNF |
| BNPNNPNPNF | ENPNNPNNNF | BNPNNPNPNF | BNNNNNNNNF |
| ENPNNPNPNF | ENPNNPNPNF | BNPNNPNPNF | ENNNNNNNNF |
| ENPNPNNNNF | BNPNPNNNNF | BNPNPNNNNF | ENNNNNNNNF |
| ENNPNPNNNF | BNNPNPNNNF | BNNPNPNNNF | BNNNNNNNNF |
| BNNPNPNNNF | BNNPNPNPNF | BNNPNPNNNF | ENNNNNNNNF |
| ENNPNPNPNF | ENNPNPNNNF | ENNPNPNPNF | ENNNNNNNNF |
| ENPNNPNPNF | ENPNNPNPNF | ENPNNPNPNF | BNNNNNNNNF |
| BNPPNPNPNF | ENPPNNNPNF | BNPPNPNPNF | ENNNNNNNNF |
| ENPPNNNPNF | BNPPNPNPNF | ENPPNNNPNF | BNNNNNNNNF |
| BNPPNNNPNF | BNPPNNNPNF | BNPPNNNPNF | ENNNNNNNNF |
| ENPPPNNNNF | ENPPPNNNNF | ENPPPNNNNF | ENNNNNNNNF |
| ENPNNPNPNF | ENPNNPNPNF | ENPNNPNPNF | BNNNNNNNNF |
| ENPNNPNPNF | ENPNNNNPNF | ENPNNPNPNF | BNNNNNNNNF |
| ENPNNNNPNF | BNPNNPNPNF | BNPNNNNPNF | BNNNNNNNNF |
| ENPPNNNPNF | BNPPNNNPNF | ENPPNNNPNF | BNNNNNNNNF |
| BPNNNNNPNF | EPNNNNPPNF | BPNNNNNPNF | ENNNNNNNNF |
| BPNNNNPPNF | EPNNNNNPNF | BPNNNNPPNF | BNNNNNNNNF |
| EPNNNNPPNF | BPNNNNPPNF | BPNNNNPPNF | BNNNNNNNNF |
| EPNNPNNNNF | BPNNPNNNNF | BPNNPNNNNF | BNNNNNNNNF |
| ENPPNNNPNF | ENPPNNNPNF | BNPPNNNPNF | ENNNNNNNNF |
| BNPPNNNPNF | ENPPNNPPNF | ENPPNNNPNF | ENNNNNNNNF |
| ENPPNNPPNF | BNPPNNNPNF | ENPPNNPPNF | BNNNNNNNNF |
| BPNNNNPPNF | EPNNNNPPNF | EPNNNNPPNF | ENNNNNNNNF |
| BPNPNNPPNF | BPNPNNPNNF | BPNPNNPPNF | ENNNNNNNNF |
| BPNPNNPNNF | EPNPNNPPNF | EPNPNNPNNF | ENNNNNNNNF |
| BPNPNNPNNF | EPNPNNPNNF | EPNPNNPNNF | BNNNNNNNNF |
| EPNPPNNNNF | EPNPPNNNNF | BPNPPNNNNF | ENNNNNNNNF |
| EPNNNNPPNF | BPNNNNPPNF | EPNNNNPPNF | BNNNNNNNNF |
| EPNNNNPPNF | EPNNNNPNNF | BPNNNNPPNF | ENNNNNNNNF |
| EPNNNNPNNF | BPNNNNPPNF | BPNNNNPNNF | BNNNNNNNNF |
| BPNPNNPNNF | EPNPNNPNNF | BPNPNNPNNF | ENNNNNNNNF |
| EPPNNNPNNF | EPPNNNPNPF | BPPNNNPNNF | ENNNNNNNNF |
| BPPNNNPNPF | BPPNNNPNNF | BPPNNNPNPF | BNNNNNNNNF |
| EPPNNNPNPF | BPPNNNPNPF | EPPNNNPNPF | BNNNNNNNNF |
| BPPNPNNNNF | EPPNPNNNNF | EPPNPNNNNF | BNNNNNNNNF |
| BPNPNNPNNF | BPNPNNPNNF | BPNPNNPNNF | ENNNNNNNNF |
| BPNPNNPNNF | EPNPNNPNPF | EPNPNNPNNF | BNNNNNNNNF |
| EPNPNNPNPF | EPNPNNPNNF | BPNPNNPNPF | ENNNNNNNNF |
| EPPNNNPNPF | BPPNNNPNPF | EPPNNNPNPF | BNNNNNNNNF |
| BPPPNNPNPF | BPPPNNNNPF | EPPPNNPNPF | BNNNNNNNNF |
| EPPPNNNNPF | EPPPNNPNPF | EPPPNNNNPF | BNNNNNNNNF |
| EPPPNNNNPF | EPPPNNNNPF | EPPPNNNNPF | ENNNNNNNNF |
| EPPPPNNNNF | EPPPPNNNNF | EPPPPNNNNF | ENNNNNNNNF |
| BPPNNNPNPF | EPPNNNPNPF | EPPNNNPNPF | BNNNNNNNNF |
| EPPNNNPNPF | EPPNNNNNPF | EPPNNNPNPF | ENNNNNNNNF |
| EPPNNNNNPF | EPPNNNPNPF | EPPNNNNNPF | ENNNNNNNNF |
| EPPPNNNNPF | BPPPNNNNPF | BPPPNNNNPF | BNNNNNNNNF |
| ENNNNNNNPF | BNNNNPNNPF | BNNNNNNNPF | ENNNNNNNNF |
| ENNNNPNNPF | BNNNNNNNPF | BNNNNPNNPF | ENNNNNNNNF |
| ENNNNPNNPF | BNNNNPNNPF | ENNNNPNNPF | ENNNNNNNNF |
| BNNNPNNNNF | BNNNPNNNNF | BNNNPNNNNF | ENNNNNNNNF |
| ENNNNNNNNF | ENNNNNNNNF | BNNNNNNNNF | ENNNNNNNNF |
| ENNNNNNNNF | BNNNNNNNNF | BNNNNNNNNF | ENNNNNNNNF |
| ENNNNNNNNF | ENNNNNNNNF | BNNNNNNNNF | ENNNNNNNNF |
| BNNNNNNNNF | ENNNNNNNNF | BNNNNNNNNF | ENNNNNNNNF |
| BNNNNNNNNF | ENNNNNNNNF | ENNNNNNNNF | ENNNNNNNNF |
| ENNNNNNNNF | ENNNNNNNNF | BNNNNNNNNF | ENNNNNNNNF |
| ENNNNNNNNF | BNNNNNNNNF | BNNNNNNNNF | ENNNNNNNNF |
| ENNPPNNNNF | ENNPPNNNNF | ENNPPNNNNF | BNNNNNNNNF |

| | | | |
|---|---|---|---|
| BPPPNPNNPF | BPPPNPNNPF | BPPPNNNNPF | BNNNNNNNNF |
| BPPPNPNNPF | BPPPNNNNPF | BPPPNNNNPF | BNNNNNNNNF |
| BPPPNNNNPF | BPPPNNNNPF | BPPPNNNNPF | BNNNNNNNNF |
| BNNPNPNNNF | BNNPNPNNNF | BNNPNPNNNF | BNNNNNNNNF |
| BNPPNNNPNF | BNPPNNNPNF | BNPPNNNPNF | BNNNNNNNNF |
| BNPPNPNPNF | BNPPNNNPNF | BNPPNNNPNF | BNNNNNNNNF |
| BNPPNPNPNF | BNPPNPNPNF | BNPPNNNPNF | BNNNNNNNNF |
| BNPNPNNNNF | BNPNPNNNNF | BNPNPNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNPPPNNNNF | BNPPPNNNNF | BNPPPNNNNF | BNNNNNNNNF |
| BNNPNPNPNF | BNNPNPNPNF | BNNPNPNNNF | BNNNNNNNNF |
| BNNPNPNPNF | BNNPNPNNNF | BNNPNPNNNF | BNNNNNNNNF |
| BNNPNPNNNF | BNNPNPNNNF | BNNPNPNNNF | BNNNNNNNNF |
| BNPPNNNPNF | BNPPNNNPNF | BNPPNNNPNF | BNNNNNNNNF |
| BPNPNNPNNF | BPNPNNPNNF | BPNPNNPNNF | BNNNNNNNNF |
| BPNPNNPPNF | BPNPNNPNNF | BPNPNNPNNF | BNNNNNNNNF |
| BPNPNNPPNF | BPNPNNPPNF | BPNPNNPNNF | BNNNNNNNNF |
| BPNNPNNNNF | BPNNPNNNNF | BPNNPNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BPNPPNNNNF | BPNPPNNNNF | BPNPPNNNNF | BNNNNNNNNF |
| BNPPNNPPNF | BNPPNNPPNF | BNPPNNNPNF | BNNNNNNNNF |
| BNPPNNPPNF | BNPPNNNPNF | BNPPNNNPNF | BNNNNNNNNF |
| BNPPNNNPNF | BNPPNNNPNF | BNPPNNNPNF | BNNNNNNNNF |
| BPNPNNPNNF | BPNPNNPNNF | BPNPNNPNNF | BNNNNNNNNF |
| BPPPNNNNPF | BPPPNNNNPF | BPPPNNNNPF | BNNNNNNNNF |
| BPPPNNPNPF | BPPPNNNNPF | BPPPNNNNPF | BNNNNNNNNF |
| BPPPNNPNPF | BPPPNNPNPF | BPPPNNNNPF | BNNNNNNNNF |
| BPPNPNNNNF | BPPNPNNNNF | BPPNPNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BNNNNNNNNF | BNNNNNNNNF | BNNNNNNNNF | BNNNNNNNNF |
| BPPPPNNNNF | BPPPPNNNNF | BPPPPNNNNF | BNNNNNNNNF |
| BPNPNNPNPF | BPNPNNPNPF | BPNPNNPNNF | BNNNNNNNNF |
| BPNPNNPNPF | BPNPNNPNNF | BPNPNNPNNF | BNNNNNNNNF |
| BPNPNNPNNF | BPNPNNPNNF | BPNPNNPNNF | BNNNNNNNNF |
| BPPPNNNNPF | BPPPNNNNPF | BPPPNNNNPF | BNNNNNNNNF |
| BNNPNPNNNF | BNNPNPNNNF | BNNPNPNNNF | BNNNNNNNNF |
| BNNPNPNNPF | BNNPNPNNNF | BNNPNPNNNF | BNNNNNNNNF |
| BNNPNPNNPF | BNNPNPNNPF | BNNPNPNNNF | BNNNNNNNNF |

Having described the preferred embodiment of the subject invention and having described numerous specific functional improvements which result therefrom, what is believed to be new and patentable is set forth in the following claims:

We claim:

1. A coded font for storing plural alphabet character designs described by groups of successive multi-bit translational commands with each group describing the entire boundary contour of a single alphabet character beginning at a starting coordinate position and successively describing translational movements around the character boundary contour, each successive command identifying either (1) a path selected from a first translational path set consisting of translational paths frequently required in order to describe a character boundary, and uniquely identified by a binary number of X bits or (2) a path selected from a second translational path set consisting of translational paths less frequently required to define a character boundary and uniquely identified by a binary number of 2 X bits, or (3) a large displacement translational path longer than any of the displacement paths of the first and second path sets uniquely identified by a binary number of 3 X bits, comprising (a) a disc adapted to be mounted for rotation;

(b) a plurality of sequentially ordered, circumferentially spaced, magnetic storage cells formed of material magnetically alterable to store binary signals, said storage cells being arranged into plural circular storage tracks concentrically positioned around the center of said disc to permit the stored signals to be sensed sequentially as the disc is rotated; and (c) a plurality of character sectors equal in number to the number of character designs stored on the coded font, one said character sector being uniquely associated with each character design, said character sectors being arranged end to end in a predetermined ordered sequence, each said character sector including (1) a character data field formed of a plurality of said storage cells equal in number to the number of binary bits required to store the starting coordinates plus X times the total number of commands required to identify the associated character boundary contour plus X times the number of commands identifying paths from the second path set plus 2X times the number of commands identifying the large displacement translational path, said storage cells being magnetically altered to store in sequence the X, 2X, and 3X bit binary signals representing the successive translational commands describing the associated alphabet character, and (2) a non-character data field formed of a number of storage cells preceding said character data field, each said non-character data field having the same number of said storage cells as all other non-character data fields, said storage cells of said non-character data field being magnetically altered to store binary signals identifying the position of the associated said character data field, whereby all of the signals descriptive of a particular character design stored within a track of the disc may be retrieved by rotating the font disc to cause all of the storage cells in which the corresponding character data field is stored to move past a magnetic pick-up succession without interruption.

2. A coded font disc as defined in claim 1, wherein said disc includes an indexing means for actuating an index transducer positioned in predetermined relationship with respect to the hub to cause the index means to produce a signal upon rotation of the disc in syncronism with the passage in reading relationship with a reading head of the first storage cells in each of the circular storage tracks, and wherein said character sectors are positioned on the disc at a predetermined distance from the beginning of each circular storage track as determined by said index means.

3. A coded font disc adapted to be mounted on a rotatable hub for use in an ultrahigh resolution photocomposition system adapted sequentially to recreate optical images of typeface characters when the disc is rotated in a predetermined direction past a reading head adapted to read groups of encoded digital signals stored on the magnetic disc in a highly compact form describing sequential translational movements around the boundary of each character image, comprising a plurality of circular storage tracks concentrically arranged around the center of said disc, each said track including a plurality of sequentially ordered, circumferentially spaced, magnetic storage cells formed of material magnetically alterable to store a signal, at least one track including a first character sector having a character data field formed of a plurality of storage cells the number of which is sufficient to record the digital signals describing the sequential translational movements around the entire boundary of one of the characters encoded on the disc and having a first non-character data field formed of a plurality of storage cells within which is recorded digital signals identifying the position of said character data field within said one track, said tracks containing a plurality of additional character sectors corresponding in number to the number of additional characters encoded on the disc, each said additional character sector including a corresponding character data field formed of a plurality of storage cells the number of which is sufficient to record the digital signals describing the sequential translational movements around the entire boundary of the corresponding character and including a non-character data field formed of a plurality of storage cells within which is recorded digital signals identifying the postion within said track of said corresponding character data field, whereby the number of storage cells required to achieve a desired degree of optical image resolution is minimized.

4. A font for storing plural groups of encoded binary signals with each group including successive multi-bit translational codes describing the entire boundary contour of a character for use in a photocomposition system having a signal transducer for reading the stored multi-bit translational codes and an index transducer for identifying the signals being read, comprising (a) a disc containing a central aperture permitting the disc to be mounted on a hub for rotation past the signal and index transducers;

(b) a plurality of ordered, circular storage tracks concentrically arranged around the center of the circular aperture, each said track including a plurality of sequentially ordered, circumferentially spaced, magnetic storage cells formed of material magnetically alterable to store binary signals;

(c) indexing means positioned on said disc for causing the index transducer to produce a signal identifying the first storage cell in the sequence of ordered cells in each track as the first storage cell passes the signal head;

(d) a first character sector formed from a plurality of ordered storage cells commencing with the first storage cell in one said track, said first character sector including a first character data field having a plurality of storage cells corresponding to the total number of bits contained in the multi-bit translational codes describing the entire boundary contour of a single character, said storage cells of said first character data field being magnetically alterable to store sequentially the multi-bit translational codes describing the entire boundary contour of said one character and a first non-character data field formed of a predetermined number of storage cells preceding said first character data field in which binary numbers are magnetically recorded to identify the location of said first character data field;

(e) a plurality of additional character sectors corresponding in number to the remaining number of character contours recorded on the disc and arranged sequentially end to end extending from one track into the next ordered track, each said additional character sector being associated with a particular character design and including an additional character data field formed of a plurality of sequential storage cells corresponding in number to the number of bits contained in the multi-bit translational codes describing the entire boundary contour, said storage cells of each said additional character data field being magnetically altered to store sequentially the multi-bit translational codes describing the associated character contour of the character associated with said additional character sector and an additional non-character data field preceding said additional character data field and being formed of a predetermined number of storage cells equal to the number of storage cells in said first non-character data field, said additional non-character data field storage cells being magnetically altered to record binary signals representative of the position of the associated additional character data field.

5. A font as defined in claim 4 for use in a photocomposition printer capable of electronically recreating optical images of alphabet characters in a plurality of different point sizes from the same sequence of stored multi-bit translational codes including a first group of character sectors for recording a first set of optical images of alphabet characters in a particular typeface style wherein the alphabet characters are proportioned for electronic display in a predetermined point size and a second group of character sectors for recording a second set of optical images of alphabet characters in the same typeface style as the first set wherein the alphabet characters of the second set are proportioned differently than the first set for electronic display in a predetermined point size different from the first set and further including an alphabet directory sector formed from a plurality of ordered storage cells on said disc, said storage cells in said alphabet directory sector being magnetically altered to record binary control signals for instructing the photocomposition system to use the signals in one of the first and second groups of character sectors when recreating images in a selected point size in order to minimize the amount of electronic alteration of the values represented by the stored multi-bit translational codes in order to create the desired character image size.

6. A font as defined in claim 1, wherein the translational paths forming said first translational path set are less sharply curved than are the translational paths forming said second translational path set.

7. A font as defined in claim 3, wherein each said character data field is formed of consecutive storage cells and each said non-character data field is formed of consecutive storage cells whereby all of the signals descriptive of a particular character design stored within a track of the disc may be retrieved by rotating the font disc to cause all of the storage cells in which the corresponding character data field is stored to move past the reading head in succession without interruption.

8. A font as defined in claim 3, wherein the number of bits in each multi-bit translational command forming the set of translational paths defining said first translational path set is less than the number of bits required to uniquely define each of the translational paths in the set of possible translational paths and wherein each encoded binary signal representative of a translational path in said first set is selected from one of a plurality of subsets of such possible translational paths, each said subset being uniquely defined by the general direction in which the previous translational movement along the character boundary took place.

9. A font as defined in claim 8, wherein each encoded binary signal corresponding to translational paths in said first set includes 2 to 6 bits and said first path set includes 8 to 48 paths.

10. A font as defined in claim 9, wherein each encoded binary signal corresponding to translational paths in said first set includes at least 3 bits and the total path set includes 24 paths.

11. A font as defined in claim 10, wherein said first path set includes 24 separate paths starting from a common point in an X, Y orthogonal point matrix to each of 24 peripheral terminal points spaced 3 points from the common point and wherein the first octant of paths starting on the horizontal includes a first path formed of end to end line segments interconnecting points (0,0) (1,0) (2,0) (3,0), a second path formed of end to end line segments interconnecting points (0,0) (1,0) (2,1) (3,1), a third path formed of end to end line segments interconnecting points (0,0) (1,1) (2,1) (3,2) and a fourth path formed of end to end line segments interconnecting points (0,0) (1,1) (2,2) (3,3) and wherein each succeeding octant of paths is formed of a mirror image of the paths contained in the preceeding octant of paths taken along the line joining the two succeeding octants.

12. A coded font disc mounted on a rotatable hub for use in an ultrahigh resolution photocomposition system adapted sequentially to recreate optical images of typeface characters when the disc is rotated in a predetermined direction past a reading head adapted to read groups of encoded digital signals stored on the magnetic disc in a highly compact form describing sequential translational movements around the boundary of each character image, the number of encoded digital signals in some groups being different from the number of encoded digital signals in other groups, comprising a plurality of circular storage tracks concentrically arranged around the center of said disc, each said track including a plurality of sequentially ordered, circumferentially spaced, magnetic storage cells formed of material magnetically alterable to store a signal, said tracks including a plurality of character sectors corresponding in number to the number of characters encoded on the disc, each said character sector including a corresponding character data field formed of a plurality of storage cells equal in number to no more than the number of digital signals necessary to describe the sequential translational movements around the entire boundary of the corresponding character and including a non-character data field formed of a plurality of storage cells within which are recorded digital signals identifying the position within a track of said corresponding character data field, the total length of each said character sector being limited solely to the number of storage cells in said corresponding character data and non-character data fields, whereby the number of storage cells required to achieve a desired degree of optical image resolution is minimized.

13. A font as defined in claim 12, wherein each said character data field is formed of consecutive storage cells and each said non-character data field is formed of consecutive storage cells, whereby all of the signals descriptive of a particular character design stored within a track of the disc may be retrieved by rotating the font disc to cause all of the storage cells in which the corresponding character data field is stored to move past a reading head in succession without interruption.

* * * * *

UNITED STATES PATENT AND TRADEMARK OFFICE

CERTIFICATE OF CORRECTION

PATENT NO. : 4,446,491

DATED : May 1, 1984

INVENTOR(S) : James A. Tidd et al

It is certified that error appears in the above-identified patent and that said Letters Patent are hereby corrected as shown below:

Cols. 43 and 44, above first line, insert -- Appendix A, © Alphatype Corporation 1978 --;

Cols. 61 and 62, above first line, insert -- Appendix B, © Alphatype Corporation 1978 --;

Cols. 65 and 66, above first line, insert -- Appendix C, © Alphatype Corporation 1978 --;

Col. 70, above line 1, after "Appendix D", insert -- © Alphatype Corporation 1978 --;

Col. 80, above line 1, after "Appendix E", insert -- © Alphatype Corporation 1978 --;

Col. 82, above line 1, after "Appendix F", insert -- © Alphatype Corporation 1978 --;

Col. 118, line 4, after "Appendix G", insert -- © Alphatype Corporation 1978 --; and

UNITED STATES PATENT AND TRADEMARK OFFICE
CERTIFICATE OF CORRECTION

PATENT NO. : 4,446,491

DATED : May 1, 1984

INVENTOR(S) : James A. Tidd et al

It is certified that error appears in the above-identified patent and that said Letters Patent is hereby corrected as shown below:

Col. 117, line 69, after "Appendix H", insert --© Alphatype Corporation 1978 --.

Signed and Sealed this

*Twenty-third* Day of *September 1986*

[SEAL]

*Attest:*

DONALD J. QUIGG

*Attesting Officer* *Commissioner of Patents and Trademarks*